(12) United States Patent
Prince et al.

(10) Patent No.: US 12,077,997 B2
(45) Date of Patent: *Sep. 3, 2024

(54) MOTOR VEHICLE GESTURE ACCESS SYSTEM INCLUDING POWERED DOOR SPEED CONTROL

(71) Applicant: ADAC Plastics, Inc., Grand Rapids, MI (US)

(72) Inventors: Jack Prince, Ann Arbor, MI (US); Ryan Bussis, Caledonia, MI (US); Anne Adamczyk, Grand Rapids, MI (US); Keith Scheiern, Lowell, MI (US)

(73) Assignee: ADAC Plastics, Inc., Grand Rapids, MI (US)

( * ) Notice: Subject to any disclaimer, the term of this patent is extended or adjusted under 35 U.S.C. 154(b) by 316 days.

This patent is subject to a terminal disclaimer.

(21) Appl. No.: 17/683,537

(22) Filed: Mar. 1, 2022

(65) Prior Publication Data

US 2022/0186533 A1 Jun. 16, 2022

Related U.S. Application Data

(63) Continuation-in-part of application No. 17/017,221, filed on Sep. 10, 2020, now Pat. No. 11,313,159,
(Continued)

(51) Int. Cl.
*E05F 15/00* (2015.01)
*E05B 81/76* (2014.01)
(Continued)

(52) U.S. Cl.
CPC .............. *E05B 81/78* (2013.01); *E05B 81/77* (2013.01); *E05B 85/16* (2013.01); *G08C 23/04* (2013.01)

(58) Field of Classification Search
CPC .......... E05B 81/78; E05B 81/77; E05B 85/16; E05F 15/40; E05F 15/72; E05F 15/70; E05Y 2900/531; G08C 23/04
See application file for complete search history.

(56) References Cited

U.S. PATENT DOCUMENTS 5,682,135 A   10/1997 Abonde
6,086,131 A   7/2000 Bingle et al.
(Continued)

FOREIGN PATENT DOCUMENTS

CN   103507761 A   1/2014
CN   103946725 A   7/2014
(Continued)

OTHER PUBLICATIONS

Non-final Office Action for U.S. Appl. No. 15/262,647; dated Apr. 20, 2018.
(Continued)

*Primary Examiner* — Chi Q Nguyen
(74) *Attorney, Agent, or Firm* — Barnes & Thornburg LLP

(57) ABSTRACT

A gesture access system includes at least one wireless transceiver to be mounted to a motor vehicle having a powered door, a motor responsive to motor control signals to open the power door and a processor to process signals from the wireless transceiver to determine whether an object is exhibiting a predefined gesture and, if so, to control an unlocking actuator to unlock the powered door, to then continually monitor and process signals from the wireless transceiver to determine object parameters including a speed of movement of the object away from, and a distance of the object relative to, the powered door, determine a door opening speed based on the object parameters, and control
(Continued)

the motor control signals to open the powered door at the determined door opening speed.

20 Claims, 45 Drawing Sheets

Related U.S. Application Data which is a continuation-in-part of application No. 16/284,347, filed on Feb. 25, 2019, now Pat. No. 10,822,845, which is a continuation of application No. 16/164,570, filed on Oct. 18, 2018, now Pat. No. 10,415,276, which is a continuation-in-part of application No. 15/262,647, filed on Sep. 12, 2016, now abandoned.

(60) Provisional application No. 62/217,842, filed on Sep. 12, 2015.

(51) Int. Cl.
*E05B 81/78* (2014.01)
*E05B 85/16* (2014.01)
*G08C 23/04* (2006.01)

(56) References Cited

U.S. PATENT DOCUMENTS

| | | | |
|---|---|---|---|
| 6,676,186 B2 | 1/2004 | Greif | |
| 7,175,227 B2 | 2/2007 | Menard | |
| 8,333,492 B2 | 12/2012 | Dingman et al. | |
| 8,643,628 B1 | 2/2014 | Erikksson et al. | |
| 8,868,299 B2 | 10/2014 | Kroemke et al. | |
| 8,917,239 B2 | 12/2014 | Eriksson et al. | |
| 9,001,087 B2 | 4/2015 | Eriksson et al. | |
| 9,102,266 B2 | 8/2015 | Dingman et al. | |
| 9,164,625 B2 | 10/2015 | Holmgren et al. | |
| 9,394,737 B2 | 7/2016 | Gehin et al. | |
| 9,446,739 B2 | 9/2016 | Herthan et al. | |
| 9,470,033 B1 | 10/2016 | Dudar | |
| 9,598,003 B2 | 3/2017 | Dingman et al. | |
| 9,646,436 B1 | 5/2017 | Campbell et al. | |
| 9,670,702 B2 | 6/2017 | Sugita et al. | |
| 9,694,735 B2 | 7/2017 | Sheehan et al. | |
| 9,739,082 B2 | 8/2017 | Krauss et al. | |
| 9,745,778 B1 | 8/2017 | Bingle | |
| 9,776,556 B2 | 10/2017 | Dingman et al. | |
| 9,812,017 B2 | 11/2017 | Krauss et al. | |
| 9,892,583 B2 | 2/2018 | Bingle | |
| 9,922,472 B2 | 3/2018 | Jergess et al. | |
| 9,956,940 B2 | 5/2018 | Ette | |
| 10,087,673 B1 | 10/2018 | Rosenmarkle et al. | |
| 10,137,363 B2 | 11/2018 | Parshionikar | |
| 10,246,009 B2 * | 4/2019 | McMahon | B60Q 1/324 |
| 10,415,276 B2 | 9/2019 | Bussis et al. | |
| 10,493,952 B1 | 12/2019 | Schwie et al. | |
| 10,794,104 B2 * | 10/2020 | Kimura | E05F 15/622 |
| 10,822,845 B2 | 11/2020 | Bussis et al. | |
| 11,040,593 B1 | 6/2021 | Chen et al. | |
| 11,247,635 B1 * | 2/2022 | Salter | B60R 25/24 |
| 11,313,159 B2 * | 4/2022 | Bussis | E05B 85/16 |
| 2001/0011836 A1 | 8/2001 | Grey | |
| 2001/0052839 A1 | 12/2001 | Nahata et al. | |
| 2003/0020645 A1 | 1/2003 | Akiyama | |
| 2004/0031908 A1 | 2/2004 | Neveux et al. | |
| 2006/0226953 A1 | 10/2006 | Shelley et al. | |
| 2006/0232379 A1 | 10/2006 | Shelley et al. | |
| 2008/0068145 A1 | 3/2008 | Weghaus et al. | |
| 2009/0160211 A1 | 6/2009 | Krishnan et al. | |
| 2009/0302635 A1 | 12/2009 | Nakamura | |
| 2010/0106182 A1 | 4/2010 | Patel et al. | |
| 2010/0275530 A1 | 11/2010 | Laskowski et al. | |
| 2011/0196568 A1 | 8/2011 | Nickolaou et al. | |
| 2011/0309912 A1 | 12/2011 | Ulrich | |
| 2012/0200486 A1 | 8/2012 | Meinel et al. | |
| 2012/0312956 A1 | 12/2012 | Chang et al. | |
| 2013/0342379 A1 | 12/2013 | Bauman et al. | |
| 2014/0156112 A1 | 6/2014 | Lee | |
| 2014/0169139 A1 | 6/2014 | Lee | |
| 2014/0204599 A1 | 7/2014 | Miura | |
| 2014/0207344 A1 | 7/2014 | Ihlenbug et al. | |
| 2014/0324298 A1 | 10/2014 | Reime | |
| 2015/0009062 A1 | 1/2015 | Hethan | |
| 2015/0069249 A1 | 3/2015 | Alameh et al. | |
| 2015/0248796 A1 | 9/2015 | Iyer et al. | |
| 2015/0277848 A1 | 10/2015 | Grothe et al. | |
| 2015/0315840 A1 | 11/2015 | Reymann et al. | |
| 2016/0096509 A1 | 4/2016 | Ette et al. | |
| 2016/0300410 A1 | 10/2016 | Jones et al. | |
| 2016/0357262 A1 | 12/2016 | Ansari | |
| 2016/0358395 A1 | 12/2016 | Dry | |
| 2016/0376819 A1 * | 12/2016 | Bingle | E05B 85/16 |
| | | | 70/266 |
| 2017/0032599 A1 | 2/2017 | Elie et al. | |
| 2017/0074009 A1 | 3/2017 | Banter et al. | |
| 2017/0138097 A1 | 5/2017 | Patel | |
| 2017/0152697 A1 | 6/2017 | Dehelean et al. | |
| 2017/0158115 A1 | 6/2017 | Linden et al. | |
| 2017/0166166 A1 | 6/2017 | Lindic et al. | |
| 2017/0167180 A1 | 6/2017 | Bingle et al. | |
| 2017/0174179 A1 | 6/2017 | Schumacher et al. | |
| 2017/0234054 A1 * | 8/2017 | Kumar | E05F 15/73 |
| | | | 49/324 |
| 2017/0306684 A1 | 10/2017 | Baruco et al. | |
| 2017/0369016 A1 | 12/2017 | Gurghian et al. | |
| 2018/0065542 A1 | 3/2018 | Dingman et al. | |
| 2018/0099643 A1 | 4/2018 | Golsch et al. | |
| 2018/0178788 A1 | 6/2018 | Ikedo et al. | |
| 2018/0196501 A1 | 7/2018 | Trotta | |
| 2018/0238098 A1 * | 8/2018 | Rhode | E05C 17/006 |
| 2018/0238099 A1 * | 8/2018 | Schatz | E05F 15/622 |
| 2018/0371822 A1 * | 12/2018 | Rrumbullaku | H02H 7/0851 |
| 2019/0032391 A1 | 1/2019 | Lavoie et al. | |
| 2019/0053021 A1 | 2/2019 | Fuke | |
| 2019/0061689 A1 | 2/2019 | Breer et al. | |
| 2019/0126889 A1 | 5/2019 | Oman et al. | |
| 2019/0128040 A1 | 5/2019 | Mitchell | |
| 2019/0162010 A1 | 5/2019 | Rafrafi et al. | |
| 2019/0162821 A1 | 5/2019 | Rafrafi et al. | |
| 2019/0162822 A1 | 5/2019 | Rafrafi et al. | |
| 2019/0186177 A1 * | 6/2019 | Bussis | E05B 81/78 |
| 2019/0262822 A1 | 8/2019 | Döbele | |
| 2020/0150702 A1 | 5/2020 | Ueda | |
| 2020/0284876 A1 * | 9/2020 | Hurd | G01S 7/415 |
| 2020/0408009 A1 | 12/2020 | Bussis et al. | |
| 2021/0262274 A1 | 8/2021 | Schatz et al. | |

FOREIGN PATENT DOCUMENTS

| | | |
|---|---|---|
| CN | 204552434 U | 8/2015 |
| CN | 106157396 A | 11/2016 |
| CN | 106254027 A | 12/2016 |
| CN | 108287608 A | 7/2018 |
| CN | 109322585 A | 2/2019 |
| CN | 109383451 A | 2/2019 |
| CN | 109760627 A | 5/2019 |
| CN | 109844822 A | 6/2019 |
| DE | 102016007388 A1 | 12/2016 |
| EP | 2082908 A1 | 7/2009 |
| EP | 2738337 A1 | 6/2014 |
| JP | 2014227647 A | 12/2014 |
| KR | 1020120032145 A | 4/2012 |
| WO | 2009152956 A1 | 12/2009 |
| WO | 2020237348 A1 | 12/2020 |
| WO | 2021000045 A1 | 1/2021 |
| WO | 2021083626 A1 | 5/2021 |

OTHER PUBLICATIONS

Non-final Office Action for U.S. Appl. No. 15/378,823; dated Jul. 27, 2018.

(56) References Cited

OTHER PUBLICATIONS

Search Report and Written Opinion for International Patent Application No. PCT/US2018/037517 dated Mar. 11, 2019.
European Search Report for European Patent Application 18922585.7-1215 dated Dec. 7, 2021.
Search Report and Written Opinion for International Patent Application No. PCT/US2016/066623 dated Mar. 31, 2017.
Search Report and Written Opinion for International Patent Application No. PCT/US2016/051299 dated Dec. 23, 2016.
Faheem Khan et al; Hand-Based Gesture Recognition for Vehicular Applications Using IR-UWB Radar, Sensors 2017, 17, 833; doi: 10.3390/s17040833; www.mdpi.com/journal/sensors.
European Search Report for European Patent Application 21189655.0-1009 dated Jan. 2, 2022.
Office Action issued Nov. 1, 2022 in Chinese application 201880094580.1.
Office Action and Search Report for counterpart Chinese Patent Application No. 202111061434.9 (filed Sep. 10, 2021), issued May 13, 2023 (translation appended).
Office action and search report for counterpart CN Patent Application No. 202111061434.9, dated Oct. 19, 2023 (english translation appended).
Office Action issued Jan. 25, 2022 in Chinese application 201880094580.1.

\* cited by examiner

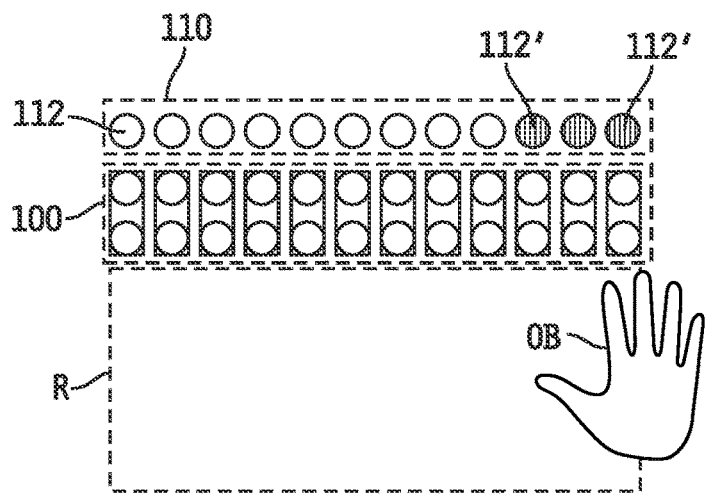
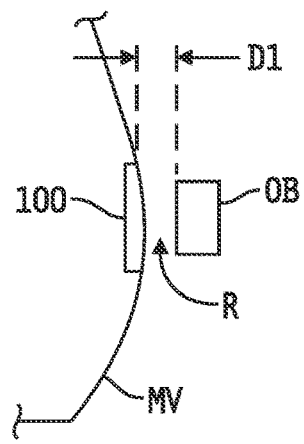
FIG. 3A  FIG. 3B
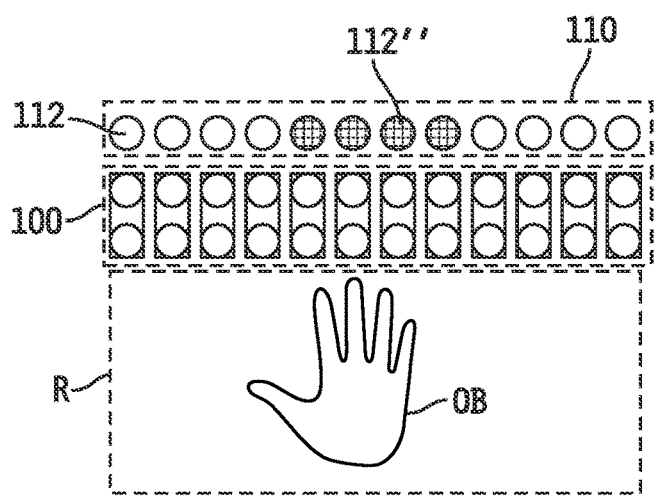
FIG. 4
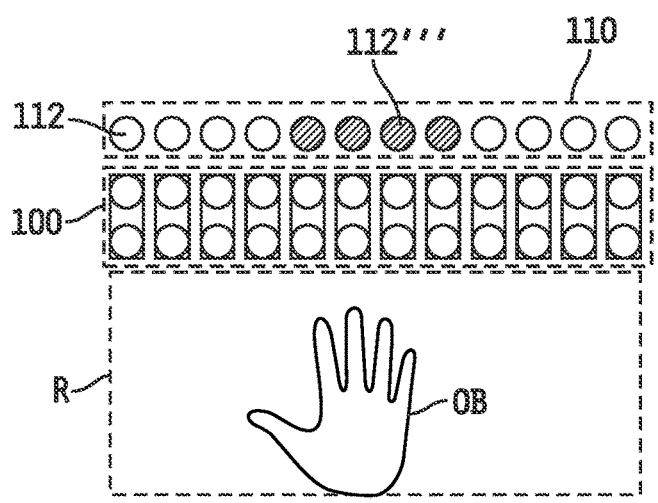
FIG. 5

MOTOR VEHICLE GESTURE ACCESS SYSTEM INCLUDING POWERED DOOR SPEED CONTROL

CROSS-REFERENCE TO RELATED APPLICATIONS

This is a continuation-in-part of U.S. patent application Ser. No. 17/017,221, filed Sep. 10, 2020 and now U.S. Pat. No. 11,313,159, which is a continuation-in-part of U.S. patent application Ser. No. 16/284,347, filed Feb. 25, 2019 and now U.S. Pat. No. 10,822,845, which is a continuation of U.S. patent application Ser. No. 16/164,570, filed Oct. 18, 2018 and now U.S. Pat. No. 10,415,276, which is a continuation-in-part of U.S. patent application Ser. No. 15/262,647, filed Sep. 12, 2016, now abandoned, which claims the benefit of and priority to U.S. Provisional Patent Application Ser. No. 62/217,842, filed Sep. 12, 2015, which is also a continuation-in-part of U.S. patent application Ser. No. 15/378,823, filed Dec. 14, 2016, now abandoned, which claims the benefit of and priority to U.S. Provisional Patent Application Ser. No. 62/266,917, filed Dec. 14, 2015, and which also claims the benefit of and priority to PCT/US2018/037517, filed Jun. 14, 2018, the disclosures of which are all expressly incorporated herein by reference in their entireties.

FIELD OF THE DISCLOSURE

The present disclosure relates generally to motor vehicle-mounted wireless access systems and, more particularly, to such systems in which transmitted and reflected wireless signals are used to detect the presence of an in-range mobile device and to then detect a predefined gesture for unlocking and/or opening at least one vehicle closure.

BACKGROUND

Many vehicles today are equipped with a passive entry system, or "PES." In some PES implementations, a key fob communicates with a computer of the motor vehicle, and the motor vehicle computer operates to automatically unlock one or more door locks of the motor vehicle in response to detection of the key fob being in close proximity to the motor vehicle. This allows an operator of the vehicle to approach the vehicle and open the door without having to manually unlock the door with a key or to manually press a button on the key fob. In some such applications, the motor vehicle computer is also configured to automatically lock the vehicle in response to detection of the key fob being outside of the close proximity of the motor vehicle.

Another known type of hands-free vehicle access or entry system employs an infrared ("IR") detector assembly. Typically, such systems may use an active near infrared arrangement including multiple IR LEDs and one or more sensors in communication with a computer or other circuitry. The computer is typically operable in such an assembly to calculate the distance of an object from the assembly by timing the interval between emission of IR radiation and reception by the sensor(s) of at least a portion of the emitted IR radiation that is reflected by the object back to the sensor(s), and then interpreting the timing information to determine movement of the object within the IR field. Exemplary IR movement recognition systems are disclosed in US Patent Application Publication 20120200486, US Patent Application Publication 20150069249, and US Patent Application Publication 20120312956, and US Patent Application Publication 20150248796, the disclosures of which are incorporated herein by reference in their entireties.

SUMMARY

This disclosure comprises one or more of the features recited in the attached claims, and/or one or more of the following features and any combination thereof. In a first aspect, a gesture access system for a motor vehicle having a powered door may comprise at least one wireless signal transceiver configured to be mounted to the motor vehicle, the at least one wireless signal transceiver responsive to activation signals to emit wireless signals outwardly away from the motor vehicle, and to produce wireless detection signals, the wireless detection signals including at least one reflected wireless signal if at least one of the emitted wireless signals is reflected by an object toward and detected by the at least one wireless signal transceiver, a motor responsive to motor control signals to open the power door, at least one processor, and at least one memory having instructions stored therein executable by the at least one processor to cause the at least one processor to (i) process the activation and wireless detection signals to determine whether an object is exhibiting a predefined gesture, (ii) upon determining that the object is exhibiting the predefined gesture, control an unlocking actuator to unlock the powered door, (iii) following unlocking of the powered door, monitor and process the activation and wireless detection signals to determine object parameters including a speed of movement of the object away from, and a distance of the object relative to, the powered door or the wireless transceiver, (iv) determine a door opening speed based on the object parameters, and (v) control the motor control signals to open the powered door at the determined door opening speed.

A second aspect may include the features of the first aspect, wherein the instructions stored in the at least one memory may include instructions executable by the at least one processor to continually execute (iii)-(v) until the powered door is fully open.

A third aspect may include the features of the first aspect or the second aspect, and may further comprise a sensor configured to produce a speed signal corresponding to an opening speed of the powered door, and wherein the instructions stored in the at least one memory may include instructions executable by the at least one processor to cause the at least one processor to process the speed signal to determine a measured door opening speed of the powered door, and to control the motor control signals to match the measured door opening speed to at least one of a speed of the object moving away from the powered door and a position of the object relative to the powered door or relative to the wireless transceiver.

A fourth aspect may include the features of any one or combination of the first through third aspects, wherein the at least one memory may have stored therein an initial door opening speed, and wherein the instructions stored in the at least one memory may include instructions executable by the at least one processor to control the motor control signals to open the powered door at the initial door opening speed following unlocking of the powered door, and wherein (v) may comprise controlling the motor control signals to control the door opening speed from the initial door opening speed to the determined door opening speed based on the object parameters.

A fifth aspect may include the features of the fourth aspect, wherein the instructions stored in the at least one memory may include instructions executable by the at least one processor to control the motor control signals to maintain the initial door opening speed until the powered door is fully open in response to determining, based on the initial door opening speed and the object parameters, that the object maintains a safe distance from the opening powered door.

A sixth aspect may include the features of any one or combination of the first through fifth aspects, and may further comprise at least one indicator operatively coupled to the processor, wherein the at least one memory may have instructions stored therein executable by the at least one processor to cause the at least one processor to activate the at least one indicator in response to controlling the motor control signals to open the powered door and to control operation of the at least one indicator according to the determined door opening speed.

A seventh aspect may include the features of any one or combination of the first through sixth aspects, wherein the instructions stored in the at least one memory include instructions executable by the at least one processor to control the motor control signals to stop the motor, and thereby stop the opening of the powered door, upon determining from the door opening speed and the object parameters that contact between the power door and the object is imminent.

An eighth aspect may include the features of the seventh aspect, and may further comprise at least one indicator operatively coupled to the processor, wherein the at least one memory may have instructions stored therein executable by the at least one processor to cause the at least one processor to activate the at least one indicator in response to, and according to, controlling the motor control signals to stop the motor.

A ninth aspect may include the features of any one or combination of the first through eighth aspects, wherein the predefined gesture may include a predefined walking pattern, and wherein the at least one wireless signal transceiver may include an ultra-wideband (UWB) transceiver and the wireless detection signals are UWB detection signals, and wherein the at least one memory may have instructions stored therein executable by the at least one processor to cause the at least one processor to process the activation and UWB detection signals to determine a position of the object while following the predefined walking pattern and, upon determining that the object is within a predefined position while following the predefined walking pattern, control the unlocking actuator to unlock the powered door in response to the object being within the predefined position while following the predefined walking pattern.

A tenth aspect may include the features of the ninth aspect, wherein the at least one wireless signal transceiver may include a Bluetooth Low Energy (BLE) transceiver and the wireless detection signals are BLE detection signals, and wherein the at least one memory has instructions stored therein executable by the at least one processor to cause the at least one processor to process the activation and BLE detection signals to determine an angle at which the object is moving while following the predefined walking pattern and, upon determining that the angle is within a predefined angle while following the predefined walking pattern, control the unlocking actuator to unlock the powered door in response to the object moving at the predefined angle while following the predefined walking pattern.

An eleventh aspect may include the features of any one or combination of the first through tenth aspects, and may further comprise at least one indicator operatively coupled to the processor, wherein the predefined gesture may comprise a predefined walking pattern, and wherein the at least one memory may have instructions stored therein executable by the at least one processor to cause the at least one processor to activate the at least one indicator in response to, and according to, at least one of determining that the object is following the predefined walking pattern and controlling the unlocking actuator to unlock the powered door.

A twelfth aspect may include the features of any one or combination of the first through eleventh aspects, and may further comprise a sensor configured to produce a perimeter signal corresponding a position of the object relative to a predefined perimeter surrounding the motor vehicle, wherein the at least one memory may have instructions stored therein executable by the at least one processor to process the perimeter signal and activate the at least one wireless signal transceiver in response to the object being within the predefined perimeter.

A thirteenth aspect may include the features of the twelfth aspect, wherein the sensor may include at least one of the at least one wireless signal transceiver, a radar unit, an ultra-wideband radar unit, an infrared sensor, a camera or a lidar scanner.

In a fourteenth aspect, a gesture access system for a motor vehicle having a powered door may comprise at least one wireless signal transceiver configured to be mounted to the motor vehicle, the at least one wireless signal transceiver responsive to activation signals to emit wireless signals outwardly away from the motor vehicle, and to produce wireless detection signals, the wireless detection signals including at least one reflected wireless signal if at least one of the emitted wireless signals is reflected by an object toward and detected by the at least one wireless signal transceiver, a motor responsive to motor control signals to open the power door, at least one indicator configured to be mounted to the motor vehicle, at least one processor, and at least one memory having instructions stored therein executable by the at least one processor to cause the at least one processor to (i) monitor a mobile device status signal produced by a control computer of the motor vehicle or by the at least one processor based on a determination by the control computer or the at least one processor of a proximity, relative to the motor vehicle, of a mobile communication device known to the control computer or to the at least one processor, (ii) in response to the mobile device status signal corresponding to the known mobile communication device being within a perimeter defined about the motor vehicle, process the activation and wireless detection signals to determine whether an object is exhibiting a predefined gesture, (iii) upon determining that the object is exhibiting the predefined gesture, control an unlocking actuator to unlock the powered door, (iv) following unlocking of the powered door, control the motor control signals to open the powered door and activate the at least one indicator according to a door opening indication scheme. In some embodiments, the predefined gesture may be or include a predefined walking pattern.

A fifteenth aspect may include the features of the fourteenth aspect, wherein the instructions stored in the at least one memory may include instructions executable by the at least one processor to cause the at least one processor to (a) following unlocking of the powered door, monitor and process the activation and wireless detection signals to determine object parameters including a speed of movement of the object away from, and a distance of the object relative to, the powered door or the wireless transceiver, (b) determine a door opening speed based on the object parameters, and (c) control the motor control signals to open the powered door at the determined door opening speed.

A sixteenth aspect may include the features of the fifteenth aspect, wherein the instructions stored in the at least one memory may include instructions executable by the at least one processor to continually execute (a)-(c) until the powered door is fully open, and wherein the door opening indication scheme may correspond to the determined door opening speed and the at least one memory may have instructions stored therein executable by the at least one processor to cause the at least one processor to control operation of the at least one indicator according to the determined door opening speed.

A seventeenth aspect may include the features of the sixteenth aspect, and may further comprise a sensor configured to produce a speed signal corresponding to an opening speed of the powered door, and wherein the instructions stored in the at least one memory may include instructions executable by the at least one processor to cause the at least one processor to process the speed signal to determine a measured door opening speed of the powered door, and to control the motor control signals to match the measured door opening speed to at least one of a speed of the object moving away from the powered door and a position of the object relative to the powered door or relative to the wireless transceiver.

An eighteenth aspect may include the features of any one or combination of the fourteenth through seventeenth aspects, wherein the indicator may be at least one of an illumination device to produce light visible from outside the motor vehicle, a device configured to produce illuminated graphics, a device configured to project visible light or illuminated graphics onto a surface supporting the motor vehicle, or an audio device configured to produce one or more audible signals.

In a nineteenth aspect, a gesture access system for a motor vehicle having a powered door may comprise at least one wireless signal transceiver configured to be mounted to the motor vehicle, the at least one wireless signal transceiver responsive to activation signals to emit wireless signals outwardly away from the motor vehicle, and to produce wireless detection signals, the wireless detection signals including at least one of the emitted wireless signals is reflected by an object toward and detected by the at least one wireless signal transceiver, a motor responsive to motor control signals to open the power door, at least one indicator configured to be mounted to the motor vehicle, at least one processor, and at least one memory having instructions stored therein executable by the at least one processor to cause the at least one processor to (i) process the activation and wireless detection signals to determine whether an object is following a predefined walking pattern, (iii) upon determining that the object is following the predefined walking pattern, control an unlocking actuator to unlock the powered door, (iv) following unlocking of the powered door, control the motor control signals to open the powered door and activate the at least one indicator according to a door opening indication scheme.

A twentieth aspect may include the features of the nineteenth aspects, wherein the instructions stored in the at least one memory may include instructions executable by the at least one processor to cause the at least one processor to (a) following unlocking of the powered door, monitor and process the activation and wireless detection signals to determine object parameters including a speed of movement of the object away from, and a distance of the object relative to, the powered door or the wireless transceiver, (b) determine a door opening speed based on the object parameters, and (c) control the motor control signals to open the powered door at the determined door opening speed.

In a twenty first aspect, a gesture access system for a motor vehicle may comprise at least one wireless signal transceiver configured to be mounted to the motor vehicle, the at least one wireless signal transceiver responsive to activation signals to emit wireless signals outwardly away from the motor vehicle, and to produce wireless detection signals, the wireless detection signals including at least one reflected wireless signal if at least one of the emitted wireless signals is reflected by an object toward and detected by the at least one wireless signal transceiver, at least one processor, and at least one memory having instructions stored therein executable by the at least one processor to cause the at least one processor to monitor a mobile device status signal produced by a control computer of the motor vehicle or by the at least one processor based on a determination by the control computer or the at least one processor of a proximity, relative to the motor vehicle, of a mobile communication device known to the control computer or to the at least one processor, and operate in a gesture access mode by processing the activation and wireless detection signals to determine whether an object is following a predefined walking pattern and, upon determining that the object is following the predefined walking pattern, controlling at least one actuator associated with an access closure of the motor vehicle to lock, unlock, open or close the access closure in response to the object following the predefined walking pattern.

A twenty second aspect may include the features of the twenty first aspect, wherein the at least one wireless signal transceiver may include an ultra-wideband (UWB) transceiver and the wireless detection signals may be UWB detection signals, wherein the at least one memory has instructions stored therein executable by the at least one processor to cause the at least one processor to operate in the gesture access mode by processing the activation and UWB detection signals to determine a position of the object while following the predefined walking pattern and, upon determining that the object is within a predefined position while following the predefined walking pattern, controlling at least one actuator associated with the access closure of the motor vehicle to lock, unlock, open or close the access closure in response to the object being within the predefined position while following the predefined walking pattern.

A twenty third aspect may include the features of either or both of the twenty first and twenty second aspects, wherein the at least one wireless signal transceiver may include a Bluetooth Low Energy (BLE) transceiver and the wireless detection signals may be BLE detection signals, and wherein the at least one memory may have instructions stored therein executable by the at least one processor to cause the at least one processor to operate in the gesture access mode by processing the activation and BLE detection signals to determine an angle at which the object is moving while following the predefined walking pattern and, upon determining that the angle is within a predefined angle while following the predefined walking pattern, controlling at least one actuator associated with the access closure of the motor vehicle to lock, unlock, open or close the access closure in response to the object moving at the predefined angle while following the predefined walking pattern.

A twenty fourth aspect may include the features of any one or combination of the twenty first through twenty third aspects, further comprising at least one indicator operatively coupled to the processor, wherein the predefined walking pattern may include a first stage and a second stage, and wherein the at least one memory may have instructions stored therein executable by the at least one processor to cause the at least one processor to activate the at least one indicator in response to processing the activation and wireless detection signals to determine that the object has followed the first stage of the predefined walking pattern.

A twenty fifth aspect may include the features of the twenty fourth aspect, wherein the at least one memory may have instructions stored therein executable by the at least one processor to cause the at least one processor to control the at least one actuator associated with the access closure of the motor vehicle to lock, unlock, open or close the access closure in response to processing the activation and wireless detection signals determining that the object has followed the second stage of the predefined walking pattern.

A twenty sixth aspect may include the features of any one or combination of the twenty first through twenty fifth aspects, further comprising a sensor operatively coupled to the processor, the sensor being operable to determine whether the object is within a predefined perimeter relative to the motor vehicle, wherein the at least one memory may have instructions stored therein executable by the at least one processor to activate the at least one wireless signal transceiver in response to the object being detected within the predefined perimeter by the sensor.

A twenty seventh aspect may include the features of the twenty sixth aspect, wherein the sensor may include at least one of a radar, an ultra-wideband radar, an infrared sensor, camera or a lidar scanner.

A twenty eighth aspect may include the features of any one or combination of the twenty first through twenty seventh aspects, further comprising a housing configured to be mounted to the motor vehicle, wherein the at least one processor and the at least one memory may be mounted within the housing.

A twenty ninth aspect may include the features of the twenty eighth aspect, wherein the at least one wireless transceiver may be mounted within the housing and operatively coupled to the at least one processor, and wherein the at least one processor produces the activation signals and receives the radiation detection signals from the at least one wireless transceiver.

A thirtieth aspect may include the features of either of the twenty eighth and the twenty ninth aspects, wherein the housing may be mounted to or carried by a door handle assembly configured to be mounted to an access closure of the motor vehicle.

In a thirty first aspect, a gesture access system for a motor vehicle, may comprise at least one wireless signal transceiver configured to be mounted to the motor vehicle, the at least one wireless signal transceiver responsive to activation signals to emit wireless signals outwardly away from the motor vehicle, and to produce wireless detection signals, the wireless detection signals including at least one reflected wireless signal if at least one of the emitted wireless signals is reflected by an object toward and detected by the at least one wireless signal transceiver, at least one indicator configured to be mounted to the motor vehicle, at least one processor operatively coupled to the at least one indicator, and at least one memory having instructions stored therein executable by the at least one processor to cause the at least one processor to monitor a mobile device status signal produced by a control computer of the motor vehicle or by the at least one processor based on a determination by the control computer or the at least one processor of a proximity, relative to the motor vehicle, of a mobile communication device known to the control computer or to the at least one processor, and operate in a gesture access mode by processing the activation and wireless detection signals to determine whether an object is following a predefined walking pattern and, upon determining that the object is following the predefined walking pattern, activate the indicator according to an activation scheme in response to determining the object is following the predefined walking pattern.

A thirty second aspect may include the features of the thirty first aspect, and wherein the at least one memory has instructions stored therein executable by the at least one processor to, upon determining that the object is following the predefined walking pattern, control at least one actuator associated with an access closure of the motor vehicle to lock, unlock, open or close the access closure in response to the object following the predefined walking pattern.

A thirty third aspect may include the features of the thirty first aspect or thirty second aspect, wherein the indicator may be at least one of an illumination device to produce light visible from outside the motor vehicle or an audio device to produce one or more audible signals.

A thirty fourth aspect may include the features of one or any combination of the thirty first through thirty third aspects, wherein the predefined walking pattern may include a first stage and a second stage, and wherein the at least one memory may have instructions stored therein executable by the at least one processor to cause the at least one processor to activate the at least one indicator in response to processing the activation and wireless detection signals to determine that the object has followed the first stage of the predefined walking pattern, and in a manner indicative of the object having followed the first stage of the predefined walking pattern.

A thirty fifth aspect may include the features of the thirty fourth aspect, wherein the at least one memory may have instructions stored therein executable by the at least one processor to cause the at least one processor to control the at least one actuator associated with the access closure of the motor vehicle to lock, unlock, open or close the access closure in response to processing the activation and wireless detection signals determining that the object has followed the second stage of the predefined walking pattern.

A thirty sixth aspect may include the features of any of the thirty first through thirty fifth aspects, wherein the at least one wireless signal transceiver may include an ultra-wideband (UWB) transceiver and the wireless detection signals are UWB detection signals, and wherein the at least one memory may have instructions stored therein executable by the at least one processor to cause the at least one processor to operate in the gesture access mode by processing the activation and UWB detection signals to determine a position of the object while following the predefined walking pattern and, upon determining that the object is within a predefined position while following the predefined walking pattern, controlling at least one actuator associated with the access closure of the motor vehicle to lock, unlock, open or close the access closure in response to the object being within the predefined position while following the predefined walking pattern.

A thirty seventh aspect may include the features of the thirty sixth aspect, wherein the at least one wireless signal transceiver may include a Bluetooth Low Energy (BLE) transceiver and the wireless detection signals are BLE detection signals, and wherein the at least one memory may have instructions stored therein executable by the at least one processor to cause the at least one processor to operate in the gesture access mode by processing the activation and BLE detection signals to determine an angle at which the object is moving while following the predefined walking pattern and, upon determining that the angle is within a predefined angle while following the predefined walking pattern, controlling at least one actuator associated with the access closure of the motor vehicle to lock, unlock, open or close the access closure in response to the object moving at the predefined angle while following the predefined walking pattern.

A thirty eighth aspect may include the features of any one or combination of the thirty first through thirty seventh aspects, further comprising a housing configured to be mounted to the motor vehicle, wherein the at least one processor, the at least one memory, and the at least one wireless transceiver may be mounted within the housing, wherein the at least one wireless transceiver may be operatively coupled to the at least one processor, wherein the at least one processor may produce the activation signals and receive the radiation detection signals from the at least one wireless transceiver, and wherein the housing may be mounted to or carried by a door handle assembly configured to be mounted to an access closure of the motor vehicle.

In a thirty ninth aspect, a gesture access system for a motor vehicle may comprise a sensor configured to be mounted to the motor vehicle, at least one ultra-wideband (UWB) transceiver configured to be mounted to the motor vehicle, the at least one UWB transceiver responsive to activation signals to emit UWB signals outwardly away from the motor vehicle, and to produce UWB detection signals, the UWB detection signals including at least one reflected UWB signal if at least one of the emitted UWB signals is reflected by an object toward and detected by the at least one UWB transceiver, at least one processor, and at least one memory having instructions stored therein executable by the at least one processor to cause the at least one processor to activate the at least one UWB transceiver in response to the sensor detecting an object within a predefined perimeter the motor vehicle, monitor a mobile device status signal produced by a control computer of the motor vehicle or by the at least one processor based on a determination by the control computer or the at least one processor of a proximity, relative to the motor vehicle, of a mobile communication device known to the control computer or to the at least one processor, operate in a gesture access mode by processing the activation and UWB detection signals to determine whether an object is following a predefined walking pattern and, upon determining that the object is following the predefined walking pattern, and controlling at least one actuator associated with an access closure of the motor vehicle to lock, unlock, open or close the access closure in response to the object following the predefined walking pattern.

A fortieth aspect may include the features of the thirty ninth aspect, wherein the instructions stored in the at least one memory may include instructions executable by the at least one processor to cause the at least one processor to, in response to the mobile device status signal corresponding to the known mobile communication device being beyond the predefined perimeter defined about the motor vehicle, operate in an inactive mode in which the at least one processor does not receive or does not act on UWB radiation detection signals.

A forty first aspect may include the features of the thirty ninth aspect or the fortieth aspect, further comprising at least one indicator configured to be mounted to the motor vehicle, wherein the at least one memory may have instructions stored therein executable by the at least one processor to cause the at least one processor to activate the indicator according to an activation scheme in response to determining the object is following the predefined walking pattern.

A forty second aspect may include the features of any one or combination of the thirty ninth through forty first aspects, further comprising a Bluetooth Low Energy (BLE) transceiver configured to receive BLE detection signals, wherein the at least one memory may have instructions stored therein executable by the at least one processor to cause the at least one processor to operate in the gesture access mode by processing the activation and BLE detection signals to determine an angle at which the object is moving while following the predefined walking pattern and, upon determining that the angle is within a predefined angle while following the predefined walking pattern, controlling at least one actuator associated with the access closure of the motor vehicle to lock, unlock, open or close the access closure in response to the object moving at the predefined angle while following the predefined walking pattern.

BRIEF DESCRIPTION OF THE DRAWINGS

FIG. 3A is a simplified diagram depicting illumination of visible lights in response to detection of an object entering the sensing region of the object detection module of FIG. 2.

FIG. 3B is a simplified side elevational view of a portion of a motor vehicle having the object detection module of FIG. 2 mounted thereto and depicting an example distance range of object detection by the module.

FIG. 4 is a simplified diagram depicting illumination of visible lights in response to detection of an object in the sensing region of the object detection module of FIG. 2.

FIG. 5 is a simplified diagram depicting illumination of visible lights by the object detection module of FIG. 2 in response to exhibition of a predefined gesture by the detected object.

DESCRIPTION OF THE ILLUSTRATIVE EMBODIMENTS

For the purposes of promoting an understanding of the principles of this disclosure, reference will now be made to a number of illustrative embodiments shown in the attached drawings and specific language will be used to describe the same.

This disclosure relates to object detection system mountable to or carried by a motor vehicle in any of various locations at or about the motor vehicle. In some embodiments, the object detection system may implemented solely in the form of a hands-free vehicle access system. In some such embodiments, one or more illumination devices may be implemented to provide visual feedback of objects being detected. In other embodiments, the object detection system may be implemented in the form of a combination hands-free vehicle access system and an object impact avoidance system. In such embodiments, the object detection system operates in a hands-free vehicle access mode under some conditions and in an object impact avoidance mode under other operating conditions.

Figure 1:
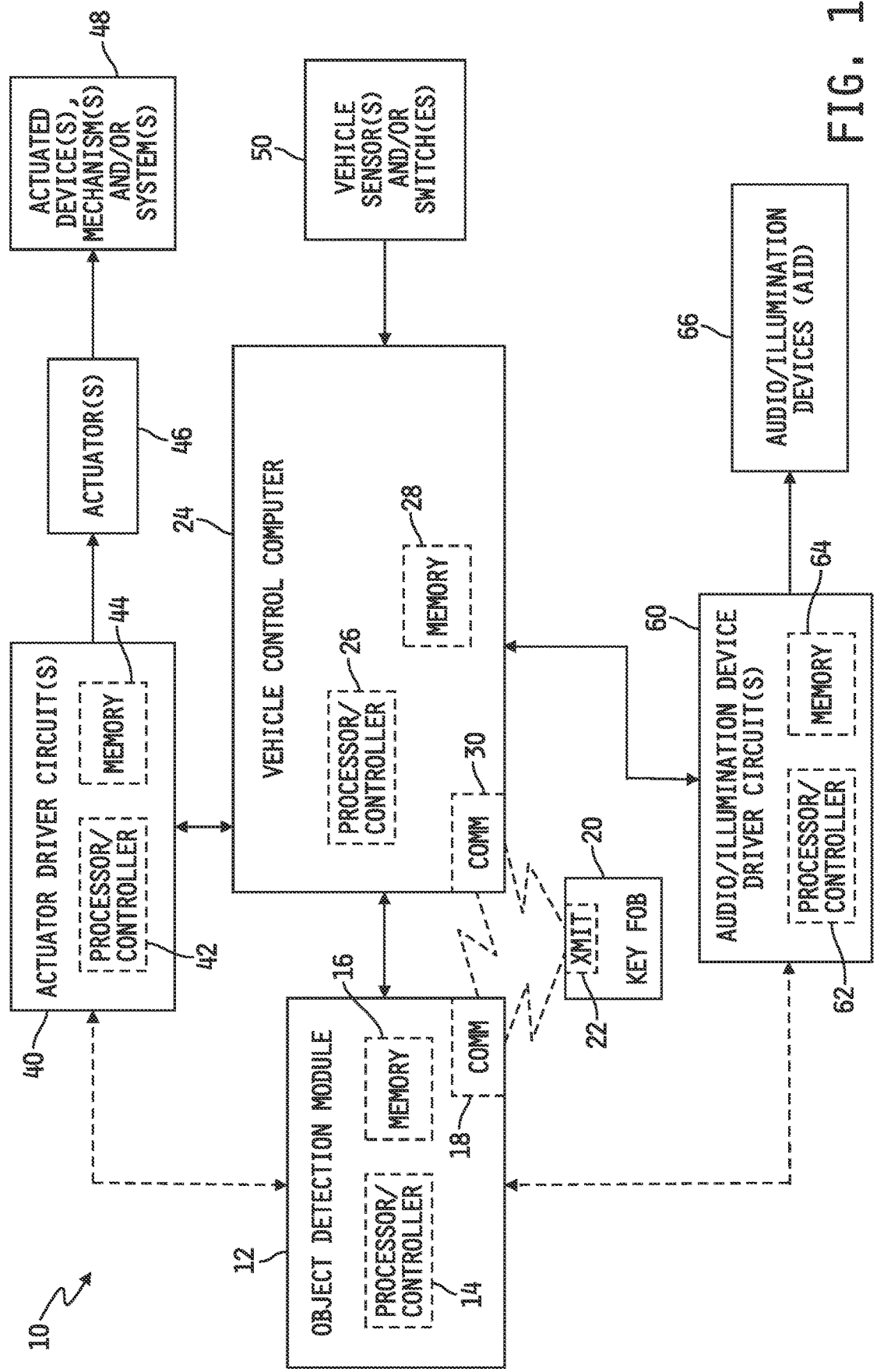
FIG. 1 is a simplified block diagram schematic of an embodiment of a gesture access and object impact avoidance system for a motor vehicle.

Referring now to FIG. 1, an embodiment of an object detection system 10 is shown. The object detection system 10 illustratively includes an object detection module 12 having at least one processor or controller 14, at least one memory 16 and a communication circuit 18 for receiving vehicle access signals wirelessly transmitted by a transmitter 22 of a key fob 20. The object detection module 12 further illustratively includes object detection circuitry, and various example embodiments of such object detection circuitry will be described below with respect to FIGS. 2, 6A, 7 and 8.

In some embodiments, the object detection system 10 may include a vehicle control computer 24 electrically connected to the object detection module 12 and having at least one processor or controller 26 and at least one memory 28. In some embodiments, the vehicle control computer 24 may include a communication circuit 30 for receiving the vehicle access signals wirelessly transmitted by the transmitter 22 of the key fob 20. In some embodiments, the communication circuit 18 of the object detection module 12 and the communication circuit 30 of the vehicle control computer 24 may be configured to wirelessly communicate with one another in a conventional manner so that the processors 14, 26 may conduct information transfer wirelessly via the communication circuits 18, 30.

In some embodiments, the object detection system 10 may include one or more actuator driver circuits 40 for controllably driving one or more corresponding actuators 46. In some such embodiments, the one or more actuator driver circuits 40 may include at least one processor or controller 42 and at least one memory 44 in addition to one or more conventional driver circuits, although in other embodiments the processor or controller 42 and the memory 44 may be omitted. In some embodiments, one, some or all of the one or more driver circuits 40 may be electrically connected to the vehicle control computer 24 so that the processor or controller 26 of the vehicle control computer 24 may control the operation of one or more actuators 46 via control of such one or more driver circuits 40. Alternatively or additionally, at least one, some or all of the one or more driver circuits 40 may be electrically connected to the object detection module 12 as illustrated by dashed-line connection in FIG. 1, so that the processor or controller 14 of the object detection module 12 may control operation of one or more actuators 46 via control of such one or more driver circuits 40. In any case, the one or more actuators 46 are operatively coupled to one or more conventional, actuatable devices, mechanisms and/or systems 48. Examples of such actuators and actuatable devices, mechanisms and/or systems may include, but are not limited to, one or more electronically controllable motor vehicle access closure locks or locking systems, one or more electronically controllable motor vehicle access closure latches or latching systems, an automatic (i.e., electronically controllable) engine ignition system, an automatic (i.e., electronically controllable) motor vehicle braking system, an automatic (i.e., electronically controllable) motor vehicle steering system, an automated (i.e., electronically controllable) motor vehicle driving system (e.g., "self-driving" or "autonomous driving" system), and the like.

In some embodiments, the object detection system 10 may include one or more conventional vehicle operating parameter sensors, sensing systems and/or switches 50 carried by the motor vehicle and electrically connected to, or otherwise communicatively coupled to, the vehicle control computer 24. Examples of such vehicle operating parameter sensors, sensing systems and/or switches 50 may include, but are not limited to, an engine ignition sensor or sensing system, a vehicle speed sensor or sensing system, a transmission gear selector position sensor, sensing system or switch, a transmission gear position sensor, sensing system or switch, and the like.

In some embodiments, the object detection system 10 may include one or more conventional audio and/or illumination device driver circuits 60 for controllably driving one or more corresponding audio (or audible) devices and/or one or more illumination devices 66. In some such embodiments, the one or more audio and/or illumination device driver circuits 60 may include at least one processor or controller 62 and at least one memory 64 in addition to one or more conventional driver circuits, although in other embodiments the processor or controller 62 and the memory 64 may be omitted. In some embodiments, one, some or all of the one or more driver circuits 60 may be electrically connected to the vehicle control computer 24 so that the processor or controller 26 of the vehicle control computer 24 may control the operation of one or more audio and/or illumination devices 66 via control of such one or more driver circuits 60. Alternatively or additionally, at least one, some or all of the one or more driver circuits 60 may be electrically connected to the object detection module 12 as illustrated by dashed-line connection in FIG. 1, so that the processor or controller 14 of the object detection module 12 may control operation of one or more of the audio and/or illumination devices 66 via control of such one or more driver circuits 60. In any case, examples of such audio devices may include, but are not limited to, one or more electronically controllable audible warning device or systems, one or more electronically controllable audio notification devices or systems, one or more electronically controllable audio voice messaging devices or systems, one or more electrically controllable motor vehicle horns, and the like. Examples of such illumination devices may include, but are not limited to, one or more exterior motor vehicle illumination devices, one or more interior motor vehicle illumination devices, one or more warning illumination devices, and the like, e.g., in the form of one or any combination of one or more conventional illumination sources configured to produce light visible from outside the motor vehicle, one or more devices configured to produce illuminated graphics, one or more conventional devices configured to project visible light or illuminated graphics onto a surface, e.g., the ground or paved surface, supporting the motor vehicle, or the like.

Figure 2:
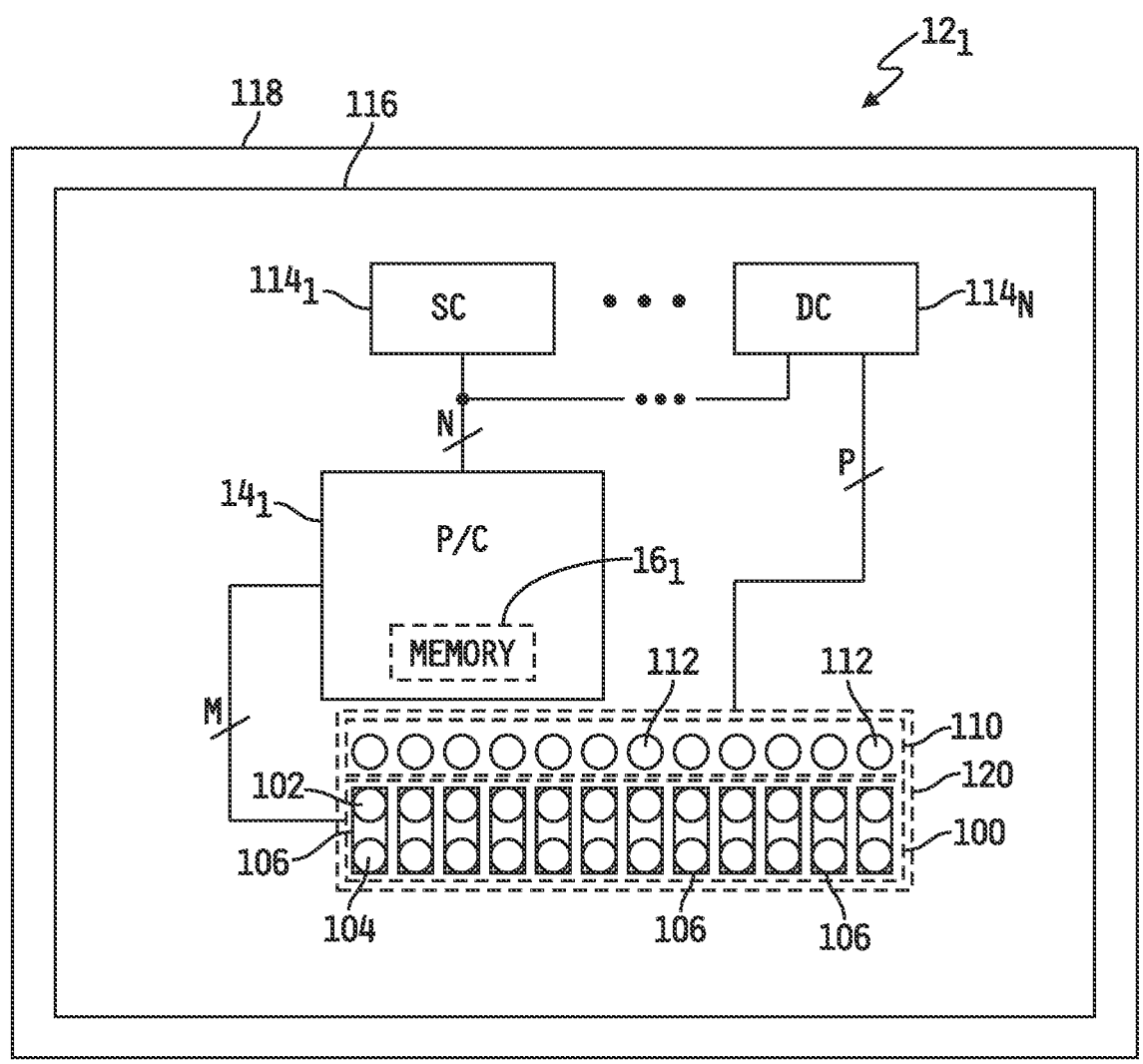
FIG. 2 is a simplified block diagram schematic of an embodiment of the object detection module illustrated in FIG. 1.

Referring now to FIG. 2, one example embodiment $12_1$ is shown of the object detection module 12 illustrated in FIG. 1. In the illustrated embodiment, the object detection module $12_1$ includes a radiation emission and detection assembly 100 electrically connected to the at least one processor or controller $14_1$ via a number M of signal paths, wherein M may be any positive integer. The radiation emission and detection assembly 100 illustratively includes a plurality of radiation transmitters 102 in the form of an array of two or more infrared light-emitting diodes ("IR LEDs"), and a plurality of radiation detectors 104 in the form of an array of two or more infrared light sensors ("IR sensors"). The IR LEDs 102 are conventional and are configured to be responsive to control signals produced by the processor or controller $14_1$ to emit radiation outwardly from the assembly 100. The IR sensors 104 are likewise conventional and are configured to produce radiation detection signals. The radiation detection signals produced by the IR sensors 104 illustratively include reflected radiation signals if the emitted radiation is reflected by an object in a sensing region of the IR sensors 104, in accordance with a time sequence in which one or more of the IR LEDs 102 is activated to emit radiation and at least a portion of such emitted radiation is reflected by the object toward and detected by at least one of the IR sensors 104.

In the embodiment illustrated in FIG. 2, the plurality of IR LEDs 102 and the plurality of IR sensors 104 are arranged in pairs with each IR LED 102 emitting the IR radiation for detection by an associated IR sensor 104 paired therewith. In some such embodiments, an array of IR LEDs 102 and an array of IR sensors 104 of the radiation emission and detection assembly 100 may be provided together in the form of a preformed IR sensor module. In alternate embodiments, the plurality of IR LEDs 102 may be provided in the form of a preformed IR LED array. In some such embodiments, the plurality of IR sensors 104 may be provided individually and in other embodiments the plurality of IR sensors 104 may be provided in the form of an IR sensor array separate from the IR LED array. In still other alternate embodiments, the plurality of IR sensors 104 may be provided in the form of a preformed IR sensor array, and the plurality of IR LEDs 102 may be provided individually or in the form of an IR LED array. In embodiments in which the plurality of IR LEDs 102 is provided in the form of an array, such an array may be arranged linearly, e.g., in a continuous row. Likewise, in embodiments in which the plurality of IR sensors 104 is provided in the form of an array of IR sensors, such an array may be arrange linearly, e.g., in a continuous row. In the embodiment illustrated in FIG. 2 for example, the IR LEDs 102 and the IR sensors 104 are both arranged in the form of linear arrays. In alternate embodiments in which the plurality of IR LEDs 102 is provide in the form of an array, and/or in which the plurality of IR sensors 104 is provided in the form of an array, either or both such arrays may be arranged non-linearly and/or non-continuously, e.g., in groups of two or more spaced apart LEDs and/or sensors.

Radiation emission and detection assemblies 100 are conventionally associated with processors or controllers $14_1$ as depicted in FIG. 2, and at least one associated memory $16_1$ includes conventional instructions which, when executed by the processor or controller $14_1$, cause the processor or controller $14_1$ to determine from the IR sensor 104 such things as, without limitation, (a) when an object has been detected in a sensing region of the sensors 104 IR, (b) whether the object is of a predetermined type, and (c) whether the object has moved within the sensing region. Examples of known IR detector systems are disclosed in US Patent Application Publication 20120200486, US Patent Application Publication 20150069249, US Patent Application Publication 20120312956, and US Patent Application Publication 20150248796, the disclosures of which are incorporated herein by reference in their entireties.

In some embodiments, the IR LEDs 102 and IR sensors 104 illustratively take the form of an IR sensor module available from NEONODE, INC. (San Jose, California). The modules typically contain multiple pairs of IR emitter LEDs 102 and IR sensors 104 for receiving reflected IR radiation. Such modules typically have a range of about 200 millimeters (mm) of off-surface detection and arranging IR LEDs 102 and the IR sensors 104 in pairs permits a higher resolution of detection. For instance, the assembly 100 of IR LEDs 102 and IR sensors 104 is capable of detecting the difference between a single finger and multiple fingers. As a result, the assembly 100 of IR LEDs 102 and IR sensors 104 is capable of detecting gesturing by a user's hand, for instance.

The embodiment of the object detection module $12_1$ illustrated in FIG. 2 further includes a plurality of illumination devices 112. In some embodiments, the illumination devices 112 are spaced apart at least partially across the sensing region of the IR sensors 104, and in other embodiments one or more of the illumination devices 112 may be positioned remotely from the sensing region. In some embodiments, the illumination devices 112 may be arranged in the form of a linear or non-linear array 110 of equally or non-equally spaced-apart illumination devices. In some embodiments, the plurality of illumination devices include at least one LED configured to emit radiation in the visible spectrum. In such embodiments, the at least one LED may be configured to produce visible light in a single color or in multiple colors. In alternate embodiments, the plurality of illumination sources may include one or more conventional non-LED illumination sources.

In the embodiment illustrated in FIG. 2, the plurality of illumination devices 112 is provided in the form of an array 110 of visible light LEDs equal in number to the number of IR LEDs 102 and arranged such that each visible light LED 112 is co-extensive with a respective one of the plurality of IR LEDs 102 paired with a corresponding IR sensor 104. In the illustrated embodiment, each visible light LED 112 is positioned adjacent to and above a respective one of the plurality of IR LEDs 102 which is itself positioned adjacent to and above a respective paired one of the IR sensors 104. In alternate embodiments, the visible light LEDs 112, the IR LEDs 102 and the IR sensors 104 may be positioned in any order relative to one another and arranged horizontally, as shown in FIG. 2, vertically, diagonally or non-linearly. In some alternate embodiments, more or fewer visible light LEDs 112 than the IR LEDs 102 and/or the IR sensors 104 may be provided.

The one or more illumination devices 112 is/are illustratively included to provide visual feedback of one or more conditions relating to detection by the radiation emission and detection assembly 100 of an object within a sensing region of the assembly 100. In one example embodiment, two illumination devices 112 may be provided for producing the desired visual feedback. In one implementation of this example embodiment, a first one of the illumination devices 112 may be configured and controlled to illuminate with a first color to visibly indicate the detected presence by the radiation emission and detection assembly 100 of an object within the sensing region, and the second illumination device 112 may be configured and controlled to illuminate with a second color, different from the first, to visibly indicate that the detected object exhibits a predefined gesture. In another example embodiment, three illumination devices 112 may be provided. In this embodiment, a first one of the illumination devices 112 may be controlled to illuminate with a first color to visibly indicate the detected presence of an object within an area of the sensing region in which the radiation emission and detection assembly 100 is unable determine whether the detected object exhibits a predefined gesture (e.g., the object may be within a sub-region of the sensing region which is too small to allow determination of whether the object exhibits the predefined gesture), a second one of the illumination devices 112 is controlled to illuminate with a second color to visibly indicate the detected presence of an object within an area of the sensing region in which the radiation emission and detection assembly 100 is able to determine whether the detected object exhibits a predefined gesture, and a third one of the illumination devices is controlled to illuminate with a third color to visibly indicate that the object within the sensing region is detected by the radiation emission and detection assembly 100 as exhibiting a predefined gesture.

In other embodiments, the one or more illumination devices 112 may include any number of illumination devices 10. Multiple illumination devices 112, for example, may be illuminated in one or more colors to provide a desired visual feedback. In any such embodiments, in one or more illumination devices 112 may be LEDs, and one or more such LEDs may illustratively be provided in the form of RGB LEDs capable of illumination in more than one color. According to this variant, it will be appreciated that positive visual indication of various modes of operation of the radiation emission and detection assembly 100 may be carried out in numerous different colors, with each such color indicative of a different state of operation of the object detection module $12_1$. As one non-limiting example, the color red may serve to indicate that the radiation emission and detection assembly 100 has detected an object (e.g., a hand or foot) within the sensing region, but is unable to determine whether the detected object is exhibiting a predefined gesture. The color green, in contrast, may serve to indicate that the detected object is exhibiting a predefined gesture and, consequently, that the predefined vehicle command associated with that predefined gesture (e.g., unlocking the vehicle closure, opening the vehicle closure, etc.) is being effected. In addition to green, other colors might be uniquely associated with different predefined commands. Thus, while green illumination might reflect that a closure for the vehicle is being unlocked, blue illumination, for example, may reflect that a fuel door latch has been opened, purple illumination may reflect that a window is being opened, etc.

In still other embodiments, in addition to or alternatively to color distinction, different operating modes, i.e., different detection modes, of the radiation emission and detection assembly 100 may be visually distinguished from one another by controlling the at least one illumination device 112 to switch on and off with different respective frequencies and/or duty cycles. In some embodiments which include multiple illumination devices 112, the different operating modes of the radiation emission and detection assembly 100 may be additionally or alternatively distinguished visually from one another by activating different subsets of the multiple illumination devices 112 for different operating or detection modes, and/or by sequentially activating the multiple illumination devices 112 or subsets thereof with different respective activation frequencies and/or duty cycles.

The object detection module $12_1$ further illustratively includes a number N of conventional supporting circuits (SC) and conventional driver circuits (DC) $114_1$-$114_N$, wherein N may be any positive integer. The supporting circuit(s) (SC) is/are each electrically connected to the processor or controller $14_1$, and may include one or more conventional circuits configured to support the operation of the processor or controller $14_1$ and/or other electrical circuits and/or components of the object detection module $12_1$. Example supporting circuits may include, but are not limited to, one or more voltage supply regulation circuits, one or more capacitors, one or more resistors, one or more inductors, one or more oscillator circuits, and the like. The driver circuit(s) (DC) include one or more inputs electrically connected to the processor or controller $14_1$ and one or more outputs electrically connected to the one or more illumination devices 112 and the plurality of IR LEDs 104. The driver circuit(s) DC is/are conventional and is/are configured to be responsive to one or more control signals supplied by the processor or controller $14_1$ to selectively drive, i.e., activate and deactivate, the plurality of IR LEDs 102 and the one or more illumination devices 112.

It will be understood that the terms "processor" and "controller" used in this disclosure is comprehensive of any computer, processor, microchip processor, integrated circuit, or any other element(s), whether singly or in multiple parts, capable of carrying programming for performing the functions specified in the claims and this written description. The at least one processor or controller $14_1$ may be a single such element which is resident on a printed circuit board with the other elements of the inventive access system. It may, alternatively, reside remotely from the other elements of the system. For example, but without limitation, the at least one processor or controller $14_1$ may take the form of a physical processor or controller on-board the object detection module $12_1$. Alternately or additionally, the at least one processor or controller $14_1$ may be or include programming in the at least one processor or controller 26 of the vehicle control computer 24 illustrated in FIG. 1. Alternatively or additionally still, the at least one processor or controller $14_1$ may be or include programming in the at least one processor or controller 42 of the actuator driver circuit(s) 40 and/or in the at least one processor or controller 62 of the audio/illumination device driver circuit(s) 60 and/or in at least one processor or controller residing in any location within the motor vehicle in which the system 10 is located. For instance, and without limitation, it is contemplated that one or more operations associated with one or more functions of the object detection module $12_1$ described herein may be carried out, i.e., executed, by a first microprocessor and/or other control circuit(s) on-board the object detection module $12_1$, while one or more operations associated with one or more other functions of the object detection module $12_1$ described herein may be carried out, i.e., executed, by a second microprocessor and/or other circuit(s) remote from the object detection module $12_1$, e.g., such as the processor or controller 26 on-board the vehicle control computer 24.

In the embodiment illustrated in FIG. 2, the IR LEDs 102, the IR sensors 104, the illumination devices 112, the at least one processor or controller $14_1$ and the supporting/driver circuits $114_1$-$114_N$ are all mounted to a conventional circuit substrate 116 which is mounted within a housing 118. In some such embodiments, the IR LEDs 102, IR sensors 104 and visible LEDs 112 may be combined and provided in the form of a radiation assembly or module 120 mounted to the circuit substrate 116 as illustrated by example in FIG. 2. In alternate embodiments, the circuit substrate 116 may be provided in the form of two or more separate circuit substrates, and in such embodiments one or more of the IR LEDs 102, the IR sensors 104, the illumination devices 112, the at least one processor or controller $14_1$ and the supporting/driver circuits $114_1$-$114_N$ may be mounted to a first one of the two or more circuit substrates and remaining one(s) of the one or more of the IR LEDs 102, the IR sensors 104, the illumination devices 112, the at least one processor or controller $14_1$ and the supporting/driver circuits $114_1$-$114_N$ may be mounted to other(s) of the two or more circuit substrates. In some such embodiments, all such circuit substrates may be mounted to and/or within a single housing 118, and in other embodiments at least one of the two or more of the circuit substrates may be mounted to and/or within the housing 118 and one or more others of the two or more circuit substrates may be mounted to or within one or more other housings. In embodiments which the object detection module $12_1$ includes multiple housings, two or more such housings may be mounted to the motor vehicle at or near a single location, and in other embodiments at least one of the multiple housings may be mounted to the motor vehicle at a first location and at least another of the multiple housings may be mounted to the motor vehicle at a second location remote from the first location. As one non-limiting example, at least the plurality of IR LEDs 102 and the plurality of IR sensors 104 may be mounted to or within a first housing mounted to the motor vehicle at a first location suitable for detection of one or more specific objects, and at least the one or more illumination devices may be mounted to or within a second housing mounted to the motor vehicle at a second location suitable for viewing by one or more users and/or operators of the motor vehicle.

In one embodiment, electrical power for the object detection module 12, the vehicle control computer 24, the actuator driver circuit(s) 40, the actuator(s) 46, the audio/illumination device driver circuit(s) 60 and the audio/illumination device(s) 66 is illustratively provided by a conventional electrical power source and/or system on-board the motor vehicle. In alternate embodiments, electrical power for the object detection module 12, the actuator driver circuit(s) 40, the actuator(s) 46, the audio/illumination device driver circuit(s) 60 and/or the audio/illumination device(s) 66 may be provided by one or more local power sources, e.g., one or more batteries, on-board the associated module(s), circuit(s) and/or device(s).

Referring now to FIGS. 3A-5, the radiation emission and detection assembly 100 is illustratively operable, under control of the processor or controller $14_1$, to detect an object OB within a sensing region R (depicted schematically in dashed lines in FIGS. 3A-5) of the assembly 100, and to provide corresponding object detection signals to the processor or controller $14_1$. In some embodiments, the processor or controller $14_1$ is, in turn, operable, e.g., by executing corresponding instructions stored in the memory $16_1$, to (1) determine from the object detection signals whether the object OB is within the sensing region R, (2) determine whether the object OB detected as being within the sensing region R exhibits a predefined gesture, and (3) if the detected object OB exhibits a predefined gesture, to (i) control the illumination devices 112 to selectively illuminate one or more of the illumination devices 112 to visibly indicate detection of the predefined gesture, and (ii) control, via the actuator control driver circuit(s), at least one of the actuators 46 associated with an access closure of the motor vehicle to lock or unlock the access closure and/or to open or close the access closure.

In some embodiments, the processor or controller $14_1$ is operable upon detection of the object OB within the sensing region R to selectively illuminate the at least one illumination device 112 in a manner which visibly indicates the detected presence of the object OB within the sensing region R. In some such embodiments, the processor or controller $14_1$ is operable upon detection of the object OB within the sensing region to selectively illuminate the at least one illumination device in a manner which indicates that the object OB is within a sub-region of the sensing region R that is too small to make a determination of whether the object OB exhibits the predefined gesture, and is operable to selectively illuminate the at least one illumination device in a manner which indicates that the object OB is within a sub-region of the sensing region R in which a determination can be made of whether the object OB exhibits the predefined gesture. In embodiments in which the at least one illumination device 112 is provided in the form of an array 110 of illumination devices spaced apart at least partially across the sensing region R, the processor or controller $14_1$ is illustratively operable to selectively illuminate illumination devices 112 in the array 10 in a manner which correlates the location of the detected object OB within the sensing region R to a corresponding location or region along the illumination device array 110. In any case, the memory 16 illustratively has instructions stored therein which, when executed by the processor $14_1$, causes the processor $14_1$ to carry out the functions described below. It will be understood that in other embodiments, such instructions may be stored, in whole or in part, in one or more other memory units within the system 10 and/or may be executed, in whole or in part, by one or more other processors and/or controllers within the system 10.

In a first example state of operation illustrated in FIG. 3A, an object OB—in this example, a user's hand, foot or other object that is part of or controlled by the user—has entered the sensing region R of the radiation emission and detection assembly 100. Due to limitations of the assembly 100, however, the object is insufficiently positioned within the sensing region R, and/or is positioned within a sub-region sensing region R that is too small, for the assembly 100 to be able to determine if and when the object OB exhibits a predefined gesture. As a result, the processor or controller $14_1$ is operable to control the illumination driver circuits DC to activate at least one of the illumination devices 112—in this example, the illumination devices 112', 112' proximate the IR LED/sensor pairs which detected the object OB—with a first color to visually indicate to the user that the object OB has been detected within a sub-region of the sensing region R, but is insufficiently positioned in the sensing region R such that the sub-region R is too small to enable to the assembly 100 to determine whether the object OB exhibits a predefined gesture. In this example, the applicable illumination devices 112' are controlled to illuminate with the color red. Illustratively, red serves as a generally universal indicator of warning and so is appropriate as a visual indicator to the user that the object OB is insufficiently positioned in the sensing region R. As noted above, however, one or more other colors may alternatively be employed as desired. Alternatively or additionally still, one or more of the illumination devices 112' (or 112 generally) may be controlled in another visually distinctive manner to provide the visual indicator that the object OB is insufficiently positioned in the sensing region R such that the sub-region R is too small to enable to the assembly 100 to determine whether the object OB exhibits a predefined gesture, e.g., sequentially activating and deactivating the illumination devices 112' (or one or more of the illumination devices 112 generally) with a predefined frequency, activating and deactivating one or more of the illumination devices 112' (or one or more of the illumination devices 112 generally) with a predefined frequency and/or duty cycle, and/or activating in any manner only a subset of the illumination devices 112' (or one or more of the illumination devices 112 generally).

As illustrated by example in FIG. 3B, the object OB is detectable within a distance D1 of the assembly 100, where D1 defines a maximum axial sensing region R; that is, a maximum distance away from the assembly 100 at which the object OB is horizontally and vertically aligned with the assembly 100, i.e., directly opposite the assembly 100. As briefly described above, the radiation emission and detection assembly 100 made up of multiple IR LEDs 102 and IR sensors 104 illustratively has a range of about 200 millimeters (mm) of off-surface detection, and D1 is thus approximately equal to 200 mm. It is to be understood, however, that the object OB is also detectable by the assembly distances less than D1 at least partially off-axis vertically and/or horizontally relative to the assembly 100.

In a second example state of operation illustrated in FIG. 4, the object OB is positioned centrally within the sensing region R. In some cases, the user may have initially positioned the object OB in the location illustrated in FIG. 4, and in other cases the user may have moved the object OB to the location illustrated in FIG. 4 in response to visual feedback provided by illumination of one or more of the illumination devices 112, such as depicted in the example of FIG. 3A. In any case, in the position illustrated in FIG. 4, the object OB is sufficiently in the sensing region and/or otherwise within a sub-region of the sensing region R in which the radiation emission and detection assembly 100 is capable of detecting whether and when the object OB exhibits a predefined gesture. As a result, the processor or controller 14$_1$ is operable to control the illumination driver circuits DC to activate at least one of the illumination devices 112—in this example, the illumination devices 112" proximate the IR LED/sensor pairs which detected the object OB—with a second color to visually indicate to the user that the object OB is detected within the sensing region R and is within a sub-region thereof in which the processor or controller 14$_1$ is capable of determining whether the object OB exhibits a predefined gesture.

In this example, the illumination devices 112" are illuminated in the color amber (or yellow or gold), which serves as a visual feedback indication that the object OB is positioned within the sensing region R such that any subsequent gestures made by the object OB can be recognized by the processor or controller 14$_1$ as a predefined gesture or any of multiple different predefined gestures. As noted above, however, one or more other colors may alternatively be employed as desired. Alternatively or additionally still, one or more of the illumination devices 112" (or one or more of the illumination devices 112 generally) may be controlled in another visually distinctive manner to provide the visual indication that the object OB is positioned within the sensing region R such that any subsequent gestures made by the object OB can be recognized by the processor or controller 14$_1$ as a predefined gesture or any of multiple different predefined gestures, e.g., sequentially activating and deactivating the illumination devices 112' (or one or more illumination devices 112 generally) with a predefined frequency, activating and deactivating one or more of the illumination devices 112' (or one or more illumination devices 112 generally) with a predefined frequency and/or duty cycle, and/or activating in any manner only a subset of the illumination devices 112' (or any subset of the illumination devices 112 generally).

In a third example state of operation illustrated in FIG. 5, the object OB positioned centrally within the sensing region R (e.g., see FIG. 4) has exhibited a predefined gesture which has been detected by the assembly 100 and determined by the processor or controller 14$_1$ as correspond to a predefined gesture. As a result, the processor or controller 14$_1$ is operable to control the illumination driver circuits DC to activate at least one of the illumination devices 112—in this example, the illumination devices 112''' proximate the IR LED/sensor pairs which detected the object OB (e.g., the same illumination devices 112" illuminated in FIG. 4)—with a third color to visually indicate to the user that the detected object OB has exhibited a predefined gesture. Illumination in this instance is in the color green, which illustratively serves as a generally universal indicator of acceptance and so is appropriate as a visual indicator to the user that the gesture has been recognized. As noted above, however, one or more other colors may alternatively be employed as desired. Alternatively or additionally still, one or more of the illumination devices 112''' (or one or more of the illumination devices 112 generally) may be controlled in another visually distinctive manner to provide the visual indication that the object OB positioned within the sensing region R has exhibited a predefined gesture, e.g., sequentially activating and deactivating the illumination devices 112''' (or one or more illumination devices 112 generally) with a predefined frequency, activating and deactivating one or more of the illumination devices 112''' (or one or more illumination devices 112 generally) with a predefined frequency and/or duty cycle, and/or activating in any manner only a subset of the illumination devices 112''' (or any subset of the illumination devices 112 generally). In any case, the processor or controller 14$_1$ is further responsive to detection of the predefined gesture to control at least one of the actuator control driver circuit(s) 40 to control at least one of the actuators 46 associated with an access closure of the motor vehicle, e.g., to lock or unlock the access closure and/or to open or close the access closure.

The memory 16 illustratively has stored therein a vehicle access condition value which represents the predefined gesture. In alternate embodiments, the vehicle access condition value may be stored in one or more of the memory 16, the memory 28, the memory 44 and the memory 64. In some embodiments, the vehicle access condition value is illustratively stored in the form of a predefined set or sequence of values, and the processor 14$_1$ is illustratively operable to process the signal(s) produced by the assembly 100 to convert such signals to a detected set or sequence of values, to then compare the detected set or sequence of values to the stored, predefined set or sequence of values and to then determine that the predefined gesture has been exhibited and detected by the assembly 100 if the detected set or sequence of values matches the vehicle access condition value in the form of the stored, predefined set or sequence of values. In some such embodiments, the object detection module 12$_1$ may have a "learning" mode of operation in which the predefined gesture may be programmed by exhibiting the predefined gesture within the sensing region R of the assembly 100, then converting the signals produced by the assembly 100 in response to the exhibited gesture to a learned set or sequence of values, and then storing the learned set or sequence of values as the predefined set of sequence or values corresponding to the predefined gesture. In some embodiments, two or more different vehicle access condition values may be stored in the memory 16 (and/or any of the memories 28, 44 and 64) each corresponding to a different one of two or more corresponding predefined gestures, and the processor $14_1$ may be operable to compare detected sets or sequences of values produced by the assembly 100 to each of the two or more different stored vehicle access condition values to determine whether one of the two or more predefined gestures has been exhibited. In some such embodiments, each of the multiple predefined gestures may be associated with a different user of the motor vehicle, and in other such embodiments any single user may have two or more predefined gestures store in the memory $14_1$.

In some embodiments, the processor or controller $14_1$ may be responsive to (i) detection of the object OB within a sub-region of the sensing region R but insufficiently positioned in the sensing region R such that the sub-region R is too small to enable to the assembly 100 to determine whether the object OB exhibits a predefined gesture, (ii) detection of the object OB positioned within the sensing region R such that any subsequent gestures made by the object OB can be recognized by the processor or controller $14_1$ as a predefined gesture or any of multiple different predefined gestures, and/or (iii) detection of the predefined gesture, to control at least one of the audio/illumination device driver circuits 60 to activate one or more respective audio and/or illumination devices 66 in addition to the one or more illumination devices 112 or in instead of the one or more illumination devices 112.

While the foregoing example illustrates the selective illumination of several of the illumination devices 112 simultaneously, it will be appreciated that the number of lights illuminated in any given situation may vary depending on the type of feedback desired, the number and/or type of illumination devices 112 being employed in the system, etc. Likewise, although one or more of the illumination devices 112 may activated with one or more colors and/or be activated and deactivated, i.e., switched on and off, to provide visual feedback of the position of the object OB, one or more illumination devices 112 may alternatively be activated (and deactivated) in any manner which visually directs, e.g., coaxes, the user to move the object OB is a particular direction and/or to a particular position relative to the assembly 100.

In one embodiment, the at least one processor or controller $14_1$ is illustratively operable, upon determining from the radiation emission and detection assembly 100 that a predefined gesture has been exhibited by an object OB within the sensing region R of the assembly 100, to communicate instructions to the vehicle control computer 24 to effect the desired operation (e.g., to unlock or lock a closure—such as a door, rear hatch, tailgate, etc., to open a closure—such as a rear hatch, tailgate, etc. and/or to activate, i.e., turn on, one or more interior and/or exterior vehicle illumination devices). In some alternate embodiments, the at least one processor or controller $14_1$ may be operable, upon such determination, to control one or more actuator driver circuits 40 and/or one or more audio/illumination device driver circuits 60 directly to effect the desired operation. In other alternate embodiments, the at least one processor or controller $14_1$ may be operable, upon such determination, to communicate instructions to the vehicle to one or more other processors or controllers, e.g., the at least one processor or controller 42 and/or the at least one processor or controller 62, to effect the desired operation. In still other alternate embodiments, the at least one processor or controller $14_1$ may be operable, upon such determination, to effect the desired operation in part and to instruct one or more other processors or controllers, e.g., 26, 42, 62, to also effect the desired operation in part.

In some embodiments, one or more aspects of the gesture access process described above and illustrated by example with respect to FIGS. 3A-5 may be implemented in combination with, or integrated with, one or more existing vehicle access devices, techniques or processes. One non-limiting example of such an existing vehicle access device, technique and process is a conventional intelligent "key fob"-type remote used in PES-type access systems. Such access systems may typically operate in a conventional manner by issuing a short-range "challenge" signal to a "key fob" remote 20 carried by a user. If the "key fob" remote 20 is one that is authorized for the vehicle, the "challenge" response from the remote 20 results in the vehicle control computer 24 being placed in a mode where it will accept subsequent "commands" from the remote 20, such as unlocking or locking the vehicle, unlatching the trunk or rear hatch, or the like. The gesture access process described above and illustrated by example with respect to FIGS. 3A-5 may operatively interface with the vehicle control computer 24 so as to permit execution of the gesture access process by the processor or controller $14_1$ only in circumstances when an authorized user seeks to use the system, e.g., such as when the user conveying gesture access movements to the radiation emission and detection assembly 100 is also carrying a key fob remote 20 or other remote device, e.g., a smart phone or other mobile device, which may communicate with the vehicle control computer 24 to allow the user to access the vehicle using predefined gesture access movements. Alternatively, the object detection module $12_1$ may further include the necessary components to enable independent authentication of the user; that is, the electronics, hardware, firmware and/or software necessary to issue a challenge signal and to receive and evaluate the response from a user's key fob 20 and/or to otherwise communicate with one or more other mobile electronic devices 20 carried by the user for purposes of authenticating the user for subsequent recognition by the combination of the radiation emission and detection assembly 100 and the processor or controller $14_1$ of a predefined gesture movement carried out by the user.

In embodiments in which the gesture access process illustrated by example in FIGS. 3A-5 and descried above is permitted only in circumstances when an authorized user seeks to use the system, e.g., such as when the user conveying gesture access movements to the radiation emission and detection assembly 100 is also carrying a key fob remote 20 or other such remote device, the memory $16_1$ illustratively has a key fob code stored therein, and the processor or controller $14_1$ is illustratively operable to receive a key fob signal(s) wirelessly transmitted by a key fob or other such remote device 20 within a key fob signal detection area of the motor vehicle, to determine a code based on the received key fob signal and to activate the IR LED(s) 102 and process the radiation detection signals detected by the IR sensor(s) 104 only if the determined code matches the stored key fob code. Illustratively, the key fob signal detection area is defined by a transmission/detection range of the key fob or other such remote device 20, which may typically be up to about 20-30 yards (or more). In some such embodiments, the key fob code is illustratively associated in the memory $16_1$ with a vehicle access condition value, corresponding to a predefined gesture, also stored in the memory $16_1$, and in such embodiments the processor or controller $14_1$ is illustratively operable to process the radiation detection signals produced by the assembly 100 as described above and actuate a corresponding one of the actuators 46 only if the object OB in the sensing region R of the assembly 100 exhibits the predefined gesture corresponding to the vehicle access condition value associated in the memory $16_1$ with the stored key fob code. In embodiments in which multiple key fob codes are stored in the memory $16_1$, each such stored key fob code is illustratively associated in the memory $16_1$ with a different vehicle access condition value mapped to or associated with a different corresponding predefined gesture. In such embodiments, the processor or controller $14_1$ is illustratively operable to activate one or more of the actuators 46, as described above, only upon detection of a key fob code which matches one of the multiple stored key fob codes, followed by detection by the assembly 100 of a gesture exhibited within the sensing region R which matches the predefined gesture mapped to or associated with the vehicle access condition value associated in the memory with the matching key fob code.

Figure 6A:
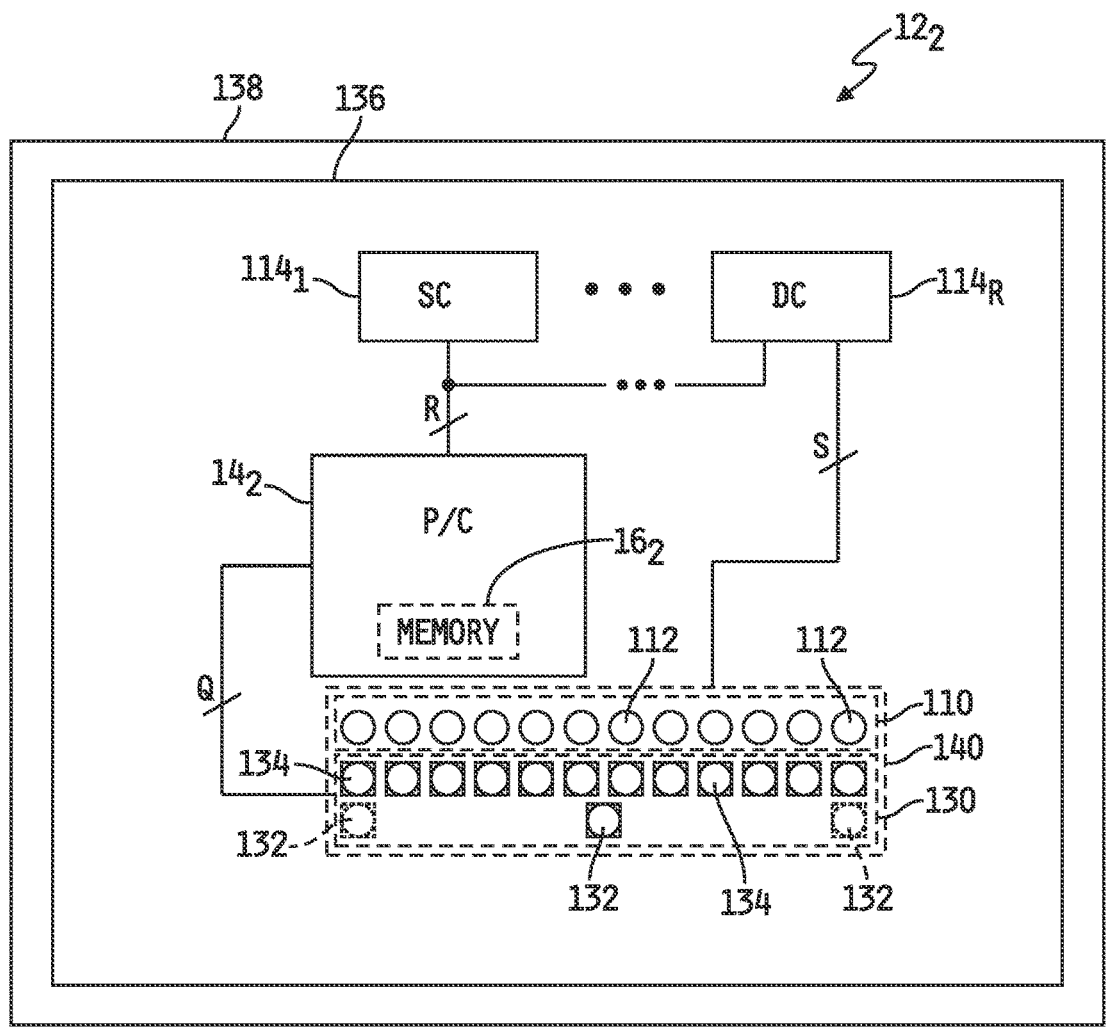
FIG. 6A is a simplified block diagram schematic of another embodiment of the object detection module illustrated in FIG. 1.

Referring now to FIG. 6A, another example embodiment $12_2$ is shown of the object detection module 12 illustrated in FIG. 1. In the illustrated embodiment, the object detection module $12_2$ includes a radiation emission and detection assembly 130 electrically connected to the at least one processor or controller 142 via a number Q of signal paths, wherein Q may be any positive integer. The radiation emission and detection assembly 130 illustratively includes at least one radiation transmitter 132 in the form of a radar transmitter, and a plurality of radiation detectors 134 in the form of an array of two or more radar detectors. In some embodiments, a single radar transmitter 132 is positioned adjacent to or proximate to the plurality of radar detectors 134, and in other embodiments two or more radar transmitters 132 may be positioned adjacent to or proximate to the plurality of radar detectors as illustrated by dashed-line representation in FIG. 6A. In other embodiments, the one or more radar transmitters 132 may be spaced apart from the plurality of radar detectors 134.

The at least one radar transmitter 132 is illustratively conventional, and is configured to be responsive to control signals produced by the processor or controller $14_1$ to emit radio frequency (RF) radiation outwardly from the assembly 100. In one embodiment, the at least one radar transmitter 132 is configured to emit radiation in the so-called short-range-radar (SRR) band, e.g., at and around 24 gigahertz (GHz). Alternatively or additionally, the at least one radar transmitter 132 may be configured to emit radiation in the so-called long-range-radar (LRR) band, e.g., at and around 77 GHz. It will be understood, however, that these numerical frequency ranges are provided only by way of example, and that the at least one radar transmitter 132 may be alternatively or additionally configured to emit radiation at radar frequencies less than 1 GHz and up to or greater than 300 GHz. In any case, each of the plurality of radar detectors 134 is configured to detect radar signals in frequency range(s) corresponding to that/those of the at least one radar transmitter 132, and to produce radiation detection signals corresponding thereto.

The radiation detection signals produced by the radar detectors 134 illustratively include reflected radar signals if the emitted radiation is reflected by an object in a sensing region of the assembly 130, in accordance with a conventional time sequence in which the at least one radar transmitter 132 is activated to emit radiation and at least a portion of such emitted radiation is reflected by the object toward and detected by at least one of the radar detectors 134. As illustrated by example in FIG. 6B, an object OBJ is detectable within a distance D2 of the assembly 130, where D2 defines a maximum axial sensing region; that is, a maximum distance away from the assembly 130 at which the object OB is horizontally and vertically aligned with the assembly 130, i.e., directly opposite the assembly 130. Within this distance D2, radar signals 133 emitted by the at least one radar transmitter 132 propagate outwardly away from the assembly 130 and from the motor vehicle MV, and at least a portion of such signals 133 which strike the object OBJ are reflected by the object OBJ back toward the assembly 130 in the form of reflected radar signals 135 which are detected by one or more of the plurality of radar detectors 134. The distance D2 between the assembly 130 mounted to the motor vehicle MV and a detectable object is illustratively several meters, and in some embodiments D2 may be greater than several meters. It is to be understood, however, that the object OBJ is also detectable by the assembly 130 at distances less than D2 and at least partially off-axis vertically and/or horizontally relative to the assembly 130.

Referring again to FIG. 6A, the illustrated object detection module $12_2$ is illustratively otherwise identical in structure and operation to the object detection module $12_1$ illustrated in FIGS. 2-5 and described above. For example, the object detection module $12_2$ further illustratively includes a plurality of illumination devices 112 which may (or may not) be arranged in the form of a linear or non-linear array 110 of equally or non-equally spaced-apart illumination devices as illustrated in FIG. 6A. The plurality of illumination devices 112 are illustratively as described above with respect to FIG. 2. As another example, the object detection module $12_2$ further illustratively includes a number R of conventional supporting circuits (SC) and conventional driver circuits (DC) $114_1$-$114_R$, wherein R may be any positive integer. The supporting circuit(s) (SC) and the driver circuit(s) (DC) is/are each as described above with respect to FIG. 2. As yet another example, the components of the object detection module $12_2$ are illustratively mounted to at least one circuit substrate 136, which is as described with respect to the circuit substrate 116 of FIG. 2, and the combination is illustratively mounted to or within a housing 138, which is as described with respect to the housing 118 of FIG. 2. In some embodiments, as also described above with respect to the object detection module $12_2$ illustrated in FIG. 2, the at least one radar transmitter 132, the plurality of radar detectors 134 and the one or more visible LEDs 112 may be combined and provided in the form of a radiation assembly or module 140 mounted to the at least one circuit substrate 136 as illustrated by example in FIG. 6A.

Figure 7:
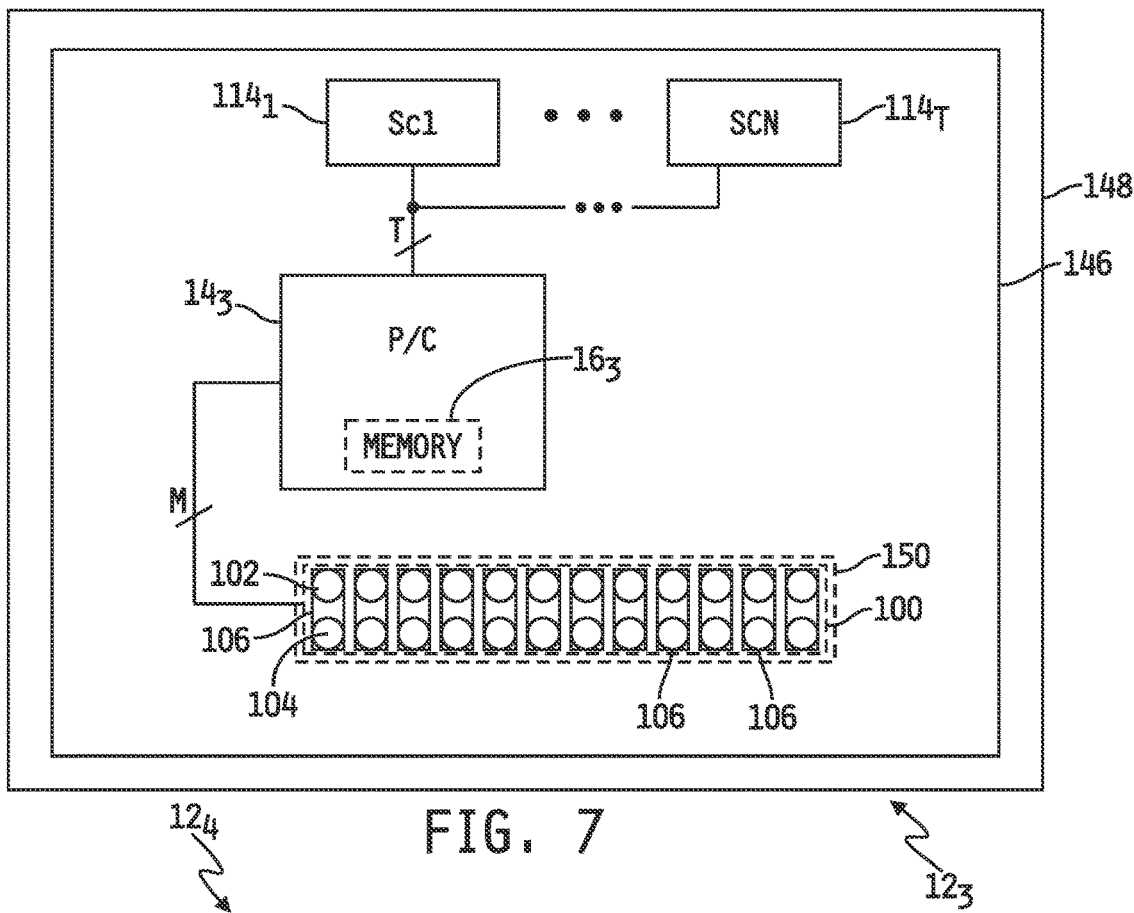
FIG. 7 is a simplified block diagram schematic of yet another embodiment of the object detection module illustrated in FIG. 1.

Referring now to FIG. 7, yet another example embodiment $12_3$ is shown of the object detection module 12 illustrated in FIG. 1. In the illustrated embodiment, the object detection module $12_3$ includes the radiation emission and detection assembly 100 illustrated in FIG. 2 and described above, which is electrically connected to the at least one processor or controller 143 via a number M of signal paths, wherein M may be any positive integer. Unlike the object detection module $12_1$ illustrated in FIG. 2, the object detection module $12_3$ does not include the plurality of illumination devices 112. The object detection module $12_3$ is otherwise identical in structure and operation to the object detection module $12_1$ illustrated in FIGS. 2-5 and described above. For example, the object detection module $12_3$ further illustratively includes a number T of conventional supporting circuits (SC) $114_1$-$114_T$, wherein T may be any positive integer. In some embodiments, the object detection module $12_3$ may further include one or more conventional driver circuits, as described above with respect to FIG. 2, in such embodiments in which the object detection module $12_3$ includes one or more drivable devices. In any case, the supporting circuit(s) (SC) is/are each as described above with respect to FIG. 2. As another example, the components of the object detection module $12_3$ are illustratively mounted to at least one circuit substrate 146, which is as described with respect to the circuit substrate 116 of FIG. 2, and the combination is illustratively mounted to or within a housing 148, which is as described with respect to the housing 118 of FIG. 2. In some embodiments, as also described above with respect to the object detection module $12_1$ illustrated in FIG. 2, the plurality of IR LEDs 102 and the plurality of IR sensors 104 may be combined and provided in the form of a radiation assembly or module 150 mounted to the at least one circuit substrate 146 as illustrated by example in FIG. 7.

Figure 8:
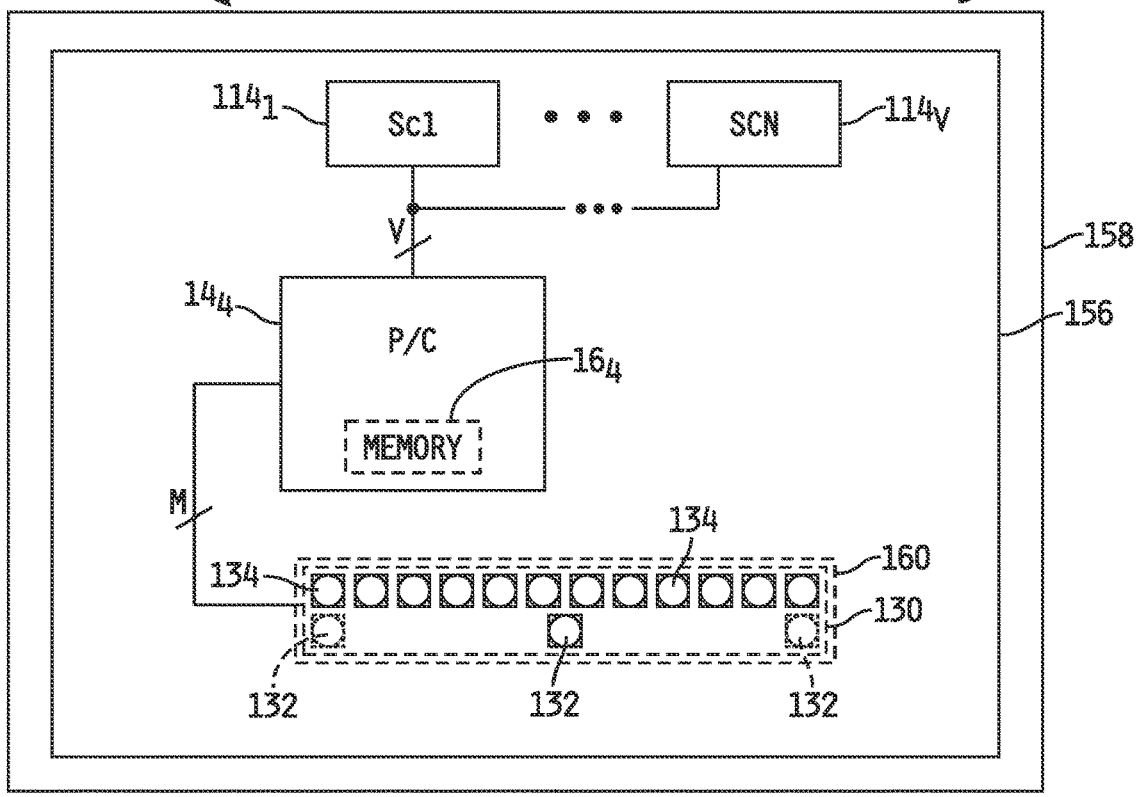
FIG. 8 a simplified block diagram schematic of a further embodiment of the object detection module illustrated in FIG. 1.

Referring now to FIG. 8, still another example embodiment $12_4$ is shown of the object detection module 12 illustrated in FIG. 1. In the illustrated embodiment, the object detection module $12_4$ includes the radiation emission and detection assembly 130 illustrated in FIG. 6A and described above, which is electrically connected to the at least one processor or controller 144 via a number M of signal paths, wherein M may be any positive integer. Unlike the object detection module $12_2$ illustrated in FIG. 6A, the object detection module $12_4$ does not include the plurality of illumination devices 112. The object detection module $12_4$ is otherwise identical in structure and operation to the object detection module $12_2$ illustrated in FIGS. 6A, 6B and described above. For example, the object detection module $12_4$ further illustratively includes a number V of conventional supporting circuits (SC) $114_1$-$114_V$, wherein V may be any positive integer. In some embodiments, the object detection module $12_4$ may further include one or more conventional driver circuits, as described above with respect to FIG. 2, in such embodiments in which the object detection module $12_4$ includes one or more drivable devices. In any case, the supporting circuit(s) (SC) is/are each as described above with respect to FIG. 2. As another example, the components of the object detection module $12_4$ are illustratively mounted to at least one circuit substrate 156, which is as described with respect to the circuit substrate 116 of FIG. 2, and the combination is illustratively mounted to or within a housing 158, which is as described with respect to the housing 118 of FIG. 2. In some embodiments, as also described above with respect to the object detection module $12_2$ illustrated in FIG. 6A, the at least one radar transmitter 132 and the plurality of radar detectors 134 may be combined and provided in the form of a radiation assembly or module 160 mounted to the at least one circuit substrate 156 as illustrated by example in FIG. 8.

Figure 9:
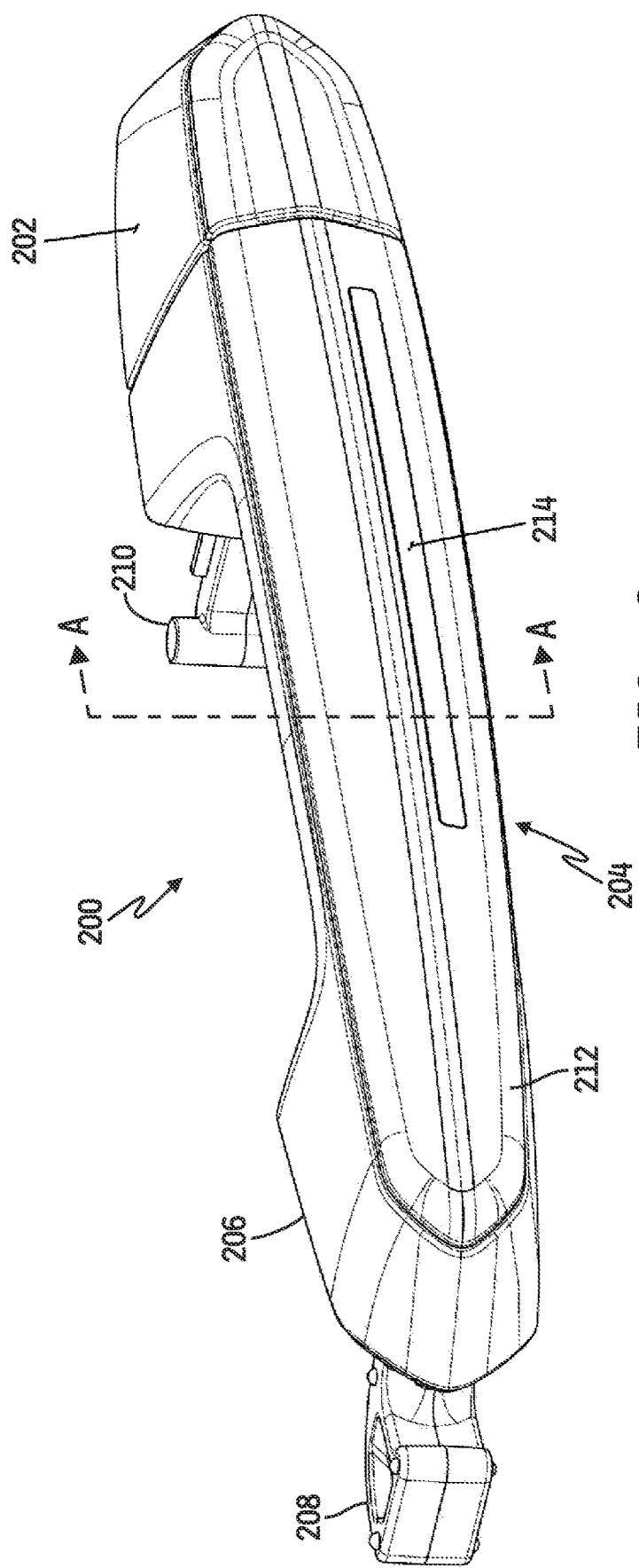
FIG. 9 is a perspective view of an embodiment of a motor vehicle access closure release handle in which the object detection module of FIG. 2 or FIG. 6A may be embodied.

The object detection module 12, as described above with respect to FIG. 1 and various example embodiments $12_1$-$12_4$ of which are described above with respect to FIGS. 2-8, may be implemented in a motor vehicle in any number of ways. As one example, and without limitation, the object detection module $12_3$ or the object detection module $12_4$ may be embodied in a motor vehicle access handle (e.g., a door handle) assembly 200 as illustrated by example in FIGS. 9-12. Referring now to FIG. 9, the motor vehicle access handle assembly 200 is illustratively a strap-style handle of the type comprising a stationary base 202 fixable to a motor vehicle door and a movable portion 204 adapted to be grasped by a user and pulled outwardly away from the door to release the door latch and, thus, open the door. A handle base 206 is coupled to a pivot mount 210 configured to be pivotally mounted to the motor vehicle door and a latch actuator 208 operatively coupled with a door latch assembly located within the motor vehicle door. A grip cover 212 is mountable to and over the handle base 206, and the grip cover 212 carries a lens 214 through which radiation is emitted outwardly in the direction of a user approaching or positioned proximate the lens 214 and through which reflected radiation passes into the handle 200. Together, the grip cover 212 and the handle base 206 form a grip configured to be grasped by a human hand. As will be described in greater detail below, the grip cover 212 and handle base 206 together form a housing which carries the object detection module $12_3$ or $12_4$. In one embodiment, the radiation emission and detection assembly 100, including the plurality of IR LEDs 102 and the plurality of IR sensors 104, is housed within the movable portion 204 of the handle assembly 200, and in another embodiment the radiation emission and detection assembly 130, including the at least one radar transmitter 132 and the plurality of radar detectors 134, is housed within the movable portion 204.

Figure 10:
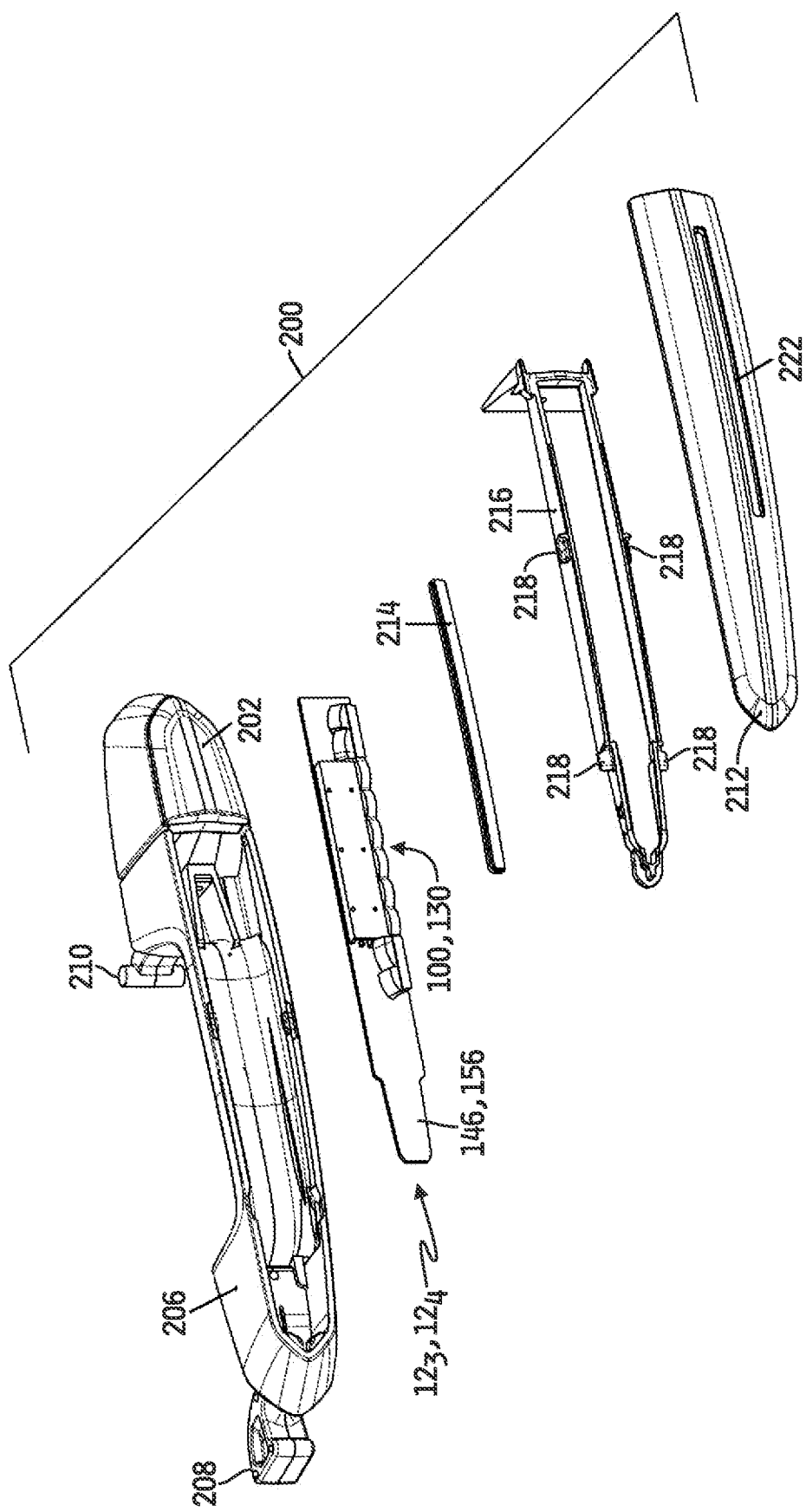
FIG. 10 is an exploded view of the motor vehicle access closure release handle of FIG. 9.

Referring now to FIG. 10, the grip cover 212 includes an opening 222 therein in which the lens 214 is mounted. The lens 214 may be secured within the opening 222 in any known fashion. In the illustrated embodiment, lens 214 includes a base portion that is wider than the opening 222, whereby the lens 214 is inserted through the opening 222 from the inside of the grip cover 212 and the base portion secured to the grip cover 212 with epoxy or other suitable adhesive.

Figure 11:
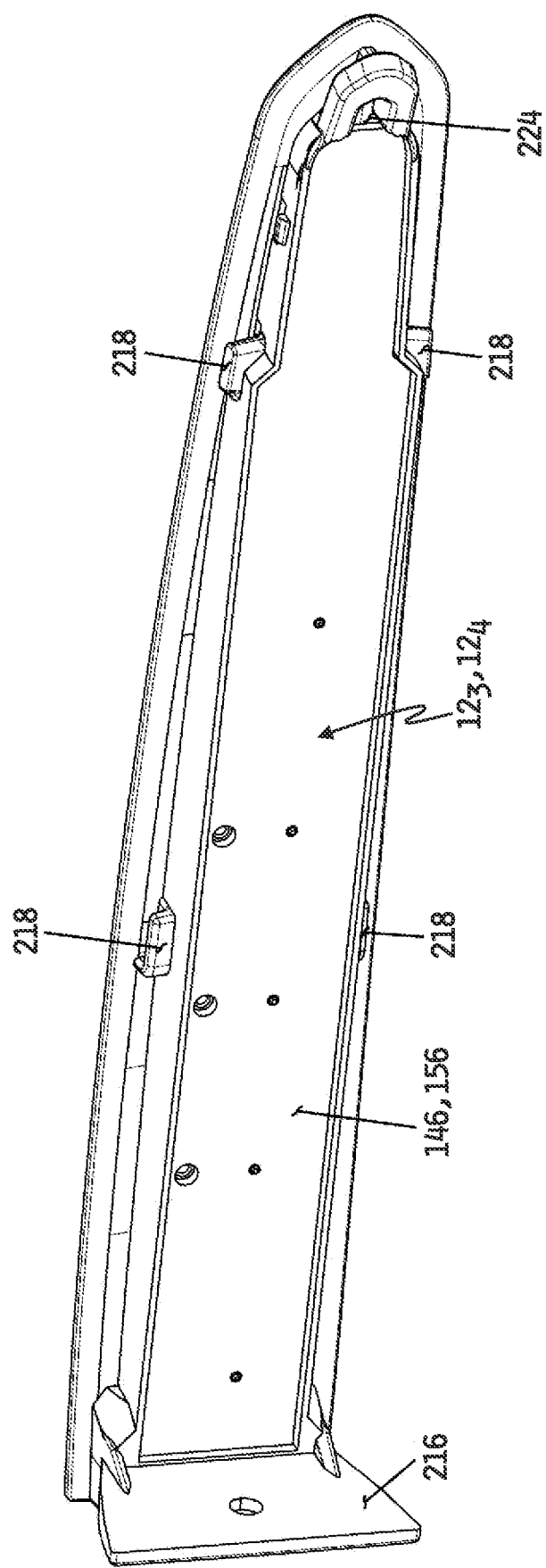
FIG. 11 is a rear view of the motor vehicle access closure release handle of FIG. 8.

As further illustrated in FIGS. 10 and 11, the object detection module $12_3$ or $12_4$ is shown including the respective radiation emission and detection assembly 100, 130 mounted to a respective circuit substrate 146, 156. The radiation emission and detection assembly 100, 130 is illustratively mounted to the circuit substrate 146, 156, and the circuit substrate 146, 156 is illustratively mounted to a support member 216. The radiation emission and detection assembly 100, 130, the circuit substrate 146, 156 and the support member 216 are all illustratively configured such that, when assembled, the radiation emission and detection assembly 100, 130 is aligned with the opening 222 and the lens 214 described above. Illustratively, the support member 16 is dimensioned to be sandwiched between the handle base 206 and the grip cover 212 so as to securely position the object detection module $12_3$, $12_4$ within the housing defined by the handle base 206 and the grip cover 212.

Figure 12:
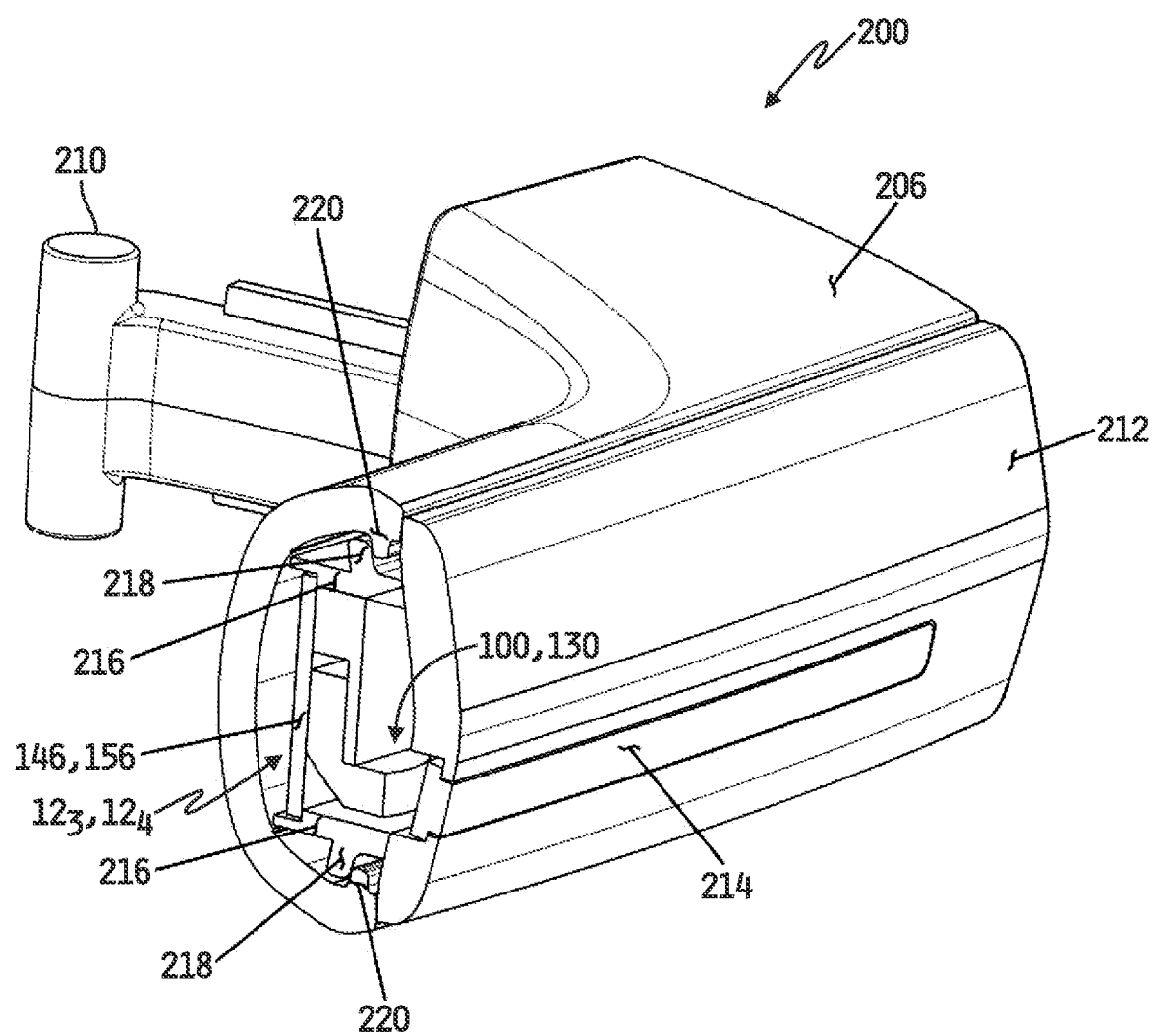
FIG. 12 is a cross-sectional view of the motor vehicle access closure release handle of FIG. 9 as viewed along section lines A-A.
Figure 13:
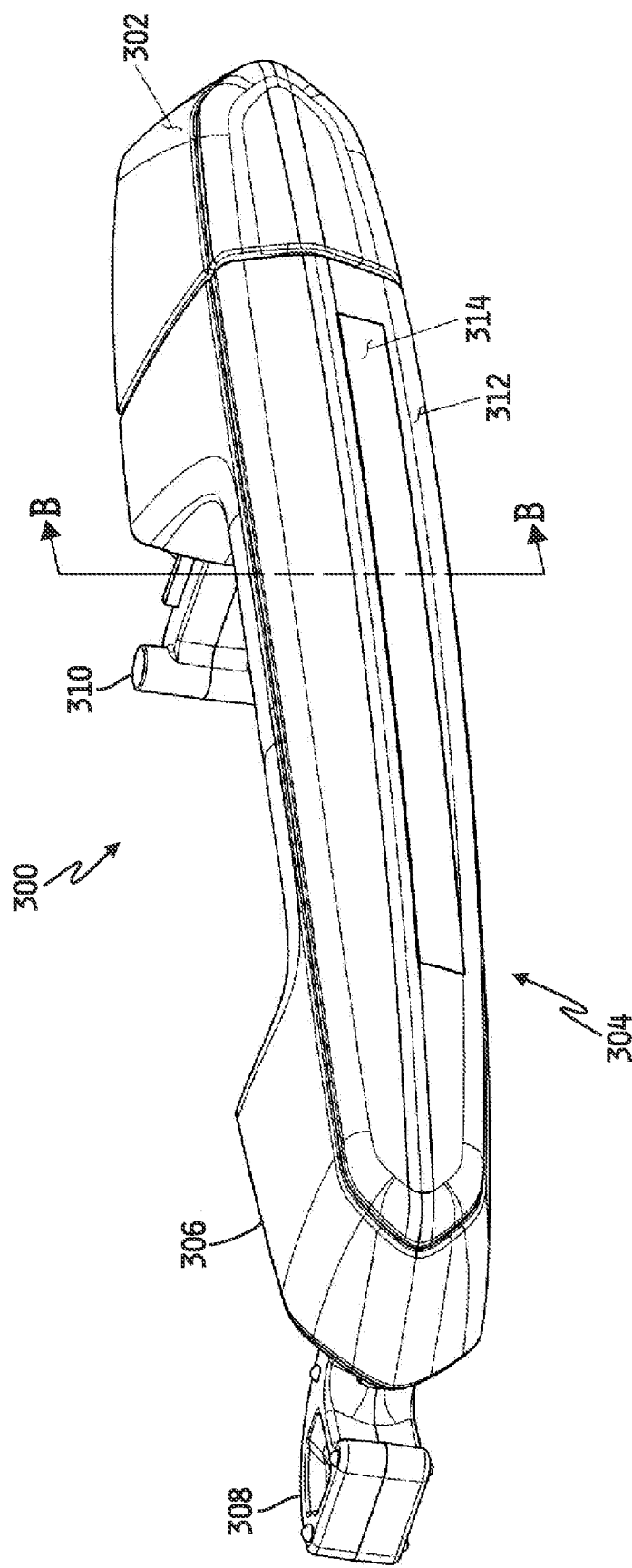
FIG. 13 is a perspective view of another embodiment of a motor vehicle access closure release handle in which the object detection module of FIG. 2 or FIG. 6A may be embodied.
Figure 14:
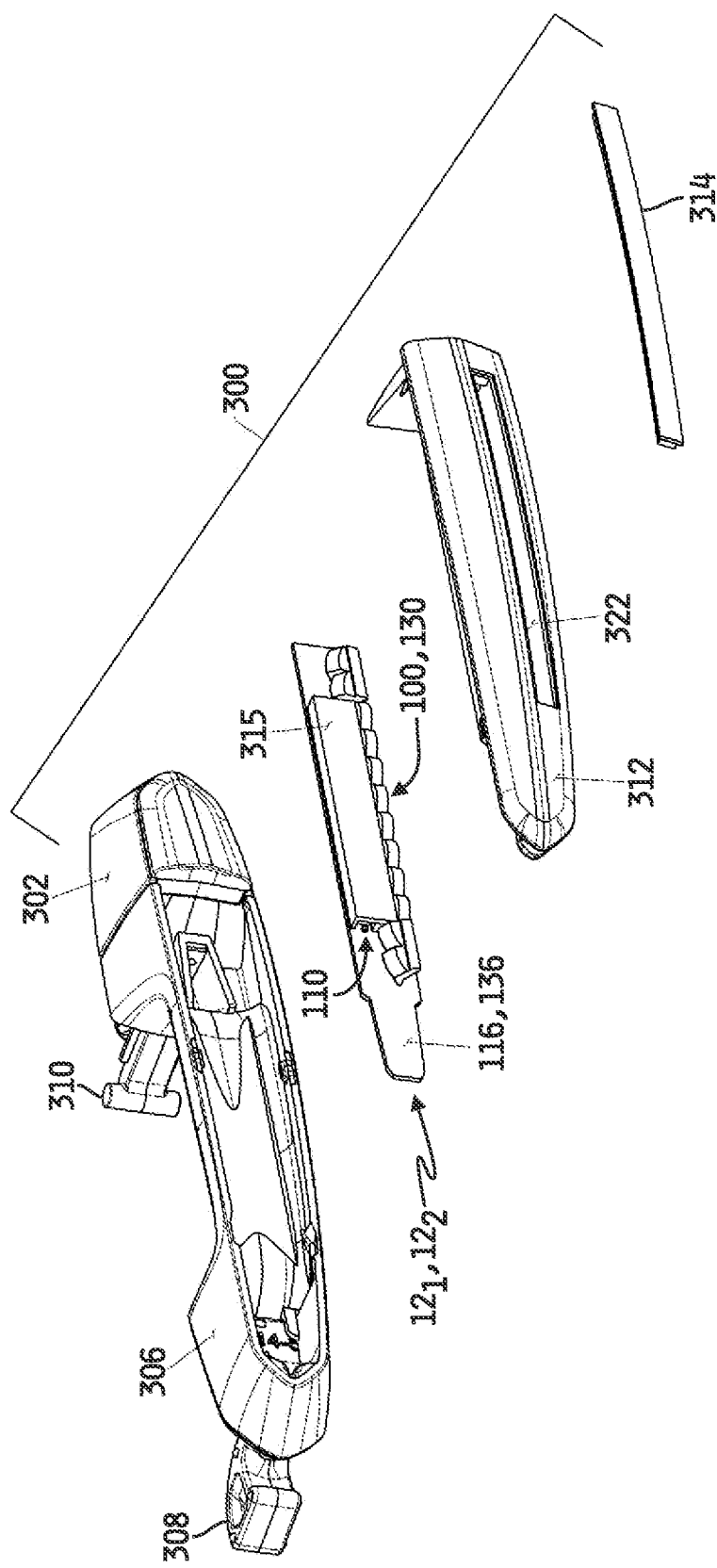
FIG. 14 is an exploded front perspective view of the motor vehicle access closure release handle of FIG. 13.

Referring now to FIGS. 10 and 12, the support member 216 can be seen to include a plurality of outwardly facing locking tabs 218 which engage with corresponding locking tabs 220 defined on the handle base 206 to securely capture the support member 216 in place within the housing defined by the handle base 206 and the grip cover 212. And as shown best in FIG. 11, an opening 224 defined in the support member 216 provides a pass-through for wiring (not depicted) for electrically connecting the components mounted to the circuit substrate 146, 156 to a power source (e.g., the vehicle battery) and, optionally, to one or more of the motor vehicle's onboard computers, e.g., 24, in order to effect vehicle commands, in some embodiments, as described herein.

As another example implementation of the object detection module 12 in a motor vehicle, the object detection module $12_1$ or the object detection module $12_2$ may likewise be embodied in a motor vehicle access handle assembly (e.g., a door handle) 300 as illustrated by example in FIGS.

13-16. Referring to FIGS. 13 through 16, the motor vehicle access handle assembly 300 is illustratively a strap-style handle of the type including a stationary base 302 fixable to a motor vehicle door and a movable portion 304 adapted to be grasped by a user and pulled outwardly away from the door to release the door latch and, thus, open the door. A handle base 306 is coupled to a pivot mount 310 configured to be pivotally mounted to the motor vehicle door and a latch actuator 308 operatively coupled with a door latch assembly located within the motor vehicle door. A grip cover 312 is mountable to and over the handle base 306, and the grip cover 312 illustratively carries a lens 314 through which radiation is emitted outwardly in the direction of a user approaching or positioned proximate the lens 314, through which reflected radiation passes into the handle assembly 300 and through which illumination of at the at least one illumination source 112 is visible. Together, the grip cover 312 and the handle base 306 form a grip configured to be grasped by a human hand. As will be described in greater detail below, the grip cover 312 and handle base 306 together form a housing which carries the object detection module $12_1$ or $12_2$. In one embodiment, the radiation emission and detection assembly 100, including the plurality of IR LEDs 102 and the plurality of IR sensors 104, is housed within the movable portion 304 of the handle assembly 300, and in another embodiment the radiation emission and detection assembly 130, including the at least one radar transmitter 132 and the plurality of radar detectors 134, is housed within the movable portion 304. In both embodiments, the array 110 of illumination sources 112 is also housed within the movable portion 304 of the handle assembly, although in alternate embodiments the array 110 may be replaced by one or more individual illumination sources 112 as described above.

As in the door handle assembly 200, the grip cover 312 includes an opening 322 therein configured to receive the lens 314, and the lens 314 may be secured to the grip cover 312 within the opening 322 via any conventional means. As further illustrated in FIGS. 14 and 15, the object detection module $12_1$ or $12_2$ is shown including the respective radiation emission and detection assembly 100, 130 mounted to a respective circuit substrate 116, 136. The illumination device array 110 is also illustratively mounted to the circuit substrate 116, 136 adjacent to the radiation emission and detection assembly 100, 130 as described above, and in the illustrated embodiment a light-transmissive cover or lens 315 is mounted to the circuit substrate 116, 136 over the illumination device array 110. In one embodiment, the array 110 of illumination devices 112 is aligned with and relative to the radiation emission and detection assembly 100, 130 such that each of the illumination devices 112 is positioned adjacent to a corresponding one of the plurality of IR sensors 104, in the case of the assembly 100, or adjacent to a corresponding one of the plurality of radar detectors 134 in the case of the assembly 130.

The circuit substrate 116, 136 is illustratively mounted to a support member 316 between sidewalls 324 of the grip cover 312. In some embodiments, the radiation emission and detection assembly 100, 130, the illumination device array 110 and the circuit substrate 116, 136 are all illustratively configured such that, when assembled, the radiation emission and detection assembly 100, 130 and the illumination device array 110 are together aligned with the opening 322 and the lens 314 described above. In alternate embodiments, the grip cover 312 may be at least partially light transmissive, and in such embodiments illumination of the one or more illumination devices 112 is viewable through the grip cover 312. In still other embodiments, the grip cover 312 may define another opening and be fitted with another lens through which illumination of the one or more illumination devices 112 may be viewed. In any case, the support member 316 is illustratively dimensioned to be sandwiched between the handle base 206 and the grip cover 212 so as to securely position the object detection module $12_1$, $12_2$ within the housing defined by the handle base 206 and the grip cover 212.

Figure 15:
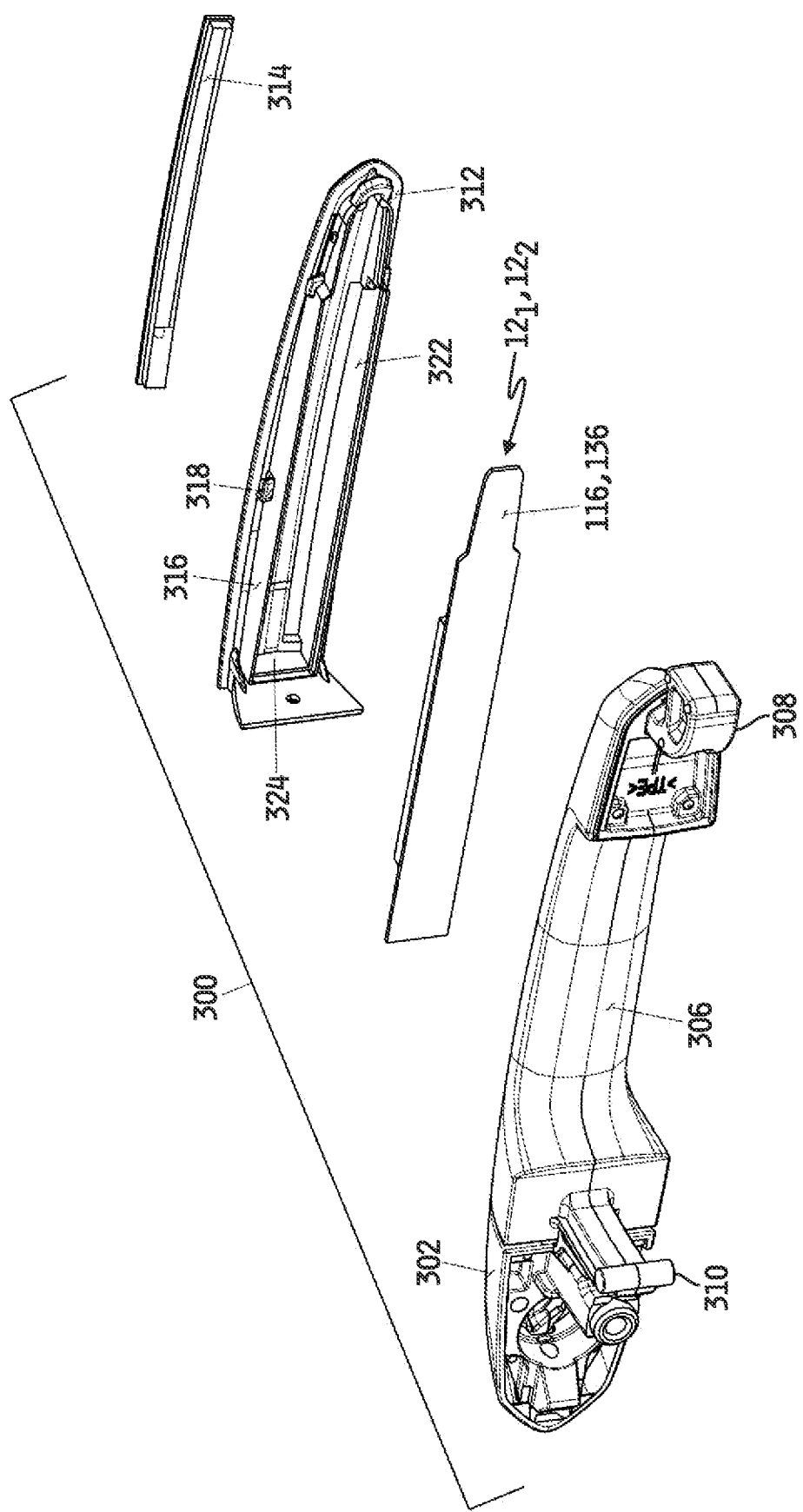
FIG. 15 is an exploded rear perspective view of the motor vehicle access closure release handle of FIG. 13.
Figure 16:
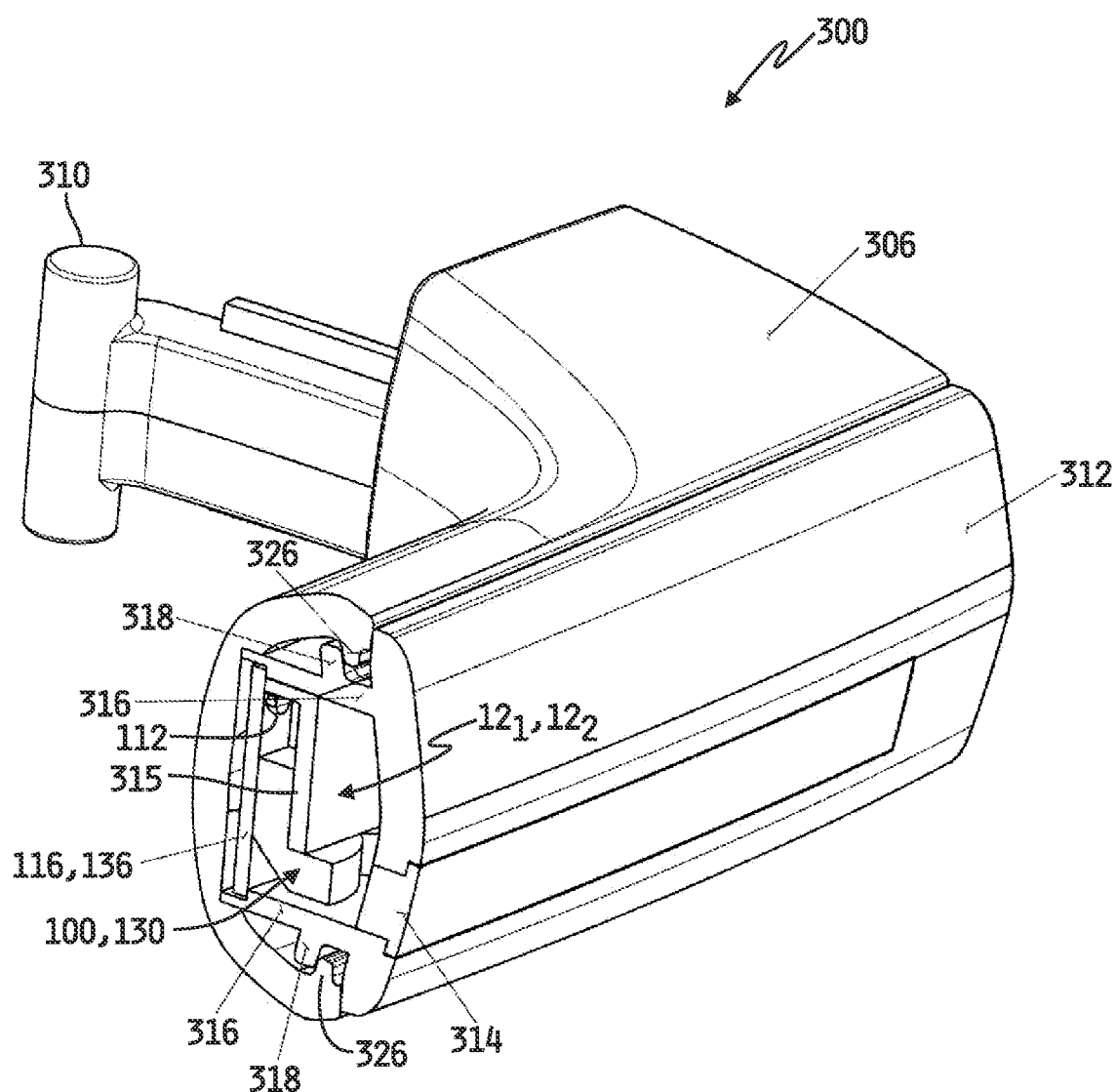
FIG. 16 is a cross-sectional view of the motor vehicle access closure release handle of FIG. 13 as viewed along section lines B-B.

With particular reference to FIGS. 15 and 16, secure positioning of the circuit substrate 116, 136 carrying the radiation emission and detector assembly 100, 130 and the illumination device array 110 220 is accomplished via the support member 316 which extends inwardly from the grip cover 312 so as to be positioned inside the moveable portion 304 of the handle assembly 300. The support member 316 includes sidewalls on which are disposed a plurality of outwardly facing locking tabs 318 which engage with corresponding locking tabs 326 defined on the base portion 306 to securely connect the and handle base 306 to the grip cover 312. The circuit substrate 116, 136 is sandwiched between the support member 316 and the handle base 312, while the radiation emission and detection assembly 100, 130 and the illumination device array 110 are IR received between the sidewalls of the support member 316.

In either of the motor vehicle access handle assemblies 200, 300 illustrated in FIGS. 9-16, it will be understood that some embodiments may include the at least one respective processor or controller 141-144 mounted to the respective circuit substrate 116, 136, 146, 156 as described above with respect to FIGS. 1-8. In some alternate embodiments, the at least one respective processor or controller 141-144 may be positioned elsewhere on the vehicle and operatively connected to the radiation emission and detection assembly 100, 130 and, in the embodiment illustrated in FIGS. 13-16, to the illumination device array 110. In either case, it will also be understood that some embodiments may include the support circuit(s) and, in the case of the modules 121, 122, 114 also mounted to the respective circuit substrate 116, 136, 146, 156 as described above with respect to FIGS. 1-8. In alternate embodiments, at least one of the support circuit(s) and/or at least one of the driver circuit(s) (in embodiments which include at least one driver circuit) may be positioned elsewhere on the vehicle and operatively connected to the respective circuit components of the modules 121-124. In any such embodiment, the respective processor or controller $14_1$-$14_4$ is operable as described above with respect to FIGS. 2-8 to actuate at least one actuator 46 upon detection of a predefined gesture, to controllably illuminate the one or more illumination sources 112, as also described above, in embodiments which include the one or more illumination sources 112 and, in some embodiments, to control activation of one or more audio and/or illumination devices 66.

Figure 17:
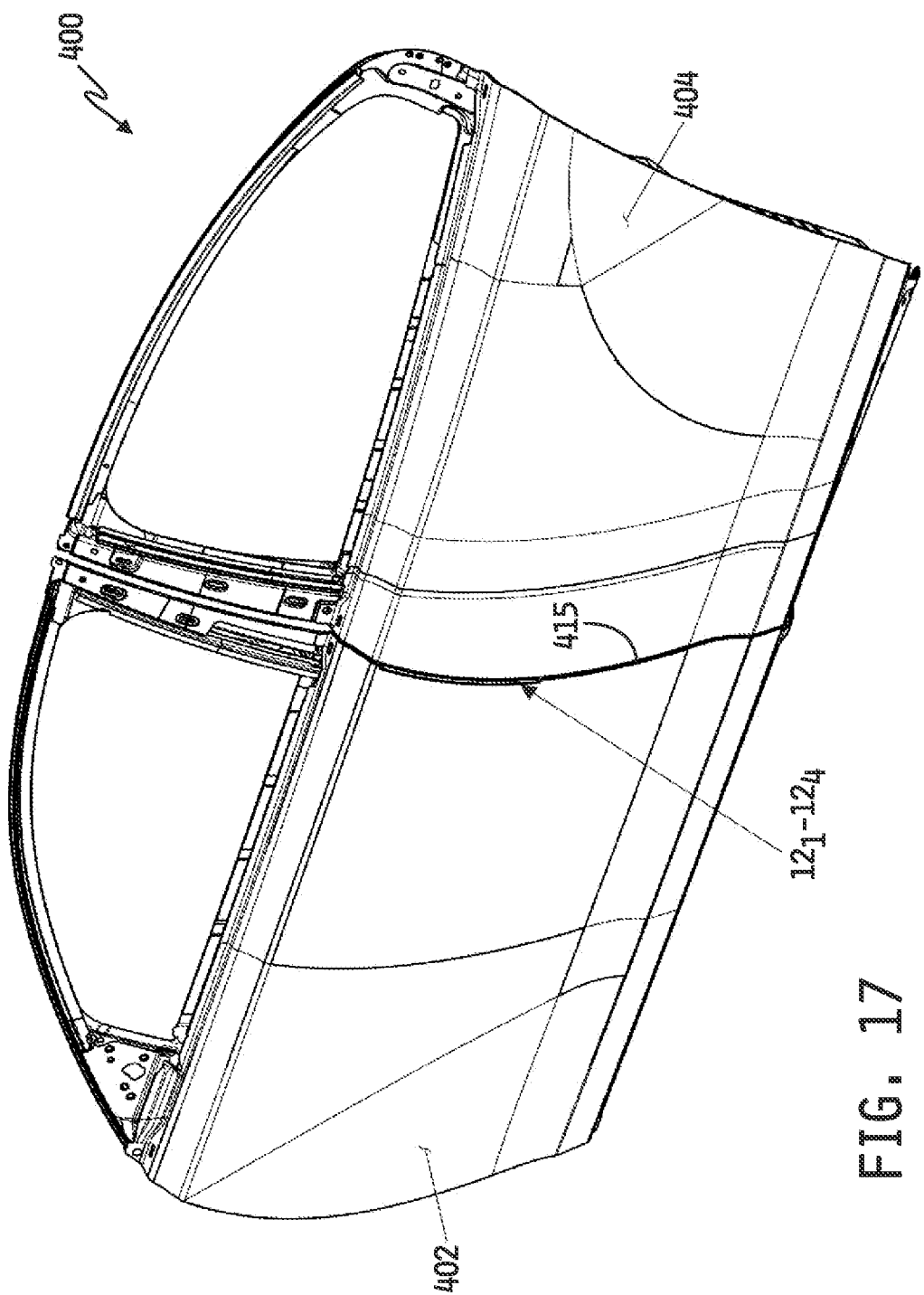
FIG. 17 is a perspective view of an embodiment of a motor vehicle access closure arrangement in which the object detection module of any of FIG. 2, 6A, 7 or 8 may be embodied.
Figure 18:
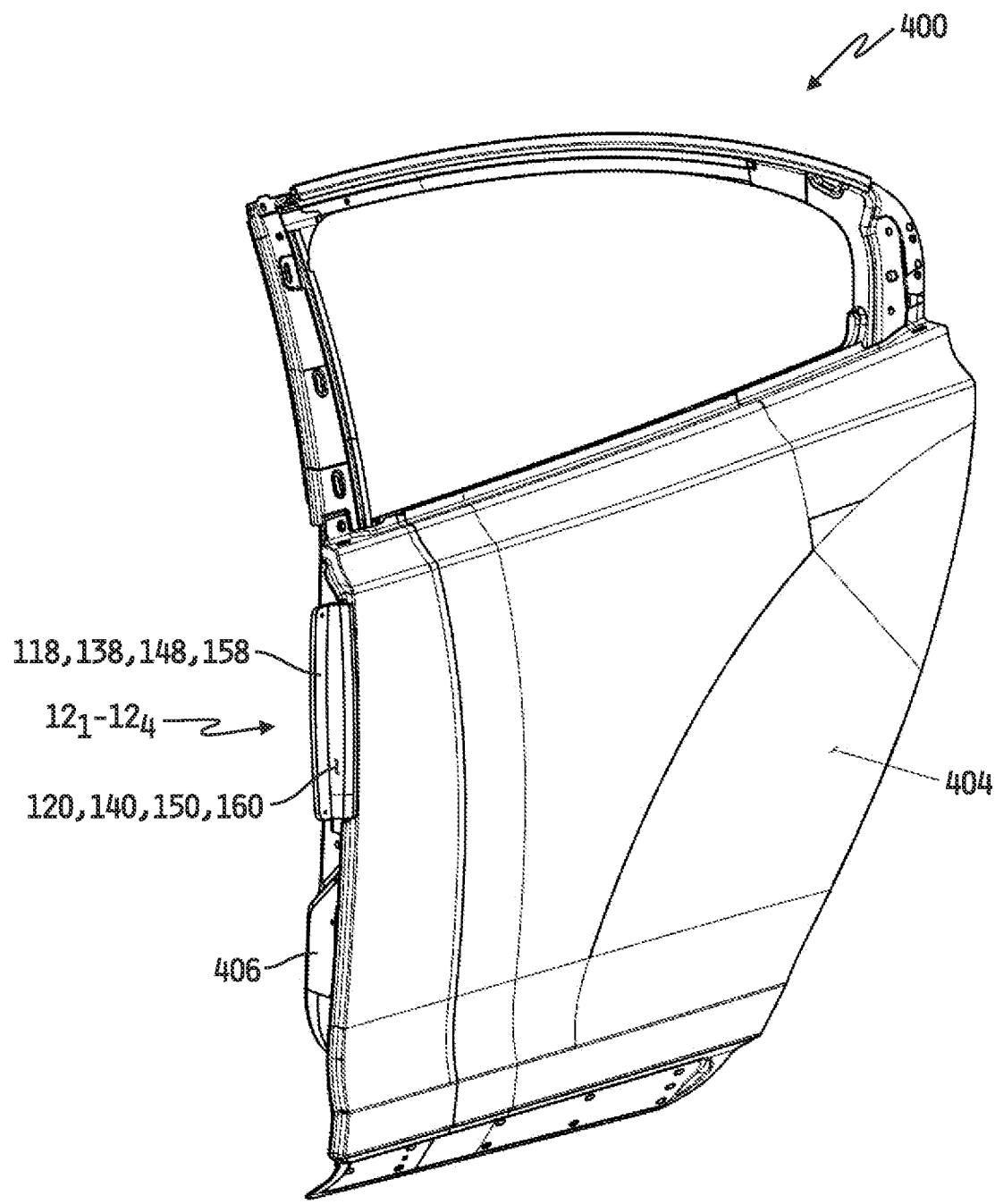
FIG. 18 is a perspective view of a portion of the motor vehicle illustrated in FIG. 17 with the access closure removed to illustrate mounting of the object detection module to a pillar of the motor vehicle.
Figure 19:
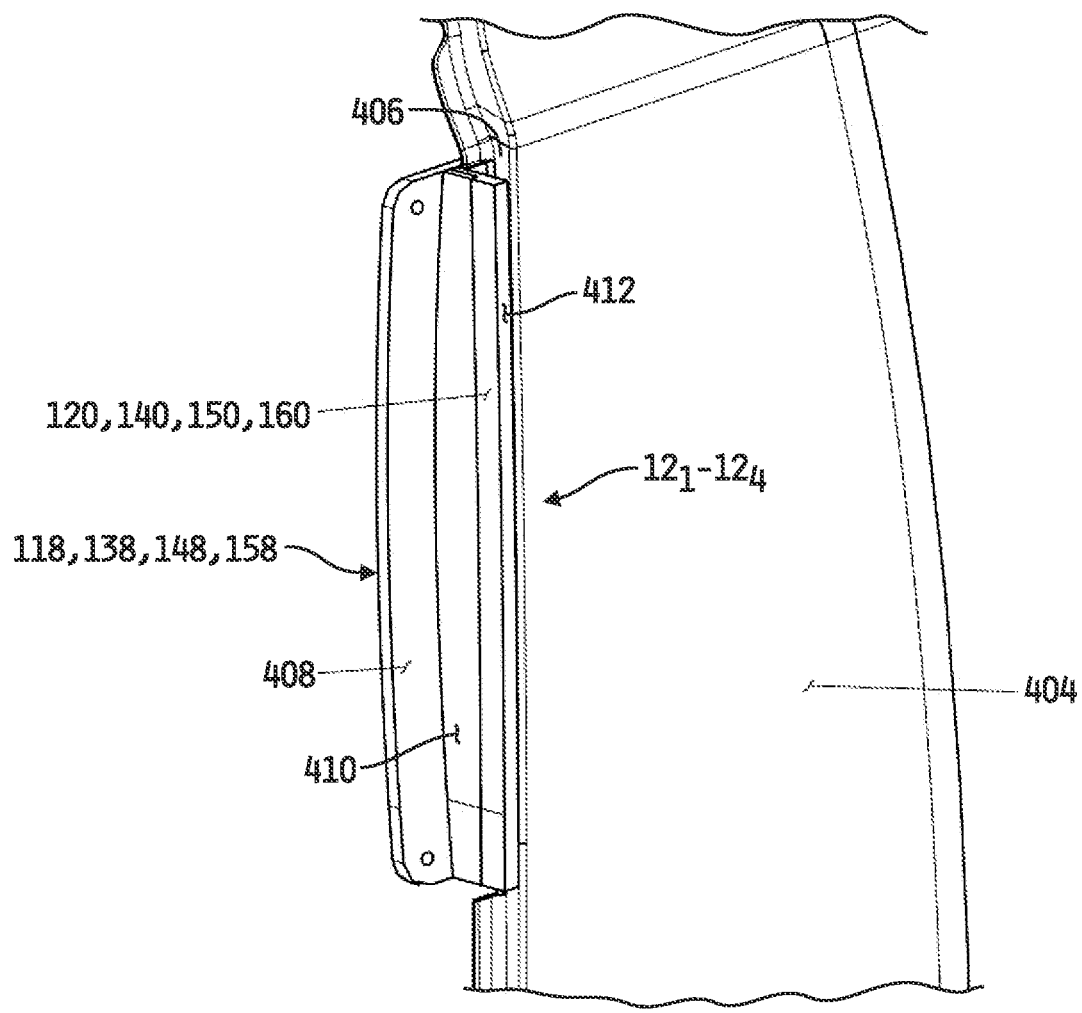
FIG. 19 is a magnified view of the portion of the motor vehicle shown in FIG. 18 and illustrating an embodiment of a housing mounted to the motor vehicle pillar with one of the object detection modules of FIG. 2, 64, 7 or 8 mounted within the housing.

As yet another example implementation of the object detection module 12 in a motor vehicle, any of the object detection modules $12_1$-$12_4$ may be embodied in a motor vehicle access assembly 400 as illustrated by example in FIGS. 17-21. Referring to FIGS. 17 through 19, the motor vehicle access assembly 400 is illustratively provided in the form of a housing 118, 138, 148, 158 of a respective one of the object detection modules $12_1$-$12_4$ adapted to be mounted to a support member 406 of the motor vehicle, e.g., a pillar, positioned between two access closures, e.g., doors, 402, 404 of the motor vehicle. As most clearly shown in FIG. 19, the housing 118, 138, 148, 158 of any of the respective object detection modules $12_1$-$12_4$ is illustratively provided in the form of a first housing portion 408 mounted to the vehicle structure 406, and a second elongated housing portion 410 mounted to the first housing portion 408 such that a free elongated end of the second elongated housing 410 is vertically oriented with a vertical seam 415 defined between the vehicle doors 402, 404. In alternate embodiments, the vertical seam 415 may be defined between an access closure of the motor vehicle and a stationary panel of the motor vehicle.

In embodiments in which the object detection module 12 is provided in the form of the object detection module 12₃ or 12₄, the radiation emission and detection assembly 100, 130 is illustratively provided in the form of a radiation assembly or module 150, 160 as described above, and in embodiments in which the object detection module 12 is provided in the form of the object detection module 12₁ or 12₂, the radiation emission and detection assembly 100, 130 and the one or more illumination devices 112 are together provided in the form of a radiation assembly or module 120, 140 as also described above. In the embodiment illustrated in FIGS. 18 and 19, the radiation assembly or module 120, 140, 150, 160 is illustratively an elongated assembly or module mounted to the elongated free end of the housing portion 410 such that the elongated radiation assembly or module 120, 140, 150, 160 is vertically oriented with the vertical seam 415, and such that the housing portion 410 and the radiation assembly or module 120, 140, 150, 160 together are illustratively recessed within the motor vehicle relative to an outer surface of the motor vehicle. In alternate embodiments, the housing portion 410 and the radiation assembly or module 120, 140, 150, 160 are configured such that the housing portion 410 is recessed within the motor vehicle relative to the outer surface of the motor vehicle but at least a portion of the radiation assembly or module 120, 140, 150, 160 extends at least partially into the vertical seam 415. In some such embodiments, the radiation assembly or module 120, 140, 150, 160 may at least partially protrude from the vertical seam 415 and thus extend outwardly from the outer surface of the motor vehicle adjacent one either side of the vertical seam 415, and in other such embodiments the radiation assembly or module 120, 140, 150, 160 may at least partially extend into the vertical seam 415, but not protrude outwardly therefrom and thus not extend outwardly from the outer surface of the motor vehicle. In some embodiments, an elongated lens 412 may cover the radiation assembly or module 120, 140, 150, 160 to protect the same from the outside environment, as illustrated by example in FIG. 19.

Thusly positioned, the at least one radiation transmitter, e.g., the plurality of IR LEDs 102 or the at least one radar transmitter, is positioned relative to the vertical seam 415 such that, when activated, radiation is emitted outwardly through the vertical oriented seam 415 at least partially along its length and, if an object is positioned within a sensing region of the radiation assembly or module 120, 140, 150, 160, at least some reflected radiation signals are reflected back towards (and in some embodiments, through) the vertically oriented seam 415 to be detected by one or more of the radiation receivers, e.g., one or more of the IR sensors 104 or one or more of the radar detectors 134. Otherwise, the respective processor or controller 14₁-14₄ is operable as described above with respect to FIGS. 2-8 to actuate at least one actuator 46 upon detection of a predefined gesture, to controllably illuminate the one or more illumination sources 112, as also described above, in embodiments which include the one or more illumination sources 112 and, in some embodiments, to control activation of one or more audio and/or illumination devices 66.

Figure 20:
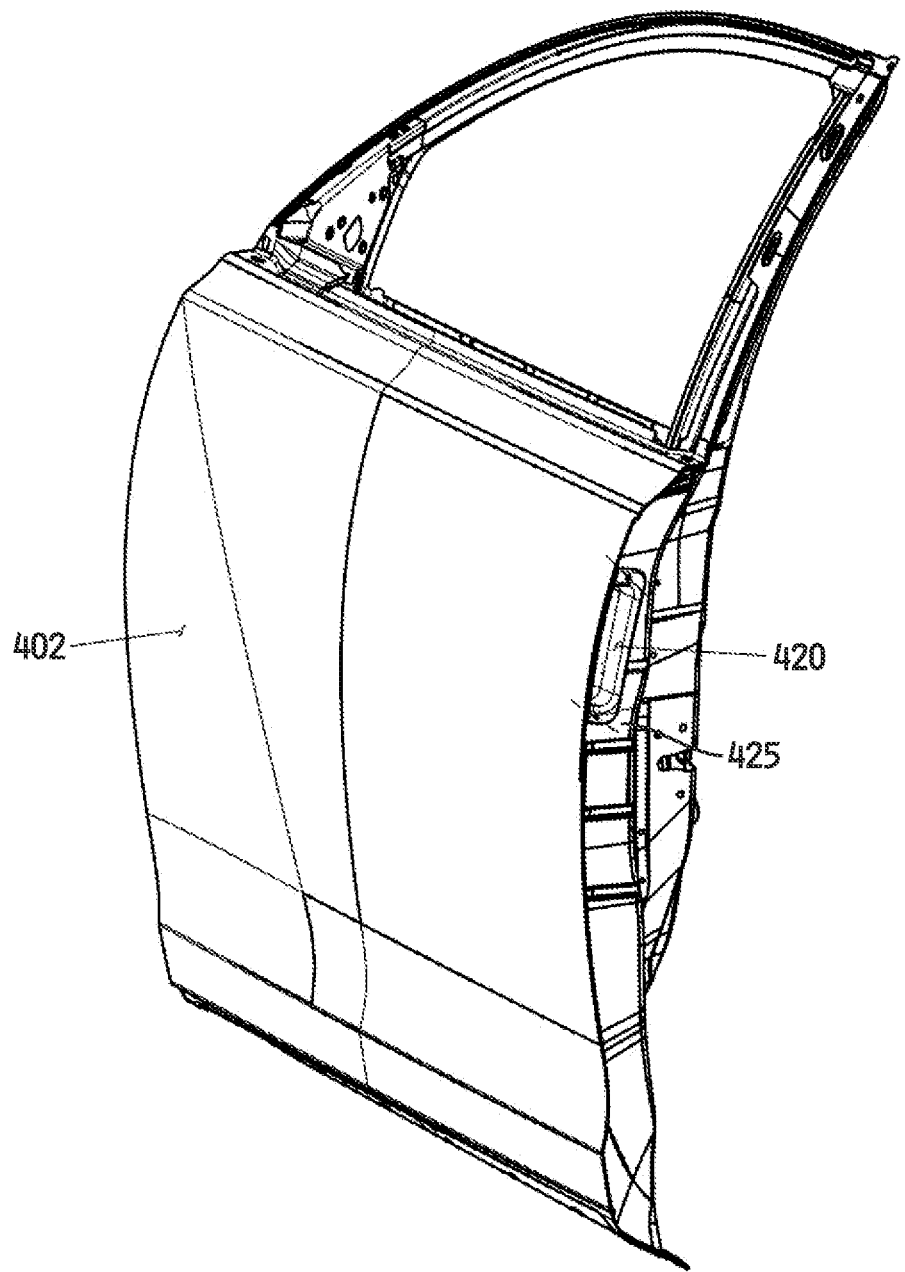
FIG. 20 is a perspective view of the motor vehicle access closure shown in FIG. 17 illustrating an embodiment of a hand-engageable pocket disposed along an inside edge of the access closure.
Figure 21:
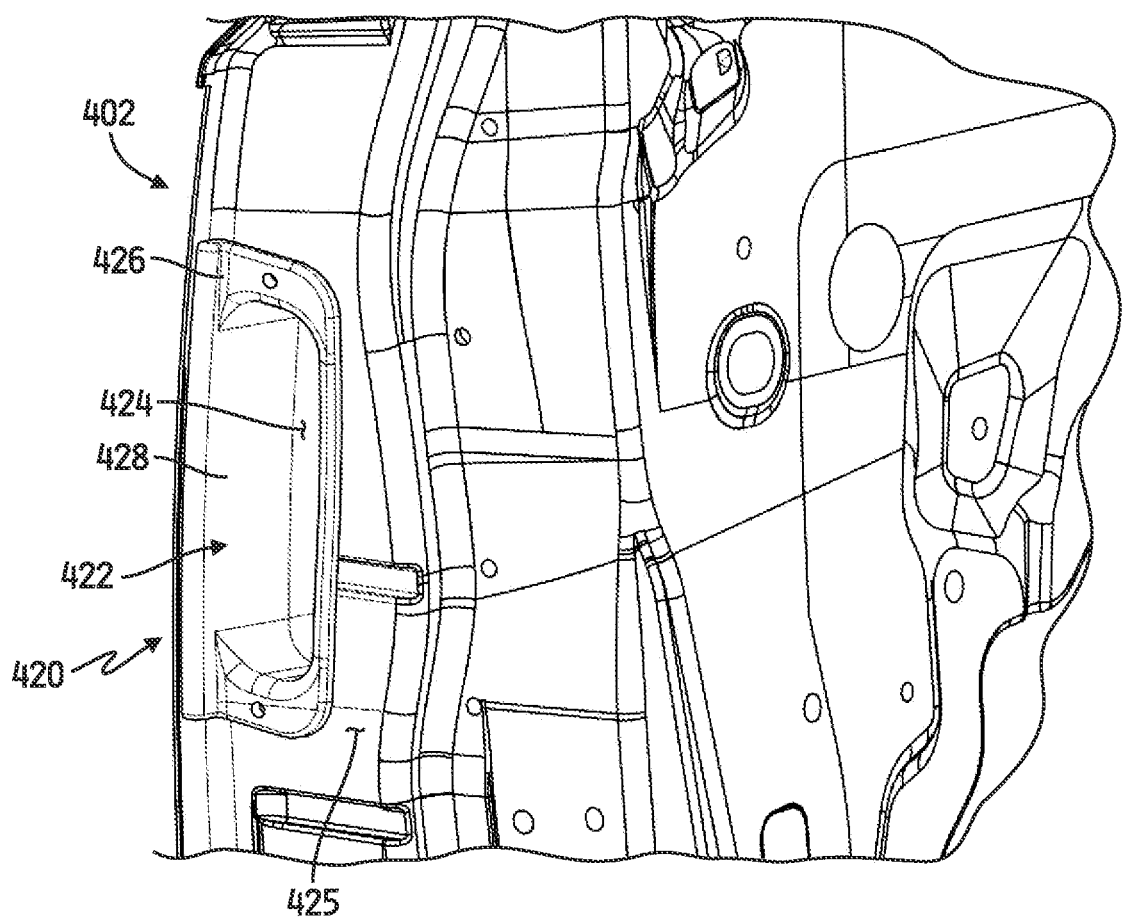
FIG. 21 is a magnified view of the pocket illustrated in FIG. 20.
Figure 22:
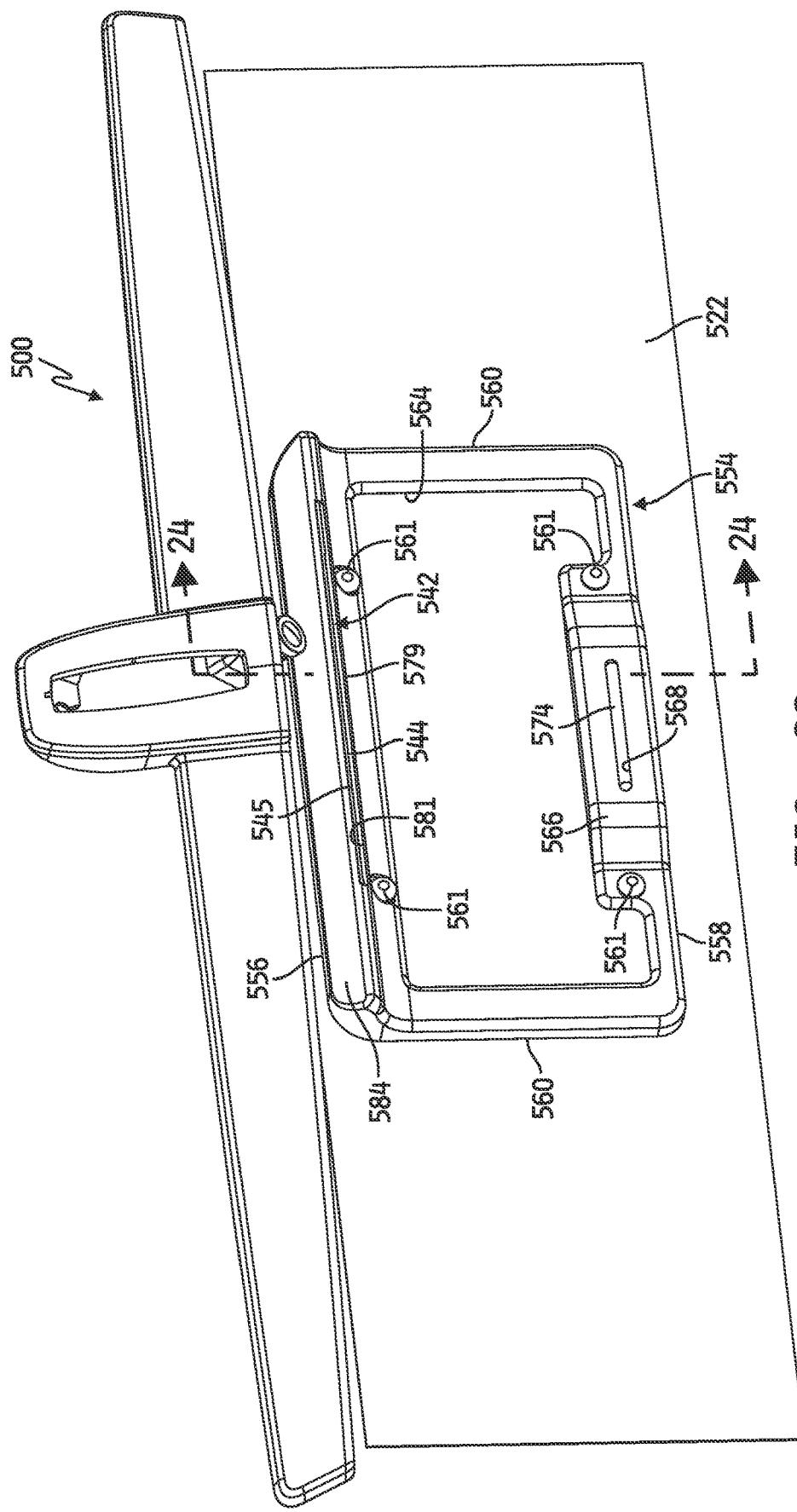
FIG. 22 is a simplified perspective view of an embodiment of a license plate bracket assembly in which the object detection module of any of FIG. 2, 6A 7 or 8 may be embodied, shown mounted to a rear portion of a motor vehicle.

As further illustrated by example in FIGS. 20 and 21, the vehicle access closure 402, e.g., door, which partially defines the vertically oriented seam 415 may be fitted with a passive handle 420 along an inside edge 425 of the closure 402, i.e., along an interior, side surface of the door 402 which is not seen or accessible outside of the motor vehicle when the door 402 is closed but which is seen and accessible when the door 402 is at least partially open. In the illustrated embodiment, the passive handle 420 is illustratively provided in the form of a pocket 422 surrounded by a flange 426 which is attached to the inside edge 425 of the door 402. The pocket 422 illustratively has a sidewall which extends into the inside edge 425 of the door 402 to a bottom surface 424 so as to form a cavity 428 bound by the sides and bottom 424 of the pocket 422. Illustratively, the cavity 428 of the pocket 402 is sized to receive at least two or more fingers of a human hand therein to allow the human hand to facilitate opening the door 402. In the illustrated embodiment, the processor or controller 14₁-14₄ is illustratively operable, upon exhibition of a predefined gesture detected by the radiation assembly or module 120, 140, 150, 160, to control at least one actuator driver circuit 40 to activate at least one actuator 46 associated with the door 402 to at least partially open the door 402 sufficiently to allow the two or more fingers of a human hand to access and engage the pocket 402.

As a further example implementation of the object detection module 12 in a motor vehicle, any of the object detection modules 12₁-12₄ may be embodied in a motor vehicle access assembly 400 as illustrated by example in FIGS. 22-31. In the embodiment shown in FIGS. 21-31, the motor vehicle access assembly 400 illustratively takes the form of a license plate bracket and sensor assembly 500, 500' for providing hands-free access to a rear access closure, e.g., door, of a motor vehicle 522. It should be appreciated that the terms "rear access closure" and "rear access door" as used herein may include any rear access door for a motor vehicle such as, but not limited to, a lift gate, trunk and tailgate. Additionally, the term "motor vehicle" as used herein may encompass various types of motor vehicles including, but not limited to, automobiles, trucks, all-terrain vehicles and the like.

Figure 23:
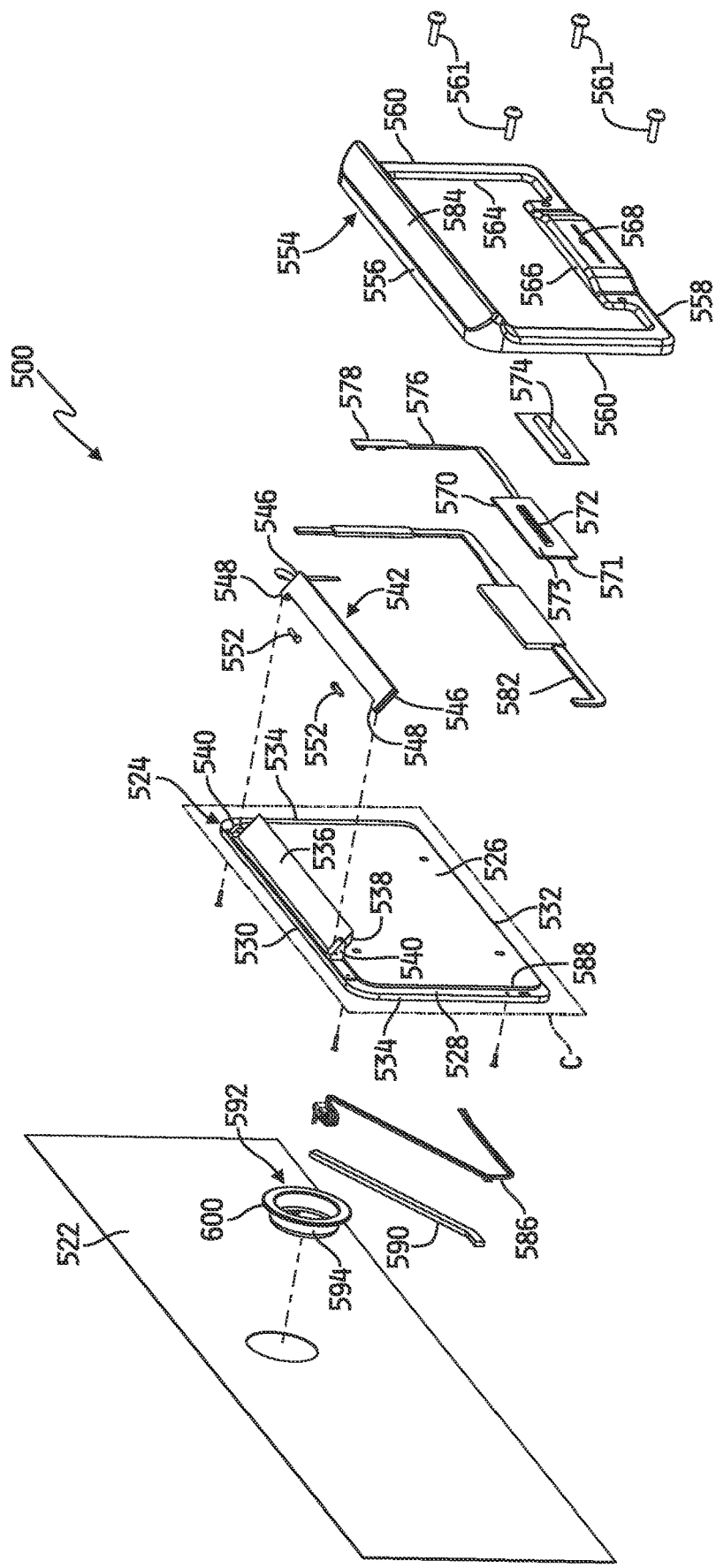
FIG. 23 is an exploded perspective side view of the license plate bracket assembly of FIG. 22.

With specific reference to FIG. 23, the assembly 500 includes a generally rectangular-shaped back plate 524 that extends along a plane C. The back plate 524 presents a front surface 526, a rear surface 528, a top 530, a bottom 532 and a pair of sides 534 that extend between the top 530 and bottom 532. It should be appreciated that the back plate 524 could have other shapes, such as, but not limited to, an oval shape.

Figure 24:
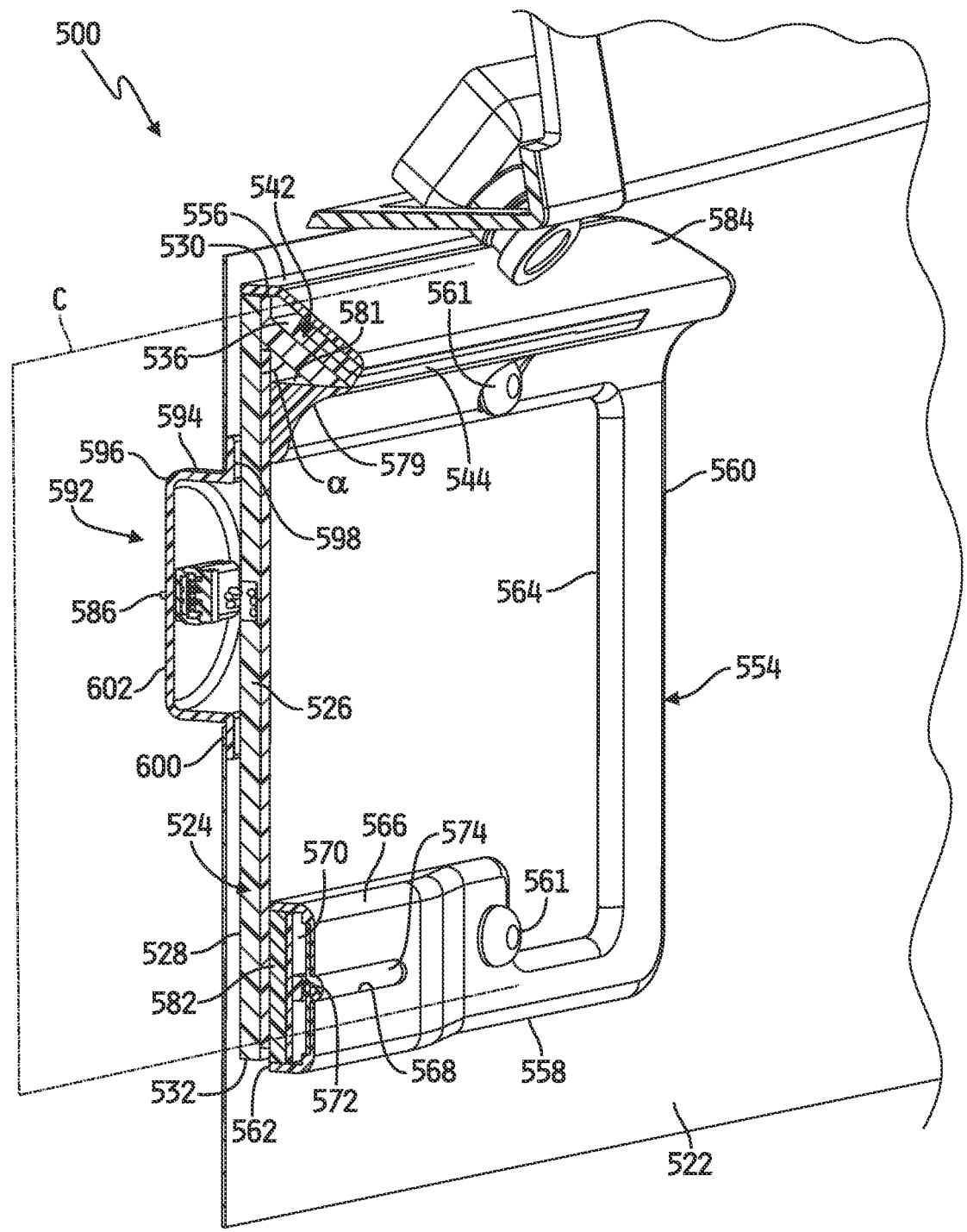
FIG. 24 is a perspective cutaway side view of the license plate bracket assembly of FIG. 22.
Figure 27:
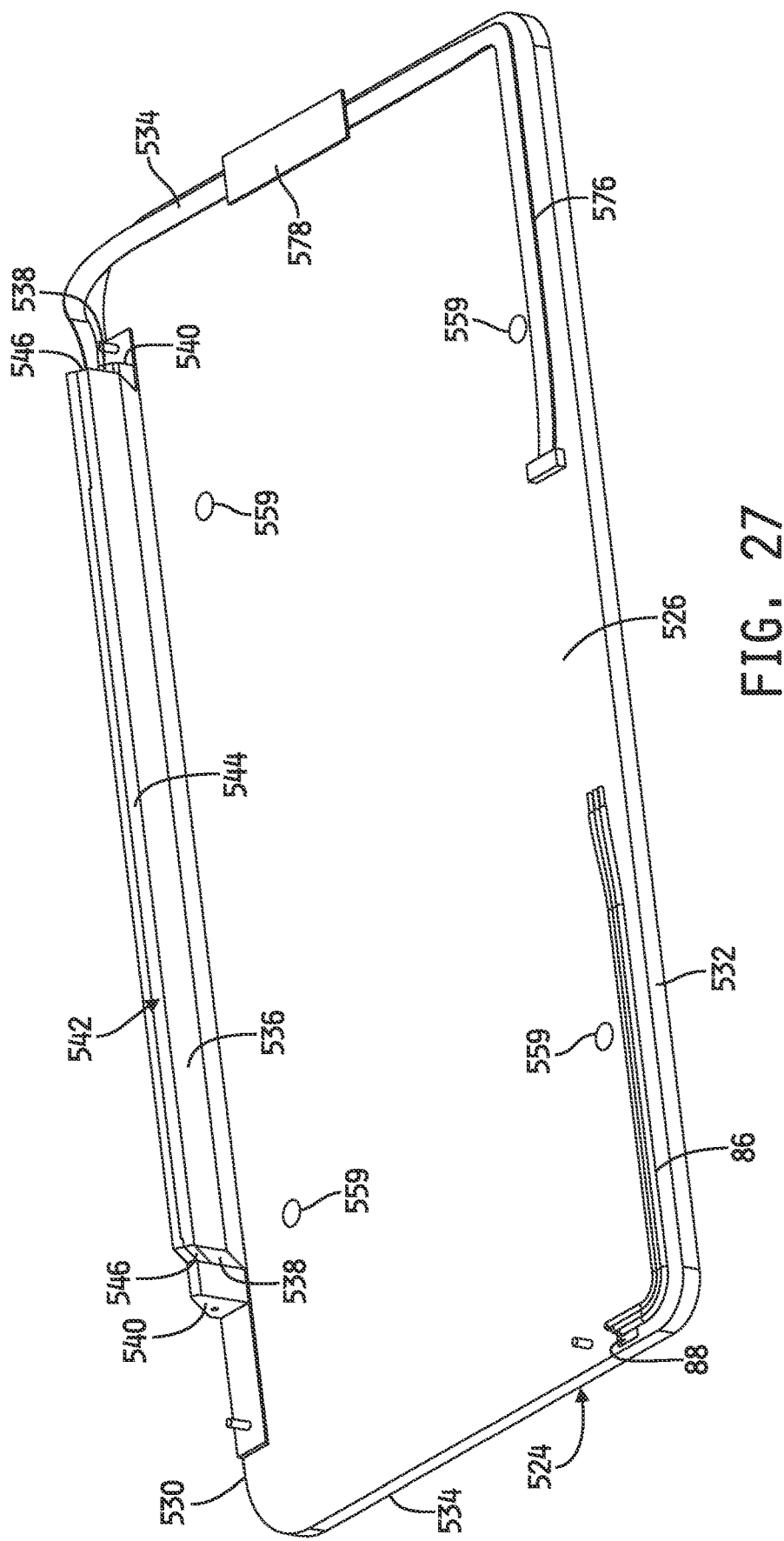
FIG. 27 is a front perspective view of a back plate of the license plate bracket assembly of FIG. 22.
Figure 28:
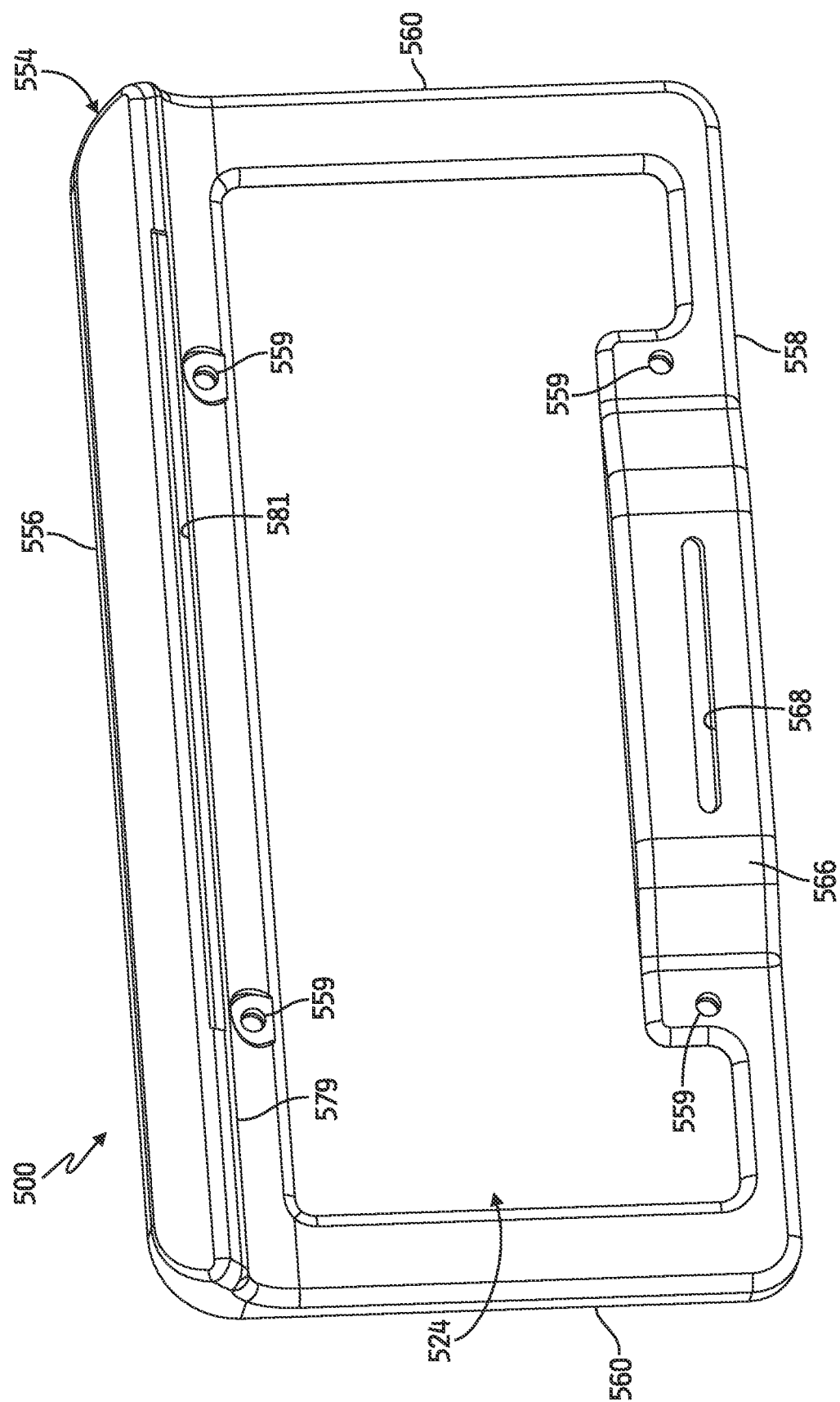
FIG. 28 is a front perspective view of the license plate bracket assembly of FIG. 22.

As best shown in FIG. 24, a first flange 536 extends from the top 530 of the back plate 524 over the front surface 526 at a viewing angle α. The viewing angle α is acute relative to the plane C of the back plate 524. As best shown in FIG. 27, the first flange 536 extends between a pair of edges 538 that are spaced inwardly from the sides 534 of the back plate 524. A protrusion 540 extends transversely from the front surface 526 of the back plate 524 adjacent to each of the edges 538 of the first flange 536.

An object detection assembly 542, in the form of one of the object detection module 12₁-12₄, overlies the first flange 536. The object detection assembly 542 illustratively includes a radiation emission and detection assembly 544, e.g., in the form of one of the radiation assemblies or modules 120, 140, 150, 160, at the viewing angle α relative to the plane C for detecting movement in a sensing region in front of the assembly 544. It should be appreciated that since the viewing angle α is acute relative to the plane C of the back plate 524, once the assembly 500 is attached or mounted to the motor vehicle 522, the radiation emission and detection assembly 544 is pointed generally toward the feet of an operator that is standing behind the motor vehicle 522, thus allowing the assembly 544 to detect movement in the region of the feet of the operator.

Figure 29:
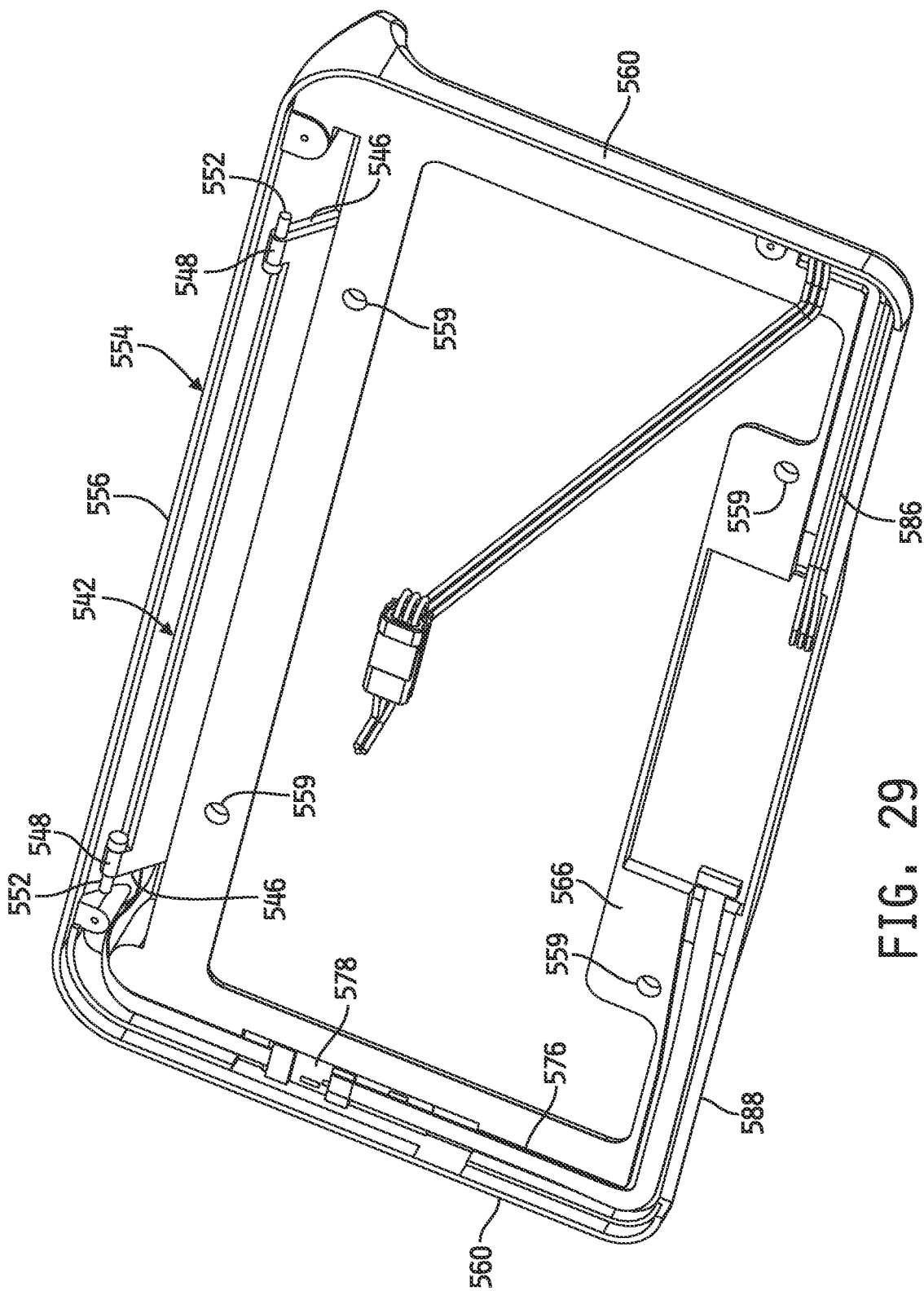
FIG. 29 is a rear perspective view of a plate frame of the license plate bracket assembly of FIG. 22.
Figure 30:
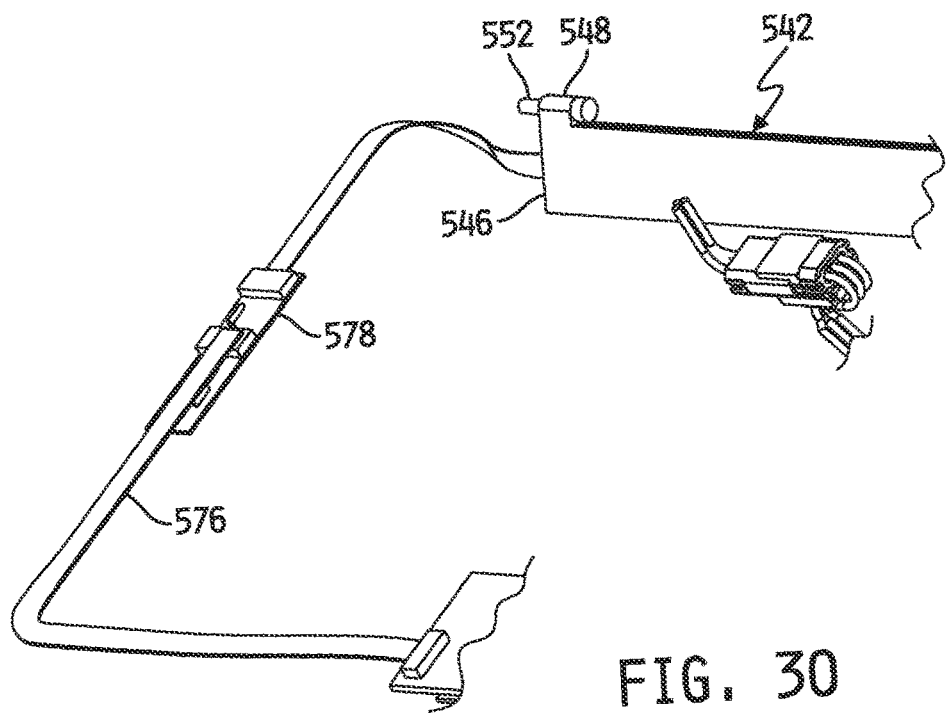
FIG. 30 is a rear perspective view of a plurality of ribbon wires and a jumper board of the license plate bracket assembly of FIG. 22.

As best shown in FIGS. 27 and 29, the object detection assembly 542 extends between a pair of extremities 546, with each of the extremities 546 aligned with one of the edges 538 of the first flange 536. A pair of tabs 548 extend away from the object detection assembly 542, each aligned with one of the extremities 546 and disposed against one of the protrusions 540. A pair of first fasteners 552 each extend through one of the tabs 548 and one of the protrusions 540 to secure the object detection assembly 542 to the first protrusions 540. In the example embodiment, the first fasteners 552 are bolts, however, it should be appreciated that they could be other types of fasteners including, but not limited to, screws or adhesives.

As best shown in FIGS. 22-25, a plate frame 554 overlies the back plate 524. The plate frame 554 has a generally rectangular shaped cross-section and includes an upper segment 556 disposed over the top 530 of the back plate 524, a lower segment 558 disposed over the bottom 532 of the back plate 524 and a pair of flank segments 560 that extend between the upper and lower segments 556, 558 and are disposed over the sides 534 of the back plate 524. The plate frame 554 further defines a window 564 between the upper and lower and flank segments 556, 558, 560 for providing visibility to a license plate 525 disposed between the back plate 524 and the plate frame 554.

Figure 25:
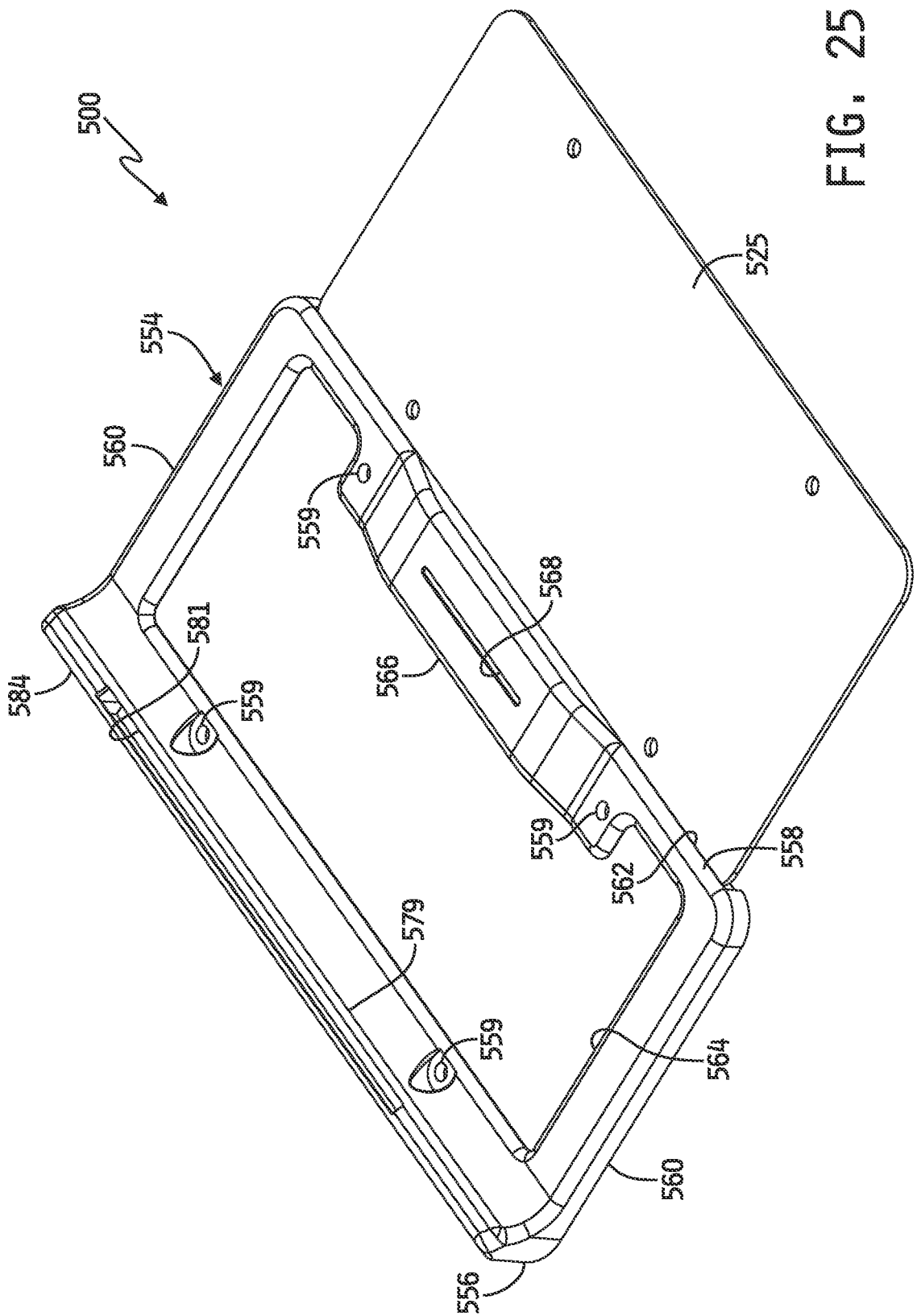
FIG. 25 is a perspective top view of the license plate bracket assembly of FIG. 22 illustrating receipt of a license plate within a slot of the assembly.
Figure 26:
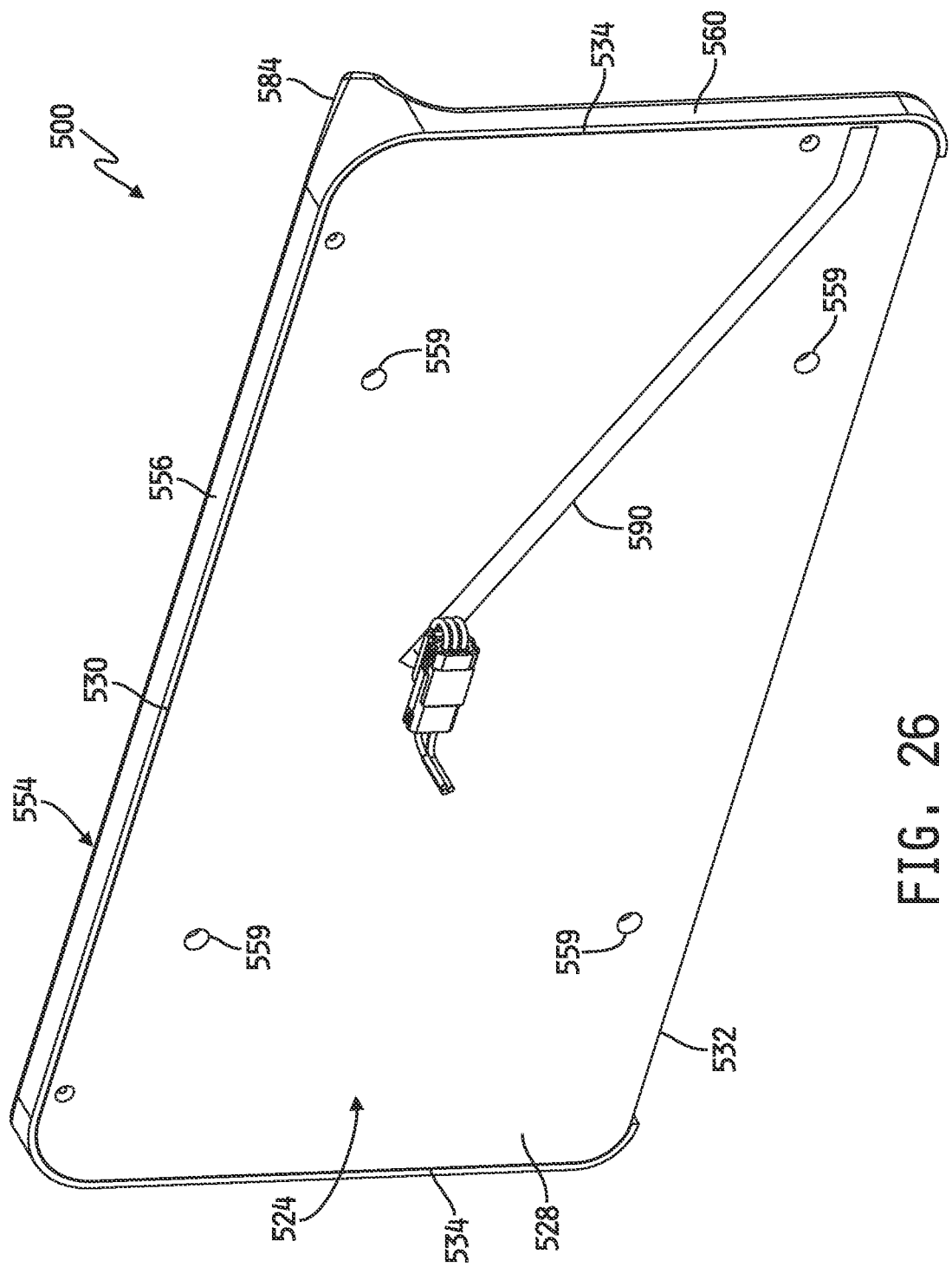
FIG. 26 is a rear perspective view of the license plate bracket assembly of FIG. 22.

As best shown in FIG. 25, the bottom 532 of the back plate 524 and the lower segment 558 of the plate frame 554 define a plate slot 562 therebetween for receiving a license plate 525 between the back plate 524 and the plate frame 554. Said another way, a license plate 525 may be inserted into the object detection assembly 520 through the plate slot 562.

As best shown in FIGS. 23 and 27, a plurality of connection orifices 559 are defined by the plate frame 554 and the back plate 524. A plurality of second fasteners 561 extend through the connection orifices 559 and the license plate 525 for connecting the assembly 500 and the license plate 525 to the motor vehicle 522. In the example embodiments, the second fasteners 561 are bolts; however, it should be appreciated that other types of fasteners could be utilized.

As best shown in FIGS. 23 and 24, a generally rectangular-shaped cover member 566 extends from the lower segment 558 into the window 564 toward the upper segment 556. The cover member 566 defines a linear slit 568 that extends parallel to the lower segment 558 of the plate frame 554.

The processor or controller 14₁-14₂ of the object detection assembly 542 is depicted in the example embodiment illustrated in FIGS. 22-30 in the form of a controller 570, 571, which is electrically connected to the object detection assembly 542 for processing information received by the radiation emission and detection assembly 544. In the first example embodiment illustrated in FIGS. 22-30, the controller includes a circuit board 570 that is disposed in alignment with the cover member 566 and is electrically connected to the assembly 544. The circuit board 570 illustratively includes a microprocessor 571 (schematically shown) for processing information received by the assembly 544.

In the illustrated embodiment, the one or more illumination devices 112 is/are depicted in the form of a plurality of light emitting diodes 572 mounted to the circuit board 570 in alignment with the slit 568. Each LED in the plurality of light emitting diodes 572 is electrically connected to the circuit board 570 for emitting light in response to the detection of movement by the assembly 544 as described above. A lens 574 is illustratively disposed between the circuit board 570 and the cover member 566, and overlies the plurality of light emitting diodes 572 for holding the light emitting diodes 572 in place and for protecting the light emitting diodes 572 while allowing light from the light emitting diodes 572 to pass through the lens 574. It should be appreciated that other light emitting devices could be utilized instead of light emitting diodes 572.

In addition to, or as an alternative to the light emitting diodes 572, an audible device 573 (schematically shown and which may be one of the audio devices 66 depicted in FIG. 1) such as a speaker or piezoelectric element may also be disposed on the circuit board 570 or other location of the assembly to provide feedback to an operator of the motor vehicle 522 during use of the object detection assembly 542.

A plurality of first ribbon wires 576 and a jumper board 578 extend between and electrically connect the circuit board 570 and the radiation emission and detection assembly 544. The first ribbon wires 576 extend along the lower and flank segments 558, 560 of the plate frame 554. A first potting material 582 is disposed between back plate 524 and ribbon wires 580 and jumper board 578 for damping vibrations between the back plate 524 and the assembly 544, first ribbon wires 576 and jumper board 578 and for holding the first ribbon wires 576 and jumper board 578 in place relative to the back plate 524.

As best shown in FIGS. 24 and 25, a support member 579 is disposed beneath and engages the first flange 536. The support member 579 extends between the flank segments 557 for supporting the first flange 536. A second flange 584 extends from the upper segment 556 of the plate frame 554 at the viewing angle α and overlies the first flange 536. The second flange 584 and the support member 579 define a detector slot 581 therebetween receiving the object detection assembly 542 for protecting the assembly 542.

As best shown in FIG. 27, the back plate 524 defines a wire opening 588 adjacent to the bottom 532 of the back plate 524. A plurality of second ribbon wires 586 extend from circuit board 570 along the front surface 526 of the back plate 524 adjacent to the bottom 532 of the back plate 524 and through the wire opening 588 and across the rear surface 528 of the back plate 524. A second potting material 590 overlies the second ribbon wires 586 for damping vibrations of the plurality of second ribbon wires 586 and for holding the second ribbon wires 586 in place relative to the rear surface 528 of the back plate 524.

As best shown in FIGS. 23 and 24, a pocket insert 592 of a metal material is fixed to the rear surface 528 of the back plate 524 for being received by a mounting hole on the vehicle 522 for connecting the license plate bracket and sensor assembly 500 to the motor vehicle 522. The pocket insert 592 has a tube portion 594 that extends between a rearward end 596 and a forward end 598. A lip 600 extends outwardly from the forward end 598 of the tube portion 594 and fixedly engages the rear surface 528 of the back plate 524 for connecting the pocket insert 592 to the back plate 524. A lid 602 is disposed across the rearward end 596 of the tube portion 594 to close the rearward end 596. The lid 602 defines a passage 604 that extends therethrough.

The second ribbon wires 586 further extend through the passage 604 for allowing the second ribbon wires 586 to be connected to a computer of the motor vehicle 522 for electrically connecting the circuit board 570 to the computer, e.g., the vehicle control computer 24, of the motor vehicle 522. More specifically, the second wires 576, 580, 586 electrically connect the license plate bracket and sensor assembly 500 to the existing passive entry system of the motor vehicle 522.

Operation of the license plate bracket and sensor assembly 500 is as described above with respect to FIGS. 2-8 in that the microprocessor 571 is programmed to identify a recognizable, predetermined, position, motion or reflection base on signals provided by the object detection assembly 542. Upon recognition of such a position, motion or reflection, the microprocessor 571 illustratively sends one or more signals to the computer 24 of the motor vehicle 522 to open the rear access enclosure. In other words, the microprocessor 571 is configured to receive signals from the object detection assembly 542, and to open the rear access closure in response to the reception and recognition of one or more predetermined signals corresponding to a predefine gesture, e.g., a hand wave or foot wave, within a detection range of the object detection assembly 542.

In embodiments in which the object detection assembly 542 is implemented in the form of the object detection module $12_1$ or $12_2$ illustrated in FIGS. 2-6B and described above, the microprocessor 571 is further illustratively configured to cause the one or more illumination devices 112, i.e., the light emitting diodes 572, to emit light, as described above, in a manner which directs the operator to the proper position or motion to open the rear access enclosure of the motor vehicle 522. As one illustrative example, which should not be considered limiting in any way, as the user approaches the side of the assembly 500 the light emitting diodes 572 may initially be controlled to illuminate in red. As the user moves a hand or foot toward the middle of the assembly 500, the light emitting diodes 572 may be controlled to illuminate in amber, and finally to illuminate in green to indicate actuation of an opening mechanism 48 of the rear access closure of the motor vehicle 522. Additionally or as an alternative, the audible device 573 may be activated to further guide the user to the proper position or through the proper predetermined movement to open the rear access closure. Of course, other configurations and/or control techniques of the light emitting diodes 571 may be alternatively or additionally be implemented, several examples of which are described hereinabove.

In embodiments in which the object detection assembly 542 is implemented in the form of the object detection module $12_3$ or $12_4$ illustrated in FIGS. 7 and 8 respectively, operation of the assembly 500 may be as just described except with no visual feedback from the module $12_3$, $12_4$ due to the absence of the one or more illumination devices 112, e.g., in the form of the light emitting diodes 571.

Figure 31:
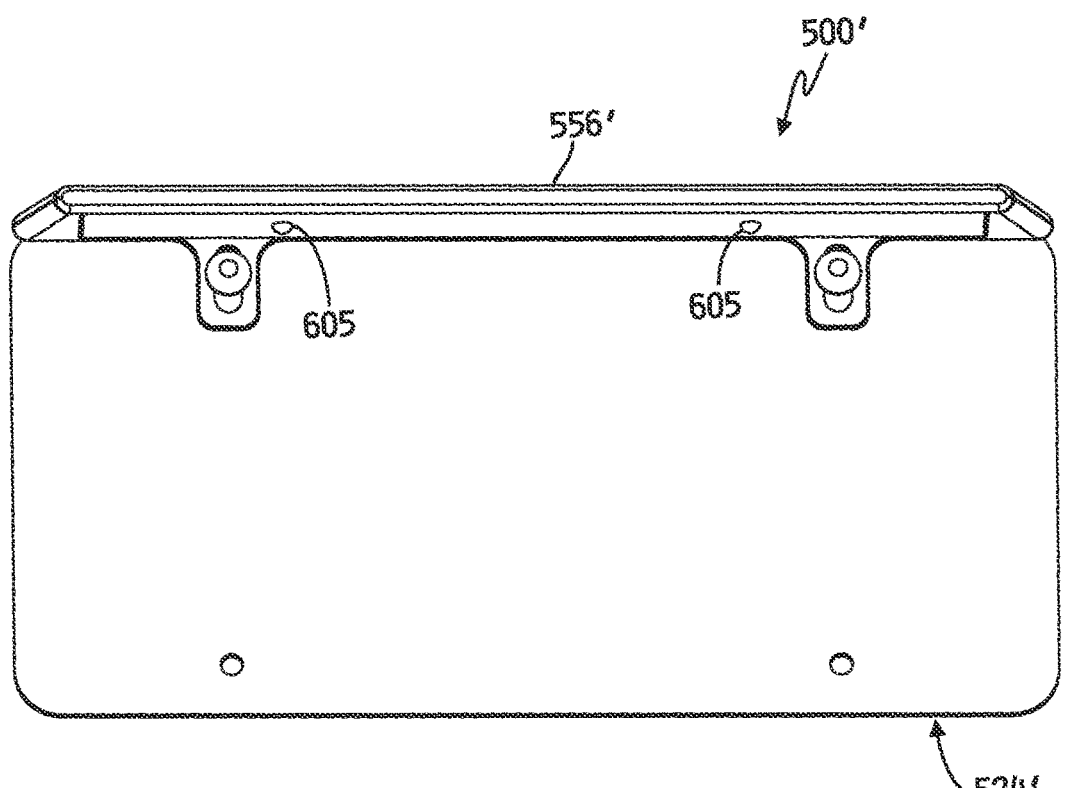
FIG. 31 is a simplified front perspective view of another embodiment of a license plate bracket assembly.

In the second example embodiment of the license plate bracket and sensor assembly 500' illustrated in FIG. 31, the plate frame only extends across the top of the back plate 524', such that only an upper portion of a license plate is covered by the plate frame. In this embodiment, the object detection module $12_1$-$12_4$ may be incorporated into an upper segment 556' of the plate frame. Furthermore, a pair of visibility lights 605 may be connected to the upper segment 556' of the plate frame for illuminating the license plate in the event that the assembly 500' casts a shadow on the license plate by blocking the factory installed lights of the motor vehicle 522. It should be appreciated that the first example embodiment of the assembly 500 could also include or more of such visibility lights 605.

Figure 32:
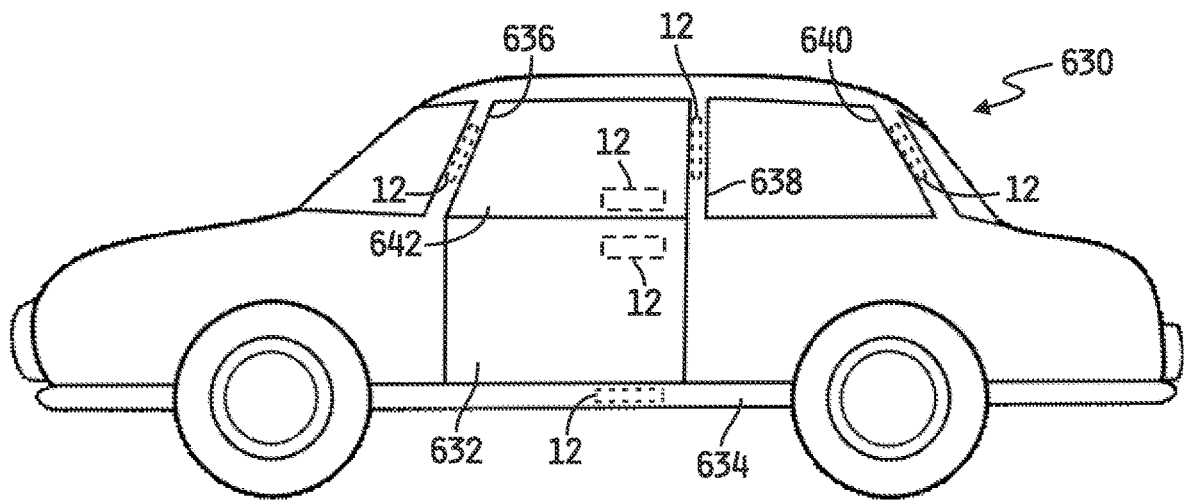
FIG. 32 is a simplified side elevational view of a motor vehicle illustrating various locations on and about the motor vehicle at which the object detection module of any of FIG. 2, 6A 7 or 8 may be mounted.
Figure 33:
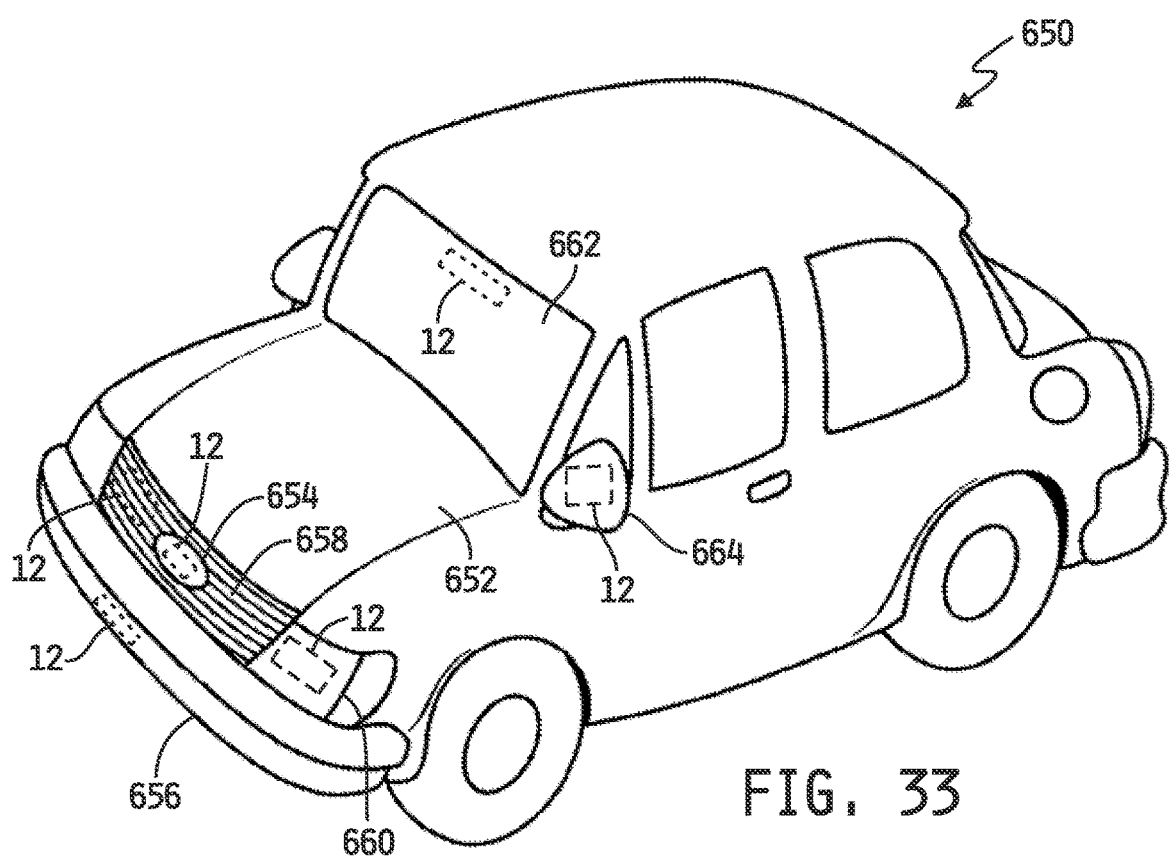
FIG. 33 is a simplified front perspective view of another motor vehicle illustrating various alternate or additional locations on and about the motor vehicle at which the object detection module of any of FIG. 2, 6A 7 or 8 may be mounted.
Figure 34:
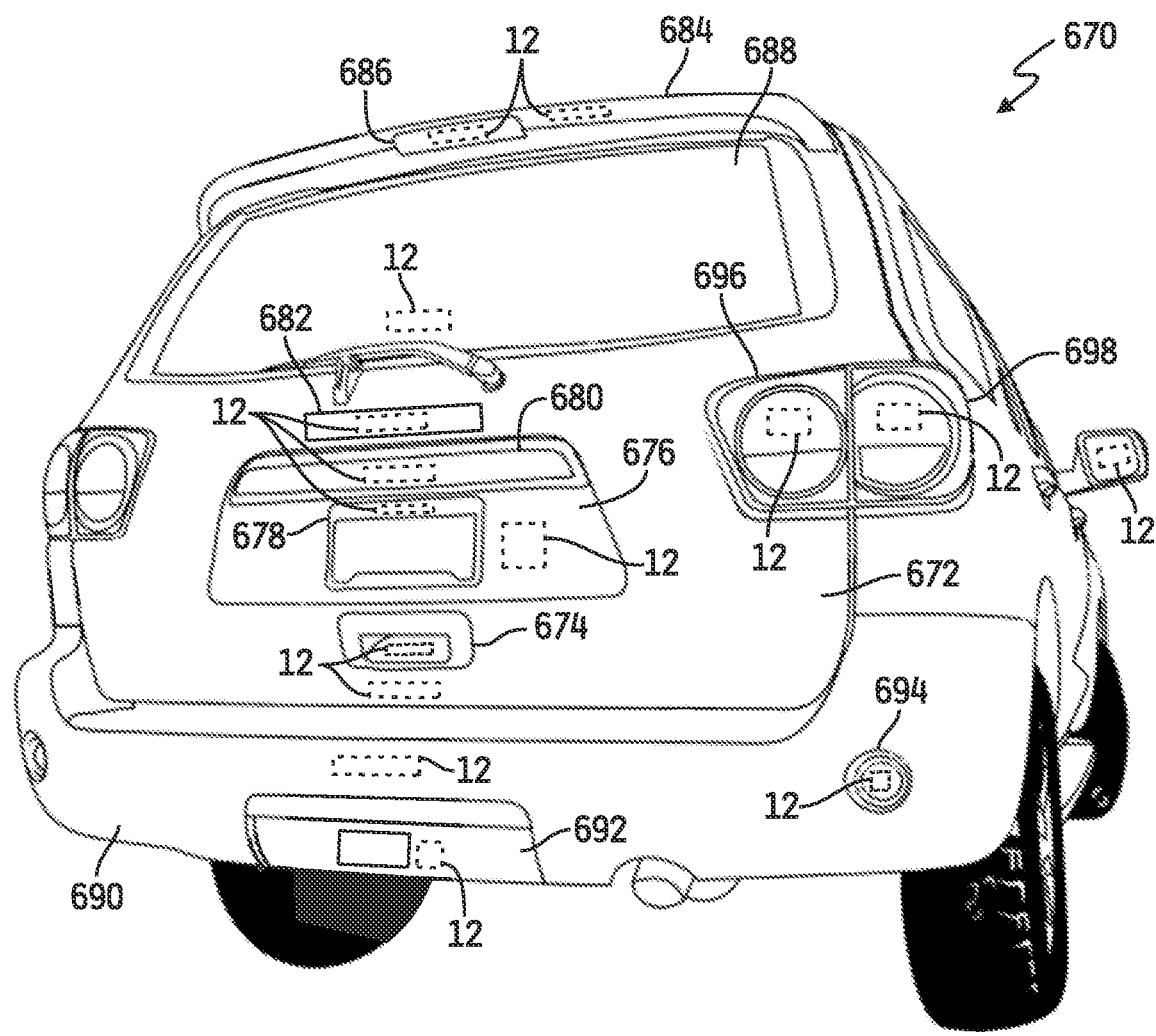
FIG. 34 is a simplified rear perspective view of yet another motor vehicle illustrating further alternate or additional locations on and about the motor vehicle at which the object detection module of any of FIG. 2, 6A 7 or 8 may be mounted.

Referring now to FIG. 32, a motor vehicle 630 is shown depicting various example locations on and around the motor vehicle 630 to or at which all or part of the object detection module 12 (e.g., in any of its example forms $12_1$-$12_4$) may be attached, affixed, mounted, integrated or otherwise positioned (collectively "mounted"). For example, one or more object detection modules 12 may be mounted at or to one or more of a side door 632, a rocker panel 634, a so-called "A pillar" 636, a so-called "B pillar" 638, a so-called "C pillar" 640 and a side window 642. Referring to FIG. 33, another motor vehicle 650 is shown depicting other various example locations on and around the motor vehicle 650 to or at which all or part of the object detection module 12 (e.g., in any of its example forms $12_1$-$12_4$) may be attached, affixed, mounted, integrated or otherwise positioned (collectively "mounted"). For example, one or more object detection modules 12 may be mounted at or to one or more of an emblem or plaque 654 affixed to a front grille 654 of a hood 652 or front end of the vehicle 650, the front grille 654 or hood 652 itself, a front bumper 656, one or both of the front headlights 660 (or other light fixture(s) on the front of the vehicle 650 and/or on the side of the vehicle 650 adjacent to the front of the vehicle 650), a front windshield 662 and one or more side mirror housings 664. Referring to FIG. 34, yet another motor vehicle 670 is shown depicting still other various example locations on and around the motor vehicle 670 to or at which all or part of the object detection module 12 (e.g., in any of its example forms $12_1$-$12_4$) may be attached, affixed, mounted, integrated or otherwise positioned (collectively "mounted"). For example, one or more object detection modules 12 may be mounted at or to one or more of a handle or handle area 674 of a rear closure 672, e.g., rear door or hatch, of the motor vehicle 670, an accessory area 676, e.g., in or to which a license plate and/or lighting may be mounted, a license plate frame 678, a license plate lamp assembly or other rear lamp assembly 680, an emblem or plaque 682 affixed to the rear closure 672, a rear spoiler 684, a brake lamp assembly 686 mounted to the rear spoiler 684 or to the rear closure 672, a rear window 688, the rear bumper 690, a main or auxiliary license plate area 692 of or adjacent to the rear bumper 690, a rear lamp assembly 694 mounted to or within the rear bumper 690, at least one rear lamp assembly 696 mounted to the rear closure 672 and at least one rear lamp assembly 698 mounted to the body of the motor vehicle 670 adjacent to the rear closure 672.

Figure 35:
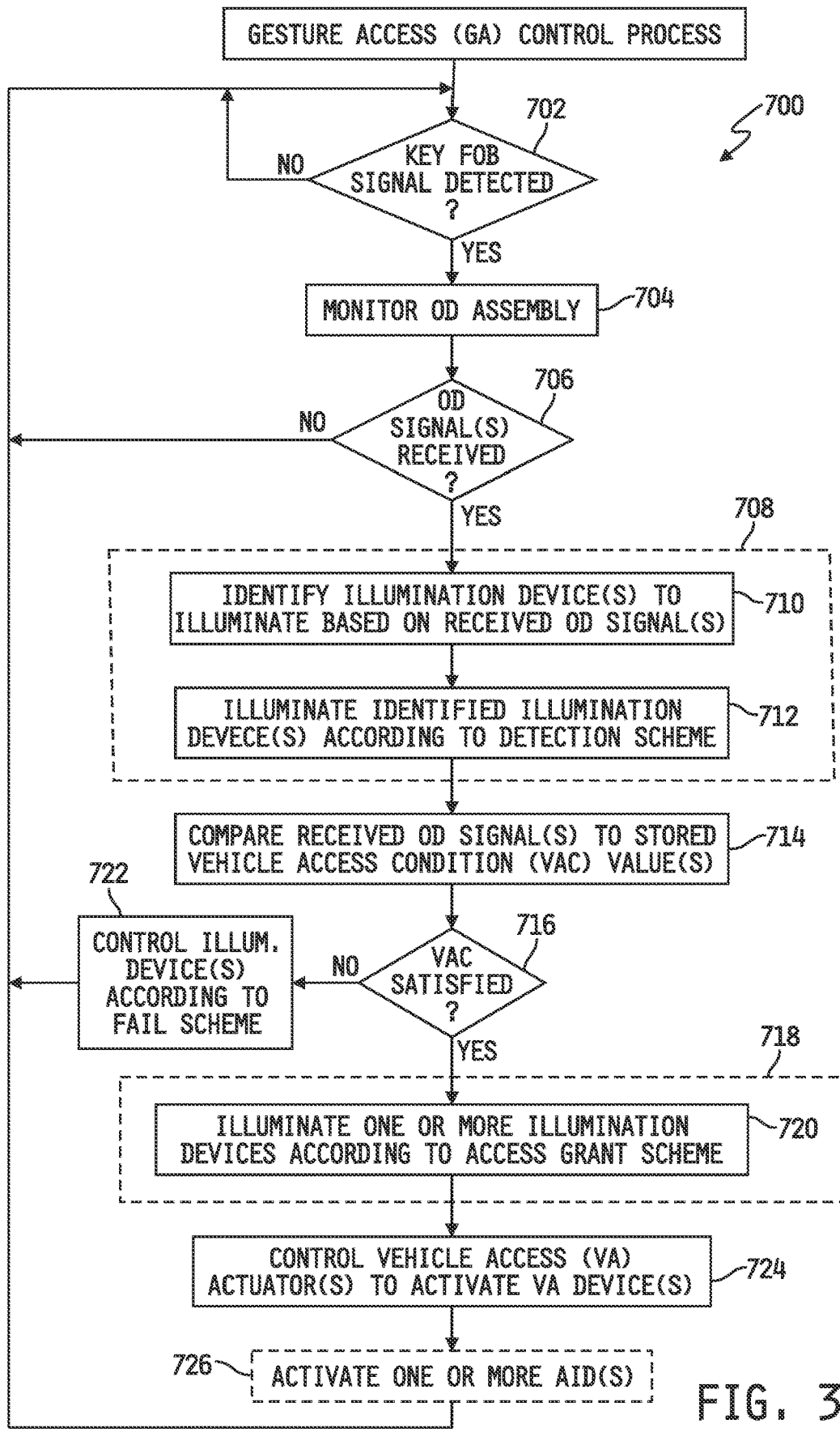
FIG. 35 is a simplified flowchart of an embodiment of a gesture access process executable by one or more processors illustrated in FIG. 1.
Figure 36:
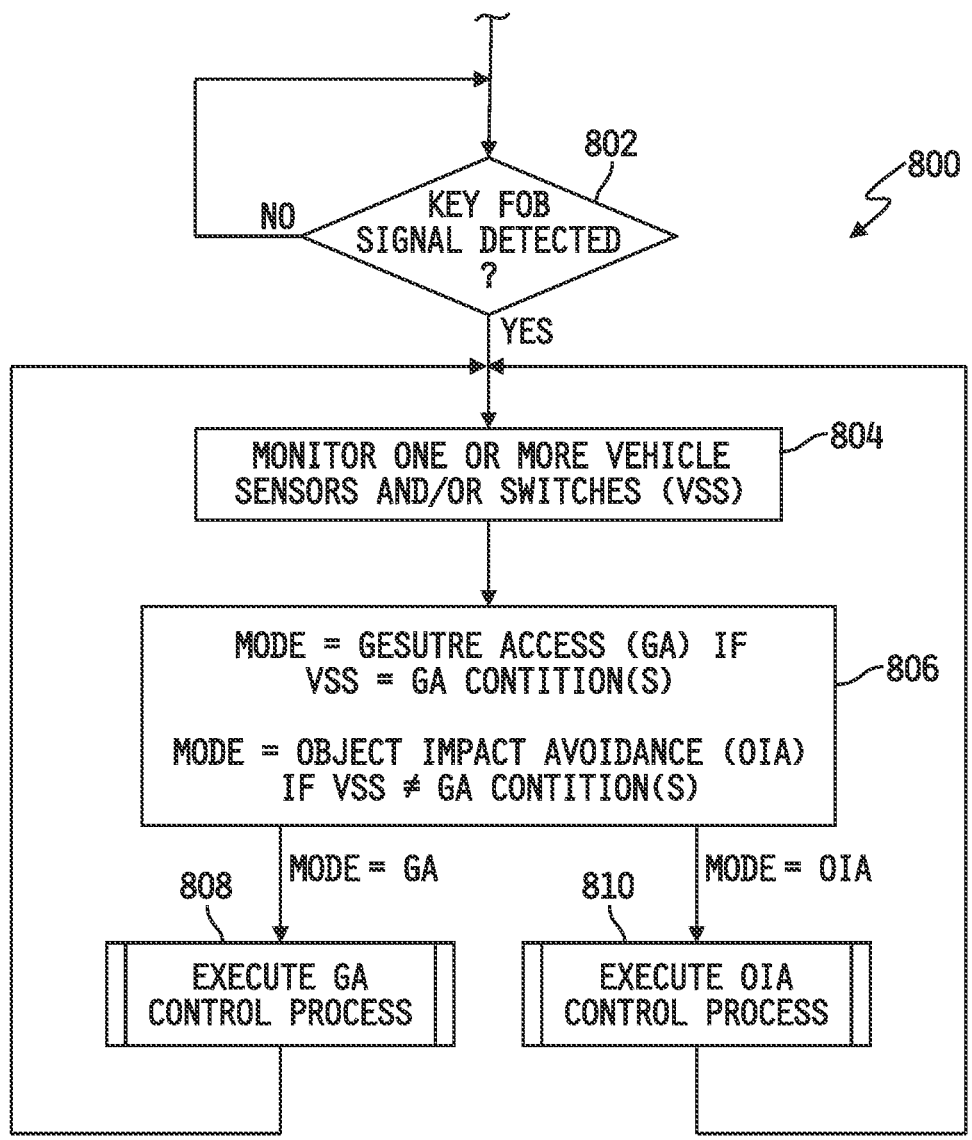
FIG. 36 is a simplified flowchart of an embodiment of a process for executing either of a gesture access process or an object impact avoidance process based upon the status of one or more vehicle sensors and/or switches.
Figure 37:
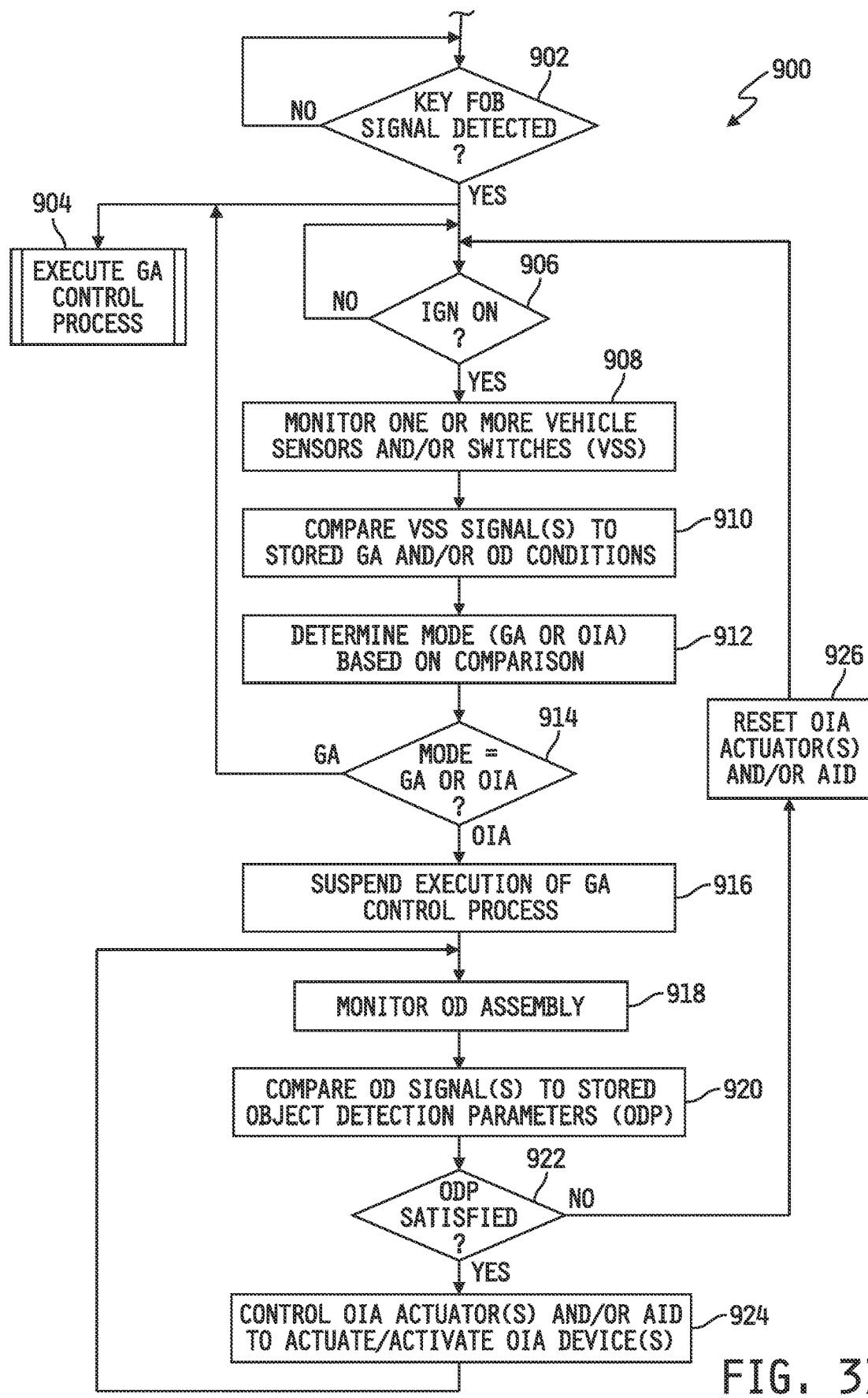
FIG. 37 is a simplified flowchart of another embodiment of a process for executing either of a gesture access process or an object impact avoidance process based upon the status of one or more vehicle sensors and/or switches.

In some embodiments, at least one object detection module 12 illustrated in any of FIGS. 13-34 may include at least one illumination device 112, and in such embodiments the at least one object detection module 12 may be implemented in the form of the object detection module $12_1$ and/or the object detection module $12_2$ operable to provide for gesture access to the motor vehicle with visual feedback provided by the at least one illumination device 112 as described hereinabove. In some such embodiments and/or in other embodiments, at least one object detection module 12 illustrated in any of FIGS. 9-12 and 17-34 may not include any illumination device(s) 112, and in such embodiments the at least one object detection module 12 may be implemented in the form of the object detection module $12_3$ and/or the object detection module $12_4$ operable to provide for gesture access to the motor vehicle with no visual feedback provided by the object detection module $12_3$ and/or the object detection module $12_4$ as also described hereinabove. An example process for providing for such gesture access is illustrated in FIG. 35 and will be described in detail below. In some such embodiments and/or in still other embodiments, at least one object detection module 12 illustrated in any of FIGS. 9-34 may be implemented in the form of the object detection module $12_2$ and/or the object detection module $12_4$ which include the radiation emission and detection assembly 130, in the form of at least one radar transmitter 132 and a plurality of radar detectors or receivers 134, to selectively provide for (i) gesture access to the motor vehicle, with or without visual feedback when, e.g., movement of the motor vehicle is disabled, and (ii) object detection for object impact avoidance when, e.g., the motor vehicle is moving or is enabled to move, as briefly described above. Example processes for selectively providing for gesture access and object impact avoidance are illustrated in FIGS. 36 and 37 and will be described in detail below.

Referring now to FIG. 35, a simplified flowchart is shown of a process 700 for providing gesture access to one or more access closures of a motor vehicle in or to which at least one object detection module 12 is mounted. In one embodiment, the process 700 is illustratively stored in the at least one memory 16 of the object detection module 12 in the form of instructions which, when executed by the at least one processor or controller 14 of the object detection module 12, cause the at least one processor or controller 14 to execute the corresponding functions. It will be understood that in some alternate embodiments, such instructions may be stored, in whole or in part, in any one or more of the memory units illustrated in FIG. 1, e.g., in one or more of the memory 16 of the object detection module 12, the memory 28 of the vehicle control computer 24, the memory 44 of the actuator driver circuit(s) 40 and the memory 64 of the audio/illumination device driver circuit(s) 60, and provided to the at least one processor or controller 14 for execution thereby. In other alternate embodiments, such instructions, wherever stored, may be executed, in whole or in part, by any one or more of the processors or controllers illustrated in FIG. 1, e.g., by one or more of the processors or controllers 14, 26, 42 and 62. For purposes of the following description, the process 700 will be described as being executed by the processor or controller 14, it being understood that the process 700 may alternatively or additionally be executed, in whole or in part, by one or more of the processors or controllers 26, 42, 62.

It will be further understood that the process 700 may be executed using any of the object detection modules $12_1$-$12_4$. In this regard, dashed-line boxes are shown around some of the steps or groups of steps of the process 700 to identify steps which are part of the process 700 when the object detection module 12 is implemented in the form of the object detection module $12_1$ or the object detection module $12_2$ to include at least one illumination device 112. As will be described below, such steps are illustratively omitted in embodiments in which the object detection module 12 is implemented in the form of the object detection module $12_3$ or the object detection module $12_4$ which do not include any such illumination devices 112.

The process 700 illustratively begins at step 702 where the processor or controller 14 is operable to determine whether a Key Fob signal has been detected. As described above, the Key Fob signal is illustratively produced by a conventional Key Fob 20 or other mobile electronic device. In some embodiments, the Key Fob signal is received by the communication circuit 30 of the vehicle control computer 24 and passed, processed or unprocessed, to the processor or controller 14. In other embodiments in which the object detection module 12 includes a communication circuit 18, the Key Fob signal may be received directly by the processor or controller 14. In any case, until the Key Fob signal is detected, the process 700 loops back to step 702.

If the Key Fob signal is received by the communication circuit 30 of the vehicle control computer 24, the processor or controller 26 of the vehicle control computer 24 is illustratively operable to decode the received Key Fob signal and determine whether it matches at least one Key Fob code stored in the memory 28. If not, the processor or controller 26 disregards or ignores the Key Fob signal and the process 700 loops back to step 702. Likewise, if the Key Fob signal is received by the communication circuit 18 of the object detection module 12, the processor 14 is similarly operable to determine whether the received Key Fob signal matches at least one Key Fob code stored in the memory 16 or in the memory 28. If not, the process 700 likewise loops back to step 702. Thus, the process 700 advances along the "YES" branch of step 702 only if the received Key Fob signal matches at least one stored Key Fob code, such that the gesture access process proceeds only for authorized users, i.e., only for users carrying a Key Fob 20 that is recognizable by the object detection system 10. It will be understood that some embodiments of the process 700 may not include step 702, and in such embodiments the process 700 begins at step 704.

Following the "YES" branch of step 702 (in embodiments which include step 702), the process 700 advances to step 704 where the processor or controller 14 is operable to monitor the object detection assembly; more specifically, to monitor the radiation emission and detection assembly 100, 130 of the respective object detection module $12_1$-$12_4$ for object detection signals produced thereby, if any. In some embodiments, the processor or controller 14 is operable at step 704 to activate the radiation emission and detection assembly 100, 130 to begin transmitting radiation following step 702, and in other embodiments the radiation emission and detection assembly 100, 130 may already be operating and the processor or controller 14 may be operable at step 704 to begin monitoring the signals being produced by the previously activated radiation emission and detection assembly 100, 130.

In any case, following step 704 the processor or controller 14 is operable at step 706 to determine whether any object detection signals have been produced by the radiation emission and detection assembly 100, 130 of the respective object detection module $12_1$-$12_4$. If not, then an object has not been detected within the sensing region of the radiation emission and detection assembly 100, 130 of the respective object detection module $12_1$-$12_4$. In some embodiments, the process 700 advances from the "NO" branch of step 706 back to the beginning of step 702 as illustrated by example in FIG. 35. In some alternate embodiments, the process 700 may advance from the "NO" branch of step 706 back to the beginning of step 706 such that the process 700 continually checks for an object detection until an object is detected. In such embodiments, a timer or counter may illustratively be implemented such that the process 700 exits the loop of step 706, e.g., by looping back to the beginning of step 702, after a predefined time period has elapsed since detecting the Key Fob signal without thereafter detecting an object. If, at step 706, the signal(s) received from the radiation emission and detection assembly 100, 130 of the respective object detection module $12_1$-$12_4$ indicate that an object is detected within the sensing region of thereof, the process 700 proceeds from step 706 along the "YES" branch.

In embodiments in which the object detection module 12 is implemented in the form of the object detection module $12_1$ or the object detection module $12_2$, the process 700 illustratively includes step 708. Conversely, in embodiments in which the object detection module 12 is implemented in the form of the object detection module 12₃ or the object detection module 12₄, the process 700 does not include step 708. In implementations of the process 700 which include it, step 708 illustratively includes step 710 in which the processor or controller 14 is operable to identify one or more illumination devices 112 to illuminate based on the received object detection (OD) signal(s) produced by the radiation emission and detection assembly 100, 130 of the respective object detection module 12₁, 12₂. Thereafter at step 712, the processor or controller 14 is operable to control one or more of the driver circuit(s) DC to illuminate the identified illumination device(s) 112 according to a predefined detection scheme.

In one embodiment, the processor or controller 14 is operable at steps 710 and 712 to identify and illuminate at least one of the illumination devices 112 according to various different detection or illumination schemes. For example, if an object is determined, based on the object detection signals produced by the radiation emission and detection assembly 100, 130, to be within the sensing region of the radiation emission and detection assembly 100, 130 but within a sub-region of the sensing region that is too small to allow determination by the radiation emission and detection assembly 100, 130 and/or by the processor or controller 14 of whether the object within the sensing region exhibits a predefined gesture, the processor or controller 14 is operable to control illumination of the one or more illumination devices 112 according to an "insufficient detection" illumination scheme. In one embodiment in which the object detection module 12₁ or 12₂ includes a plurality of illumination devices in the form of an array 110 extending at least partially across the sensing region as described above with respect to the example illustrated in FIG. 3A, the processor or controller 14 is operable to identify for illumination according to the "insufficient detection" scheme those of the illumination devices 112 which occupy the same or substantially the same sub-region of the sensing region as that occupied by the object, and to control such identified illumination devices 112 to illuminate with a predefined color, e.g., red. Alternatively or additionally, the controller 14 may be operable at step 712 to control the identified illumination devices 112 to illuminate according to the "insufficient detection" scheme by switching on and off at a predefined frequency and/or with a predefined duty cycle, and/or to illuminate only a subset of the illumination devices. In embodiments which include more or fewer illumination devices, the processor or controller 14 may be operable at steps 710 and 712 to control at least one illumination device 112 to illuminate according to the "insufficient detection" illumination scheme by illuminating with at least one of a predefined color, a predefined frequency and a predefined duty cycle.

As another example, if an object is determined, based on the object detection signals produced by the radiation emission and detection assembly 100, 130, to be within the sensing region of the radiation emission and detection assembly 100, 130 and also within a sub-region of the sensing region in which the radiation emission and detection assembly 100, 130 and/or by the processor or controller 14 can determine whether the object therein exhibits a predefined gesture, the processor or controller 14 is operable to control illumination of the one or more illumination devices 112 according to an "object detection" illumination scheme. In one embodiment in which the object detection module 12₁ or 12₂ includes a plurality of illumination devices in the form of an array 110 extending at least partially across the sensing region as described above with respect to the example illustrated in FIG. 4, the processor or controller 14 is operable to identify for illumination according to the "object detection" scheme those of the illumination devices 112 which occupy the same or substantially the same sub-region of the sensing region as that occupied by the object, and to control such identified illumination devices 112 to illuminate with a predefined color that is different from any that may be used in other illumination schemes, e.g., in this case, amber. Alternatively or additionally, the controller 14 may be operable at step 712 to control the identified illumination devices 112 to illuminate according to the "object detection" scheme by switching on and off at a predefined frequency and/or with a predefined duty cycle different from any such predefined frequency and/or duty cycle used in different illumination schemes, and/or to illuminate only a subset of the illumination devices different from any subset used in other illumination schemes. In embodiments which include more or fewer illumination devices, the processor or controller 14 may be operable at steps 710 and 712 to control at least one illumination device 112 to illuminate according to the "object detection" illumination scheme by illuminating with at least one of a predefined color, a predefined frequency and a predefined duty cycle which is/are different that that/those used in other illumination schemes.

In embodiments which include step 708, the process 700 advances from step 712 to step 714, and in embodiments which do not include step 708 the process 700 advances from the "YES" branch of step 706 to step 714. In any case, the processor or controller 14 is operable at step 714 to compare the received object detection signals (OD), i.e., received from the radiation emission and detection assembly 100, 130, to one or more vehicle access condition (VAC) values stored in the memory 16 (or the memory 28, 42 and/or 64), and to determine at step 716 whether the VAC is satisfied. In some embodiments, for example, the stored VAC is satisfied if the object detected within a suitable sub-region of the sensing region of the radiation emission and detection assembly 100, 130 exhibits a predefined gesture which, when processed by the processor or controller 14 to determine a corresponding vehicle access value, matches the stored VAC as described above. Alternatively or additionally, as also described above, one or more VAC values stored in the memory 16, 28, 42 and/or 64 may be associated in the memory with a corresponding Key Fob code, and in some embodiments multiple VAC values are stored in the memory 16, 28, 42, 64 with each associated with a different Key Fob code. In some such embodiments, vehicle access may be granted only if the combination of the Key Fob code and associated VAC are satisfied.

In embodiments in which the object detection module 12 is implemented in the form of the object detection module 12₁ or the object detection module 12₂, the process 700 illustratively includes step 718 to which the process 700 advances from the "YES" branch of step 716. Conversely, in embodiments in which the object detection module 12 is implemented in the form of the object detection module 12₃ or the object detection module 12₄, the process 700 does not include step 718. In implementations of the process 700 which include it, step 718 illustratively includes step 720 in which the processor or controller 14 is operable to control one or more of the driver circuit(s) DC to illuminate the identified illumination device(s) 112 according to another predefined detection or illumination scheme different from the "insufficient detection" and "object detection" schemes described above. For example, if an object previously determined to be within the sensing region of the radiation emission and detection assembly 100, 130 is determined, based on the object detection signals produced by the radiation emission and detection assembly 100, 130, to exhibit a predefined gesture as described above, the processor or controller 14 is illustratively operable to control illumination of one or more illumination devices 112 according to an "access grant" illumination scheme. In one embodiment in which the object detection module $12_1$ or $12_2$ includes a plurality of illumination devices in the form of an array 110 extending at least partially across the sensing region as described above with respect to the example illustrated in FIG. 5, the processor or controller 14 is operable to identify for illumination according to the "access grant" scheme those of the illumination devices 112 which occupy the same or substantially the same sub-region of the sensing region as that occupied by the object, and to control such identified illumination devices 112 to illuminate with a predefined color that is different from any that may be used in other illumination schemes, e.g., in this case, green. Alternatively or additionally, the controller 14 may be operable at step 718 to control the identified illumination devices 112 to illuminate according to the "access grant" scheme by switching on and off at a predefined frequency and/or with a predefined duty cycle different from any such predefined frequency and/or duty cycle used in other illumination schemes, and/or to illuminate only a subset of the illumination devices different from any subset used in other illumination schemes. In embodiments which include more or fewer illumination devices, the processor or controller 14 may be operable at step 718 to control at least one illumination device 112 to illuminate according to the "access grant" illumination scheme by illuminating with at least one of a predefined color, a predefined frequency and a predefined duty cycle which is/are different that that/those used in other illumination schemes.

In embodiments which include step 718, the process 700 advances from step 718 to step 724, and in embodiments which do not include step 718 the process 700 advances from the "YES" branch of step 716 to step 724. In any case, the processor or controller 14 is operable at step 724 to control one or more of the actuator driver circuits 40 to activate one or more corresponding vehicle access actuators 46 in order to actuate one or more corresponding vehicle access closure devices. Examples of such vehicle access closure devices may include, but are not limited to, one or more access closure locks, one or more access closure latches, and the like. At step 724, the processor or controller 14 may be operable to, for example, control at least one lock actuator associated with at least one access closure of the motor vehicle to unlock the access closure from a locked state or condition and/or to lock the access closure from an unlocked state or condition, and/or to control at least one latch actuator associated with at least one access closure of the motor vehicle to at least partially open the access closure from a closed position or condition and/or to close the access closure from an at least partially open position or condition.

In some embodiments, the process 700 may optionally include a step 726 to which the process 700 advances from step 724, as illustrated by dashed-line representation in FIG. 35. In embodiments which include it, the processor or controller 14 is operable at step 724 to control one or more of the audio and/or illumination device driver circuits 60 to activate one or more corresponding audio and/or illumination devices 66 in addition to controlling one or more vehicle access actuators to activate one or more vehicle access devices at step 724 following detection at step 716 of exhibition of a predefined gesture by the object within the sensing region of the radiation emission and detection assembly 100, 130. Example audio devices which may be activated at step 726 may include, but are not limited to, the vehicle horn, an audible device configured to emit one or more chirps, beeps, or other audible indicators, or the like. Example illumination devices which may be activated at step 726 in addition to one or more illumination devices 112 (in embodiments which include one or more such illumination devices 112) may include, but are not limited to, one or more existing exterior motor vehicle lights or lighting systems, e.g., headlamp(s), tail lamp(s), running lamp(s), brake lamp(s), side marker lamp(s), or the like, and one or more existing interior motor vehicle lights or lighting systems, e.g., dome lamp, access closure-mounted lamp(s), motor vehicle floor-illumination lamp(s), trunk illumination lamp(s), or the like. In any case, following step 726, or following step 724 in embodiments which do not include step 726, the process 700 illustratively loops back to step 702.

In embodiments in which the object detection module 12 is implemented in the form of the object detection module $12_1$ or the object detection module $12_2$, the process 700 may illustratively include step 722 to which the process 700 advances from the "NO" branch of step 716. Conversely, in embodiments in which the object detection module 12 is implemented in the form of the object detection module $12_3$ or the object detection module $12_4$, the process 700 does not include step 72. In implementations of the process 700 which include it, the processor or controller 14 is illustratively operable at step 722 to control one or more of the driver circuit(s) DC to illuminate the identified illumination device(s) 112 according to another predefined detection or illumination scheme different from the "insufficient detection," "object detection" and "access grant" schemes described above. For example, if an object previously determined to be within the sensing region of the radiation emission and detection assembly 100, 130 is determined, based on the object detection signals produced by the radiation emission and detection assembly 100, 130, to fail to exhibit a predefined gesture as described above within a predefined time period following execution of step 712, the processor or controller 14 may illustratively be operable to control illumination of one or more illumination devices 112 according to a "fail" illumination scheme. In one embodiment in which the object detection module $12_1$ or $12_2$ includes a plurality of illumination devices in the form of an array 110 extending at least partially across the sensing region as described above with respect to the example illustrated in FIGS. 3A-5, the processor or controller 14 is operable to identify for illumination according to the "fail" scheme those of the illumination devices 112 which occupy the same or substantially the same sub-region of the sensing region as that occupied by the object, and to control such identified illumination devices 112 to illuminate with a predefined color that is different from any that may be used in other illumination schemes, e.g., in this case, red. Alternatively or additionally, the controller 14 may be operable at step 722 to control the identified illumination devices 112 to illuminate according to the "fail" scheme by switching on and off at a predefined frequency and/or with a predefined duty cycle different from any such predefined frequency and/or duty cycle used in other illumination schemes, and/or to illuminate only a subset of the illumination devices different from any subset used in other illumination schemes. In embodiments which include more or fewer illumination devices, the processor or controller 14 may be operable at step 722 to control at least one illumination device 112 to illuminate according to the "fail" illumination scheme by illuminating with at least one of a predefined color, a predefined frequency and a predefined duty cycle which is/are different that that/those used in other illumination schemes.

Referring now to FIG. 36, a simplified flowchart is shown of a process 800 for selectively providing for (i) gesture access to the motor vehicle, with or without visual feedback, under some operating conditions of the motor vehicle, and (ii) object impact avoidance under other operating conditions of the motor vehicle in or to which at least one object detection module 12 is mounted. Any such object detection module 12 will illustratively be implemented in the form of the object detection module 12₂ and/or the object detection module 12₄, either of which include the radiation emission and detection assembly 130 in the form of at least one radar transmitter 132 and a plurality of radar detectors or receivers 134. In one embodiment, the process 800 is illustratively stored in the at least one memory 16 of the object detection module 12 in the form of instructions which, when executed by the at least one processor or controller 14 of the object detection module 12, cause the at least one processor or controller 14 to execute the corresponding functions. It will be understood that in some alternate embodiments, such instructions may be stored, in whole or in part, in any one or more of the memory units illustrated in FIG. 1, e.g., in one or more of the memory 16 of the object detection module 12, the memory 28 of the vehicle control computer 24, the memory 44 of the actuator driver circuit(s) 40 and the memory 64 of the audio/illumination device driver circuit(s) 60, and provided to the at least one processor or controller 14 for execution thereby. In other alternate embodiments, such instructions, wherever stored, may be executed, in whole or in part, by any one or more of the processors or controllers illustrated in FIG. 1, e.g., by one or more of the processors or controllers 14, 26, 42 and 62. For purposes of the following description, the process 800 will be described as being executed by the processor or controller 14, it being understood that the process 800 may alternatively or additionally be executed, in whole or in part, by one or more of the processors or controllers 26, 42, 62.

The process 800 illustratively begins at step 802 where the processor or controller 14 is operable to determine whether a Key Fob signal has been detected. Illustratively, the processor or controller 14 is operable to execute step 802 as described above with respect to step 702 of the process 700. Thus, the process 800 advances along the "YES" branch of step 802 only if the received Key Fob signal matches at least one stored Key Fob code, such that the process 800 proceeds from step 802 only for authorized users, i.e., only for users carrying a Key Fob 20 that is recognizable by the object detection system 10. It will be understood that some embodiments of the process 800 may not include step 802, and in such embodiments the process 800 begins at step 804.

Following the "YES" branch of step 802 (in embodiments which include step 802), the process 800 advances to step 804 where the processor or controller 14 is operable to monitor one or more of the vehicle operating parameter sensors and/or switches 50 mounted to or within or otherwise carried by the motor vehicle. Illustratively, signals produced by the one or more monitored sensors and/or the status(es) of the one or more switches monitored at step 804 are indicative of an operating condition or state, e.g., engine running or not, and/or of a moving condition or state of the motor vehicle, e.g., motor vehicle stationary, moving, enabled to move, etc. As described above with respect to FIG. 1, examples of such sensors and/or switches 50 may include, but are not limited to, an engine ignition sensor or sensing system, a vehicle speed sensor or sensing system, a transmission gear selector position sensor, sensing system or switch, a transmission gear position sensor, sensing system or switch, vehicle brake sensor, sensing system or switch, and the like. Those skilled in the art will recognize other sensors and/or switches from which an operating condition or state of the motor vehicle may be determined, implied or estimated and/or from which a moving condition or state of the motor vehicle may be determined, implied or estimated, and it will be understood that monitoring of any such other sensors and/or switches at step 804 is intended to fall within the scope of this disclosure.

Following step 804, the process 800 advances to step 806 where the processor or controller 14 is operable to determine a mode based on the monitored vehicle sensor(s) and/or switch(es). Generally, the mode determined by the processor or controller 14 at step 806 is a gesture access (GA) mode if the signal(s) produced by the monitored vehicle sensor(s) and/or the operational state(s) of the monitored switch(es) correspond to a state or condition of the motor vehicle conducive to gesture access operation of the system 10, and is an object impact avoidance (OIA) mode of signal(s) produced by the monitored vehicle sensor(s) and/or the operational state(s) of the monitored switch(es) correspond to a state or condition of the motor vehicle conducive to object impact avoidance operation of the system 10. In the former case, for example, the processor 14 may operate in the gesture access mode if the motor vehicle is stationary and disabled from moving, and in the latter case, for example, the processor 14 may operate in the object impact avoidance mode if the motor vehicle is moving or is enabled to move.

For purposes of this disclosure, the phrase "disabled from moving" should be understood to mean at least that the engine of the motor vehicle may or may not be running and, if the engine is running, that one or more actuators are preventing the motor vehicle from moving in the forward or reverse direction. In some embodiments, for example, an engine ignition switch in the "off" position means that the motor vehicle is disabled from moving, and the processor 14 may be operable at step 806 under such conditions to set mode=GA. In other example embodiments, an engine ignition switch in the "run" or "on" position means that the engine is running, and the processor 14 may be then operable at step 806 under such conditions to determine the status of one or more other vehicle operating parameters such as the transmission selection lever, the vehicle brakes and/or vehicle road speed. In some such embodiments, the processor 14 may be operable at step 806 when the engine is running to set mode=GA if, and as long as, the transmission selection lever is in "park" or otherwise not in a selectable gear (e.g., in the case of a manual transmission) and/or the vehicle brakes are engaged and/or the vehicle speed is zero. The phrase "enabled to move," on the other hand, should be understood to mean at least that the engine of the motor vehicle has been started, and in some embodiments the processor 14 may be operable at step 806 under conditions in which the engine ignition switch is in the "run" or "on" position to set mode=OIA. In some embodiments in which the processor or controller 14 has determined that the engine has been started, the processor 14 may then be further operable at step 806 to determine the status of at least one other vehicle operating parameter such as the transmission selection lever, the vehicle brakes or vehicle road speed. In some such embodiments, the processor 14 may be operable at step 806 when the engine is running to set mode=OIA if, and as long as, a drive gear (forward or reverse) of the motor vehicle transmission has been selected, and/or the vehicle brakes are disengaged and/or vehicle speed is greater than zero. Those skilled in the art will recognize other vehicle operating parameters which may be used alone, in combination with one or more of the above-described vehicle operating parameters and/or in combination with other vehicle operating parameters to determine when and whether the motor vehicle is disabled from moving or enabled to move, and it will be understood that any such other vehicle operating parameters are intended to fall within the scope of this disclosure. Moreover, those skilled in the art will recognize other vehicle operating conditions conducive to gesture access mode of operation or in which gesture access mode may be safely executed, and it will be understood that the processor or controller 14 may be alternatively configured to set mode=GA at step 806 according to any such other vehicle operating conditions. Further still, those skilled in the art will recognize other vehicle operating conditions conducive to object impact avoidance mode of operation or in which object impact avoidance mode may be safely executed, and it will be understood that the processor or controller 14 may be alternatively configured to set mode=OIA at step 806 according to any such other vehicle operating conditions. It will be appreciated that configuring the processor or controller 14 to set mode=GA or OIA based on any such other vehicle operating conditions will involve only mechanical steps for a skilled programmer.

If, at step 806, the processor or controller 14 has set mode=GA, the process 800 advances to step 808 to execute a GA control process. In some embodiments, the GA control process may be the process 700 illustrated in FIG. 35 and described above. As described above, the process 700 may be executed by or for object detection modules 12₂, i.e., having one or more illumination devices 112, and by or for object detection modules 12₄, i.e., which do not have any illumination devices 112. It will be understood, however, that the process 800 does not specifically require the GA control process 700 illustrated in FIG. 35, and that other gesture access control processes using a radiation emission and detection assembly 130 having at least one radar transmitter and a plurality of radar detectors may therefore be alternatively executed at step 808.

If, at step 806, the processor or controller 14 has set mode=OIA, the process 800 advances to step 810 to execute an OIA control process. An example of one such OIA process is illustrated in FIG. 37 and will be described with respect thereto, although it will be understood that the process 800 does not specifically require the OIA control process illustrated in FIG. 37, and that other object impact avoidance control processes using a radiation emission and detection assembly 130 having at least one radar transmitter and a plurality of radar detectors may therefore be alternatively executed at step 810. In any case, the process 800 illustratively loops back from either of steps 808 and 810 to step 804.

Referring now to FIG. 37, a simplified flowchart is shown of another process 900 for selectively providing for (i) gesture access to the motor vehicle, with or without visual feedback, under some operating conditions of the motor vehicle, and (ii) object impact avoidance under other operating conditions of the motor vehicle in or to which at least one object detection module 12 is mounted. As with the process 800 illustrated in FIG. 36, any such object detection module 12 will illustratively be implemented in the form of the object detection module 12₂ and/or the object detection module 12₄, either of which include the radiation emission and detection assembly 130 in the form of at least one radar transmitter 132 and a plurality of radar detectors or receivers or detectors 134. In one embodiment, the process 900 is illustratively stored in the at least one memory 16 of the object detection module 12 in the form of instructions which, when executed by the at least one processor or controller 14 of the object detection module 12, cause the at least one processor or controller 14 to execute the corresponding functions. It will be understood that in some alternate embodiments, such instructions may be stored, in whole or in part, in any one or more of the memory units illustrated in FIG. 1, e.g., in one or more of the memory 16 of the object detection module 12, the memory 28 of the vehicle control computer 24, the memory 44 of the actuator driver circuit(s) 40 and the memory 64 of the audio/illumination device driver circuit(s) 60, and provided to the at least one processor or controller 14 for execution thereby. In other alternate embodiments, such instructions, wherever stored, may be executed, in whole or in part, by any one or more of the processors or controllers illustrated in FIG. 1, e.g., by one or more of the processors or controllers 14, 26, 42 and 62. For purposes of the following description, the process 800 will be described as being executed by the processor or controller 14, it being understood that the process 900 may alternatively or additionally be executed, in whole or in part, by one or more of the processors or controllers 26, 42, 62.

The process 900 illustratively begins at step 902 where the processor or controller 14 is operable to determine whether a Key Fob signal has been detected. Illustratively, the processor or controller 14 is operable to execute step 902 as described above with respect to step 702 of the process 700. Thus, the process 900 advances along the "YES" branch of step 902 only if the received Key Fob signal matches at least one stored Key Fob code, such that the process 900 proceeds from step 902 only for authorized users, i.e., only for users carrying a Key Fob 20 that is recognizable by the object detection system 10. It will be understood that some embodiments of the process 900 may not include step 902, and in such embodiments the process 900 begins at steps 904 and 906.

Following the "YES" branch of step 902 (in embodiments which include step 902), the process 900 advances to steps 904 and 906. At step 904, the processor 14 is illustratively operable to execute a GA control process. In some embodiments, the GA control process may be the process 700 illustrated in FIG. 35 and described above. As described above, the process 700 may be executed by or for object detection modules 12₂, i.e., having one or more illumination devices 112, and by or for object detection modules 12₄, i.e., which do not have any illumination devices 112. It will be understood, however, that the process 900 does not specifically require the GA control process 700 illustrated in FIG. 35, and that other gesture access control processes using a radiation emission and detection assembly 130 having at least one radar transmitter and a plurality of radar detectors may therefore be alternatively executed at step 904.

At step 906, the processor or controller 14 is operable to determine, e.g., by monitoring the engine ignition switch included in the vehicle sensors/switches 50, whether the engine ignition status IGN is "on" or "running." If not, the process 900 loops back to the beginning of step 906. Thus, as long as the engine of the motor vehicle is not running, the processor or controller 14 will continue to execute the GA control process at step 904. If, however, the processor or controller 14 determines at step 906 that the engine ignition status IGN is "on" or "running," thus indicating that the engine of the motor vehicle has been started and is running, the process 900 advances to step 908 where the processor or controller 14 is operable to monitor one or more vehicle sensors and/or switches. Thereafter at step 910, the processor or controller 14 is operable to compare the signal(s) and/or state(s) of the monitored vehicle sensor(s) and/or switch(es) to gesture access (GA) and/or object detection (OD) conditions, and thereafter at step 912 the processor or controller 14 is operable to determine a mode as either gesture access (GA) or object impact avoidance (OIA) based on the comparison. Illustratively, the processor or controller 14 is operable to execute steps 908-912 as described above with respect to step 806 of the process 800.

Following step 912, the processor or controller 14 is illustratively operable to determine whether the mode determined at step 912 is GA or OIA. If GA, the process 900 loops back to the beginning of steps 904 and 906. Thus, with the engine running, as long as the vehicle operating parameters correspond to gesture access operating conditions, the processor or controller 14 will continue to execute the GA control process at step 904. However, if the processor or controller 14 determines at step 914 that the mode determined at step 912 is OIA, the process 900 advances to step 916 where the processor or controller 14 is operable to suspend execution of the GA control process executing at step 904 and to execute an object impact avoidance control process beginning at step 918.

Figure 6B:
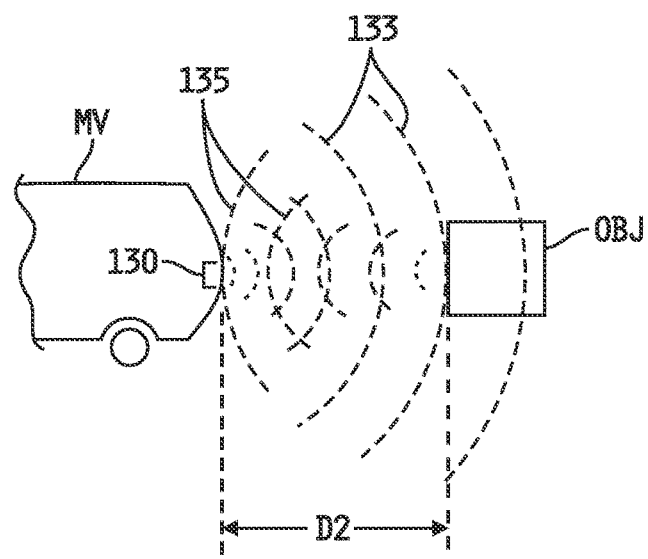
FIG. 6B is a simplified side elevational view of a portion of a motor vehicle having the object detection module of FIG. 6A mounted thereto and depicting an example distance range of object detection by the module.

At step 918, the processor or controller 14 is operable to monitor the object detection assembly; more specifically, to monitor the radiation emission and detection assembly 130 of the respective object detection module $12_2$, $12_4$ for object detection signals produced thereby, if any. Thereafter at step 920, the processor or controller 14 is operable to compare the object detection signal(s) produced by the assembly 130 to one or more object detection parameters (ODP) stored in the memory 16 (and/or stored in the memory 28, 44 or 64). In some embodiments, for example, the one or more stored ODPs is/are satisfied by an object detected anywhere within the distance D2 of the radiation emission and detection assembly 130 as illustrated in FIG. 6B and described above with respect thereto. In such embodiments, the detected object signal(s), when processed by the processor or controller 14 to determine a corresponding object detection value, thus matches at least one of the one or more stored ODPs.

Following step 920, the processor or controller 14 is operable at step 922 to determine whether the one or more stored ODPs has/have been satisfied. If so, the process 900 advances to step 924 where the processor or controller 14 is operable to control one or more of the actuator driver circuits 40 to control one or more corresponding actuators 48 to activate one or more corresponding object avoidance devices, mechanisms and/or systems 50 of the motor vehicle. Examples of such object avoidance devices, mechanisms and/or systems 50 may include, but are not limited to, one or more electronically controllable motor vehicle access closure latches or latching systems, an automatic (i.e., electronically controllable) engine ignition system, an automatic (i.e., electronically controllable) motor vehicle braking system, an automatic (i.e., electronically controllable) motor vehicle steering system, an automated (i.e., electronically controllable) motor vehicle driving system (e.g., "self-driving" or "autonomous driving" system), and the like. Thus, depending upon the location of the object detection module 12 on and relative to the motor vehicle, the processor or controller 14 may execute step 924 by locking one or more electronically controllable access closure latches or latching systems, by automatically turning off the engine ignition system, by activating an electrically controllable motor vehicle braking system to automatically apply braking force to stop or slow the motor vehicle, by controlling an automatic steering system so as to avoid impact with the detected object and/or by controlling an automated vehicle driving system so as to avoid impact with the detected object. Those skilled in the art will recognize other object impact avoidance devices, mechanisms and/or systems which may be controlled at step 924 to avoid or mitigate impact with the detected object, and it will be understood that any such other object impact avoidance devices, mechanism and/or systems are intended to fall within the scope of this disclosure. In any case, the process 900 illustratively loops from step 924 back to the beginning of step 918 so that the processor or controller 14 continues to execute the object impact avoidance control process of steps 918-924 as long as the one or more stored ODP conditions continue to be satisfied.

In some embodiments, the processor or controller 14 may be additionally operable at step 926 to control one or more audio and/or illumination driver circuits 60 to activate one or more corresponding audio devices and/or illumination devices 66. Examples of the one or more audio devices 66 which the processor or controller 14 may activate at step 926 may include, but are not limited to, a vehicle horn, one or more electronically controllable audible warning devices, e.g., in the form of one or more predefined alarm sounds, sequences or the like, one or more electronically controllable audio notification devices or systems, one or more electronically controllable audio voice messaging devices or systems, or the like. Examples of the one or more illumination devices 66 which the processor or controller 14 may activate at step 926 may include, but are not limited to, one or more electronically controllable visible warning devices, one or more exterior vehicle lights, one or more interior vehicle lights, or the like.

If at step 922, the processor or controller 14 determines that the one or more stored ODPs is/are not, or no longer, satisfied, the process 900 advances to step 926 where the processor or controller 14 is operable to control the one or more actuator driver circuits 40 to reset the corresponding one or more actuators 46 activated at step 924. If, at step 924, the process or controller 14 activated one or more audible and/or illumination devices 66, the processor or controller 14 is further operable at step 926 to reset or deactivate such one or more activated audible and/or illumination devices 66. Following step 926, the process 900 loops back to steps 904 and 906 where the processor or controller 14 is operable at step 904 to again execute the GA control process and at steps 906-914 to determine whether to continue to execute the GA control process or whether to again suspend the GA process and execute the OIA process of steps 918-924. It will be understood that if step 924 has not yet been executed prior to determining at step 922 that the ODPs is/are not satisfied, step 926 may be bypassed and the process 900 may proceed directly from the "NO" branch of step 922 to steps 904 and 906.

In some embodiments of the process 800 illustrated in FIG. 36, the OIA control process executed at step 810 thereof may be similar or identical to the OIA control process executed at steps 916-924 of the process 900. In other embodiments of the process 800, the OIA control process executed at step 810 may be or include other OIA control processes as described above.

While some of the foregoing embodiments illustrated in the attached drawings are described above as including at least one illumination device 112 for providing visual feedback during gesture access operation, any of the object detection modules 12 which include at least one illumination device 112 may alternatively include at least one audible device responsive to at least one control signal to produce at least one audible signal. In some such embodiments, at least one audible device may be configured to produce sounds of different volumes and/or frequencies. In other such embodiments, two or more audible devices may be included, each producing sound with a different volume and/or frequency. In any such embodiments, the at least one audible device may be controlled to switch on and off with a predefined frequency and/or duty cycle. In some such embodiments which include multiple audible devices, at least two of the multiple audible devices may be controlled to switch on and off with different frequencies and/or duty cycles.

Figure 38:
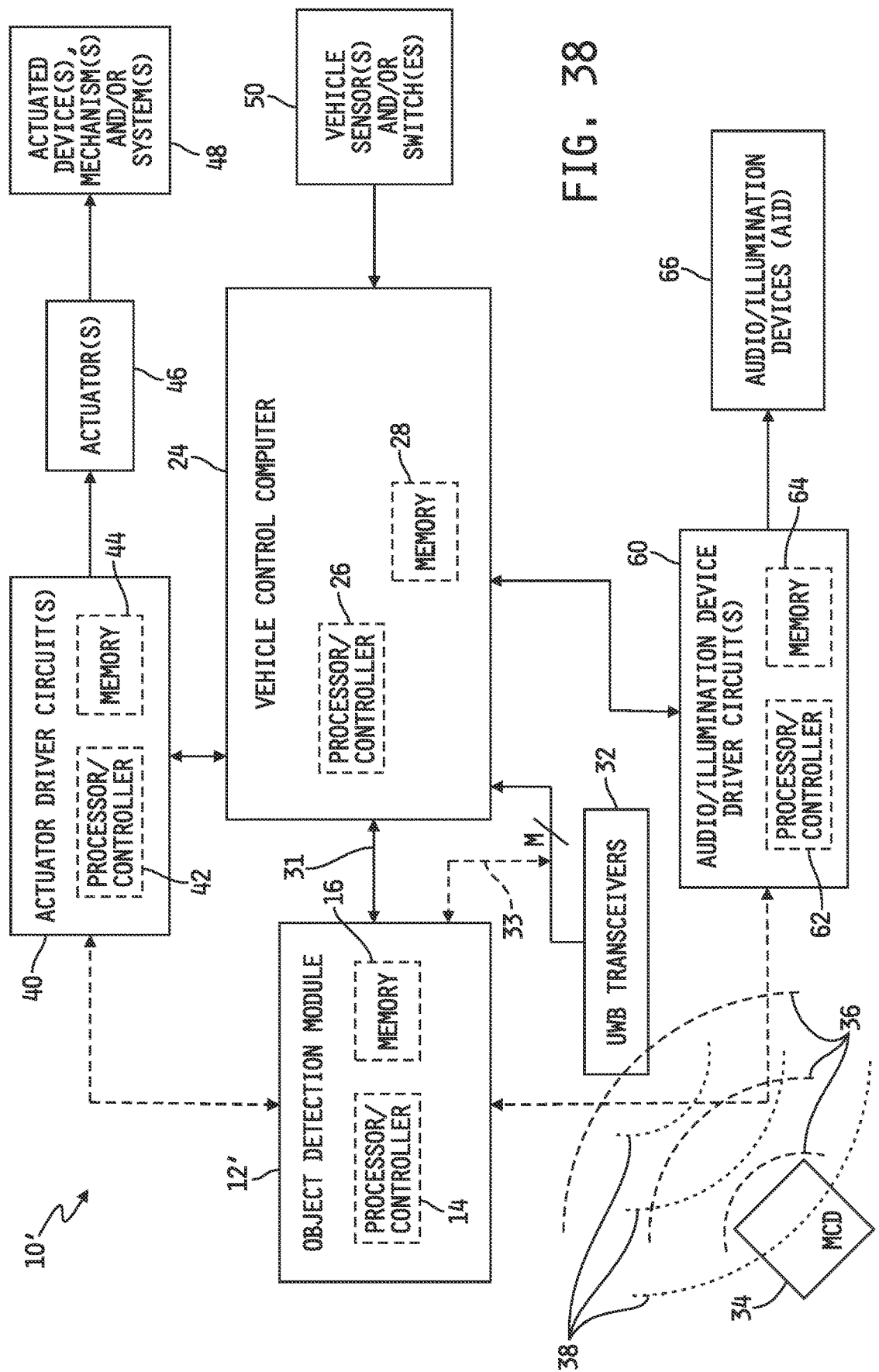
FIG. 38 is a simplified block diagram schematic of another embodiment of a gesture access system for a motor vehicle.

Referring now to FIG. 38, another embodiment of a gesture access system for a motor vehicle 10' is shown which includes another embodiment of an object detection module 12'. The gesture access system 10' is identical in many respects to the object detection system 10 illustrated in FIG. 1 and described above. Components of the system 10' in common with those of the system 10 are accordingly identified with like reference numbers, and descriptions thereof will be omitted here for brevity, it being understood that the above descriptions of such components apply equally to those of the system 10' illustrated in FIG. 38.

The system 10' illustrated in FIG. 38 differs from that of the system 10 in at least three respects; (1) the system 10' utilizes ultra-wideband (UWB) circuitry and signals to determine the proximity, relative to the motor vehicle, of a UWB circuit-equipped mobile communication device (MCD) 34 known to the system 10', (2) the system 10' is operable in a gesture access mode to utilize the same and/or additional UWB circuitry perform object detection for the purpose of evaluating gestures based on emitted 36 and reflected 38 UWB signals and, upon recognition of at least one predetermined gesture, unlocking, locking, automatically opening and/or automatically closing an access closure of a motor vehicle, and (3) the system 10' is operable only in the gesture access mode if the MCD is determined to be within a perimeter defined about the motor vehicle and is otherwise operable in an inactive mode in which reflected UWB signals are not received or are not acted upon. Such operational features of the system 10' are described in detail below.

To accomplish the foregoing operational features, the system 10' illustratively includes a number, M, of conventional ultra-wideband (UWB) signal transceivers 32, where M may by any positive integer. Illustratively, each transceiver 32 operates in the conventional UWB range, e.g., any frequency or frequency range greater than 500 MHz, and is configured to wirelessly transmit and receive UWB signals. In alternate embodiments, one or more of the transceivers 32 may instead be provided in the form of a conventional UWB signal transmitter and a conventional (separate or paired) UWB receiver. In some embodiments, the one or more UWB transceiver(s) is/are operatively (i.e., communicatively, via hardwire and/or wireless connection) connected solely to the vehicle control computer 24 as depicted in FIG. 38 by the solid-line connection. In some alternate embodiments, at least one UWB transceiver 32 is connected solely to, and/or carried solely by, the object detection module 12' as depicted in FIG. 38 by the dash-line connection 33, and in other alternate embodiments one or more UWB transceiver(s) 32 is/are operatively connected to the vehicle control computer 24 and at least one UWB transceiver is connected to, and/or carried by, the object detection module 12'. It will be understood that any embodiment of the system 10' may include one or more of the object detection modules 12', each of which is operatively (i.e., communicatively, via hardwire and/or wireless connection) connected to the vehicle control computer 24 as depicted in FIG. 38 by the solid-line connection 31. Each of the one or more object detection modules 12' includes, at a minimum, a processor or controller 14 and a memory 16 as described above with respect to FIG. 1. Various example embodiments of the object detection module 12' are illustrated in FIGS. 40-43 and will be described in detail below.

Figure 39:
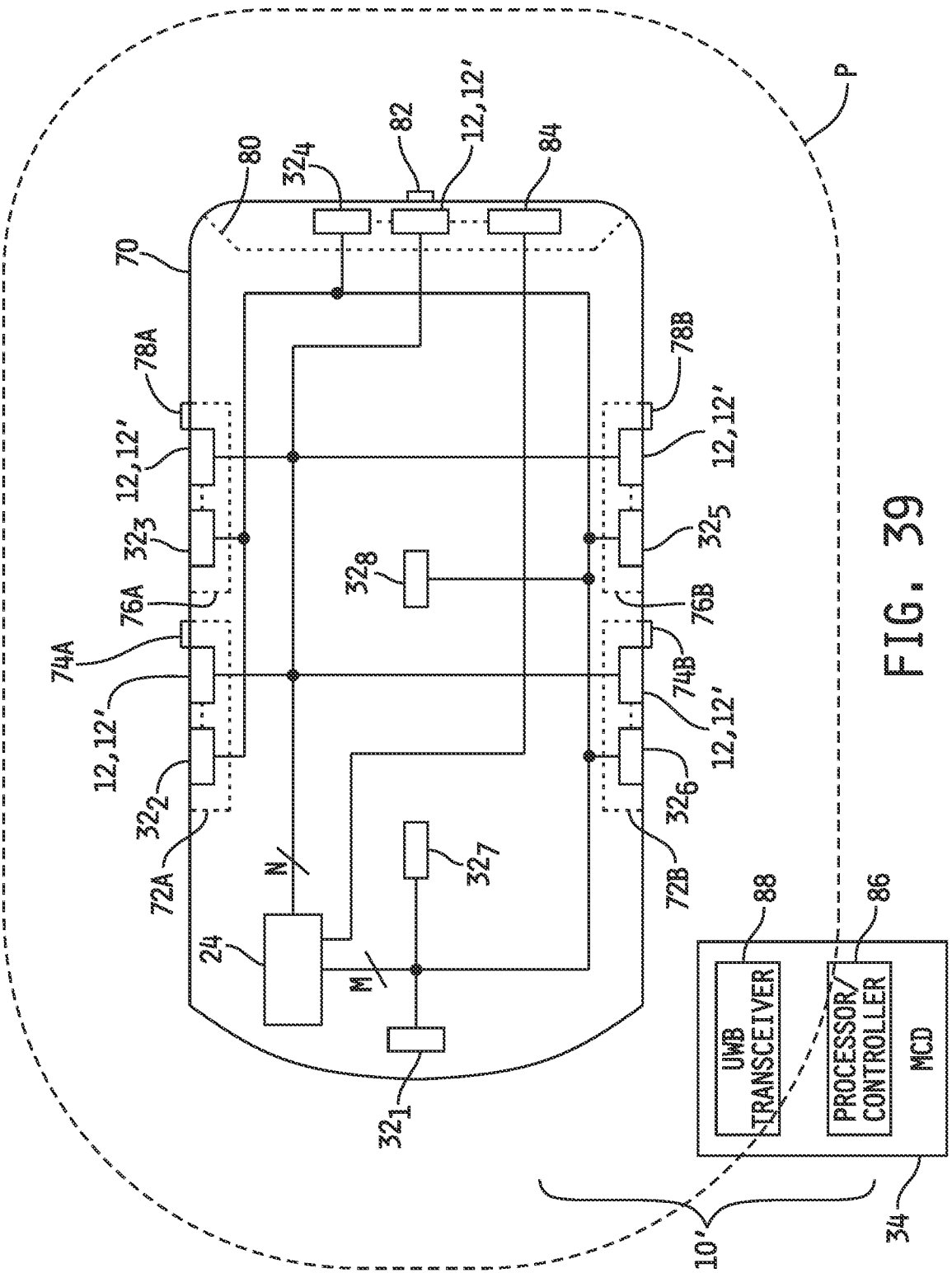
FIG. 39 is a simplified top plan view of an example implementation of the gesture access system depicted in FIG. 38 in a motor vehicle.

Referring now to FIG. 39, an example embodiment of the system 10' of FIG. 38 is shown implemented in a motor vehicle 70. It will be understood that while not all of the components of the system 10' illustrated in FIG. 38 are shown in FIG. 39, such non-illustrated components are present in the system 10' of FIG. 39. In the illustrated embodiment, the motor vehicle 70 illustratively has five access closures in the form of two conventional forward vehicle doors 72A, 72B, two rearward vehicle doors 76A, 76B and a conventional rear hatch 80. The forward doors 72A, 72B illustratively each have an access handle 74A, 74B respectively mounted thereto, the rearward doors 76A, 76B each have 72C and 72D each having an access handle 78A, 78B respectively mounted thereto and the rear had 80 has an access handle 82 mounted thereto. In some embodiments, either or both of the rearward doors 76A, 76B may be provided in the form of conventional hinged (i.e., swinging) doors, and in other embodiments either or both of the rearward doors 76A, 76B may be provided in the form of conventional sliding doors which may or may not include power-assisted or power-controlled opening/closing. In other alternate embodiments, either or both of the rearward doors 76A, 76B may be omitted. In some alternate embodiments, the rear hatch 80 may instead by a conventional trunk lid. In either case, the rear hatch or trunk lid 80 may include power-assisted or power-controlled opening and/or closing, and in such cases the motor vehicle 70 includes a power module 84, including at least one drive motor.

The vehicle control computer 24 is suitably mounted in the motor vehicle 70, and is electrically connected to number, N, of object detection modules 12, 12' as well as to a number, M, of UWB transceivers 32. In this example, the UWB transceivers 32 are operatively connected, e.g., via any number of conventional electrical wires or wirelessly, to the vehicle control computer 24 but not to any of the object detection modules 12, 12', although in alternate embodiments one or more of the UWB transceivers 32 may alternatively or additionally operatively connected directly, e.g., wired or wirelessly, to a respective one or more of the object detection modules 12, 12'. In the illustrated example, N=5 as an object detection module 12, 12' is mounted to or near each access handle 74A, 74B, 76A, 76B and 82, although in alternate embodiments more or fewer object detection modules 12, 12' may be mounted to the motor vehicle 70 at any desired location. Also in the illustrated example, M=8 as eight UWB transceivers $32_1$-$32_8$ are mounted to the motor vehicle 70 at various different locations. For example, a UWB transceiver $32_1$ at the front of the vehicle 70, UWB transceivers $32_2$-$32_6$ at each closure 72A, 76A, 80, 76B, 72B respectively, and UWB transceivers $32_7$, $32_8$ centrally on and along the top of the vehicle 70. In alternate embodiments, more or fewer UWB transceivers 32 may be mounted to the motor vehicle 70 at various locations.

As also illustrated in FIG. 39, the mobile communication device (MCD) 34 illustratively has at least a conventional processor or controller 86 and a UWB transceiver 88. The MCD 34 and the vehicle control computer 24 (and/or one or more of the object detection modules 12, 12' in some embodiments) are both capable of wirelessly communicating with one another via control of their respective UWB transceivers 32, 88 according to conventional UWB communication protocol. In one embodiment, the MCD 34 is a smart phone equipped with a UWB transceiver 88, although in other embodiments the MCD may be any mobile electronic device equipped with a UWB transceiver 88 and additional circuitry configured to communicate with the vehicle control computer 24 via a conventional UWB communication protocol, such as a key fob or other mobile electronic device carried by or on an operator of the motor vehicle.

In the context of this disclosure, a particular MCD 34 will be capable of UWB communications with a particular vehicle control computer 24 (and/or by the processor/controller 14 of at least one of the object detection modules 12, 12') of a particular motor vehicle 70 and/or vice versa if the particular MCD 34 and/or component(s) thereof is/are known to the particular vehicle control computer 24 (and/or by the processor/controller 14 of at least one of the object detection modules 12, 12') and/or if the particular vehicle control computer 24 and/or the motor vehicle 70 itself and/or the processor/controller 14 of at least one of the object detection modules 12, 12') is/are known to the MCD 34. In the former case, the particular MCD 34 will be, for example, owned by, or otherwise in the possession of, an operator of the motor vehicle 70, and in the latter case the particular motor vehicle 70 (carrying the particular vehicle control computer 24 and/or process/or controller 14 of at least one of the objection detection modules 12, 12') will be, for example, a motor vehicle 70 for which the owner or possessor of the particular MCD 34 is an operator.

The particular MCD 34 will be known to the vehicle control computer 24 (and/or by the processor/controller 14 of at least one of the object detection modules 12, 12') of the particular motor vehicle 70 if the two have been previously linked, paired or otherwise configured, in a conventional manner, for UWB communications with the other to the exclusion, with respect to the particular MCD 34, of vehicle control computers 24 of other motor vehicles 70, and to the exclusion, with respect to the particular motor vehicle 70, of other MOD's 34 that have not been previously linked, paired or otherwise configured for UWB communications therewith. It is contemplated that two or more particular MOD's 34 may be so linked, paired or otherwise configured for UWB communications with the vehicle control computer 24 (and/or with the processor/controller 14 of at least one of the object detection modules 12, 12') of a particular motor vehicle 70, e.g., to accommodate $2^{nd}$, $3^{rd}$, etc. operators of the motor vehicle 70.

In one embodiment, the particular MCD(s) 34 linked, paired or otherwise configured for UWB communications with the particular vehicle control computer 24 (and/or with the processor/controller 14 of at least one of the object detection modules 12, 12') is/are, as a result of the linking, pairing or configuration process, illustratively operable to thereafter transmit unique identification information as part of, or appended to, UWB signals transmitted by the UWB transceiver(s) 88. Alternatively or additionally, the particular vehicle control computer 24 (and/or the processor/controller 14 of at least one of the object detection modules 12, 12') linked, paired or otherwise configured for UWB communications with the particular MCD(s) 34 may be, as a result of the linking, pairing or configuration process, thereafter operable to transmit unique identification information as part of, or appended to, UWB signals transmitted by one or more of the UWB transceivers 32. Such identification information may be or include, for example, but not limited to, information identifying the processor/controller 86 of the particular MCD 34, the UWB transceiver 88 of the particular MCD 34, information identifying the particular MCD 34 itself, information identifying the particular vehicle control computer 24 (and/or with the processor/controller 14 of at least one of the object detection modules 12, 12') of the particular motor vehicle 70, information identifying one or more of the UWB transceivers 32 of the particular motor vehicle 70, information identifying the particular motor vehicle 70 itself, any combination thereof, and/or other identification information unique to the particular MCD 34/motor vehicle 70 pair. In any case, UWB communication, via one or more of the UWB transceivers 32 of a particular motor vehicle 70 and a UWB transceiver 88 of a particular MCD 34, in the context of this disclosure, may only be conducted between the vehicle control computer 24 (and/or the processor/controller 14 of at least one of the object detection modules 12, 12') of that particular motor vehicle 70 and the processor/controller 14 of that (or those) particular MCD(s) 34 by transmitting by one or the other or both, as part of or along with transmitted UWB signals, unique identification information known to the other resulting from having been previously linked, paired or otherwise configured for UWB communications with one another. In this regard, in the context of the example implementation illustrated in FIG. 39, it will be understood that the MCD 34 (or one or more components thereof) is thus known to the vehicle control computer 24 (and/or to the processor/controller 14 of at least one of the object detection modules 12, 12') of the illustrated motor vehicle 70 and/or vice versa, having been previously linked, paired or otherwise configured for UWB communications with one another.

Further illustrated in FIG. 39 is a perimeter, P, surrounding the motor vehicle 70, which represents a boundary within which UWB communications between the processor/controller 86 of the MCD 34 and the processor 26 (and/or the processor/controller 14 of at least one of the object detection modules 12, 12') of the motor vehicle 70 can take place or are permitted to take place, and beyond which such UWB communications cannot take place or are not permitted. Generally, UWB communications has a range of approximately 30 feet. In one embodiment the perimeter, P, accordingly defines approximately a 30 feet boundary about the motor vehicle such that when the MCD 34 is within the perimeter, P, as illustrated by example in FIG. 39, the MCD 34 is generally within UWB communication range of the motor vehicle 70 (and is thus considered to be "in-range"), and when the MCD 34 is beyond or outside of the perimeter, P, the MCD 34 is generally outside of UWB communication range of the motor vehicle 70 (and is thus considered to be "out-of-range"). In this embodiment, the perimeter, P, is thus defined as approximately the boundary of UWB communications between the MCD 34 and the motor vehicle 70. In alternate embodiments, the perimeter P may be defined to be any arbitrary boundary about the motor vehicle 70 (or about any particular one, set or subset of the UWB transceivers 32). In any case, for purposes of this disclosure, when the MCD 34 is determined to be within the perimeter, P, the object detection module(s) 12, 12' is/are configured to operate in the gesture access mode, and when the MCD 34 is otherwise determined to be beyond or outside of the perimeter, P, the object detection module(s) 12, 12' is/are configured to operate in the inactive mode, as these modes are briefly described above. In this regard, a convenient perimeter, P, is approximately the communication range of the UWB transceivers 32, 88, although alternate perimeters are contemplated as described above. Moreover, in some alternate embodiments, the perimeter, P, may be defined only by and about one or a subset of the total set of UWB transceivers 32, and/or the perimeter, P, may not be smooth as illustrated by example in FIG. 39, but may instead be non-smoothly formed by piecewise, intersecting segments.

Figure 40:
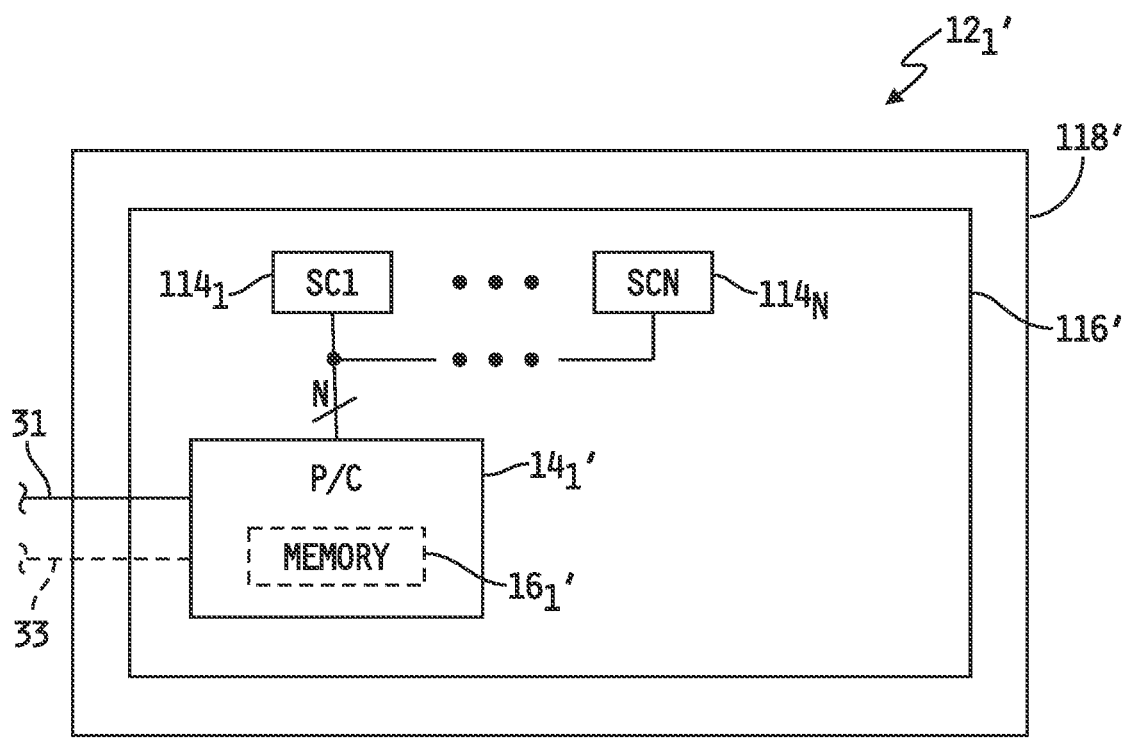
FIG. 40 is a simplified block diagram schematic of an embodiment of the object detection module illustrated in FIG. 38.

Referring now to FIG. 40, one example embodiment $12'_1$ is shown of the object detection module 12' illustrated in FIG. 38. In the illustrated embodiment, the object detection module $12'_1$ includes an embodiment $14'_1$ of the at least one processor or controller 14 as well as an embodiment $16'_1$ of the at least one memory unit 16, as illustrated in FIG. 38. As described hereinabove, it will be understood that the terms "processor" and "controller" used in this disclosure is comprehensive of any computer, processor, microchip processor, integrated circuit, or any other element(s), whether singly or in multiple parts, capable of carrying programming for performing the functions specified in the claims and this written description. The at least one processor or controller $14'_1$ may be a single such element which is resident on a printed circuit board with the other elements of the inventive access system. It may, alternatively, reside remotely from the other elements of the system. For example, but without limitation, the at least one processor or controller $14'_1$ may take the form of a physical processor or controller on-board the object detection module $12'_1$. Alternately or additionally, the at least one processor or controller $14'_1$ may be or include programming in the at least one processor or controller 26 of the vehicle control computer 24 illustrated in FIG. 38. Alternatively or additionally still, the at least one processor or controller $14'_1$ may be or include programming in the at least one processor or controller 42 of the actuator driver circuit(s) 40 and/or in the at least one processor or controller 62 of the audio/illumination device driver circuit(s) 60 and/or in at least one processor or controller residing in any location within the motor vehicle in which the system 10' is located. For instance, and without limitation, it is contemplated that one or more operations associated with one or more functions of the object detection module $12'_1$ described herein may be carried out, i.e., executed, by a first microprocessor and/or other control circuit(s) on-board the object detection module $12'_1$, while one or more operations associated with one or more other functions of the object detection module $12'_1$ described herein may be carried out, i.e., executed, by a second microprocessor and/or other circuit(s) remote from the object detection module $12'_1$, e.g., such as the processor or controller 26 on-board the vehicle control computer 24.

The example object detection module $12'_1$ illustrated in FIG. 40 further illustratively includes number N of conventional supporting circuits (SC) $114_1$-$114_N$, wherein N may be any positive integer. The supporting circuit(s) (SC) is/are each electrically connected to the processor or controller $14'_1$, and may include one or more conventional circuits configured to support the operation of the processor or controller $14'_1$ as described above with respect to FIGS. 2, 6A, 7 and 8. Example supporting circuits SC may include, but are not limited to, one or more voltage supply regulation circuits, one or more capacitors, one or more resistors, one or more inductors, one or more oscillator circuits, and the like. In embodiments in which one or more of the UWB transceivers 32 is/are operatively connected to the object detection module $12'_1$, the supporting circuits SC may further include conventional circuitry for conditioning or otherwise pre-processing signals produced by the UWB transceiver(s) 32 and fed directly or sent by the control computer 24 to the object detection module $12'_1$ or, in embodiments in which UWB transceiver signals are sent wireless to the object detection module $12'_1$ by the UWB transceiver(s) 32 and/or the control computer 24, the supporting circuits SC may further include conventional circuitry for wirelessly receiving the UWB transceiver signals. In the embodiment illustrated in FIG. 40, the at least one processor or controller $14'_1$ and the supporting/driver circuits $114_1$-$114_N$ are all mounted to a conventional circuit substrate 116' which is illustratively mounted within a housing 118'.

In the example embodiment $12'_1$ illustrated in FIG. 40, the UWB transceiver(s) of the system 10' are external to the object detection module $12'_1$ and is/are illustratively mounted to the motor vehicle, e.g., as illustrated by example in FIG. 39. In one implementation of this embodiment, the memory device(s) $16'_1$ illustratively has/have instructions stored therein executable by the processor(s) or controller(s) $14'_1$ to process signals produced by the UWB transceiver(s) 32 to operate in the gesture access or inactive mode as described above, depending upon whether a known mobile communication device 34 is determined, as described above, to be within or outside of the perimeter P, e.g., within or out of UWB signal communication range. In some such implementations, the UWB transceiver signals may be raw or conditioned transceiver signals sent by the UWB transceiver(s) 32 or the control computer 24. In such implementations the memory device(s) $16'_1$ includes instructions stored therein executable by the processor(s) or controller(s) $14'_1$ to process such UWB signals to determine time difference values each between a different one of a plurality of UWB activation signals, i.e., control signals produced by the control computer 24 or the processor(s)/controller(s) $14'_1$ to cause the UWB transceiver(s) 32 to emit one or more UWB radiation signals outwardly away from the motor vehicle, and a respective UWB radiation detection signal, i.e., a UWB radiation signal reflected by an object back toward and detected by the respective UWB transceiver 32, as described hereinabove with respect to the system 10. If operating in the gesture access mode, as briefly described above and as will be described in greater detail below, the at least one memory device $16'_1$ further has stored therein instructions executable by the at least one processor or controller $14'_1$ to process a plurality of successive ones of the time difference values to determine whether an object is within the sensing region of the respective UWB transceiver 32 (wherein the sensing region is as described above with respect to the system 10) and to determine whether the object within the sensing region of the respective UWB transceiver 32 is exhibiting a predefined gesture (also as described above with respect to the system 10). The predefined gesture is illustratively stored in the memory device(s) $16'_1$ in the form of a predefined sequence of time difference values or other suitable form. If operating in the inactive mode, as briefly described above and as will be described in greater detail below, the at least one memory device $16'_1$ further has instructions stored therein executable by the at least one processor or controller $14'_1$ to not act on, i.e., ignore, UWB radiation detection signals if received directly from the UWB transceiver(s) 32 and/or from the control computer 24 in any form. In some alternate embodiments in which the object detection module $12'_1$ receives the UWB detection signals from the control computer 24, the control computer 24 may be configured to withhold, i.e., to not send or transmit, the UWB detection signals to the object detection module 12'$_1$ when operating in the inactive mode, and in such embodiments the object detection module 12'$_1$ does not receive UWB detection signals when operating in the inactive mode. In some alternate implementations, the UWB transceiver signals may be processed by the control computer 24 to determine the time difference values, and to then send or transmit the UWB transceiver activation and reflection signals to the object detection module 12'$_1$ in the form of a plurality of time difference values, and the instructions stored in the memory device(s) 16'$_1$ include instructions executable by the processor(s) or controller(s) 14'$_1$ to process the received time difference values as just described.

Figure 41:
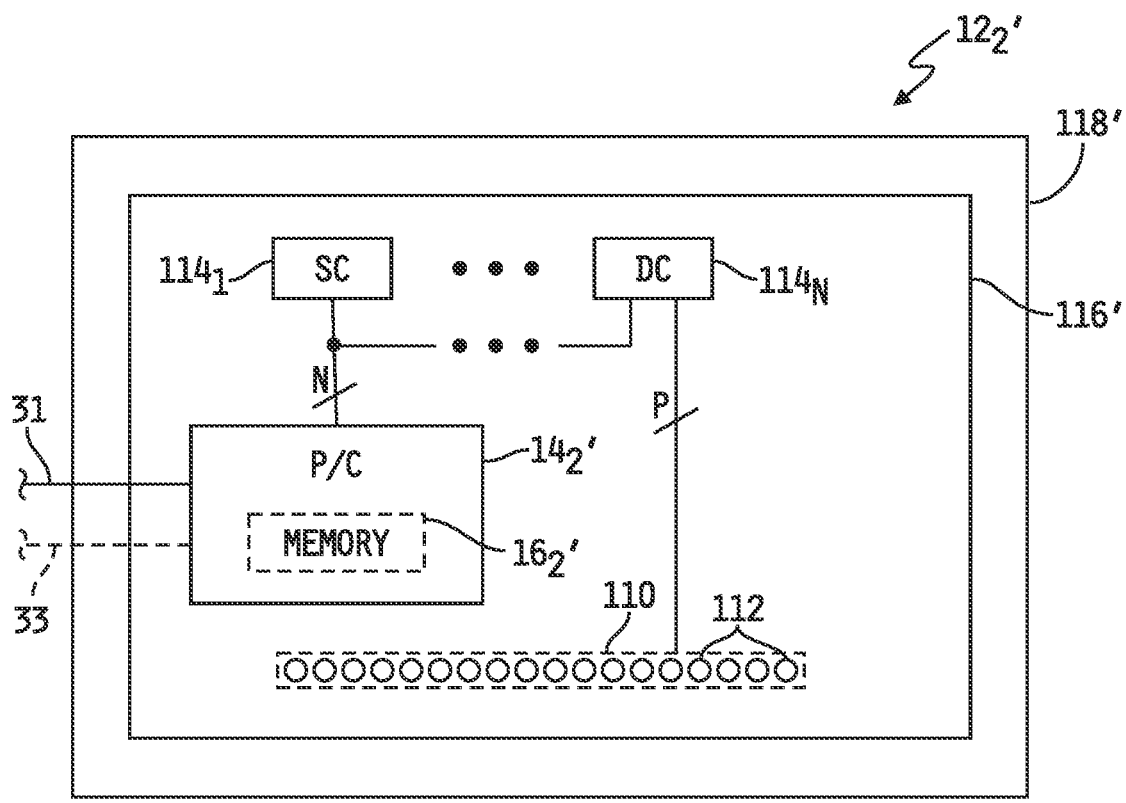
FIG. 41 is a simplified block diagram schematic of another embodiment of the object detection module illustrated in FIG. 38.

Referring now to FIG. 41, another one example embodiment 12'$_2$ is shown of the object detection module 12' illustrated in FIG. 38. In the illustrated embodiment, the object detection module 12'$_2$ includes an embodiment 14'$_2$ of the at least one processor or controller 14 as well as an embodiment 16'$_2$ of the at least one memory unit 16, wherein the terms "processor" and "controller" are as described above with respect to the embodiment 12'$_1$ of the object detection module 12'. The object detection module 12'$_2$ further illustratively includes number N of conventional supporting circuits (SC) 114$_1$-114$_N$ and driver circuits (DC) operatively connected to the at least one processor 14'$_2$, wherein N may be any positive integer. The supporting circuit(s) (SC) may be as described above with respect to the embodiment 12'$_1$ of the object detection module 12'. In the example embodiment 12'$_2$ illustrated in FIG. 41, the UWB transceiver(s) of the system 10' are, like the embodiment 12'$_1$, external to the object detection module 12'$_2$ and is/are illustratively mounted to the motor vehicle, e.g., as illustrated by example in FIG. 39.

The embodiment of the object detection module 12'$_2$ illustrated in FIG. 41 further includes one or more illumination devices 112. In some embodiments which include a plurality of illumination devices 112, the illumination devices 112 may be spaced apart at least partially across the sensing region of the nearest UWB transceiver(s) 32, and in other embodiments the illumination devices 112 may be positioned remotely from the sensing region. In some embodiments, the illumination devices 112 may be arranged in the form of a linear or non-linear array 110 of equally or non-equally spaced-apart illumination devices. In some embodiments, the at least one illumination device 112 includes at least one LED configured to emit radiation in the visible spectrum. In such embodiments, the at least one LED may be configured to produce visible light in a single color or in multiple colors. In alternate embodiments, the plurality of illumination sources may include one or more conventional non-LED illumination sources.

The one or more illumination devices 112 is/are illustratively included to provide visual feedback of one or more conditions relating to detection of an object within a sensing region of the UWB transceiver(s) 32. In one example embodiment, two illumination devices 112 may be provided for producing the desired visual feedback. In one implementation of this example embodiment, a first one of the illumination devices 112 may be configured and controlled to illuminate with a first color to visibly indicate the detected presence of an object within the sensing region, and the second illumination device 112 may be configured and controlled to illuminate with a second color, different from the first, to visibly indicate that the detected object exhibits a predefined gesture. In another example embodiment, three illumination devices 112 may be provided. In this embodiment, a first one of the illumination devices 112 may be controlled to illuminate with a first color to visibly indicate the detected presence of an object within an area of the sensing region in which it is not possible to determine whether the detected object exhibits a predefined gesture (e.g., the object may be within a sub-region of the sensing region which is too small to allow determination of whether the object exhibits the predefined gesture), a second one of the illumination devices 112 is controlled to illuminate with a second color to visibly indicate the detected presence of an object within an area of the sensing region in which it is possible to determine whether the detected object exhibits a predefined gesture, and a third one of the illumination devices is controlled to illuminate with a third color to visibly indicate that the object within the sensing region is exhibiting a predefined gesture.

In other embodiments, the one or more illumination devices 112 may include any number of illumination devices. Multiple illumination devices 112, for example, may be illuminated in one or more colors to provide a desired visual feedback. In any such embodiments, in one or more illumination devices 112 may be LEDs, and one or more such LEDs may illustratively be provided in the form of RGB LEDs capable of illumination in more than one color. According to this variant, it will be appreciated that positive visual indication of various states of operation may be carried out in numerous different colors, with each such color indicative of a different state of operation of the object detection module 12'$_2$. As one non-limiting example, the color red may serve to indicate detection of an object (e.g., a hand or foot) within a portion of the sensing region in which it cannot be determined whether the detected object is exhibiting a predefined gesture. The color green, in contrast, may serve to indicate that the detected object is exhibiting a predefined gesture and, consequently, that the predefined vehicle command associated with that predefined gesture (e.g., unlocking the vehicle closure, opening the vehicle closure, etc.) is being effected. In addition to green, other colors might be uniquely associated with different predefined commands. Thus, while green illumination might reflect that a closure for the vehicle is being unlocked, blue illumination, for example, may reflect that a fuel door latch has been opened, purple illumination may reflect that a window is being opened, etc.

In still other embodiments, in addition to or alternatively to color distinction, different operating modes, i.e., different detection or operating modes may be visually distinguished from one another by controlling the at least one illumination device 112 to switch on and off with different respective frequencies and/or duty cycles. In some embodiments which include multiple illumination devices 112, the different detection or operating modes may be additionally or alternatively distinguished visually from one another by activating different subsets of the multiple illumination devices 112 for different operating or detection modes, and/or by sequentially activating the multiple illumination devices 112 or subsets thereof with different respective activation frequencies and/or duty cycles. In any case, the output(s) of the driver circuit(s) (DC) is/are operatively connected to the one or more illumination devices 112 as illustrated by example in FIG. 41. The one or more driver circuits DC may illustratively be or include any conventional circuits for driving, i.e., actuating, the one or more illumination devices 112.

In the embodiment illustrated in FIG. 41, the at least one processor or controller 14'$_2$, the supporting/driver circuits $114_1$-$114_N$ and the one or more illumination devices 112 are all mounted to a conventional circuit substrate 116' which is illustratively mounted within a housing 118'. In alternate embodiments, the circuit substrate 116' may be provided in the form of two or more separate circuit substrates, and in such embodiments one or more of the illumination devices 112, the at least one processor or controller $14'_2$ and the supporting/driver circuits $114_1$-$114_N$ may be mounted to a first one of the two or more circuit substrates and remaining one(s) of the one or more of the illumination devices 112, the at least one processor or controller $14'_2$ and the supporting/driver circuits $114_1$-$114_N$ may be mounted to other(s) of the two or more circuit substrates. In some such embodiments, all such circuit substrates may be mounted to and/or within a single housing 118', and in other embodiments at least one of the two or more of the circuit substrates may be mounted to and/or within the housing 118' and one or more others of the two or more circuit substrates may be mounted to or within one or more other housings. In embodiments which the object detection module $12'_2$ includes multiple housings, two or more such housings may be mounted to the motor vehicle at or near a single location, and in other embodiments at least one of the multiple housings may be mounted to the motor vehicle at a first location and at least another of the multiple housings may be mounted to the motor vehicle at a second location remote from the first location.

In one implementation of the embodiment $12'_2$ illustrated in FIG. 41, the memory device(s) $16'_2$ illustratively has/have instructions stored therein executable by the processor(s) or controller(s) $14'_2$ to process signals produced by the UWB transceiver(s) 32 to operate in the gesture access or inactive mode, according to any of the different ways described above with respect to the embodiment $12'_1$, depending upon whether a known mobile communication device 34 is determined, as described above, to be within or outside of the perimeter P, e.g., within or out of UWB signal communication range. Additionally in this embodiment, the memory device(s) $16'_2$ further illustratively has/have instructions stored therein executable by the processor(s) or controller(s) $14'_2$ to control the illumination device(s) 112 according to any of the different ways just described.

Figure 42:
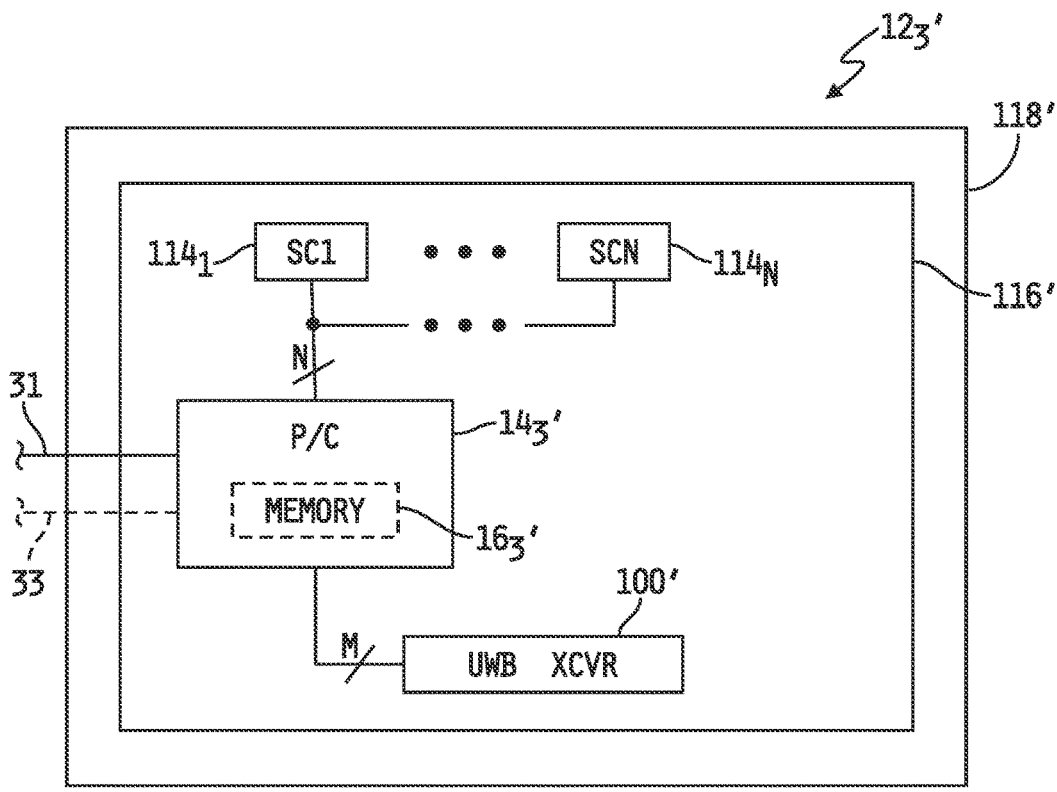
FIG. 42 is a simplified block diagram schematic of yet another embodiment of the object detection module illustrated in FIG. 38.

Referring now to FIG. 42, yet another example embodiment $12'_3$ is shown of the object detection module 12' illustrated in FIG. 38. In the illustrated embodiment, the object detection module $12'_3$ includes an embodiment $14'_3$ of the at least one processor or controller 14 as well as an embodiment $16'_3$ of the at least one memory unit 16, wherein the terms "processor" and "controller" are as described above with respect to the embodiment $12'_1$ of the object detection module 12'. As with the example object detection module $12'_1$ illustrated in FIG. 40, the object detection module $12'_3$ further illustratively includes number N of conventional supporting circuits (SC) $114_1$-$114_N$ operatively connected to the at least one processor $14'_3$, wherein N may be any positive integer. The supporting circuit(s) (SC) may be as described above with respect to the embodiment $12'_1$ of the object detection module 12'.

In the example embodiment illustrated in FIG. 42, the object detection module $12'_3$ illustratively includes a number, M, of UWB transceivers 100', where M many be any positive integer. In some embodiments, the motor vehicle may also include any number of the UWB transceivers 32, e.g., as illustrated by example in FIG. 39, and in other embodiments the motor vehicle may not include any UWB transceivers 32 such that all of the UWB transceivers carried by the motor vehicle is/are that/those included with the one or more object detection modules $12'_3$. In any case, the UWB transceiver(s) 100' may be as described above with respect to the UWB transceivers 32.

In the embodiment illustrated in FIG. 42, the at least one processor or controller $14'_3$, the supporting/driver circuits $114_1$-$114_N$ and the one or more UWB transceivers 100' are all mounted to a conventional circuit substrate 116' which is illustratively mounted within a housing 118'. In alternate embodiments, the circuit substrate 116' may be provided in the form of two or more separate circuit substrates, and in such embodiments one or more of the UWB transceiver(s) 100', the at least one processor or controller $14'_3$ and the supporting/driver circuits $114_1$-$114_N$ may be mounted to a first one of the two or more circuit substrates and remaining one(s) of the one or more of the UWB transceiver(s) 100', the at least one processor or controller $14'_3$ and the supporting/driver circuits $114_1$-$114_N$ may be mounted to other(s) of the two or more circuit substrates. In one example of this alternate embodiment, which should not be considered to be limiting in any way, the UWB transceiver(s) 100' may all be mounted to a one substrate and the remaining components may be mounted to a separate substrate. In any such embodiments, all such circuit substrates may be mounted to and/or within a single housing 118', and in other embodiments at least one of the two or more of the circuit substrates may be mounted to and/or within the housing 118' and one or more others of the two or more circuit substrates may be mounted to or within one or more other housings. In embodiments which the object detection module $12'_3$ includes multiple housings, two or more such housings may be mounted to the motor vehicle at or near a single location, and in other embodiments at least one of the multiple housings may be mounted to the motor vehicle at a first location and at least another of the multiple housings may be mounted to the motor vehicle at a second location remote from the first location.

In embodiments in which one or more UWB transceivers 32 is/are mounted to the motor vehicle in addition to the one or more UWB transceivers 100', and as illustrated by example in FIG. 39, the memory device(s) $16'_3$ illustratively has/have instructions stored therein executable by the processor(s) or controller(s) $14'_3$ to control activation of the one or more UWB transceivers 100' and to process corresponding reflected UWB radiation signals, i.e., reflected by an object, to operate in the gesture access or inactive mode as described above, depending upon whether a known mobile communication device 34 is determined, either by the control computer 24 via the UWB transceivers 32 or by the processor(s)/controller(s) $14'_3$ via the UWB transceiver(s) 32 and/or via the UWB transceiver(s) 100', to be within or outside of the perimeter P, e.g., within or out of UWB signal communication range. In other embodiments in which no UWB transceivers 32 is/are mounted to the motor vehicle, the memory device(s) $16'_3$ illustratively has/have instructions stored therein executable by the processor(s) or controller(s) $14'_3$ to control activation of the one or more UWB transceivers 100' and to process corresponding reflected UWB radiation signals to operate in the gesture access or inactive mode as described above, depending upon whether a known mobile communication device 34 is determined, by the processor(s)/controller(s) $14'_3$ via the UWB transceiver(s) 100', to be within or outside of the perimeter P.

Figure 43:
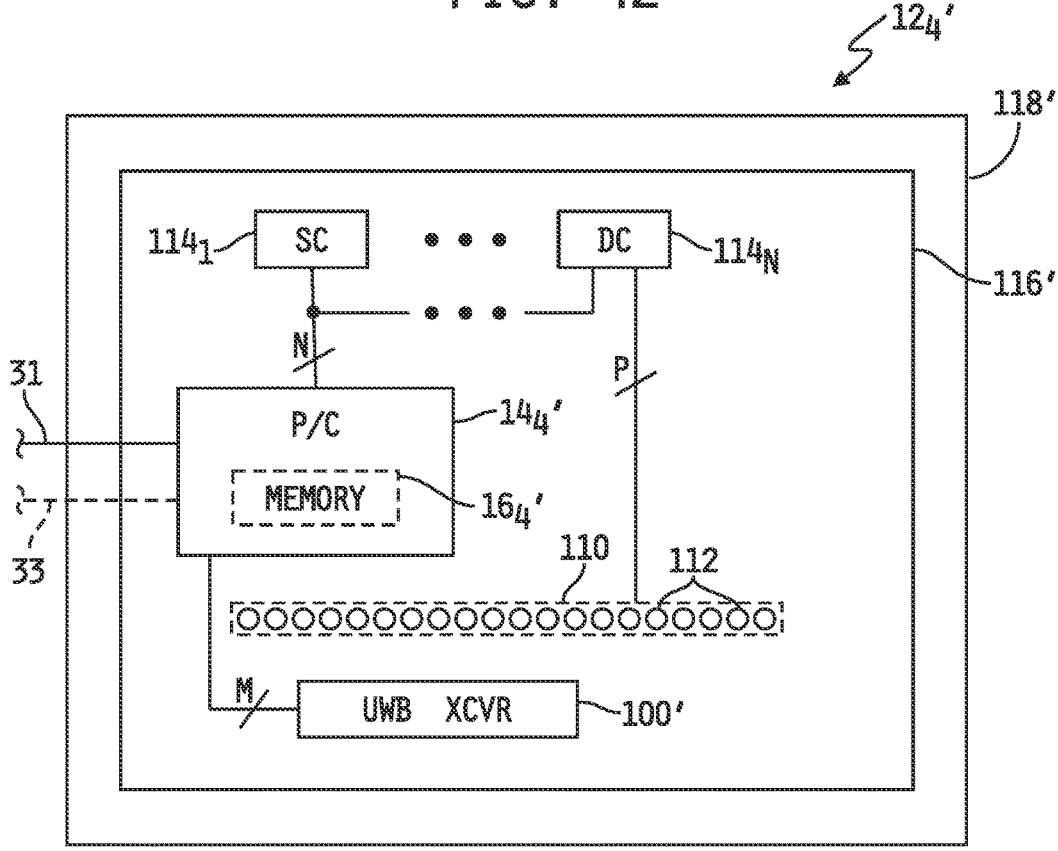
FIG. 43 is a simplified block diagram schematic of still another embodiment of the object detection module illustrated in FIG. 38.

Referring now to FIG. 43, still another example embodiment $12'_4$ is shown of the object detection module 12' illustrated in FIG. 38. In the illustrated embodiment, the object detection module $12'_4$ includes an embodiment $14'_4$ of the at least one processor or controller 14 as well as an embodiment 16'₄ of the at least one memory unit 16, wherein the terms "processor" and "controller" are as described above with respect to the embodiment 12'₁ of the object detection module 12'. As with the example object detection module 12'₂ illustrated in FIG. 41, the object detection module 12'₄ further illustratively includes number N of conventional supporting circuits (SC) 114₁-114ₙ and driver circuits (DC) operatively connected to the at least one processor 14'₄, wherein N may be any positive integer. The supporting circuit(s) (SC) and driver circuits (DC) may be as described above.

In the example embodiment illustrated in FIG. 43, the object detection module 12'₄ illustratively includes a number, M, of UWB transceivers 100', where M many be any positive integer, where the UWB transceivers 100' may be as described above. In some embodiments, the motor vehicle may also include any number of the UWB transceivers 32, e.g., as illustrated by example in FIG. 39, and in other embodiments the motor vehicle may not include any UWB transceivers 32 such that all of the UWB transceivers carried by the motor vehicle is/are that/those included with the one or more object detection modules 12'₄. Also in the example embodiment illustrated in FIG. 43, the object detection module 12'₄ further includes one or more illumination device 112 operatively connected to the one or more driver circuits (DC). The one or more illumination devices may take any of the forms, and be controlled to operate, as described above with respect to the embodiment 12'₂ illustrated in FIG. 41.

In the embodiment illustrated in FIG. 43, the at least one processor or controller 14'₄, the supporting/driver circuits 114₁-114ₙ, the one or more UWB transceivers 100' and the one or more illumination devices 112 are all mounted to a conventional circuit substrate 116' which is illustratively mounted within a housing 118'. In alternate embodiments, the circuit substrate 116' may be provided in the form of two or more separate circuit substrates, and in such embodiments one or more of the UWB transceiver(s) 100', the one or more illumination devices 112, the at least one processor or controller 14'₄ and the supporting/driver circuits 114₁-114ₙ may be mounted to a first one of the two or more circuit substrates and remaining one(s) of the one or more of the UWB transceiver(s) 100', the one or more illumination devices 112, the at least one processor or controller 14'₄ and the supporting/driver circuits 114₁-114ₙ may be mounted to other(s) of the two or more circuit substrates. In such embodiments, all such circuit substrates may be mounted to and/or within a single housing 118', and in other embodiments at least one of the two or more of the circuit substrates may be mounted to and/or within the housing 118' and one or more others of the two or more circuit substrates may be mounted to or within one or more other housings. In embodiments which the object detection module 12'₄ includes multiple housings, two or more such housings may be mounted to the motor vehicle at or near a single location, and in other embodiments at least one of the multiple housings may be mounted to the motor vehicle at a first location and at least another of the multiple housings may be mounted to the motor vehicle at a second location remote from the first location.

In embodiments in which one or more UWB transceivers 32 is/are mounted to the motor vehicle in addition to the one or more UWB transceivers 100', and as illustrated by example in FIG. 39, the memory device(s) 16'₄ illustratively has/have instructions stored therein executable by the processor(s) or controller(s) 14'₄ to control activation of the one or more UWB transceivers 100' and to process corresponding reflected UWB radiation signals, i.e., reflected by an object, to operate in the gesture access or inactive mode as described above, depending upon whether a known mobile communication device 34 is determined, either by the control computer 24 via the UWB transceivers 32 or by the processor(s)/controller(s) 14'₄ via the UWB transceiver(s) 32 and/or via the UWB transceiver(s) 100', to be within or outside of the perimeter P, e.g., within or out of UWB signal communication range, and to control operation, i.e., activation and deactivation, of the one or more illumination devices 112 as described above with respect to the object detection module 12'₂ illustrated in FIG. 41. In other embodiments in which no UWB transceivers 32 is/are mounted to the motor vehicle, the memory device(s) 16'₄ illustratively has/have instructions stored therein executable by the processor(s) or controller(s) 14'₄ to control activation of the one or more UWB transceivers 100' and to process corresponding reflected UWB radiation signals to operate in the gesture access or inactive mode as described above, depending upon whether a known mobile communication device 34 is determined, by the processor(s)/controller(s) 14'₄ via the UWB transceiver(s) 100', to be within or outside of the perimeter P, and to control operation, i.e., activation and deactivation, of the one or more illumination devices 112 as described above with respect to the object detection module 12'₂ illustrated in FIG. 41.

Figure 44:
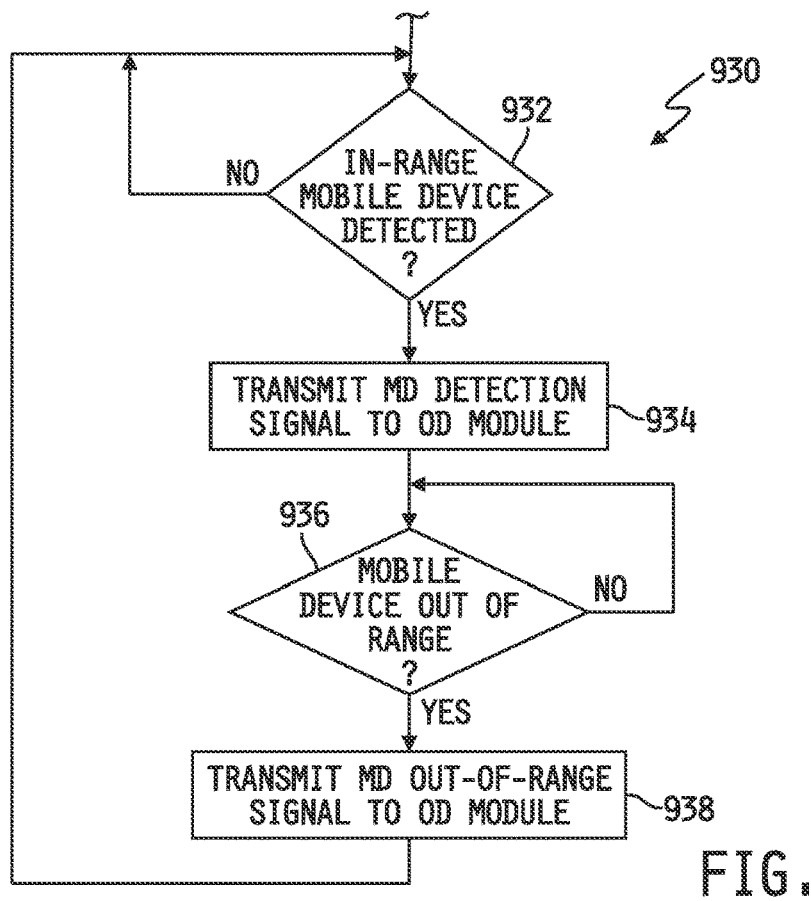
FIG. 44 is a simplified flowchart of an embodiment of a process for determining by the vehicle control computer or the object detection module whether a known mobile communicate device is within ultra-wideband communication range of the motor vehicle.

Referring now to FIG. 44, a simplified flowchart is shown of a process 930 for determining whether a known mobile communication device (MCD) 34, i.e., known to the control computer 24 of the motor vehicle and/or to the at least one processor or controller 14 of one or more object detection modules 12' mounted to the motor vehicle, is within our outside of the perimeter, P, illustrated by example in FIG. 39. An MCD 34 will be known to the control computer 24 of the motor vehicle and/or to the at least one processor or controller 14 of one or more object detection modules 12' mounted to the motor vehicle if, as described above with respect to FIG. 39, the MCD 34 has been previously paired, linked or otherwise configured in a conventional manner for UWB communications with the control computer 24 and/or with the at least one processor or controller 14 of one or more object detection modules 12' to the exclusion, with respect to the particular MCD 34, of vehicle control computers 24 and/or object detection modules 12' of other motor vehicles, and to the exclusion, with respect to the control computer 24 of the particular motor vehicle, of other MOD's 34 that have not been previously linked, paired or otherwise configured for UWB communications therewith. In any case, the at least one processor or controller 26 of the vehicle control computer 24, or in some embodiments, the at least one processor or controller 14 of one or more of the object detection modules 12', is configured to produce a mobile device status signal (MDSS) having a state or value which depends on whether the particular MCD 34 is within or outside of the perimeter P.

In the example process 930 illustrated in FIG. 44, the perimeter, P, is illustratively implemented in the form of a communication boundary defined by the range of UWB signal communications, i.e., within the perimeter, P, the UWB transceiver 88 of a known MCD 34 is within UWB communication range of one or more of the UWB transceivers 32 mounted to the motor vehicle and/or the UWB transceiver 100' of one or more object detection modules 12' mounted to the motor vehicle, and outside of the perimeter, P, the UWB transceiver 88 is outside of UWB communication range with the transceivers 32, 100'. The actual range of UWB signal communications, and thus the boundary, P, defined thereby, illustratively depends on a number of factors including, for example, but not limited to, the actual UWB frequency or frequencies used, the signal strengths implemented in the UWB transceivers 34 and 88, battery charge level (in the case of the MCD 34), and the environment in which the motor vehicle is located (e.g., in a garage or other indoor location vs. outside, in an open area vs. crowded parking garage, etc.). It will be understood that whereas the process 930 illustrated in FIG. 44 will be described with respect to the perimeter, P, being defined as the boundary of UWB signal communications as just described, other perimeters, based on one or more additional or alternative criteria, may alternatively be defined and implemented in the process 930.

In embodiments in which the control computer 24 of the motor vehicle is configured to determine the proximity thereto of a known MCD 34, the process 930 is illustratively stored in the at least one memory 28 of the vehicle control computer 24 in the form of instructions executable by the at least one processor or controller 26 of the vehicle control computer 24 to cause the at least one processor or controller 26 to execute the corresponding functions. In other embodiments in which the at least one processor or controller 14 of one or more of the object detection modules 12' mounted to the motor vehicle is configured to determine the proximity thereto of a known MCD 34, the process 930 is illustratively stored in the at least one memory 16 of one or more of the object detection modules 12' in the form of instructions executable by the at least one processor or controller 14 thereof to cause the at least one processor or controller 14 to execute the corresponding functions. It will be understood that in some alternate embodiments, such instructions may be stored, in whole or in part, in any one or more of the memory units illustrated in FIG. 38, e.g., in one or more of the memory 44 of the actuator driver circuit(s) 40 and the memory 64 of the audio/illumination device driver circuit(s) 60, and executed, in whole or in part, by any one or more of the processors or controllers illustrated in FIG. 38. For purposes of the following description, the process 930 will be described as being executed by the at least one processor or controller 26 of the vehicle control computer 24, it being understood that the process 930 may alternatively or additionally be executed, in whole or in part, by one or more of the processors or controllers 14, 42, 62.

The process 930 illustratively begins at step 932 where the processor or controller 26 is operable to determine whether an in-range mobile communication device (MCD) 34, i.e., an MCD 34 known to the processor or controller 26, has been detected. In some embodiments, the processor or controller 86 of an MCD 34 is configured to continually or periodically initiate or attempt UWB communications with a vehicle control computer 24 known to it by activating the UWB transceiver 88 to emit one or more UWB radiation signals and then waiting for a time period to determine whether a matching or otherwise expected return UWB radiation signal, emitted by one or more UWB transceivers 32 under the control of a vehicle control computer 24 known to the MCD 34, is received by the UWB transceiver 88. In alternate embodiments, the processor or controller 26 of a vehicle control computer 24 is configured to continually or periodically initiate or attempt UWB communications with an MCD 34 known to it by activating one or more of the UWB transceivers 32 to emit one or more UWB radiation signals and then waiting for a time period to determine whether a matching or otherwise expected return UWB radiation signal, emitted by the UWB transceiver 88 under the control of a processor or controller 86 of an MCD 34 known to the processor or controller 26 of a vehicle control computer 24, is received by one or more of the UWB transceivers 32. In any case, until such and in-range MCD 34 is detected, the process 930 loops back to step 932. Upon detection of such an in-range MCD 34, the process 930 advances to step 934 where the at least one processor or controller 26 of the vehicle control computer 24 is operable to produce and transmit to the at least one processor or controller 14 of one or more of the object detection modules 12' the mobile device status signal, MDSS, having a state or value corresponding to detection of the mobile communication device 34, e.g., corresponding to the known MCD 34 being within the perimeter, P, defined about the motor vehicle 70 as illustrated by example in FIG. 39. This state of the MDSS signal may illustratively be any signal that notifies the at least one processor or controller 14 of one or more of the object detection modules 12' of an in-range MCD 34, examples of which include, but are not limited to, one or more analog signals, one or more analog or digital flags, one or more digital data values, or the like.

Following step 934, the processor or controller 26 is operable at step 936 to determine whether the previously in-range mobile communication device (MCD) 34 is now out of range. As long as the in-range MCD 34 remains in-range, i.e., remains within the perimeter P illustrated in FIG. 39, the processor or controller 86 of the in-range MCD 34 and the at least one processor or controller 26 of the corresponding vehicle control computer 24 continue to exchange UWB communication signals, i.e., by continually or periodically activating the respective UWB transceiver 88 and one or more UWB transmitters 32 and then waiting for corresponding time periods for return UWB signals emitted by the other, and in this manner the at least one processor or controller 26 of the vehicle control computer 24 is configured to determine whether an MCD 34 detected as being in-range remains in-range. As long as this is the case, the process 930 loops back on step 936. If/when the at least one processor or controller 26 of the corresponding vehicle control computer 24 no longer receives return UWB radiation signals emitted by the MCD 34 within an expected time period following activation of one or more of the UWB transceivers 32, and/or following a predefined number of such attempts, the at least one processor or controller 26 of the vehicle control computer 24 determines that the previously in-range MCD 34 is now out of range, the process 930 advances to step 938 where the at least one processor or controller 26 of the vehicle control computer 24 is operable to produce and transmit to the at least one processor or controller 14 of one or more of the object detection modules 12' the mobile device status signal, MDSS, having a state or value corresponding to an out-of-range mobile communication device 34, e.g., corresponding to the known MCD 34 being outside of the perimeter, P, defined about the motor vehicle 70 as illustrated by example in FIG. 39. This state of the MDSS signal may illustratively be any signal that notifies the at least one processor or controller 14 of one or more of the object detection modules 12' of a now out-of-range MCD 34, examples of which include, but are not limited to, one or more analog signals, one or more analog or digital flags, one or more digital data values, or the like. Following step 938, the process 930 illustratively loops back to step 932. It will be understood that in embodiments in which the at least one processor or controller 14 of one or more of the object detection modules 12' is configured to determine the proximity of a known MCD 34 to the motor vehicle as described above, the at least one processor or controller 14 is configured to produce the MDSS signal but need not "transmit" the MDSS signal elsewhere unless it is to another object detection module 12'.

Figure 45:
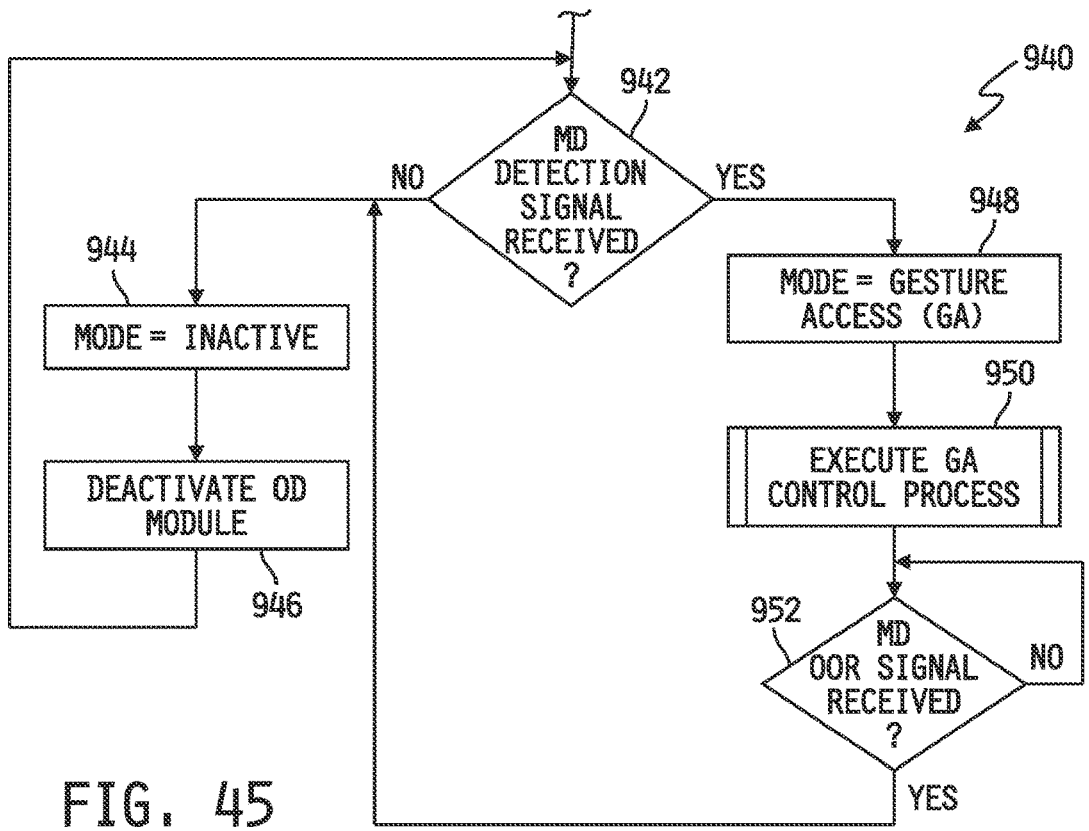
FIG. 45 is a simplified flowchart of an embodiment of a process for executing either of a gesture access process or an inactive mode based upon the status of mobile communication device detection signal resulting from the process illustrated in FIG. 44.

Referring now to FIG. 45, a simplified flowchart is shown of a process 940 for determining whether one or more of the object detection modules 12, 12' is/are to operate in the gesture access mode or the inactive mode, as these modes are described above. In the illustrated embodiment, the determination of whether to operate in the gesture access mode or the inactive mode is dependent upon the outcome of the process 930 illustrated in FIG. 44, i.e., whether the known mobile communication device (MCD) 34, i.e., known to the control computer 24 of the motor vehicle and/or to the at least one processor or controller 14 of one or more object detection modules 12' mounted to the motor vehicle, is within our outside of the perimeter, P, illustrated by example in FIG. 39, and is thus dependent upon the state or value of the module device status signal (MDSS) produced by the at least one processor 26 of the vehicle control computer 24 (or in some alternate embodiments, produced by the at least one processor or controller 14 of one or more of the object detection modules 12' mounted to the motor vehicle). In alternate embodiments, notification of whether a known MCD 34 is within or outside of the perimeter, P, defined about the motor vehicle, e.g., is in-range or out-of-range for UWB signal communications, may be generated by the MCD 34 or by another processor or controller mounted to the motor vehicle.

The process 940 is illustratively stored in the at least one memory 16 of one or more of the object detection modules 12' in the form of instructions executable by the at least one processor or controller 14 thereof to cause the at least one processor or controller 14 to execute the corresponding functions. It will be understood that in some alternate embodiments, such instructions may be stored, in whole or in part, in any one or more of the memory units illustrated in FIG. 38, e.g., in one or more of the memory 44 of the actuator driver circuit(s) 40 and the memory 64 of the audio/illumination device driver circuit(s) 60, and executed, in whole or in part, by any one or more of the processors or controllers illustrated in FIG. 38. For purposes of the following description, the process 940 will be described as being executed by the at least one processor or controller 14 of the one or more of the object detection modules 12', it being understood that the process 940 may alternatively or additionally be executed, in whole or in part, by one or more of the processors or controllers 26, 42, 62.

The process 940 illustratively begins at step 942 where the at least one processor or controller 14 is operable to determine whether a mobile device detection signal has been received; that is, whether the mobile device status signal (MDSS) produced and transmitted to the at least one processor or controller 14 by the processor 26 of the vehicle control computer 24 corresponds to detection of a known MCD 34 within the perimeter, P, defined about the motor vehicle in which the one or more object detection modules 12' is/are mounted, e.g., whether the MDSS signal corresponds to detection of an in-range, known MCD 34. If not, the process 940 follows the "NO" branch of step 942 and advances to steps 944 and 946 where the processor or controller 14 enters an INACTIVE operating mode in which the processor or controller 14 deactivates the corresponding object detection module 12'. In some embodiments, the processor or controller 14 is operable at step 946 to produce and transmit one or more control signals to the remaining object detection modules 12' mounted to the motor vehicle to which the processors or controllers 14 thereof are responsive to deactivate the respective one of those object detection modules 12'. In some alternate embodiments, such one or more control signals may be transmitted to the vehicle control computer 24 which, in turn, transmits such one or more control signals to the remaining object detection modules 12' to which the processors or controllers 14 thereof are responsive to deactivate the respective one of those object detection modules 12'. In any such embodiments, the processor(s) or controller(s) 14 of the one or more object detection modules 12' is/are illustratively operable to "deactivate" the one or more object detection modules 12' by any conventional process or technique which causes the processor or controller 14 thereof to ignore or otherwise not act upon any reflected UWB radiation signals received from one or more UWB transceivers 32 or from any other source (e.g., from the vehicle control computer 24), or in any other form, e.g., time difference signals received from the vehicle control computer 24 or from any other source. In alternate embodiments in which one or more of the object detection modules 12' includes at least one UWB transceiver 100' as described above, the processor(s) or controller(s) 14 of such one or more object detection modules 12' is/are illustratively operable to "deactivate" their respective object detection modules 12' by not activating the respective UWB transceivers 100' for purposes of granting gesture access to a closure of the motor vehicle, i.e., so that no UWB radiation signals will be emitted by any UWB transceiver 100' and ergo no reflected UWB radiation signals will be detected thereby. In any case, following step 946, the process 940 illustratively loops back to step 942.

Figure 46:
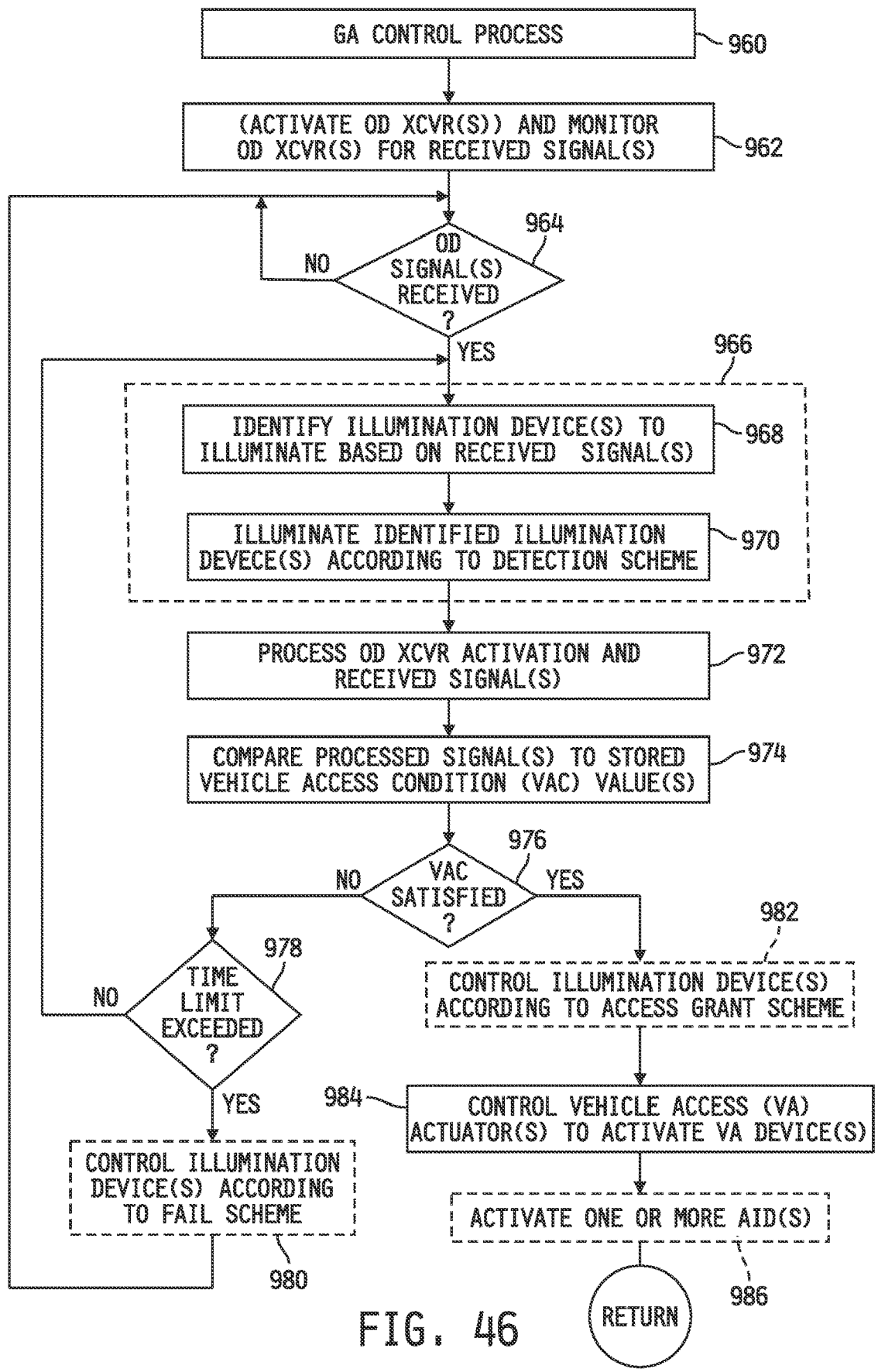
FIG. 46 is a simplified flowchart of an embodiment of a gesture access process activated by the process of FIG. 45.

If, at step 942, the most recent MDSS signal received corresponds to detection of an in-range and known MCD 34, the process 940 advances to steps 948 and 950 where the processor or controller 14 enters a GESTURE ACCESS operating mode to execute a gesture access control process. An example implementation of the gesture access control process is illustrated in FIG. 46 and will be described in detail below. Following step 950, the process 942 illustratively advances to step 952 where the processor or controller 14 continues to monitor the mobile device status signal (MDSS). As long as the MDSS signal continues to correspond to in-range detection of the known MCD 34, the process 940 loops back to the beginning of step 952. At some point, e.g., when the possessor of the in-range MCD 34 exits the motor vehicle and advances beyond the perimeter P defined about the motor vehicle, the processor or controller 26 of the vehicle control computer 24 (or, in some embodiments, the processor or controller 14 of one or more of the object detection modules 12') changes the mobile device status signal (MDSS) produced and transmitted thereby to a state or value corresponding to the previously in-range MCD 34 now being out of range, i.e., beyond perimeter P. When this occurs, the processor or controller 14 of the one or more object detection modules 12' is responsive to the now out of range MDSS state or value to loop from the "NO" branch of step 952 to steps 944 and 946 where the processor or controller 14 enters the INACTIVE mode described above.

Referring now to FIG. 46, a simplified flowchart is shown of an embodiment of a gesture access control process 960 that may be executed at step 950 of the process 940 illustrated in FIG. 45. The process 960 is illustratively stored in the at least one memory 16 of one or more of the object detection modules 12' in the form of instructions executable by the at least one processor or controller 14 thereof to cause the at least one processor or controller 14 to execute the corresponding functions. It will be understood that in some alternate embodiments, such instructions may be stored, in whole or in part, in any one or more of the memory units illustrated in FIG. 38, e.g., in one or more of the memory 28 of the vehicle control computer 24, the memory 44 of the actuator driver circuit(s) 40 and the memory 64 of the audio/illumination device driver circuit(s) 60, and executed, in whole or in part, by any one or more of the processors or controllers illustrated in FIG. 38. For purposes of the following description, the process 960 will be described as being executed by the at least one processor or controller 14 of the one or more of the object detection modules 12', it being understood that the process 960 may alternatively or additionally be executed, in whole or in part, by one or more of the processors or controllers 26, 42, 62. For purposes of the following description, the process 960 will be described as being executed by the processor or controller 14, it being understood that the process 960 may alternatively or additionally be executed, in whole or in part, by one or more of the processors or controllers 26, 42, 62.

The process 960 is illustratively executed by any one or more, or all, of the object detection modules 12, 12' mounted to the motor vehicle, e.g., any of the object detection modules 12, 12' mounted to the motor vehicle in the example illustrated in FIG. 39. In this regard, decisions and commands made or generated by the processor or controller 14 of one object detection module 12, 12' may be communicated to others of the object detection modules 12, 12' so that the processors or controllers 14 of such other object detection modules 12, 12' can act on the same decisions and/or carry out the same commands. It will be understood that some embodiments of the object detection module 12, 12' may not include one or more components of other object detection modules 12, 12'. In this regard, dashed-line boxes are illustratively shown around some of the steps or groups of steps of the process 960 to identify steps which are part of the process 960 when the object detection module 12' includes at least one illumination device 112. With the exception of step 986, such steps are illustratively omitted in embodiments in which the object detection module 12' does not include any such illumination devices 112.

The process 960 illustratively begins at step 962. In some embodiments of the object detection module(s) 12', the processor or controller 14 is operable at step 962 to activate one or more of the UWB transceivers 32 to emit UWB radiation and to then monitor the one or more UWB transceivers 32 for detection of reflected UWB radiation signals. In other embodiments, the object detection module(s) 12, 12' may include(s) one or more object detection transceivers, e.g., 102, 104 or 132, 134 in the case of the object detection module(s) 12, and 100' in the case of the object detection module(s) 12', and in such embodiments the processor or controller 14 may be operable at step 962 to activate one or more of the transmitter(s) 102, 132 or transceiver(s) 100' to emit radiation and to monitor the one or more transmitter(s) 104, 134 or transceivers 100' for detection of reflected radiation signals. In still other embodiments, the UWB transceivers 32 are activated, i.e., to emit UWB radiation, by operation of the processor or controller 26 of the vehicle control computer 24 or other processor/controller, and in such embodiments the processor or controller 14 is operable to receive the timing or other indicator of UWB transceiver activation from the processor or controller 26 or other processor/controller, and to then monitor for reflected UWB radiation signals. In some such embodiments, the processor or controller 14 of the object detection module(s) 12' is operable at step 962 to monitor the one or more UWB transceivers 32 directly for reflected UWB radiation signals, and in other embodiments the processor or controller 14 is operable to monitor the vehicle control computer 24 or other processor/controller to receive the from the control computer 24 or other processor/controller the reflected UWB radiation signals received thereby. In some embodiments, the reflected UWB radiation signals received from the control computer 24 or other processor/controller are the raw or pre-conditioned transceiver signals, and in other embodiments the reflected UWB radiation signals are received from the control computer 24 or other processor/controller in the form of timing, relative to the timing of transceiver activation, of receipt by the control computer 24 or other processor/controller of the reflected UWB radiation signals. In the latter case, the processor or controller 14 may receive the UWB transceiver information in the form of timing values of each of the UWB transceiver activation signals and the corresponding reflected UWB radiation signals, or in the form of time difference values each corresponding to a difference between a UWB transceiver activation signal and receipt of a corresponding reflected UWB radiation signal. In any case, the process 960 advances from step 962 to step 964 where the processor or controller 14 is operable to determine whether reflected radiation signals, e.g., in any of the forms described above, have been received. If not, the process 960 loops back to the beginning of step 964.

In embodiments in which the object detection module 12, 12' includes one or more illumination devices, the process 960 illustratively includes step 966 to which the process 960 advances following the "YES" branch of step 964. In other embodiments in which the object detection module 12, 12' does not include one or more illumination devices 112, the process 960 does not include step 966 and the process 960 advances from the "YES" branch of step 964 to step 972. If included, step 966 illustratively includes step 968 in which the processor or controller 14 is operable to identify one or more illumination devices 112 to illuminate based on the received object detection (OD) signal(s) produced by the radiation emission and detection assembly 100, 130 in the case of object detection module(s) 12 or based on reflected UWB radiation signals received, in any of the forms described above, from one or more of the UWB transceivers 32 in the case of object detection module(s) 12'. Thereafter at step 970, the processor or controller 14 is operable to control one or more of the driver circuit(s) DC to illuminate the identified illumination device(s) 112 according to a predefined detection scheme. The predefined detection scheme may illustratively take any of the forms described above with respect to step 708 of the process 700 illustrated in FIG. 35.

Following step 966, in embodiments which include step 966, and otherwise following the "YES" branch of step 964, the processor or controller 14 is operable at steps 972, 974 and 976 to process (at step 972) the activation and reflected radiation signals, as these signals are described above with respect to step 962, to compare (at step 974) the processed signals to one or more vehicle access condition (VAC) values stored in the memory 16 (or the memory 28, 42 and/or 64), and to then determine (at step 976) whether VAC is satisfied. In some embodiments, the processor or controller 14 is operable to process the activation and reflected radiation signals to determine time difference values between the activation and reflected radiation signals if not already provided in this form to the processor or controller 14, e.g., by the processor or controller 26 of the vehicle control computer 24 and/or by another processor or controller, and in such embodiments the stored VAC value(s) illustratively correspond to a predetermined sequence or other collection of time difference values suitable for comparison with the time difference values determined by the processor or controller 14 based on the activation and reflected radiation signals. In other embodiments, the processor or controller 14 may be operable to process the activation and reflected radiation signals according to one or more alternate signal processing strategies, and in such embodiments the stored VAC value(s) illustratively correspond to a predetermined sequence or other collection of like signals and/or values suitable for comparison with the processed signals and/or values determined by the processor or controller 14 based on the activation and reflected radiation signals.

If, at step 976, the processor or controller 14 determines that, resulting from comparison of the processed activation and reflected radiation signals with the stored VAC value(s), VAC is not satisfied; that is, the processed activation and reflected radiation signals do not match the stored VAC value(s), the process 960 illustratively advances to step 978 where the processor or controller 14 is operable to determine whether a time limit has been exceeded. In some embodiments, the time limit at step 978 is a stored time limit within which the processor or controller 14 is expected to execute steps 972-976. In alternate embodiments, the time limit may be a dynamic time limit determined by the processor or controller 14 as a function of any of one or more operating conditions within the system 10', one or more components of the system 10' and/or one or more environmental or other conditions external to the system 10'. In any case, if the processor or controller 14 determines at step 978 that the time limit has not been exceeded, the process 960 illustratively loops back to step 966, in embodiments which include step 966, or to step 972 in embodiments which do not include step 966, to process additional activation and reflected radiation signals.

In embodiments in which the object detection module 12, 12' includes one or more illumination devices, the process 960 illustratively includes step 980 to which the process 960 advances following the "YES" branch of step 978, i.e., if the processor or controller determines at step 978 that the time limit has been exceeded. In such embodiments, the processor or controller 14 is illustratively operable at step 980 operable to control one or more illumination devices 112, e.g., as described above, to illuminate based on a predetermined, i.e., stored, fail scheme, wherein the processed activation and reflected radiation signals are determined by the processor or controller 14, to fail to exhibit a predefined gesture as described above within the predefined time period following the first execution of step 972. The fail scheme may illustratively take any of the forms described above with respect to step 722 of the process 700 illustrated in FIG. 35.

If, at step 976, the processor or controller 14 determines that, resulting from comparison of the processed activation and reflected radiation signals with the stored VAC value(s), VAC is satisfied; that is, the processed activation and reflected radiation signals match the stored VAC value(s), the process 960 illustratively advances to step 984 where the processor or controller 14 is operable to control one or more of the actuator driver circuits 40 to activate one or more corresponding vehicle access actuators 46 in order to actuate one or more corresponding vehicle access closure devices. Examples of such vehicle access closure devices may include, but are not limited to, one or more access closure locks, one or more access closure latches, and the like. At step 984, the processor or controller 14 may be operable to, for example, control at least one lock actuator associated with at least one access closure of the motor vehicle to unlock the access closure from a locked state or condition and/or to lock the access closure from an unlocked state or condition, and/or to control at least one latch actuator associated with at least one access closure of the motor vehicle to at least partially open the access closure from a closed position or condition and/or to close the access closure from an at least partially open position or condition. In some embodiments, the processor or controller 14 of each of the object detection modules 12, 12' mounted to the motor vehicle may execute the process 960, or at least some portion(s) thereof, and in such embodiments the processor or controller 14 of each object detection module 12, 12' may, at step 984, control at least one actuator driver circuit 40 to activate the one of the vehicle access actuators 46 associated therewith. In alternate embodiments, the processor or controller 14 of any of the object detection modules 12, 12' that executes step 984 may communicate a vehicle access actuation command to the processor(s) or controller(s) 14 of other object detection modules 12, 12' mounted to the motor vehicle.

In embodiments in which the object detection module 12, 12' includes one or more illumination devices 112, the process 960 may further include step 982 which may be executed prior to step 984 or along with step 984. In such embodiments, the processor or controller 14 is illustratively operable to control one or more of illumination devices 112, e.g., via control of one or more of the driver circuit(s) DC, according to an "access grant" illumination scheme. Illustratively, the "access grant" illumination scheme may take any of the forms described above with respect to step 720 of the process 700 illustrated in FIG. 35.

In some embodiments, the process 960 may optionally include a step 986 to which the process 960 advances from step 984, as illustrated by dashed-line representation in FIG. 46. In embodiments which include it, the processor or controller 14 is illustratively operable at step 724 to control one or more of the audio and/or illumination device driver circuits 60 to activate one or more corresponding audio and/or illumination devices 66 in addition to controlling one or more vehicle access actuators to activate one or more vehicle access devices at step 984 following detection at step 976 of exhibition of a predefined gesture by the object within the sensing region of at least one of the radiation transceivers. Example audio devices which may be activated at step 986 may include, but are not limited to, the vehicle horn, an audible device configured to emit one or more chirps, beeps, or other audible indicators, or the like. Example illumination devices which may be activated at step 986, in addition to one or more of the illumination devices 112 (in embodiments which include one or more such illumination devices 112) or in any embodiment instead of one or more of the illumination devices 112, may include, but are not limited to, one or more existing exterior motor vehicle lights or lighting systems, e.g., headlamp(s), tail lamp(s), running lamp(s), brake lamp(s), side marker lamp(s), or the like, and one or more existing interior motor vehicle lights or lighting systems, e.g., dome lamp, access closure-mounted lamp(s), motor vehicle floor-illumination lamp(s), trunk illumination lamp(s), or the like. In any case, following step 986, or following step 984 in embodiments which do not include step 986, the process 960 illustratively returns to the process 940 illustrated in FIG. 45.

Figure 47:
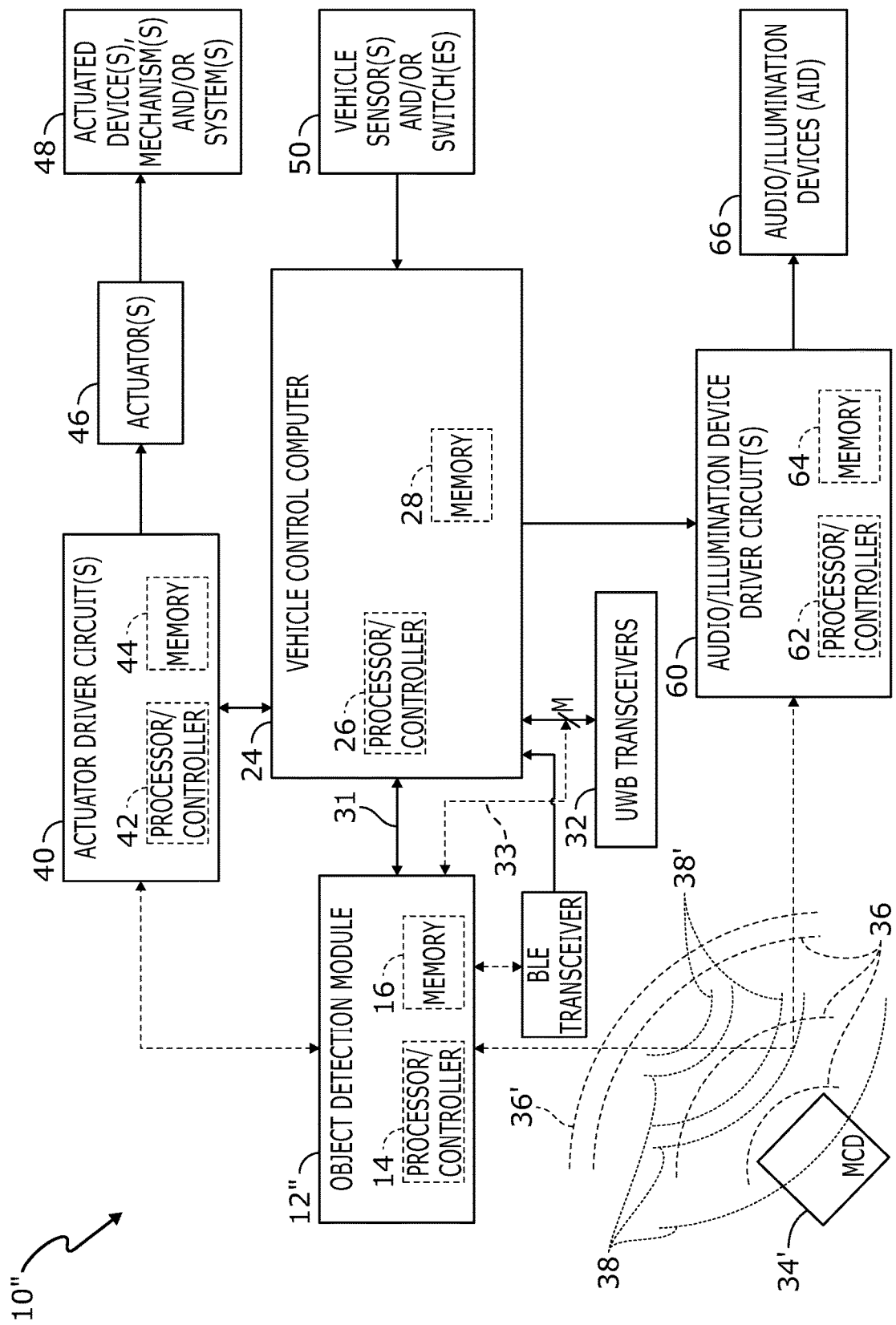
FIG. 47 is a simplified block diagram schematic of another embodiment of a gesture access system for a motor vehicle.

Referring now to FIG. 47, another embodiment of a gesture access system for a motor vehicle 10" is shown which includes another embodiment of an object detection module 12". The gesture access system 10" is identical in many respects to the object detection system 10' illustrated in FIG. 38 and described above. Components of the system 10" in common with those of the system 10' are accordingly identified with like reference numbers, and descriptions thereof will be omitted here for brevity, it being understood that the above descriptions of such components apply equally to those of the system 10" illustrated in FIG. 47.

The system 10" illustrated in FIG. 47 differs from that of the system 10' in at least three respects; (1) the system 10" utilizes Bluetooth low energy (BLE) circuitry and signals to determine the proximity and angle, relative to the motor vehicle, of the mobile communication device (MCD) 34' known to the system 10", which is both UWB circuit-equipped and BLE circuit-equipped, (2) the system 10' is operable in a gesture access mode to utilize both UWB circuitry and BLE circuitry to perform object detection for the purpose of evaluating a walking pattern based on emitted 36 and reflected 38 UWB signals and emitted 36' and reflected 38' BLE signals and, upon recognition of at least one predefined walking pattern, unlocking, locking, automatically opening and/or automatically closing an access closure of a motor vehicle, and (3) the system 10" is operable only in the gesture access mode if the MCD 34' is determined to be within a perimeter defined about the motor vehicle and is otherwise operable in an inactive mode in which reflected UWB signals and/or reflected BLE signals are not received or are not acted upon. Such operational features of the system 10" are described in detail below.

To accomplish the foregoing operational features, the system 10" illustratively includes at least one BLE signal transceiver 1000. Illustratively, each transceiver 1000 operates in the conventional BLE range, e.g., approximately 2.45 GHz, and is configured to wirelessly transmit and receive BLE signals. In some embodiments, the one or more BLE transceiver(s) 1000 is/are operatively (i.e., communicatively, via hardwire and/or wireless connection) connected solely to the vehicle control computer 24 as depicted in FIG. 47 by the solid-line connection. In some alternate embodiments, at least one BLE transceiver 1000 is connected solely to, and/or carried solely by, the object detection module 12" as depicted in FIG. 47 by the dash-line connection 1002, and in other alternate embodiments one or more BLE transceiver(s) 1000 is/are operatively connected to the vehicle control computer 24 and at least one BLE transceiver 1000 is connected to, and/or carried by, the object detection module 12". It will be understood that any embodiment of the system 10" may include one or more of the object detection modules 12", each of which is operatively (i.e., communicatively, via hardwire and/or wireless connection) connected to the vehicle control computer 24 as depicted in FIG. 47 by the solid-line connection 31. Each of the one or more object detection modules 12" includes, at a minimum, a processor or controller 14 and a memory 16 as described above with respect to FIG. 1.

Figure 48:
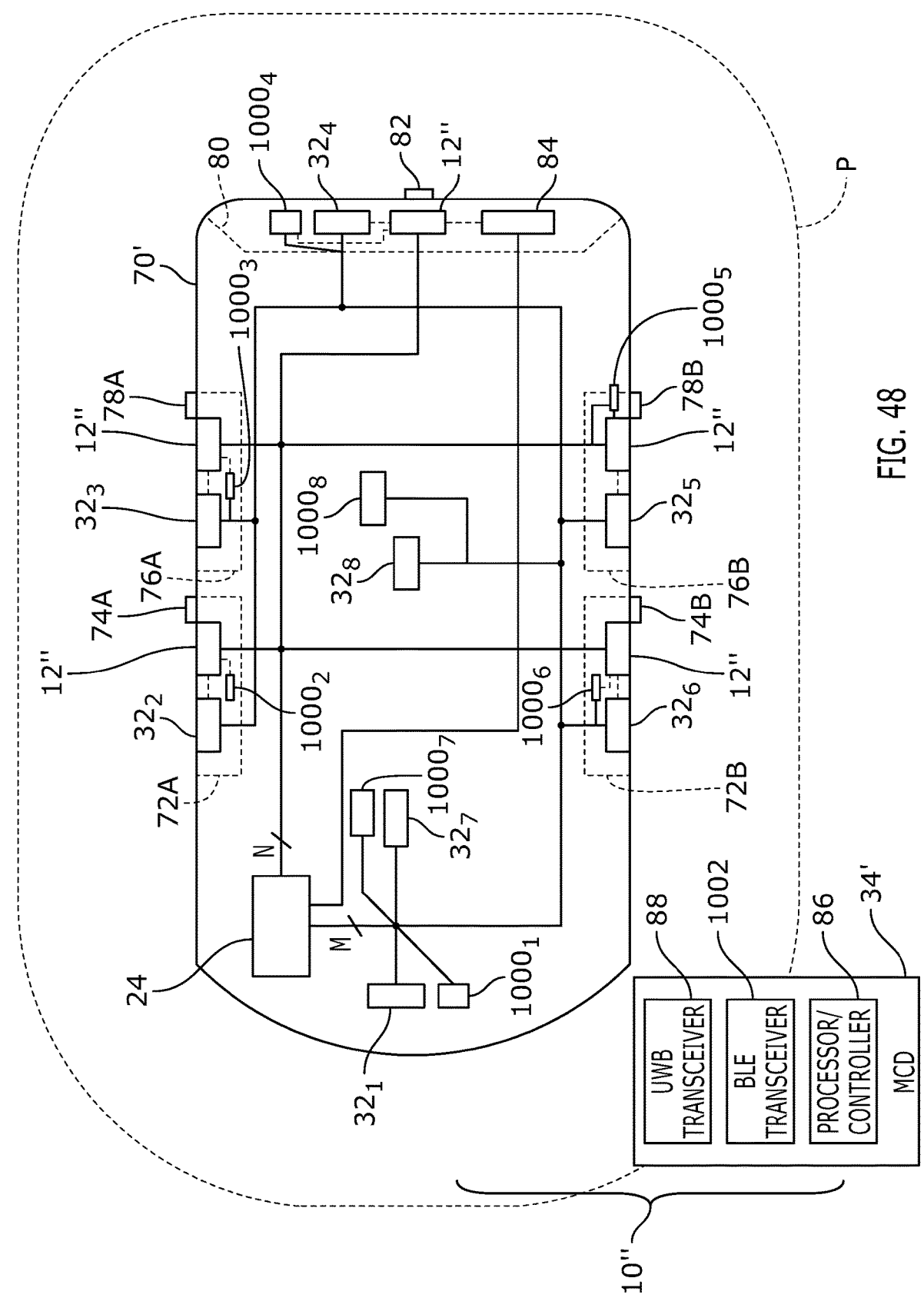
FIG. 48 is a simplified top plan view of an example implementation of the gesture access system depicted in FIG. 47 in a motor vehicle.

Referring now to FIG. 48, an example embodiment of the system 10" of FIG. 47 is shown implemented in a motor vehicle 70'. The motor vehicle 70' is identical in many respects to the motor vehicle 70' illustrated in FIG. 39 and described above. Components of the motor vehicle 70' in common with those of the motor vehicle 70 are accordingly identified with like reference numbers, and descriptions thereof will be omitted here for brevity, it being understood that the above descriptions of such components apply equally to those of the motor vehicle 70' illustrated in FIG. 48. It will be understood that while not all of the components of the system 10" illustrated in FIG. 47 are shown in FIG. 48, such non-illustrated components are present in the system 10" of FIG. 48. In the illustrated embodiment, the motor vehicle 70' illustratively has five access closures in the form of two conventional forward vehicle doors 72A, 72B, two rearward vehicle doors 76A, 76B and a conventional rear hatch 80, as described above with respect to motor vehicle 70.

The vehicle control computer 24 is suitably mounted in the motor vehicle 70', and is electrically connected to object detection module(s) 12", as well as to UWB transceiver(s) 32 and BLE transceiver(s) 1000. In this example, the BLE transceiver(s) 1000 are operatively connected, e.g., via any number of conventional electrical wires or wirelessly, to the vehicle control computer 24 but not to any of the object detection modules 12", although in alternate embodiments one or more of the BLE transceiver(s) 1000 may be alternatively or additionally operatively connected directly, e.g., wired or wirelessly, to a respective one or more of the object detection modules 12". In the illustrated example, an object detection module 12" is mounted to or near each access handle 74A, 74B, 76A, 76B and 82, although in alternate embodiments more or fewer object detection modules 12" may be mounted to the motor vehicle 70' at any desired location. Also in the illustrated example, eight BLE transceiver(s) $1000_1$-$1000_8$ are mounted to the motor vehicle 70' at various different locations. In alternate embodiments, more or fewer BLE transceiver(s) 1000 may be mounted to the motor vehicle 70' at various locations.

As also illustrated in FIG. 48, the mobile communication device (MCD) 34' illustratively has at least a conventional processor or controller 86', the UWB transceiver 88, and a BLE transceiver 1004. The MCD 34' and the vehicle control computer 24 (and/or one or more of the object detection modules 12" in some embodiments) are both capable of wirelessly communicating with one another via control of their respective UWB transceivers 32, 88 according to conventional UWB communication protocol. The MCD 34' and the vehicle control computer 24 (and/or one or more of the object detection modules 12" in some embodiments) are also capable of wirelessly communicating with one another via control of their respective BLE transceivers 1000, 1004 according to conventional BLE communication protocol. In one embodiment, the MCD 34' is a smart phone equipped with a UWB transceiver 88 and BLE transceiver 1004, although in other embodiments the MCD 34' may be any mobile electronic device equipped with a UWB transceiver 88 and a BLE transceiver 1004 and additional circuitry configured to communicate with the vehicle control computer 24 via a conventional UWB communication protocol and/or BLE communication protocol, such as a key fob or other mobile electronic device carried by or on an operator of the motor vehicle.

In the context of this disclosure, a particular MCD 34' will be capable of UWB communications and/or BLE communications with a particular vehicle control computer 24 (and/or by the processor/controller 14 of at least one of the object detection modules 12") of a particular motor vehicle 70' and/or vice versa if the particular MCD 34' and/or component(s) thereof is/are known to the particular vehicle control computer 24 (and/or by the processor/controller 14 of at least one of the object detection modules 12") and/or if the particular vehicle control computer 24 and/or the motor vehicle 70' itself (and/or the processor/controller 14 of at least one of the object detection modules 12") is/are known to the MCD 34'. In the former case, the particular MCD 34' will be, for example, owned by, or otherwise in the possession of, an operator of the motor vehicle 70', and in the latter case the particular motor vehicle 70' (carrying the particular vehicle control computer 24 and/or process/or controller 14 of at least one of the objection detection modules 12") will be, for example, a motor vehicle 70' for which the owner or possessor of the particular MCD 34' is an operator.

The particular MCD 34' will be known to the vehicle control computer 24 (and/or by the processor/controller 14 of at least one of the object detection modules 12") of the particular motor vehicle 70' if the two have been previously linked, paired or otherwise configured, in a conventional manner, for UWB communications and/or BLE communications with the other to the exclusion, with respect to the particular MCD 34', of vehicle control computers 24 of other motor vehicles 70', and to the exclusion, with respect to the particular motor vehicle 70', of other MOD's 34' that have not been previously linked, paired or otherwise configured for UWB communications and/or BLE communications therewith. It is contemplated that two or more particular MOD's 34' may be so linked, paired or otherwise configured for UWB communications and/or BLE communications with the vehicle control computer 24 (and/or with the processor/controller 14 of at least one of the object detection modules 12") of a particular motor vehicle 70', e.g., to accommodate $2^{nd}$, $3^{rd}$, etc. operators of the motor vehicle 70'.

In some embodiments, the particular MCD(s) 34' linked, paired or otherwise configured for UWB communications and/or BLE communications with the particular vehicle control computer 24 (and/or with the processor/controller 14 of at least one of the object detection modules 12, 12') is/are, as a result of the linking, pairing or configuration process, illustratively operable to thereafter transmit unique identification information as part of, or appended to, UWB signals transmitted by the UWB transceiver(s) 88 and/or BLE signals transmitted by the BLE transceiver(s) 1004. Alternatively or additionally, the particular vehicle control computer 24 (and/or the processor/controller 14 of at least one of the object detection modules 12") linked, paired or otherwise configured for UWB communications and/or BLE communications with the particular MCD(s) 34' may be, as a result of the linking, pairing or configuration process, thereafter operable to transmit unique identification information as part of, or appended to, UWB signals transmitted by one or more of the UWB transceivers 32 and/or BLE signals transmitted by one or more of the BLE transceivers 1000. Such identification information may be or include, for example, but not limited to, information identifying the processor/controller 86 of the particular MCD 34', the UWB transceiver 88 of the particular MCD 34', the BLE transceiver 1004 of the particular MCD 34', information identifying the particular MCD 34' itself, information identifying the particular vehicle control computer 24 (and/or with the processor/controller 14 of at least one of the object detection modules 12") of the particular motor vehicle 70', information identifying one or more of the UWB transceivers 32 of the particular motor vehicle 70', information identifying one or more of the BLE transceivers 1000 of the particular motor vehicle 70', information identifying the particular motor vehicle 70' itself, any combination thereof, and/or other identification information unique to the particular MCD 34'/motor vehicle 70' pair. In any case, UWB communication, via one or more of the UWB transceivers 32 of a particular motor vehicle 70' and a UWB transceiver 88 of a particular MCD 34', in the context of this disclosure, may only be conducted between the vehicle control computer 24 (and/or the processor/controller 14 of at least one of the object detection modules 12") of that particular motor vehicle 70' and the processor/controller 14 of that (or those) particular MCD(s) 34' by transmitting by one or the other or both, as part of or along with transmitted UWB signals, unique identification information known to the other resulting from having been previously linked, paired or otherwise configured for UWB communications with one another. Additionally, BLE communication, via one or more of the BLE transceivers 1000 of a particular motor vehicle 70' and a BLE transceiver 1004 of a particular MCD 34', in the context of this disclosure, may only be conducted between the vehicle control computer 24 (and/or the processor/controller 14 of at least one of the object detection modules 12") of that particular motor vehicle 70' and the processor/controller 14 of that (or those) particular MCD(s) 34' by transmitting by one or the other or both, as part of or along with transmitted BLE signals, unique identification information known to the other resulting from having been previously linked, paired or otherwise configured for BLE communications with one another. In this regard, in the context of the example implementation illustrated in FIG. 48, it will be understood that the MCD 34' (or one or more components thereof) is thus known to the vehicle control computer 24 (and/or to the processor/controller 14 of at least one of the object detection modules 12") of the illustrated motor vehicle 70' and/or vice versa, having been previously linked, paired or otherwise configured for UWB communications and/or BLE communications with one another.

Further illustrated in FIG. 48 is a perimeter, P, surrounding the motor vehicle 70', which represents a boundary within which UWB communications and/or BLE communications between the processor/controller 86 of the MCD 34' and the processor 26 (and/or the processor/controller 14 of at least one of the object detection modules 12, 12') of the motor vehicle 70' can take place or are permitted to take place, and beyond which such UWB communications and/or BLE communications cannot take place or are not permitted. Generally, UWB communications have a range of approximately 30 feet. BLE communications generally have a range of over 300 feet; however, in one embodiment, the vehicle control computer 24 (and/or to the processor/controller 14 of at least one of the object detection modules 12") of the motor vehicle 70' will not link, pair with the MCD 34' until both UWB communications and BLE communications are established between the MCD 34' and the vehicle control computer 24 (and/or to the processor/controller 14 of at least one of the object detection modules 12") of the motor vehicle 70'. Accordingly, in one embodiment the perimeter, P, defines approximately a 30 feet boundary about the motor vehicle such that when the MCD 34' is within the perimeter, P, as illustrated by example in FIG. 39, the MCD 34' is generally within both UWB communication and BLE communication range of the motor vehicle 70' (and is thus considered to be "in-range"), and when the MCD 34' is beyond or outside of the perimeter, P, the MCD 34' is generally outside of UWB communication range of the motor vehicle 70' (and is thus considered to be "out-of-range"). In this embodiment, the perimeter, P, is thus defined as approximately the boundary of UWB communications between the MCD 34' and the motor vehicle 70'. In alternate embodiments, the perimeter P may be defined to be any arbitrary boundary about the motor vehicle 70' (or about any particular one, set or subset of the UWB transceivers 32). In any case, for purposes of this disclosure, when the MCD 34' is determined to be within the perimeter, P, the object detection module(s) 12" is/are configured to operate in the gesture access mode, and when the MCD 34' is otherwise determined to be beyond or outside of the perimeter, P, the object detection module(s) 12" is/are configured to operate in the inactive mode, as these modes are briefly described above. In this regard, a convenient perimeter, P, is approximately the communication range of the UWB transceivers 32, 88, although alternate perimeters are contemplated as described above. Moreover, in some alternate embodiments, the perimeter, P, may be defined only by and about one or a subset of the total set of UWB transceivers 32, and/or the perimeter, P, may not be smooth as illustrated by example in FIG. 48, but may instead be non-smoothly formed by piecewise, intersecting segments.

Figure 49:
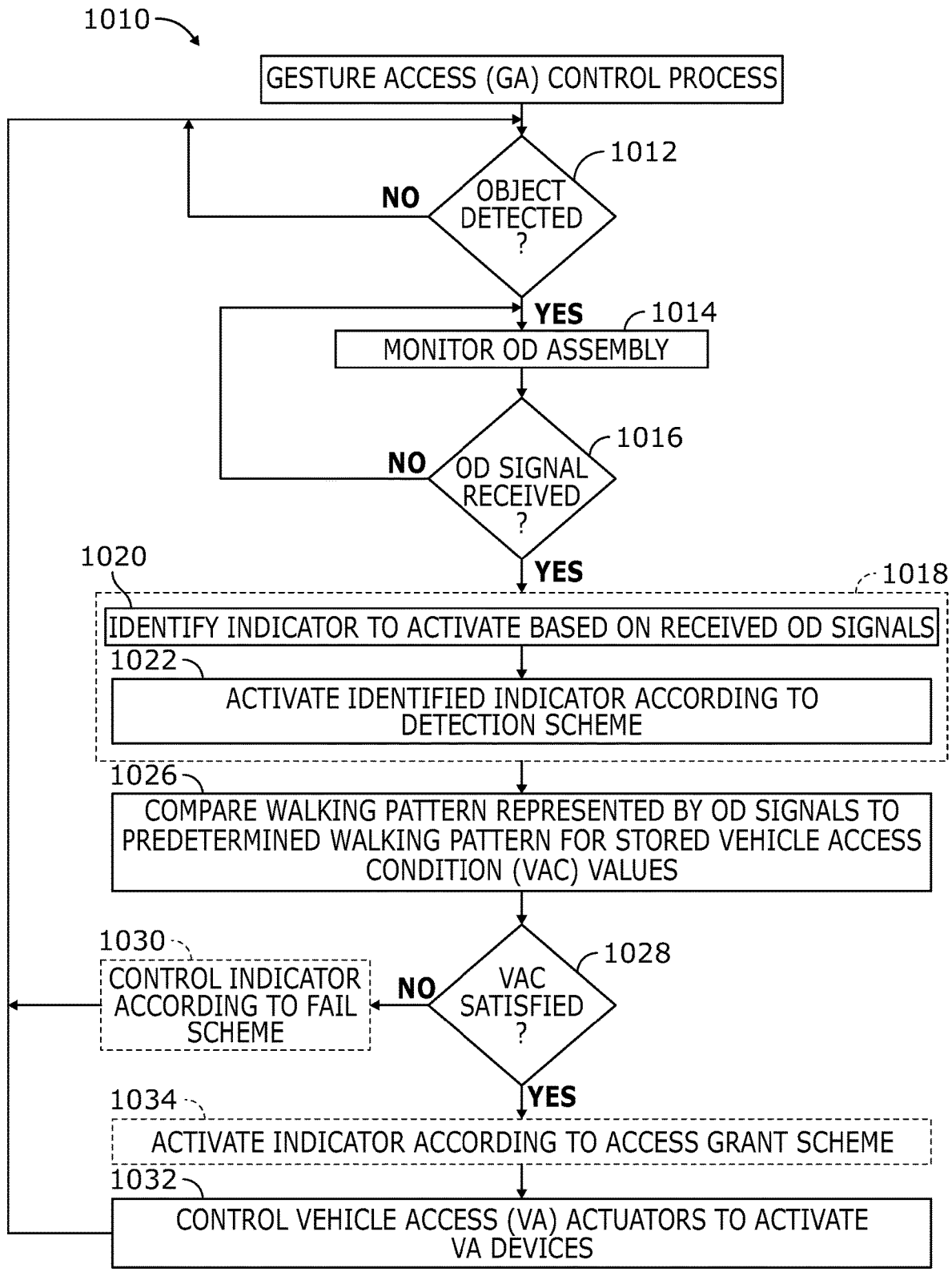
FIG. 49 is a simplified flowchart of an embodiment of a gesture access process executable by one or more processors illustrated in FIG. 47.

Referring now to FIG. 49, a simplified flowchart is shown of an embodiment of a gesture access control process 1010 that recognizes a walking pattern to unlock at least one of the access closures 72A, 72B, 76A, 76B, 80 of the motor vehicle 70'. The process 1010 is illustratively stored in the at least one memory 16 of one or more of the object detection modules 12" in the form of instructions executable by the at least one processor or controller 14 thereof to cause the at least one processor or controller 14 to execute the corresponding functions. It will be understood that in some alternate embodiments, such instructions may be stored, in whole or in part, in any one or more of the memory units illustrated in FIG. 47, e.g., in one or more of the memory 28 of the vehicle control computer 24, the memory 44 of the actuator driver circuit(s) 40 and the memory 64 of the audio/illumination device driver circuit(s) 60, and executed, in whole or in part, by any one or more of the processors or controllers illustrated in FIG. 47. For purposes of the following description, the process 1010 will be described as being executed by the at least one processor or controller 14 of the one or more of the object detection modules 12", it being understood that the process 1010 may alternatively or additionally be executed, in whole or in part, by one or more of the processors or controllers 26, 42, 62. For purposes of the following description, the process 1010 will be described as being executed by the processor or controller 14, it being understood that the process 1010 may alternatively or additionally be executed, in whole or in part, by one or more of the processors or controllers 26, 42, 62.

The process 1010 is illustratively executed by any one or more, or all, of the object detection modules 12" mounted to the motor vehicle, e.g., any of the object detection modules 12" mounted to the motor vehicle 70' in the example illustrated in FIG. 47. In this regard, decisions and commands made or generated by the processor or controller 14 of one object detection module 12" may be communicated to others of the object detection modules 12" so that the processors or controllers 14 of such other object detection modules 12" can act on the same decisions and/or carry out the same commands. It will be understood that some embodiments of the object detection module 12" may not include one or more components of other object detection modules 12". In this regard, dashed-line boxes are illustratively shown around some of the steps or groups of steps of the process 1010 to identify steps which are part of the process 1010 when the object detection module 12" includes at least one illumination device 112 or other indicator device, such as an audible device, for example a horn of the motor vehicle 70'. Such steps are illustratively omitted in embodiments in which the object detection module 12" does not include any such illumination devices 112 or other indicator device.

The process 1010 illustratively begins at step 1012 where the processor or controller 14 is operable to determine whether an object is within the perimeter, P. In some embodiments, the object may be detected using any one of a radar, an ultra-wideband radar, an infrared sensor, camera, or a lidar scanner. That is, the sensors 50 of the vehicle 70' may include any suitable sensor for detecting an object within the perimeter, P, and producing an object detection signal. In some embodiments, an object detection signal is received by the communication circuit 30 of the vehicle control computer 24 and passed, processed or unprocessed, to the processor or controller 14. In other embodiments in which the object detection module 12" includes a communication circuit 18, the object detection signal may be received directly by the processor or controller 14. In any case, until the object detection signal is detected, the process 1010 loops back to step 1012. If an object is detected within the perimeter, P, the process 1010 advances along the "YES" branch of step 1012, in one embodiment.

In some embodiments, rather than merely detecting an object within the perimeter, P, the processor or controller 14 is operable to determine whether a wireless signal from the object has been detected. For example, the wireless signal may be illustratively produced by a conventional Key Fob 20 or the MCD 34'. In some embodiments, the wireless signal is received by the communication circuit 30 of the vehicle control computer 24 and passed, processed or unprocessed, to the processor or controller 14. In other embodiments in which the object detection module 12" includes a communication circuit 18, the wireless signal may be received directly by the processor or controller 14. In any case, until the wireless signal is detected, the process 1010 loops back to step 1012.

If the wireless signal is received by the communication circuit 30 of the vehicle control computer 24, the processor or controller 26 of the vehicle control computer 24 is illustratively operable to decode the received wireless signal and determine whether it matches at least one code stored in the memory 28. If not, the processor or controller 26 disregards or ignores the wireless signal and the process 1010 loops back to step 1012. Likewise, if the wireless signal is received by the communication circuit 18 of the object detection module 12, the processor 14 is similarly operable to determine whether the received wireless signal matches at least one code stored in the memory 16 or in the memory 28. If not, the process 1010 likewise loops back to step 1012. Thus, the process 1010, in one embodiment, advances along the "YES" branch of step 1012 only if the received wireless signal matches at least one stored code, such that the gesture access process proceeds only for authorized users, i.e., only for users carrying a Key Fob 20 or MCD 34' that is recognizable by the object detection system 10. It will be understood that some embodiments of the process 1010 may not include step 1012, and in such embodiments the process 1010 begins at step 1014.

At step 1014, the processor or controller 14 is operable to activate one or more of the UWB transceivers 32 and/or the BLE transceivers 1000 to emit UWB radiation and BLE radiation and to then monitor the one or more UWB transceivers 32 for detection of reflected UWB radiation signals, and to monitor the one or more BLE transceivers 1000 for detection of reflected BLE radiation signals. The process 1010 advances from step 1014 to step 1016 where the processor or controller 14 is operable to determine whether reflected radiation signals, e.g., in any of the forms described above, have been received. If not, the process 1010 loops back to the beginning of step 1014. In some embodiments, the processor or controller 14 only activates the UWB transceivers 32 so that only reflected UWB radiation signals are detected. In other embodiments, the processor or controller 14 only activates the BLE transceivers 1000 so that only reflected BLE radiation signals are detected. In one embodiment, as described below, both UWB signals and BLE signals are detected so that a proximity of the MCD 34' and a speed of the MCD 34' is determined based on the UWB signals and an angle of the MCD 34' relative to the motor vehicle 70' is determined based on the BLE signals.

In embodiments in which the object detection module 12" includes one or more illumination devices, the process 1010 illustratively includes step 1018 to which the process 1010 advances following the "YES" branch of step 1016. In other embodiments in which the object detection module 12" does not include one or more illumination devices 112, the process 1010 does not include step 1018 and the process 1010 advances from the "YES" branch of step 1016 to step 1026. If included, step 1018 illustratively includes step 1020 in which the processor or controller 14 is operable to identify one or more illumination devices 112 to illuminate based on the received object detection (OD) signal(s) produced by object detection module(s) 12" or based on reflected UWB radiation and/or BLE radiation signals received, in any of the forms described above, from one or more of the UWB transceivers 32 and/or BLE transceiver 1000. Thereafter at step 1022, the processor or controller 14 is operable to control one or more of the driver circuit(s) DC to illuminate the identified illumination device(s) 112 according to a predefined detection scheme and/or to sound an audible device, for example, a horn of the motor vehicle 70'.

Following step 1018, in embodiments which include step 1018, and otherwise following the "YES" branch of step 1016, the processor or controller 14 is operable at step 1026 to process the activation and reflected radiation signals to compare the processed signals to one or more vehicle access condition (VAC) values stored in the memory 16 (or the memory 28, 42 and/or 64), and to then determine (at step 1028) whether VAC is satisfied. In some embodiments, the processor or controller 14 is operable to process the activation and reflected UWB radiation signals to determine time difference values between the activation and reflected UWB radiation signals to determine whether the MCD 34' is moving at a speed and direction that corresponds to a predefined walking pattern, and in such embodiments the stored VAC value(s) illustratively correspond to the predefined walking pattern. Additionally, the processor or controller 14 is operable to process the activation and reflected BLE radiation signals to determine angle values between the activation and reflected BLE radiation signals to determine whether the MCD 34' is moving at an angle that corresponds to the predefined walking pattern, and in such embodiments the stored VAC value(s) illustratively correspond to the predefined walking pattern.

If, at step 1028, the processor or controller 14 determines that, resulting from comparison of the processed activation and reflected radiation signals with the stored VAC value(s), VAC is not satisfied; that is, the processed activation and reflected radiation signals do not match the stored VAC value(s) for the speed, direction, and angle of the predefined walking pattern, the process 1010 loops back to step 1012, to process additional activation and reflected radiation signals.

In embodiments in which the object detection module 12" includes one or more illumination devices, the process 1010 illustratively includes step 1030 to which the process 1010 advances following the "NO" branch of step 1028. In such embodiments, the processor or controller 14 is illustratively operable at step 1030 to control one or more illumination devices 112 and/or audible device, e.g., as described above, to illuminate and/or produce an audible alert based on a predetermined, i.e., stored, fail scheme, wherein the processed activation and reflected radiation signals are determined by the processor or controller 14, to fail to exhibit a predefined walking pattern.

If, at step 1028, the processor or controller 14 determines that, resulting from comparison of the processed activation and reflected radiation signals with the stored VAC value(s), VAC is satisfied; that is, the processed activation and reflected radiation signals match the stored VAC value(s) for the speed, direction, and angle of the predefined walking pattern, the process 1010 illustratively advances to step 1032 where the processor or controller 14 is operable to control one or more of the actuator driver circuits 40 to activate one or more corresponding vehicle access actuators 46 in order to actuate one or more corresponding vehicle access closure devices. Examples of such vehicle access closure devices may include, but are not limited to, one or more access closure locks, one or more access closure latches, and the like. At step 1032, the processor or controller 14 may be operable to, for example, control at least one lock actuator associated with at least one access closure of the motor vehicle to unlock the access closure from a locked state or condition and/or to lock the access closure from an unlocked state or condition, and/or to control at least one latch actuator associated with at least one access closure of the motor vehicle to at least partially open the access closure from a closed position or condition and/or to close the access closure from an at least partially open position or condition. In some embodiments, the processor or controller 14 of each of the object detection modules 12" mounted to the motor vehicle 70' may execute the process 1010, or at least some portion(s) thereof, and in such embodiments the processor or controller 14 of each object detection module 12" may, at step 1032, control at least one actuator driver circuit 40 to activate the one of the vehicle access actuators 46 associated therewith. In alternate embodiments, the processor or controller 14 of any of the object detection modules 12" that executes step 1032 may communicate a vehicle access actuation command to the processor(s) or controller(s) 14 of other object detection modules 12" mounted to the motor vehicle.

In embodiments in which the object detection module 12" includes one or more illumination devices 112, the process 1010 may further include step 1034 which may be executed prior to step 1032 or along with step 1032. In such embodiments, the processor or controller 14 is illustratively operable to control one or more of illumination devices 112 and/or audible devices, e.g., via control of one or more of the driver circuit(s) DC, according to an "access grant" illumination and/or audible scheme. Example audio devices which may be activated at step 1032 may include, but are not limited to, the vehicle horn, an audible device configured to emit one or more chirps, beeps, or other audible indicators, or the like. Example illumination devices which may be activated at step 1032, in addition to one or more of the illumination devices 112 (in embodiments which include one or more such illumination devices 112) or in any embodiment instead of one or more of the illumination devices 112, may include, but are not limited to, one or more existing exterior motor vehicle lights or lighting systems, e.g., headlamp(s), tail lamp(s), running lamp(s), brake lamp(s), side marker lamp(s), or the like, and one or more existing interior motor vehicle lights or lighting systems, e.g., dome lamp, access closure-mounted lamp(s), motor vehicle floor-illumination lamp(s), trunk illumination lamp(s), or the like. In any case, following step 1032, or following step 1034 in embodiments which do not include step 1032, the process 1010 illustratively returns to the process 1012 illustrated in FIG. 49.

Figure 50:
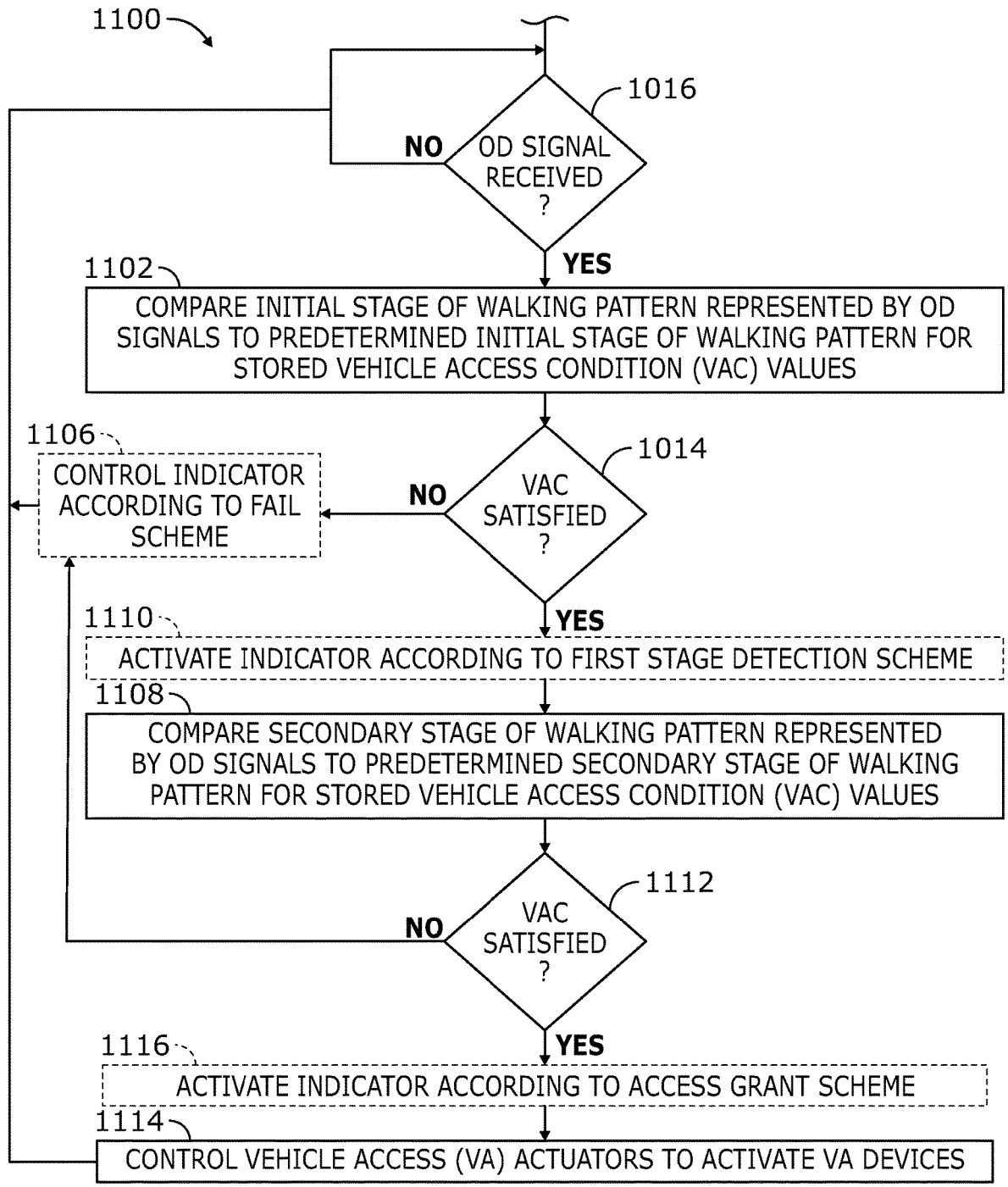
FIG. 50 is a simplified flowchart of another embodiment of a gesture access process executable by one or more processors illustrated in FIG. 47.

FIG. 50, illustrates an alternative gesture access process 1100, wherein the predefined walking pattern includes an initial stage and a secondary stage. For example, the initial stage may include a primary predefined speed and angle at which the object approaches the motor vehicle 70', and the secondary stage my include secondary predefined speed and angle at which the object backs away from the motor vehicle 70'. That is, when approaching the motor vehicle 70' the user (or carrier of the object, e.g. MCD 34') may approach the motor vehicle 70' and then back away from the motor vehicle 70' to gain access to one of the access handles 74A, 74B, 76A, 76B and 82. Accordingly, the walking pattern includes the initial stage (approach to the vehicle) and secondary stage (backing away from the vehicle). It should be noted that other embodiments may be contemplated, wherein the walking pattern includes more than two stages.

In the process 1100, following step 1016 of process 1010, the processor or controller 14 is operable at step 1102 to process the activation and reflected radiation signals to compare the processed signals to one or more vehicle access condition (VAC) values stored in the memory 16 (or the memory 28, 42 and/or 64), and to then determine whether VAC is satisfied for the initial stage of the walking pattern. In some embodiments, the processor or controller 14 is operable to process the activation and reflected UWB radiation signals to determine time difference values between the activation and reflected UWB radiation signals to determine whether the MCD 34' is moving at a speed and direction that corresponds to a predefined first stage of the walking pattern, and in such embodiments the stored VAC value(s) illustratively correspond to the predefined first stage of the walking pattern. Additionally, the processor or controller 14 is operable to process the activation and reflected BLE radiation signals to determine angle values between the activation and reflected BLE radiation signals to determine whether the MCD 34' is moving at an angle that corresponds to the predefined first stage of the walking pattern, and in such embodiments the stored VAC value(s) illustratively correspond to the predefined first stage of the walking pattern.

If, at step 1104, the processor or controller 14 determines that, resulting from comparison of the processed activation and reflected radiation signals with the stored VAC value(s), VAC for the first stage of the walking pattern is not satisfied; that is, the processed activation and reflected radiation signals do not match the stored VAC value(s) for the speed, direction, and angle of the predefined first stage of the walking pattern, the process 1102 loops back to step 1016, to process additional activation and reflected radiation signals.

In embodiments in which the object detection module 12" includes one or more illumination devices, the process 1100 illustratively includes step 1106 to which the process 1100 advances following the "NO" branch of step 1104. In such embodiments, the processor or controller 14 is illustratively operable at step 1106 to control one or more illumination devices 112 and/or audible device, e.g., as described above, to illuminate and/or produce an audible alert based on a predetermined, i.e., stored, fail scheme, wherein the processed activation and reflected radiation signals are determined by the processor or controller 14, to fail to exhibit a predefined first stage of the walking pattern.

If, at step 1104, the processor or controller 14 determines that, resulting from comparison of the processed activation and reflected radiation signals with the stored VAC value(s), VAC for the first stage of the walking pattern is satisfied; that is, the processed activation and reflected radiation signals match the stored VAC value(s) for the speed, direction, and angle of the predefined first stage of the walking pattern, the process 1100 illustratively advances to step 1108.

In embodiments in which the object detection module 12" includes one or more illumination devices, the process 1100 illustratively includes step 1110 to which the process 1100 advances following the "YES" branch of step 1104. In such embodiments, the processor or controller 14 is illustratively operable at step 1110 to control one or more illumination devices 112 and/or audible device, e.g., as described above, to illuminate and/or produce an audible alert based on a predetermined, i.e., stored, approval scheme, wherein the processed activation and reflected radiation signals are determined by the processor or controller 14, to exhibit a predefined first stage of the walking pattern.

At step 1108, the processor or controller 14 is operable to process the activation and reflected radiation signals to compare the processed signals to one or more vehicle access condition (VAC) values stored in the memory 16 (or the memory 28, 42 and/or 64), and to then determine whether VAC is satisfied for the secondary stage of the walking pattern. In some embodiments, the processor or controller 14 is operable to process the activation and reflected UWB radiation signals to determine time difference values between the activation and reflected UWB radiation signals to determine whether the MCD 34' is moving at a speed and direction that corresponds to a predefined secondary stage of the walking pattern, and in such embodiments the stored VAC value(s) illustratively correspond to the predefined secondary stage of the walking pattern. Additionally, the processor or controller 14 is operable to process the activation and reflected BLE radiation signals to determine angle values between the activation and reflected BLE radiation signals to determine whether the MCD 34' is moving at an angle that corresponds to the predefined secondary stage of the walking pattern, and in such embodiments the stored VAC value(s) illustratively correspond to the predefined secondary stage of the walking pattern.

If, at step 1112, the processor or controller 14 determines that, resulting from comparison of the processed activation and reflected radiation signals with the stored VAC value(s), VAC for the secondary stage of the walking pattern is not satisfied; that is, the processed activation and reflected radiation signals do not match the stored VAC value(s) for the speed, direction, and angle of the predefined secondary stage of the walking pattern, the process 1102 loops back to step 1016, to process additional activation and reflected radiation signals.

In embodiments in which the object detection module 12" includes one or more illumination devices, the process 1100 illustratively includes step 1106 to which the process 1100 advances following the "NO" branch of step 1112. In such embodiments, the processor or controller 14 is illustratively operable at step 1104 to control one or more illumination devices 112 and/or audible device, e.g., as described above, to illuminate and/or produce an audible alert based on a predetermined, i.e., stored, fail scheme, wherein the processed activation and reflected radiation signals are determined by the processor or controller 14, to fail to exhibit a predefined secondary stage of the walking pattern.

If, at step 1112, the processor or controller 14 determines that, resulting from comparison of the processed activation and reflected radiation signals with the stored VAC value(s), VAC for the secondary stage of the walking pattern is satisfied; that is, the processed activation and reflected radiation signals match the stored VAC value(s) for the speed, direction, and angle of the predefined secondary stage of the walking pattern, the process 1102 illustratively advances to step 1114.

In embodiments in which the object detection module 12" includes one or more illumination devices, the process 1100 illustratively includes step 1116 to which the process 1100 advances following the "YES" branch of step 1112. In such embodiments, the processor or controller 14 is illustratively operable at step 1116 to control one or more illumination devices 112 and/or audible device, e.g., as described above, to illuminate and/or produce an audible alert based on a predetermined, i.e., stored, approval scheme, wherein the processed activation and reflected radiation signals are determined by the processor or controller 14, to exhibit a predefined secondary stage of the walking pattern.

At step 1114, the processor or controller 14 is operable to control one or more of the actuator driver circuits 40 to activate one or more corresponding vehicle access actuators 46 in order to actuate one or more corresponding vehicle access closure devices. Examples of such vehicle access closure devices may include, but are not limited to, one or more access closure locks, one or more access closure latches, and the like. At step 1114, the processor or controller 14 may be operable to, for example, control at least one lock actuator associated with at least one access closure of the motor vehicle to unlock the access closure from a locked state or condition and/or to lock the access closure from an unlocked state or condition, and/or to control at least one latch actuator associated with at least one access closure of the motor vehicle to at least partially open the access closure from a closed position or condition and/or to close the access closure from an at least partially open position or condition. In some embodiments, the processor or controller 14 of each of the object detection modules 12" mounted to the motor vehicle 70' may execute the process 1100, or at least some portion(s) thereof, and in such embodiments the processor or controller 14 of each object detection module 12" may, at step 1114, control at least one actuator driver circuit 40 to activate the one of the vehicle access actuators 46 associated therewith. In alternate embodiments, the processor or controller 14 of any of the object detection modules 12" that executes step 1114 may communicate a vehicle access actuation command to the processor(s) or controller(s) 14 of other object detection modules 12" mounted to the motor vehicle.

Figure 51:
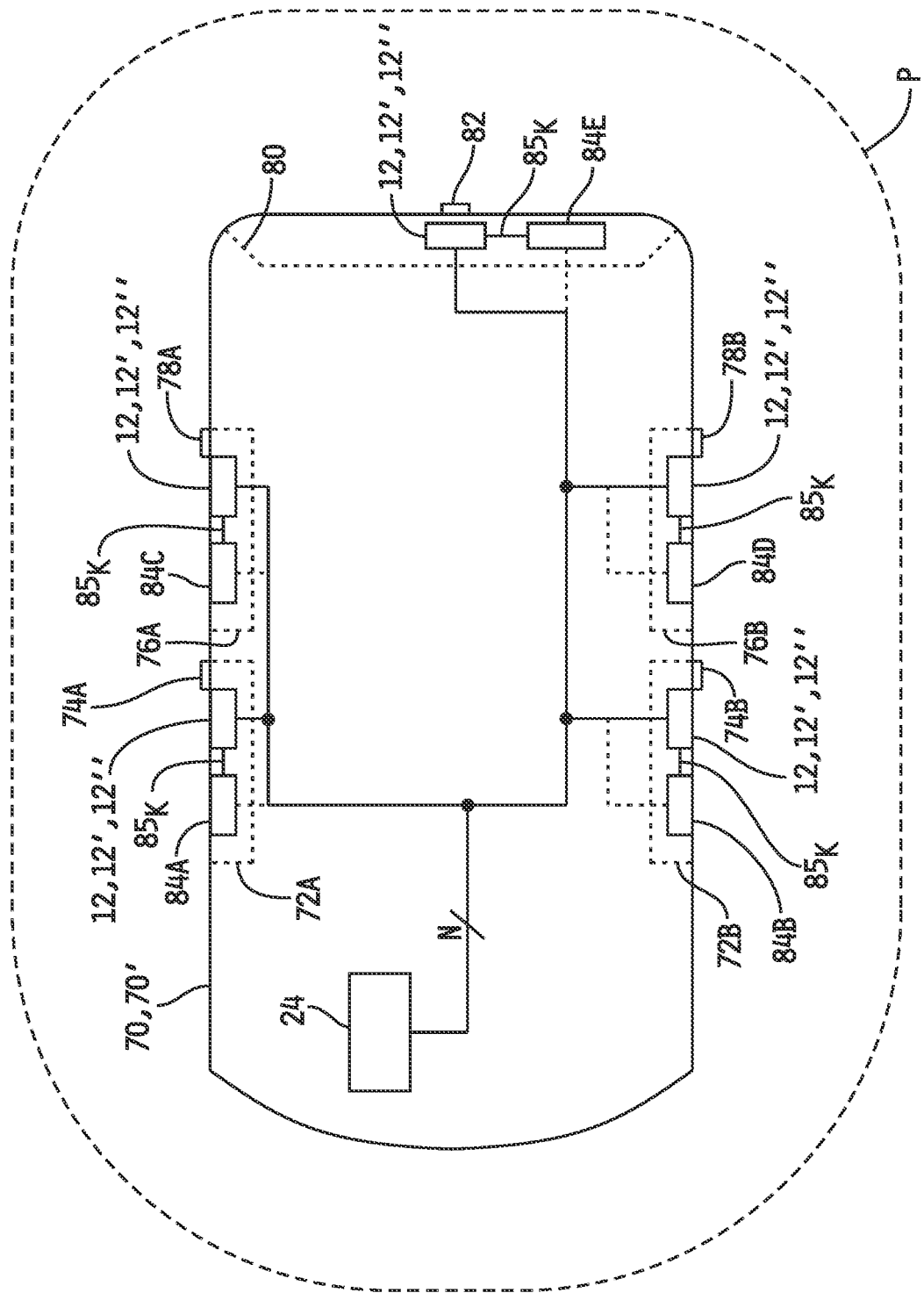
FIG. 51 is a simplified top plan view of a portion of the gesture access system implementation of FIG. 39 or FIG. 48 illustrating another embodiment in which the motor vehicle includes one or more powered doors.

Referring now to FIG. 51, a portion of the gesture access system implementation of FIG. 39 or FIG. 48 is shown illustrating another embodiment in which the motor vehicle includes one or more powered doors. It will be noted that not all of the components illustrated in FIG. 39 or FIG. 48 are depicted in FIG. 51 for clarity of illustration, although it will be understood that the gesture access system illustrated in FIG. 51 includes any and all such components illustrated in FIG. 39 or FIG. 48 and described above. It will be further understood that control of the opening speed of one or more of the powered doors, as described in detail, is not limited to the gesture access system implementation illustrated in FIG. 51, but may be implemented in any of the various gesture access implementations illustrated in FIGS. 1-50 and described above which include object detection capabilities as well as one or more powered doors as described below.

At least one of the side doors 72A, 72B, 76A, 76B and the rear door 80 (e.g., rear hatch, trunk or the like) of the motor vehicle MV, 70, 70' may illustratively be a powered door. In the embodiment illustrated in FIG. 51, for example, each of the side doors 72A, 72B, 76A, 76B and the rear door 80 is a powered door, and each includes a respective power module configured to be responsive to respective control signals to at least open, and in some embodiments to also close, the respective door. For example, the door 72A includes an associated power module 84A, the door 72B includes an associated power module 84B, the door 76A includes an associated power module 84C, the door 76B includes an associated power module 84D, and the rear door 80 includes an associated power module 84E. Each of the power modules 84A-84E is illustratively electrically connected to a respective one of the object detection modules 12, 12', 12" associated with the respective door via a number, K, of signal paths $85_K$, wherein K may be may be any positive integer, such that each power module 84A-84E is controlled, at least in part, by the processor/controller 14 associated with the respective object detection module 12, 12', 12". Alternatively or additionally, one or more of the power modules 84A-84E may be electrically connected to, and controlled, at least in part, by the vehicle control computer 24 as shown by dashed-line representation in FIG. 51. Alternatively or additionally still, one or more of the power modules 84A-84E may be electrically connected to, and controlled, at least in part, by one or more other processors and/or controllers, such as a processor/controller 42 associated with a respective actuator driver circuit 40, a processor/controller 62 associated with a respective audio/illumination device driver circuit 60 or the like.

The term "powered door," as this term is used herein, should be understood to mean that the respective door 72A, 72B, 76A, 76B, 80 is a power-controlled door having a respective power module 84A-84E which is controlled to automatically open the door 72A, 72B, 76A, 76B, 80 by pushing or pulling the door 72A, 72B, 76A, 76B, 80, via a respective mechanical linkage, from a closed state in which the door 72A, 72B, 76A, 76B, 80 is unlocked and unlatched but fully covers the corresponding access opening of the motor vehicle MV, 70, 70', to a fully open state in which the door 72A, 72B, 76A, 76B, 80 uncovers the corresponding access opening sufficiently to allow ingress and egress by a person into and from the driver/passenger compartment of the motor vehicle MV, 70, 70'. In some embodiments, the fully open state may correspond to the door 72A, 72B, 76A, 76B, 80 being opened to a designed mechanical stop or limit (e.g., full extension of one or more mechanical door hinges), while in other embodiments the fully open state may correspond to the door 72A, 72B, 76A, 76B, 80 being opened to a position short of the designed mechanical stop or limit. In some embodiments, the powered door 72A, 72B, 76A, 76B, 80 may be manually closable from the fully or a partially open state to the closed state, and in other embodiments the respective power module 84A-84E and/or one or more other actuators may be configured to automatically close, or assist in closing, the door 72A, 72B, 76A, 76B, 80 from the fully or partially open state to the closed state, e.g., by pushing or pulling the door 72A, 72B, 76A, 76B, 80 from the fully or partially open state to the closed state. In the embodiment illustrated in FIG. 51, the powered doors 72A, 72B, 76A, 76B, 80 are illustratively swinging or pivoting doors, i.e., pivotably mounted to, and pivotably openable and closable relative to the motor vehicle MV, 70, 70', e.g., with one side or end of the respective door hinged to the motor vehicle MV, 70, 70' such that the opposite side or end of the respective door swings open and closed laterally (horizontally) or vertically via the respective hinge(s). In some embodiments, one or more of the powered doors 72A, 72B, 76A, 76B, 80 may alternatively be a sliding door configured to slide laterally or vertically to open and close the corresponding access opening in the motor vehicle MV, 70, 70'.

Figure 52:
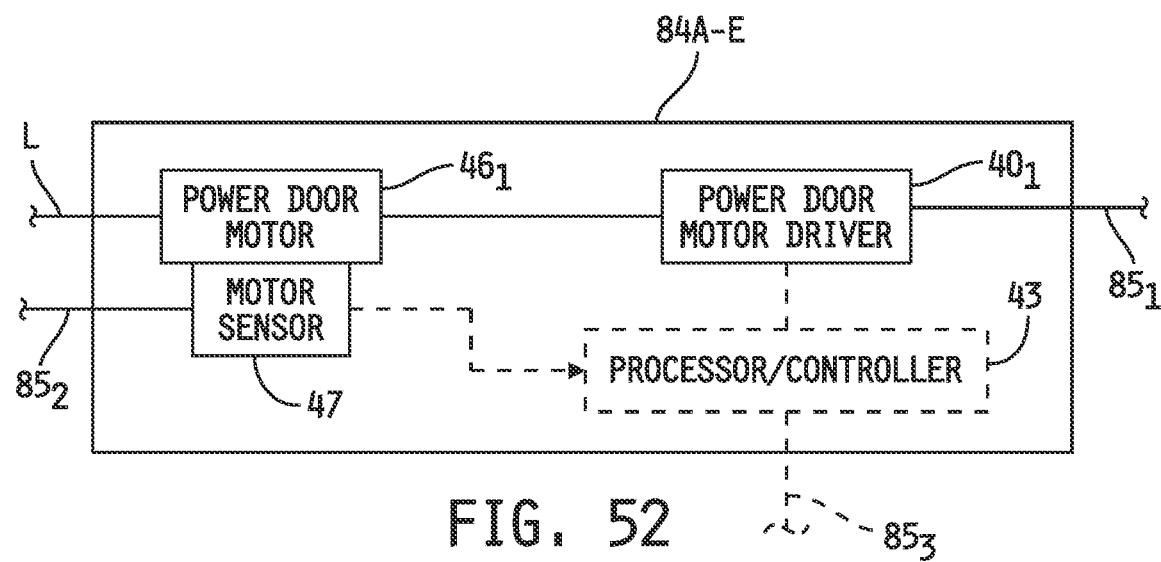
FIG. 52 is a simplified diagram of an embodiment of one of the power modules illustrated in FIG. 51 for controlling opening of a respective powered door.

Referring now to FIG. 52, an embodiment is shown of one of the power modules 84A-84E illustrated in FIG. 51 for controlling automatic opening of a respective powered door 72A, 72B, 76A, 76B, 80. In the illustrated embodiment, the power module 84A-84E includes a conventional power door motor driver circuit 401 having at least one input connected to an output of a respective object detection module 12, 12', 12" via one (or more) of the signal paths 851, and at least one output connected to an input of a power door actuator 46 in the form of a power door control motor 461. A mechanical output of the motor 461, e.g., a rotary shaft, a linearly translating shaft or the like, is coupled via a mechanical linkage, L, to the respective door 72A, 72B, 76A, 76B, 80, whereby the motor 461 is operable in a conventional manner to draw the door 72A, 72B, 76A, 76B, 80 open and/or closed as described above. In the illustrated embodiment, a conventional motor sensor 47 is operatively coupled to motor 461 and includes an output connected to an input of a respective object detection module 12, 12', 12" (and/or to one or more other control modules or control computers) via one (or more) of the signal paths 852. In one embodiment, the motor sensor 47 is a conventional speed sensor configured to produce a motor speed signal on the signal path(s) 852 corresponding to an operating (rotational or linear) speed of the motor 461 from which the opening speed (and, in some embodiments, the closing speed) of the respective door 72A, 72B, 76A, 76B, 80 can be determined by a processor or controller in a conventional manner. In some embodiments, the motor sensor 47 may be a combination of a conventional speed and position sensor in which the motor speed signal contains information from which the position of the motor output shaft can be determined relative to a reference position, and from which a corresponding open position of the respective door 72A, 72B, 76A, 76B, 80 relative to a reference position, e.g., the closed position or other position, can be determined by a processor or controller in a conventional manner. In alternate embodiments, the motor sensor 47 may include separate motor speed and motor position sensors. In some embodiments, as illustrated by dashed-line representation in FIG. 52, the power module may include a processor and/or controller 43 having at least one input connected to an output of a respective object detection module 12, 12', 12" via one (or more) of the signal paths 85$_3$, at least one input an input receiving the output signal produced by the motor sensor 47 (i.e., motor speed and/or position) and at least one output connected to the power door motor driver 40$_1$. In such embodiments, the processor/controller 43 may include, or be operatively coupled to, at least one memory having instructions stored therein that are executable by the processor/controller 43 to control the power door motor driver 40$_1$ to control operation of the power door motor 46$_1$.

In some embodiments, the initial opening speed of any of the powered doors 72A, 72B, 76A, 76B, 80, i.e., the opening speed of the door(s) upon actuation of the motor 46$_1$ to open the door and prior to control to a different opening speed based on object detection conditions, may be a preset or "default" speed value stored in the memory 16 of the object detection module 12, 12', 12" or other memory unit. The preset of default speed value may, in some embodiments, be a maximum door opening speed, i.e., the maximum or maximum allowed operating speed of the motor 46$_1$. In alternate embodiments, the preset or default speed value may be a minimum door opening speed, i.e., the minimum or minimum allowed operating speed of the motor 46$_1$, and in other alternate embodiments the preset or default speed value may be a speed value between the minimum and maxim door opening speeds.

Figure 53:
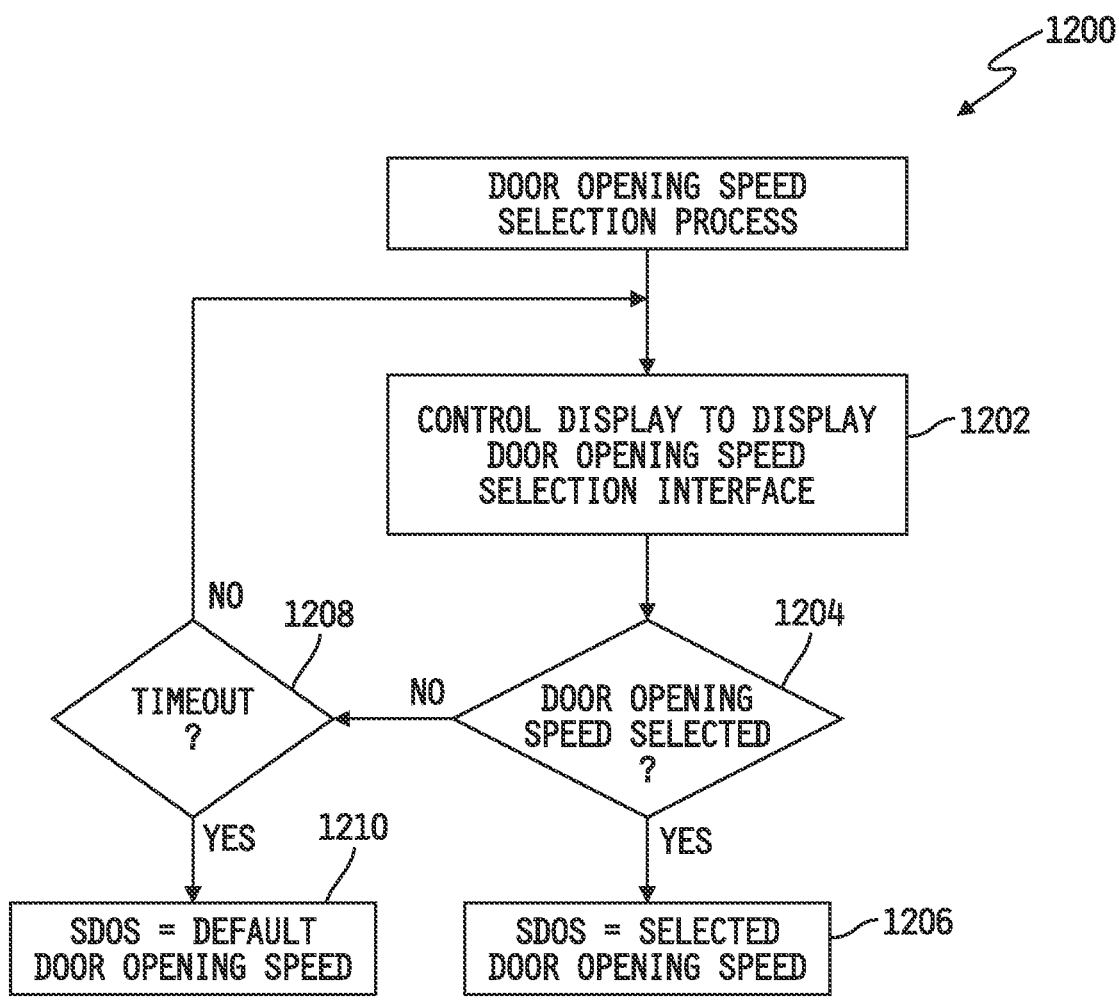
FIG. 53 is a simplified flowchart of an embodiment of a process for selecting a door opening speed for opening one or more of the powered doors illustrated in FIG. 51.

In other embodiments, the initial opening speed of any of the powered doors 72A, 72B, 76A, 76B, 80 may be selected and set by an operator of the vehicle. Referring now to FIG. 53, for example, a simplified flowchart is shown of an embodiment of a process 1200 for selecting a door opening speed for opening one or more of the powered doors 72A, 72B, 76A, 76B, 80 illustrated in FIG. 51. In some embodiments, the process 1200 may be executed for each of the powered doors 72A, 72B, 76A, 76B, 80 such that each may have an individually assigned initial opening speed. In other embodiments, each execution of the process 1200 may apply to all or a subset of the powered doors 72A, 72B, 76A, 76B, 80 such that the selected initial door opening speed is assigned to all or the subset of powered doors 72A, 72B, 76A, 76B, 80. In any case, the process 1200 is illustratively stored in the memory 16 of one or all of the object detection modules 12, 12', 12" in the form of instructions executable by the processor/controller 14 of one or more of the object detection modules 12, 12', 12", and will be described as such below. In alternate embodiments, the process 1200 may be stored in one or more other memory units described above in the form of instructions executable by the processor/controller thereof and communicated to one or more of the object detection modules 12, 12', 12" in a conventional manner.

The process 1200 illustratively begins at step 1202 where the processor/controller 14 is operable to control a display to display a door opening speed selection graphical user interface (GUI) including one or more selectable door opening speed elements. The display may illustratively be a display carried by the MCD 34, 34' and operatively coupled to the processor/controller 14, a display mounted in the motor vehicle 70, 70' and operatively coupled to the processor/controller 26 of the vehicle control computer 24, or other display. In any case, the displayed one or more selectable door opening speed elements may be user-selectable in a conventional manner such that a user may manually select, e.g., via user interaction with the display or other device(s), a user-defined door opening speed (e.g., the "initial" door opening speed described above). The process 1200 advances from step 1202 to step 1204 where the processor/controller 14 is operable to determine whether a door opening speed has been selected. If so, the process 1200 advances to step 1206 where the processor/controller 14 is operable to assign a selected door opening speed variable, SDOS, to the value of the selected door opening speed. If, on the other hand, while the processor/controller 14 determines at step 1204 that a door opening speed has not been selected, the process 1200 advances to step 1208 where the processor/controller 14 is operable to determine whether a timeout has occurred. If not, the process 1200 loops back to step 1202. If the processor/controller 14 determines at step 1208 that a timeout has occurred, the process 1200 advances to step 1210 where the processor/controller 14 is operable to assign the selected door opening speed variable, SDOS, to the default door opening speed. Illustratively, in the absence of execution of the process 1200, SDOS is equal to the default door opening speed.

Figure 54:
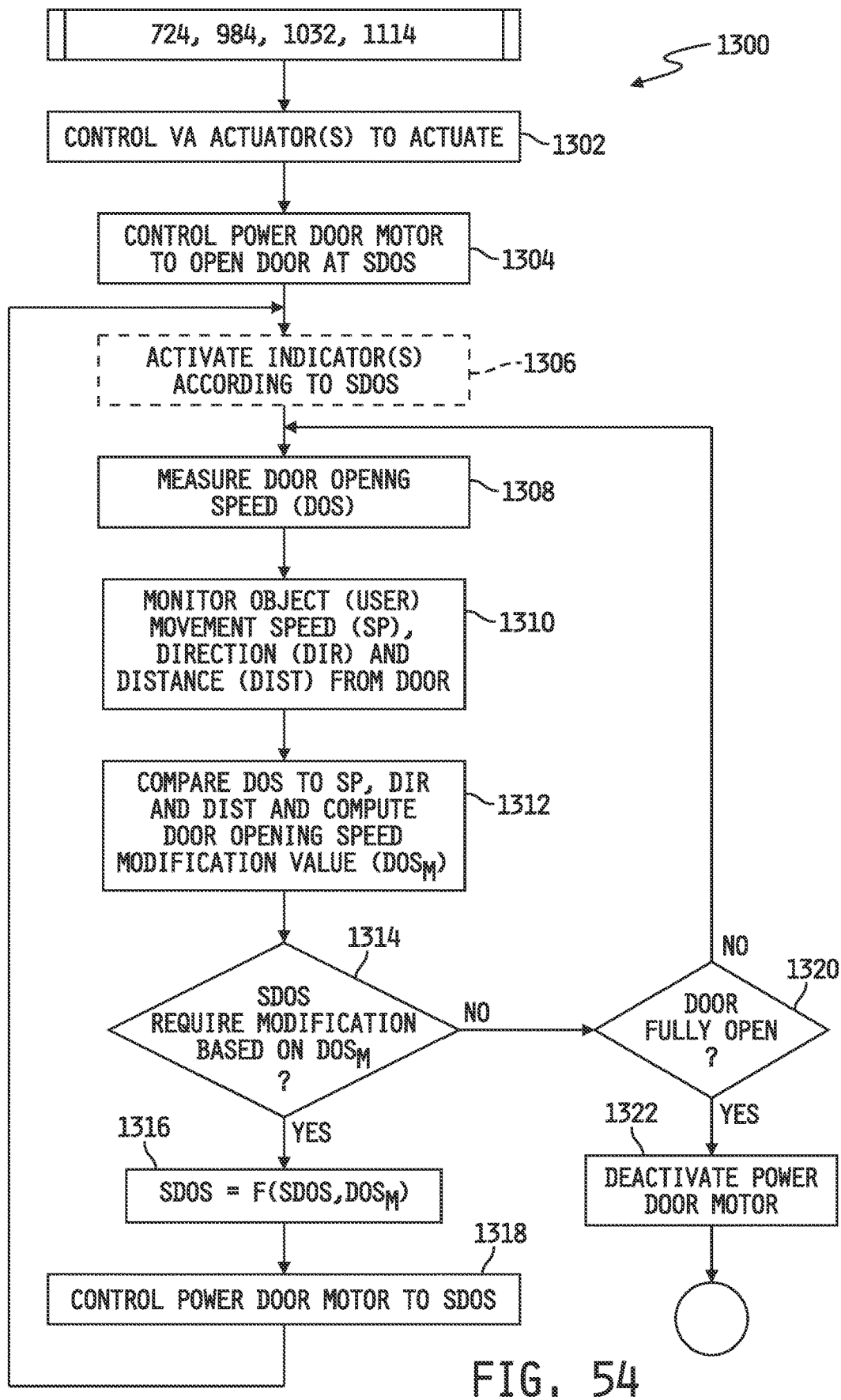
FIG. 54 is a simplified flowchart of an embodiment of a process for executing step 724, 984, 1032 or 114 of the respective process 700, 960, 1010 and 1100 to include controlling opening speed of one or more of the powered doors in the system illustrated FIGS. 1-8 and/or in FIG. 51 based on object movement and position relative thereto.

Referring now to FIG. 54 is a simplified flowchart is shown of an embodiment of a process 1300 for executing step 724, 984, 1032 or 114 of the respective process 700, 960, 1010 and 1100 described above to include controlling opening of, and the opening speed of, a respective one of the powered doors 72A, 72B, 76A, 76B, 80 in the system illustrated FIGS. 1-8 and/or in FIG. 51, after the respective door is unlocked and unlatched upon successful recognition of a corresponding gesture as described above, based on object movement and position relative to the respective powered door. The process 1300 may be executed for any of the powered doors 72A, 72B, 76A, 76B, 80 which a person has successfully unlocked via any of the gesture access processes described above. In any case, the process 1300 is illustratively stored in the memory 16 of each of the object detection modules 12, 12', 12" in the form of instructions executable by the processor/controller 14 of the respective object detection modules 12, 12', 12", and will be described as such below. In alternate embodiments, the process 1300 may be stored in one or more other memory units described above in the form of instructions executable by the processor/controller thereof and communicated to one or more of the object detection modules 12, 12', 12" in a conventional manner.

The process 1300 illustratively begins at step 1302 where the processor/controller 14 is operable, as described above with respect to steps 724, 984, 1032 and 1114 of the respective process 700, 960, 1010 and 1100 to control one or more of the actuator driver circuits 40 to activate one or more corresponding vehicle access actuators 46 in order to actuate one or more corresponding vehicle access closure devices. As described above, such one or more vehicle access closure devices illustratively include, but are not limited to, access closure locks, i.e., conventional electrically actuatable locks for locking and/or unlocking each of the powered doors 72A, 72B, 76A, 76B, 80, and access closure latches, i.e., conventional electrically actuatable latches for latching and/or unlatching each of the powered doors 72A, 72B, 76A, 76B, 80. At step 1302, the processor/controller 14 is illustratively operable to control the lock actuator associated with the respective access closure of the motor vehicle, i.e., associated with the respective door 72A, 72B, 76A, 76B, 80, to unlock the access closure, i.e., the respective door 72A, 72B, 76A, 76B, 80 from a locked state or condition. In some embodiments, the processor/controller 14 is further operable at step 1302 to control the latch actuator to unlatch the unlocked access closure, i.e., to unlatch the respective unlocked door 72A, 72B, 76A, 76B, 80 from a latched state to allow the door 72A, 72B, 76A, 76B, 80 to be subsequently opened under control of the power door motor 461. In other embodiments, unlatching of the door 72A, 72B, 76A, 76B, 80 may not be carried out at step 1302 and may be delayed until the processor/controller 14 determines that contact between the door 72A, 72B, 76A, 76B, 80 and an object will not be made upon activating the motor 461 to open the door 72A, 72B, 76A, 76B, 80 as will be described below.

Following step 1302, the process 1300 advances to step 1304 where the processor/controller 14 is operable, in the embodiment illustrated in FIG. 54, to control the power door motor 461 of the respective door 72A, 72B, 76A, 76B, 80 to open the door 72A, 72B, 76A, 76B, 80 at the door opening speed SDOS stored in the memory 16 of the respective object detection module 12, 12', 12". In some embodiments, the process 1300 may optionally include a step 1306 to which the process 1300 advances from step 1304, as illustrated by dashed-line representation in FIG. 54, and/or may include the step 1306 prior to execution of step 1304. In either case, the processor/controller 14 is operable at step 1306, in embodiments which include it, to control one or more of the audio and/or illumination device driver circuits 60 to activate one or more corresponding audio and/or illumination devices 66 in a manner which notifies the user (i.e., the person attempting to gain entrance to the vehicle 70, 70' via the respective door 72A, 72B, 76A, 76B, 80) that the respective door 72A, 72B, 76A, 76B, 80 is opening (or, in embodiments which step 1306 is alternatively or additionally executed prior to step 1304, in a manner which notifies the user that the respective door 72A, 72B, 76A, 76B, 80 is about to begin opening). Example audio devices which may be activated at step 1306 may include, but are not limited to, the vehicle horn, an audible device configured to emit one or more chirps, beeps, or other audible indicators, or the like. Example illumination devices which may be activated at step 1306 may include, but are not limited to, a respective one, subset or set of the illumination devices 112 associated with the opening door 72A, 72B, 76A, 76B, 80 (in embodiments which include one or more such illumination devices 112), one or more existing exterior motor vehicle lights or lighting systems, e.g., headlamp(s), tail lamp(s), running lamp(s), brake lamp(s), side marker lamp(s), or the like, and/or one or more existing interior motor vehicle lights or lighting systems, e.g., dome lamp, access closure-mounted lamp(s), motor vehicle floor-illumination lamp(s), trunk illumination lamp(s), or the like.

The one or more audio and/or illumination devices may be controlled at step 1306 in any manner including, but not limited to, any one or more of the examples described above. In one example embodiment, which should not be considered to be limiting in any way, the one or more illumination devices may be controlled at step 1306 prior to execution of step 1304 to illuminate with a particular color or flash at a rate or with a particular color which serves as a warning that the door 72A, 72B, 76A, 76B, 80 is about to be automatically opened. Alternatively or additionally, the one or more illumination devices may be controlled at step 1306 after execution of step 1304 to illuminate with a particular color and/or flash at rate corresponding to the opening speed of the respective door 72A, 72B, 76A, 76B, 80.

In the embodiment illustrated in FIG. 54, the process 1300 advances from step 1306, or from step 1304 in embodiments which do not include step 1306, to step 1308 where the processor/controller 14 is operable to measure the door opening speed (DOS); that is, the speed at which the activated motor 461 is opening the respective door 72A, 72B, 76A, 76B, 80, by processing the speed signal produced by the motor sensor 47. In some embodiments in which the motor sensor 47 includes a position sensor, the processor/controller 14 may also be operable at step 1308 to determine the position of the door 72A, 72B, 76A, 76B, 80 relative to a reference position, e.g., to determine an amount, degree or the like that the door 72A, 72B, 76A, 76B, 80 is open relative to a closed position of the door 72A, 72B, 76A, 76B, 80.

Thereafter at step 1310, the processor/controller 14 is operable to monitor a number of parameters of an object, if any, detected by the radar unit carried by the object detection module 12, 12', 12". In the embodiment of the process 1300 illustrated in FIG. 54, for example, the processor/controller 14 is operable to monitor object movement speed (SP), movement direction (DIR) and distance or position (DIST) of the object relative to the door 72A, 72B, 76A, 76B, 80. Illustratively, the object is the user or person attempting to gain access to the vehicle 70, 70' via the respective door 72A, 72B, 76A, 76B, 80, and the processor/controller 14 is operable to process the radar signals, as described above, to determine and monitor the object parameters SP, DIR and DIST. Illustratively, the object parameters are determined relative to the position of the respective object detection module 12, 12', 12", and the processor/controller 14 is operable at step 1310 to process, in a conventional manner, the object parameters along, with stored data relating to the physical characteristics of the door 72A, 72B, 76A, 76B, 80 and placement of the object detection module 12, 12', 12" relative thereto, to determine the object parameters SP, DIR and DIST relative to one or more portions of the door 72A, 72B, 76A, 76B, 80, e.g., relative to the leading edge of the opening door 72A, 72B, 76A, 76B, 80 and/or other portion(s) of the door 72A, 72B, 76A, 76B, 80. In any case, SP illustratively corresponds to the speed with which the object (e.g., user) is moving relative to the door 72A, 72B, 76A, 76B, 80, DIR corresponds to the direction of movement of the object (e.g., user) relative to the door 72A, 72B, 76A, 76B, 80 and DIST corresponds to the distance of the object (e.g., user) from the door 72A, 72B, 76A, 76B, 80 or portion thereof.

From step 1310, the process 1300 advances to step 1312 where the processor/controller 14 is operable to compare the measured door opening speed, DOS, to the object parameters SP, DIR and DIST, and to compute a door opening speed modification value $DOS_M$ based on the comparison. Thereafter at step 1314, the processor/controller 14 is operable to determine whether the current opening speed of the door 72A, 72B, 76A, 76B, 80 (SDOS) requires modification based on $DOS_M$. If so, the process 1300 advances to step 1316 where the processor/controller 14 is operable to modify SDOS as a function of the current value of SDOS and $DOS_M$, and thereafter at step 1318 the processor/controller 14 is operable to control the power door motor 461 to a door opening speed of the new value of SDOS determined at step 1318 before looping back to step 1306 (or to step 1308 in embodiments which do not include step 1306). If, at step 1314, the processor/controller 14 determines that SDOS does not, based on the comparison at step 1312, require any modification from the current value of SDOS, the process 1300 advances to step 1320 where the processor/controller 14 determines whether the door is fully open. If not, the process loops back to step 1308, and otherwise the processor/controller 14 deactivates the power door motor 461 at step 1322.

Illustratively, the processor/controller 14 is operable to compute $DOS_M$ at step 1312 in a manner which, when used to modify SDOS at step 1316, serves to avoid contact between the opening door 72A, 72B, 76A, 76B, 80 and the object (e.g., user or, in some cases, another moving or stationary object). Illustratively $DOS_M$ may be a multiplier value (positive or negative) which will get multiplied by the current door opening speed SDOS, an offset value (positive or negative) which will get added to the current door opening speed SDOS, or a replacement value which will replace the current door opening speed SDOS. In some cases, the new value of SDOS computed at step 1316 may be greater than the current value of SDOS, and in other cases the new value of SDOS may be less than the current value of SDOS. Is still other cases, the new value of SDOS computed at step 1316 may be zero—effectively stopping movement of the door 72A, 72B, 76A, 76B, 80 until object parameters indicate that the door opening can be resumed.

In some alternate embodiments of the process 1300 illustrated in FIG. 54, steps 1304-1308 may not be executed until the processor/controller 14 has determined that any object detected near the powered door 72A, 72B, 76A, 76B, 80 is positioned at a safe distance from the door 72A, 72B, 76A, 76B, 80 so as to avoid contact, e.g., until after execution of steps 1310-1316. In such embodiments, the controller/processor 14 may also be configured to delay unlatching of the door 72A, 72B, 76A, 76B, 80 until just prior to activating the motor $46_1$. Any such alternate embodiments will be referred to hereinafter as "variations" of the process 1300.

Generally, the gesture access process via which the user may unlock one of the doors 72A, 72B, 76A, 76B, 80 prior to automatic opening of the door 72A, 72B, 76A, 76B, 80 according to the process 1300 or variations thereof may be any of the gesture access processes described above, e.g., a predefined hand or foot gesture, walking speed, etc. In such gesture access processes, the user will typically positioned proximate to the door 72A, 72B, 76A, 76B, 80 to be opened when step 1302 is executed, and in order for the motor $46_1$ to open the door 72A, 72B, 76A, 76B, 80 safely, i.e., without contacting the user, the user must move away from the door 72A, 72B, 76A, 76B, 80 at a speed that is faster than the door opening speed or must have already moved sufficiently away from the door 72A, 72B, 76A, 76B, 80 such that the door 72A, 72B, 76A, 76B, 80, even when fully open, will not contact the user. The process 1300 illustratively manages the door opening speed in a manner which ensures that the opening door will not contact the user or other object, and further manages the door opening speed so as to match the speed of movement of the user away from the door 72A, 72B, 76A, 76B, 80 so as to accommodate both quickly moving users and slowly moving users.

Several example scenarios of control of the opening of a powered door according to the process 1300 or variations thereof will now be described. In one example scenario, the user, after the door 72A, 72B, 76A, 76B, 80 is unlocked at step 1302, backs away from the door 72A, 72B, 76A, 76B, 80 at a speed which is faster than that of the opening door, SDOS. In one embodiment of this scenario, the door opening speed modification value $DOS_M$ may reflect no change in the current value of SDOS since the speed at which the user is backing away from the door is greater than SDOS, and there is no danger of contact between the user and the door. Step 1314 may branch to step 1320 in this embodiment of the present scenario, and will continue to do so as long as the speed at which the user is backing away from the door exceeds SDOS. In other embodiments of this scenario, the door opening speed modification value $DOS_M$ may reflect an increased change in the current value of SDOS if the current door opening speed SDOS is less than the maximum door opening speed or maximum allowable door opening speed. In this embodiment of the present scenario, $DOS_M$ may be computed so as to increase SDOS at step 1316 to a door opening speed which matches the speed at which the user is backing away from the door so long as a predefined safe distance is maintained between the door and the user.

In another example scenario, the user, after the door 72A, 72B, 76A, 76B, 80 is unlocked at step 1302, fails to move away from the door 72A, 72B, 76A, 76B, 80. In this scenario, contact between the door and the user will be imminent and the door opening speed modification value $DOS_M$ may be computed so as to require the processor/controller 14 to stop or deactivate the motor $46_1$ to stop the door from opening, or to delay activation of the motor $46_1$ to keep the door from opening in variations of the process 1300. In this scenario, the processor/controller 14 may control the illumination device(s) 112, 112' at step 1306 in a manner which is indicative of the stopped (or non-started) state of the door. The motor $46_1$ and door 72A, 72B, 76A, 76B, 80 will illustratively remain stationary until the user moves, or begins moving, away from the door 72A, 72B, 76A, 76B, 80, after which the door opening speed modification value $DOS_M$ will reflect an increased change in the current value of SDOS so that operation of the motor $46_1$ is resumed (or is started) to continue (or begin) opening the door.

In yet another example scenario, the user, after the door 72A, 72B, 76A, 76B, 80 is unlocked at step 1302, moves away from the door 72A, 72B, 76A, 76B, 80 with a speed that is less than that of the opening door. In this scenario, contact between the door and the user will be imminent at the current opening speed of the door and the door opening speed modification value $DOS_M$ will be computed so as to require the processor/controller 14 reduce the speed of the motor $46_1$ to slow the opening speed of the door. The door opening speed modification value $DOS_M$ will depend on the user's speed and position relative to the door such that the new value of SDOS will correspond to a door opening speed which maintains a predefined safe distance between the opening door and the slowly retreating user. In this scenario, the processor/controller 14 may control the illumination device(s) 112, 112' at step 1306 in a manner which is indicative of the slowed speed of the door.

Illustratively, the process 1300 and variations thereof will continually monitor the opening speed DOS of the door and the object parameters including the speed SP, direction DIR of movement of the user relative to the door 72A, 72B, 76A, 76B, 80 and the position or distance DIST of the user from the door 72A, 72B, 76A, 76B, 80, and modify the opening speed SDOS of the door 72A, 72B, 76A, 76B, 80 based on the measured speed DOS of the door and the object parameters so as to maintain a predefined safe distance between the opening door 72A, 72B, 76A, 76B, 80 and the user. The processor/controller 14 may further control the illumination device(s) 112, 112' at step 1306 in a manner which is indicative of the operational status of the door 72A, 72B, 76A, 76B, 80, e.g., stopped, begin opening, about to begin opening, fully open, etc., and/or to reflect the opening speed of the door 72A, 72B, 76A, 76B, 80.

While this disclosure has been illustrated and described in detail in the foregoing drawings and description, the same is to be considered as illustrative and not restrictive in character, it being understood that only illustrative embodiments thereof have been shown and described and that all changes and modifications that come within the spirit of this disclosure are desired to be protected. Obviously, many modifications and variations of this disclosure are possible in light of the above teachings, and it is to be understood that the various features described herein may be practiced in any combination whether or not specifically recited in the appended claims.

What is claimed is:

1. A gesture access system for a motor vehicle having a powered door, the gesture access system comprising:
   at least one wireless signal transceiver configured to be mounted to the motor vehicle, the at least one wireless signal transceiver responsive to activation signals to emit wireless signals outwardly away from the motor vehicle, and to produce wireless detection signals, the wireless detection signals including at least one reflected wireless signal upon reflection of at least one of the emitted wireless signals by an object toward and detected by the at least one wireless signal transceiver,
   a motor responsive to motor control signals to open the power door,
   at least one processor, and
   at least one memory having instructions stored therein executable by the at least one processor to cause the at least one processor to (i) process the activation and wireless detection signals to determine whether an object is following a predefined gesture, (ii) upon determining that the object is following the predefined gesture, control an unlocking actuator to unlock and unlatch the powered door, (iii) following unlocking of the powered door, monitor and process the activation and wireless detection signals to determine object parameters including a speed of movement of the object away from, and a distance of the object relative to, the powered door, (iv) determine a door opening speed based on the object parameters, and (v) control the motor control signals to open the powered door at the determined door opening speed.

2. The gesture access system of claim 1, wherein the instructions stored in the at least one memory include instructions executable by the at least one processor to continually execute (iii)-(v) until the powered door is fully open.

3. The gesture access system of claim 2, further comprising a sensor configured to produce a speed signal corresponding to an opening speed of the powered door,
   and wherein the instructions stored in the at least one memory include instructions executable by the at least one processor to cause the at least one processor to process the speed signal to determine a measured door opening speed of the powered door, and to control the motor control signals to match the measured door opening speed to at least one of a speed of the object moving away from the powered door and a position of the object relative to the powered door.

4. The gesture access system of claim 1, wherein the at least one memory has stored therein an initial door opening speed,
   and wherein the instructions stored in the at least one memory include instructions executable by the at least one processor to control the motor control signals to open the powered door at the initial door opening speed following unlocking of the powered door,
   and wherein (v) comprises controlling the motor control signals to control the door opening speed from the initial door opening speed to the determined door opening speed based on the object parameters.

5. The gesture access system of claim 4, wherein the instructions stored in the at least one memory include instructions executable by the at least one processor to control the motor control signals to maintain the initial door opening speed until the powered door is fully open in response to determining, based on the initial door opening speed and the object parameters, that the object maintains a safe distance from the opening powered door.

6. The gesture access system of claim 1, further comprising at least one indicator operatively coupled to the processor,
   wherein the at least one memory has instructions stored therein executable by the at least one processor to cause the at least one processor to activate the at least one indicator in response to controlling the motor control signals to open the powered door and to control operation of the at least one indicator according to the determined door opening speed.

7. The gesture access system of claim 1, wherein the instructions stored in the at least one memory include instructions executable by the at least one processor to control the motor control signals to stop the motor, and thereby stop the opening of the powered door, upon determining from the door opening speed and the object parameters that contact between the power door and the object is imminent.

8. The gesture access system of claim 7, further comprising at least one indicator operatively coupled to the processor,
wherein the at least one memory has instructions stored therein executable by the at least one processor to cause the at least one processor to activate the at least one indicator in response to, and according to, controlling the motor control signals to stop the motor.

9. The gesture access system of claim 1, wherein the at least one wireless signal transceiver includes an ultra-wideband (UWB) transceiver and the wireless detection signals are UWB detection signals,
and wherein the predefined gesture comprises a predefined walking pattern,
and wherein the at least one memory has instructions stored therein executable by the at least one processor to cause the at least one processor to process the activation and UWB detection signals to determine a position of the object while following the predefined walking pattern and, upon determining that the object is within a predefined position while following the predefined walking pattern, control the unlocking actuator to unlock the powered door in response to the object being within the predefined position while following the predefined walking pattern.

10. The gesture access system of claim 9, wherein the at least one wireless signal transceiver includes a Bluetooth Low Energy (BLE) transceiver and the wireless detection signals are BLE detection signals,
wherein the at least one memory has instructions stored therein executable by the at least one processor to cause the at least one processor to process the activation and BLE detection signals to determine an angle at which the object is moving while following the predefined walking pattern and, upon determining that the angle is within a predefined angle while following the predefined walking pattern, control the unlocking actuator to unlock the powered door in response to the object moving at the predefined angle while following the predefined walking pattern.

11. The gesture access system of claim 1, further comprising at least one indicator operatively coupled to the processor,
wherein the predefined gesture comprises a predefined walking pattern,
and wherein the at least one memory has instructions stored therein executable by the at least one processor to cause the at least one processor to activate the at least one indicator in response to, and according to, at least one of determining that the object is following the predefined walking pattern and controlling the unlocking actuator to unlock the powered door.

12. The gesture access system of claim 1, further comprising a sensor configured to produce a perimeter signal corresponding a position of the object relative to a predefined perimeter surrounding the motor vehicle,
wherein the at least one memory has instructions stored therein executable by the at least one processor to process the perimeter signal and activate the at least one wireless signal transceiver in response to the object being within the predefined perimeter.

13. The gesture access system of claim 12, wherein the sensor includes at least one of the at least one wireless signal transceiver, a radar unit, an ultra-wideband radar unit, an infrared sensor, a camera or a lidar scanner.

14. A gesture access system for a motor vehicle having a powered door, the gesture access system comprising:

at least one wireless signal transceiver configured to be mounted to the motor vehicle, the at least one wireless signal transceiver responsive to activation signals to emit wireless signals outwardly away from the motor vehicle, and to produce wireless detection signals, the wireless detection signals including at least one reflected wireless signal upon reflection of at least one of the emitted wireless signals by an object toward and detected by the at least one wireless signal transceiver,
a motor responsive to motor control signals to open the power door,
at least one indicator configured to be mounted to the motor vehicle,
at least one processor, and
at least one memory having instructions stored therein executable by the at least one processor to cause the at least one processor to (i) monitor a mobile device status signal produced by a control computer of the motor vehicle or by the at least one processor based on a determination by the control computer or the at least one processor of a proximity, relative to the motor vehicle, of a mobile communication device known to the control computer or to the at least one processor, (ii) in response to the mobile device status signal corresponding to the known mobile communication device being within a perimeter defined about the motor vehicle, process the activation and wireless detection signals to determine whether an object is exhibiting a predefined gesture, (iii) upon determining that the object is exhibiting the predefined gesture, control an unlocking actuator to unlock the powered door, (iv) following unlocking of the powered door, control the motor control signals to open the powered door and activate the at least one indicator according to a door opening indication scheme.

15. The gesture access system of claim 14, wherein the instructions stored in the at least one memory include instructions executable by the at least one processor to cause the at least one processor to (a) following unlocking of the powered door, monitor and process the activation and wireless detection signals to determine object parameters including a speed of movement of the object away from, and a distance of the object relative to, the powered door, (b) determine a door opening speed based on the object parameters, and (c) control the motor control signals to open the powered door at the determined door opening speed.

16. The gesture access system of claim 15, wherein the instructions stored in the at least one memory include instructions executable by the at least one processor to continually execute (a)-(c) until the powered door is fully open,
and wherein the door opening indication scheme corresponds to the determined door opening speed and the at least one memory has instructions stored therein executable by the at least one processor to cause the at least one processor to control operation of the at least one indicator according to the determined door opening speed.

17. The gesture access system of claim 16, further comprising a sensor configured to produce a speed signal corresponding to an opening speed of the powered door,
and wherein the instructions stored in the at least one memory include instructions executable by the at least one processor to cause the at least one processor to process the speed signal to determine a measured door opening speed of the powered door, and to control the motor control signals to match the measured door opening speed to at least one of a speed of the object moving away from the powered door and a position of the object relative to the powered door.

18. The gesture access system of claim 14, wherein the indicator is at least one of an illumination device to produce light visible from outside the motor vehicle, a device configured to produce illuminated graphics, a device configured to project visible light or illuminated graphics onto a surface supporting the motor vehicle, or an audio device configured to produce one or more audible signals.

19. A gesture access system for a motor vehicle having a powered door, the gesture access system comprising:
   at least one wireless signal transceiver configured to be mounted to the motor vehicle, the at least one wireless signal transceiver responsive to activation signals to emit wireless signals outwardly away from the motor vehicle, and to produce wireless detection signals, the wireless detection signals including at least one reflected wireless signal upon reflection of at least one of the emitted wireless signals by an object toward and detected by the at least one wireless signal transceiver,
   a motor responsive to motor control signals to open the power door,
   at least one indicator configured to be mounted to the motor vehicle,
   at least one processor, and
   at least one memory having instructions stored therein executable by the at least one processor to cause the at least one processor to (i) process the activation and wireless detection signals to determine whether an object is following a predefined walking pattern, (iii) upon determining that the object is following the predefined walking pattern, control an unlocking actuator to unlock the powered door, (iv) following unlocking of the powered door, control the motor control signals to open the powered door and activate the at least one indicator according to a door opening indication scheme.

20. The gesture access system of claim 19, wherein the instructions stored in the at least one memory include instructions executable by the at least one processor to cause the at least one processor to (a) following unlocking of the powered door, monitor and process the activation and wireless detection signals to determine object parameters including a speed of movement of the object away from, and a distance of the object relative to, the powered door, (b) determine a door opening speed based on the object parameters, and (c) control the motor control signals to open the powered door at the determined door opening speed.

* * * * *